(12) United States Patent
Cavallo

(10) Patent No.: US 12,516,304 B2
(45) Date of Patent: Jan. 6, 2026

(54) COMPOSITIONS AND METHODS FOR IMPROVED NUCLEASES

(71) Applicant: ASTRAZENECA AB, Sodertalje (SE)

(72) Inventor: Anna-Lina Cavallo, Sodertalje (SE)

(73) Assignee: ASTRAZENECA AB, Södertälje (SE)

( * ) Notice: Subject to any disclaimer, the term of this patent is extended or adjusted under 35 U.S.C. 154(b) by 1168 days.

(21) Appl. No.: 17/273,498

(22) PCT Filed: Sep. 6, 2019

(86) PCT No.: PCT/EP2019/073838
§ 371 (c)(1),
(2) Date: Mar. 4, 2021

(87) PCT Pub. No.: WO2020/049158
PCT Pub. Date: Mar. 12, 2020

(65) Prior Publication Data
US 2021/0198642 A1    Jul. 1, 2021

Related U.S. Application Data

(60) Provisional application No. 62/728,184, filed on Sep. 7, 2018.

(51) Int. Cl.
| | | |
|---|---|---|
| *C12N 9/22* | (2006.01) | |
| *C12N 15/11* | (2006.01) | |
| *C12N 15/90* | (2006.01) | |

(52) U.S. Cl.
CPC ............... *C12N 9/22* (2013.01); *C12N 15/11* (2013.01); *C12N 15/907* (2013.01); *C12N 2310/20* (2017.05); *C12N 2800/80* (2013.01)

(58) Field of Classification Search
None
See application file for complete search history.

(56) References Cited

FOREIGN PATENT DOCUMENTS

| | | |
|---|---|---|
| EP | 3178935 A1 | 6/2017 |
| JP | 2015533817 A | 11/2015 |
| JP | 2016534132 A | 11/2016 |
| JP | 2017526387 A | 9/2017 |
| JP | 2018522546 A | 8/2018 |
| WO | 2014047741 A1 | 4/2014 |
| WO | 2016021973 A1 | 2/2016 |
| WO | 2015035136 A8 | 3/2016 |
| WO | 2016205613 A1 | 12/2016 |
| WO | 2018068053 A2 | 4/2018 |

OTHER PUBLICATIONS

Koo et al. "Measuring and Reducing Off-Target Activities of Programmable Nucleases Including CRISPR-Cas9" (2015) Molecules Cells, vol. 38, No. 6: 475-481. (Year: 2015).*
Newman et al. "Cas9 Cuts and Consequences: Detecting, Predicting, and Mitigating CRISPR/Cas9 On- and Off-Target Damage" (2020) BioEssays, vol. 42, No. 2000047 (1-13). (Year: 2020).*
Chapman et al. "Approaches to Reduce CRISPR Off-Target Effects for Safer Genome Editing" (2017) Applied Biosafety: J of ABSA Intern'l, vol. 22, No. 1: 7-13. (Year: 2017).*
Fernandez-Fernandez Hsp70 chaperone: a master player in protein homestasis. (2018) F1000Research, vol. 7: 1-10. (Year: 2018).*
International Search Report and Written Opinion for International Application No. PCT/EP2019/073838, mailed Jan. 20, 2020, 10 Pages.

* cited by examiner

*Primary Examiner* — Teresa E Knight

(57) ABSTRACT

The present disclosure provides recombinant Cas9 proteins with a faster degradation rate than wild-type Cas9. The present disclosure also provides recombinant Cas9 proteins and CRISPR-Cas systems with reduced off-target modifications. Also provided herein are methods of site-specific modification with reduced off-target modifications utilizing the recombinant Cas9 proteins of the present disclosure.

16 Claims, 27 Drawing Sheets

Specification includes a Sequence Listing.

Cas9     KFERQ-Cas9

FLAG-Cas9     FLAG-FaDe

FIG. 8
FIG. 9A          FIG. 9B
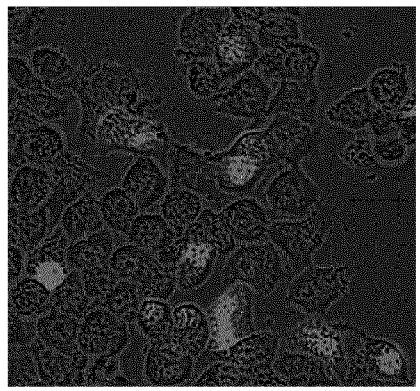  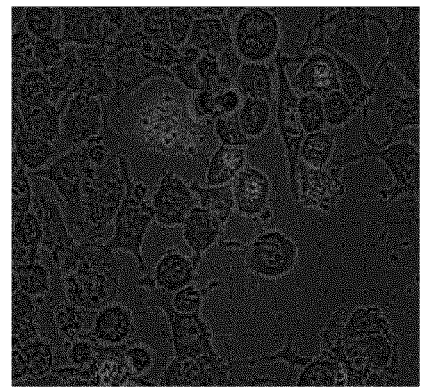
Cas9 fused GFP        FaDe-Cas9 fused GFP Cas9-GFP-Fused mCherry Merge dsRed-Lamp2a    GFP-FaDe-Cas9    Merge

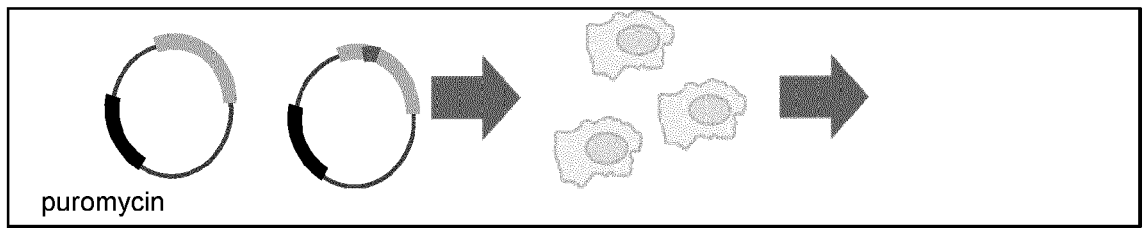
FIG. 22A
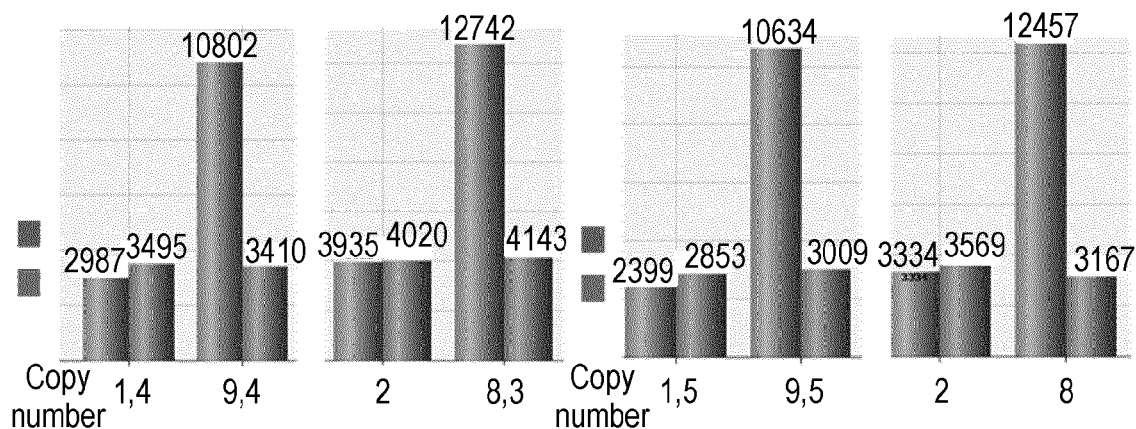
FIG. 22B
| Stable poolsc | Copy number Cas9 | Copy number puromycin |
|---|---|---|
| Cas9 pool 1 | 1,5 | 1,4 |
| Cas9 pool 2 | 2 | 2 |
| FaDe pool 1 | 9,5 | 9,4 |
| FaDe pool 2 | 8 | 8,3 |
FIG. 22C

```
CIRCLE-seq      Paired OFF targets
read count   20            10              1
    WT     AGCAGCAGCGGCGGCAACAGNGG
    5546   . . . . . . . . . . . . . . . . . . C . .
    4214   . . . . . . . . . A . . A . . . . . . C . .
    3928   . . . . . . . . . . . A . . . . . . . CA .
    3106   . . . . . . . . A . . A . . . . . . . G . .
    2954   . . . . . . . . A . . A . . . . . . . GA .
    2646   . . . . . . . . . A . . A . . . . . . C . .
    2358   . . . . . . . . . . . . . . . . . . . CA .
    2224   . . . . . . . . AA . A . . . . . . . C . .
    930    . . . . . . . . . A . . A . . . . . . CA .
    710    . . . . . . . G . . . . . . . . . . . G . .
```

FIG 28A
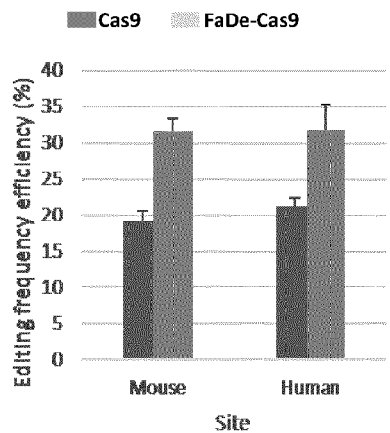
FIG 28B
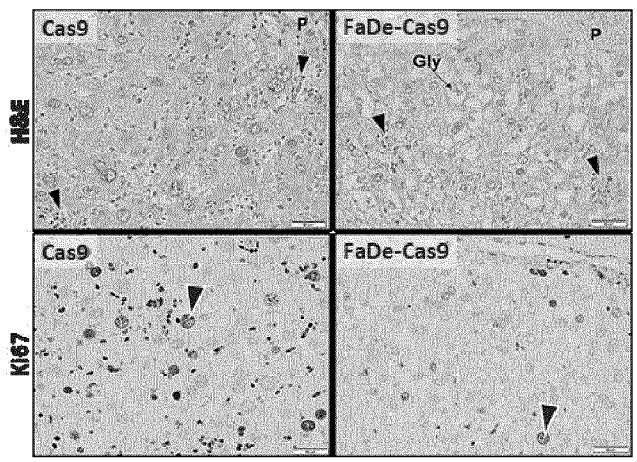
FIG 28C
|  | Cas9-gMH | FaDe-gMH |
|---|---|---|
| Number of mice | 3 | 3 |
| Glycogen loss | 3(2.3) | 0 |
| Cell infiltrates | 3(5) | 3(2.3) |
| Single cell necrosis | 3(3.0) | 3(1.7) |
| KI67 expression | ++ | + |

COMPOSITIONS AND METHODS FOR IMPROVED NUCLEASES

CROSS-REFERENCE TO RELATED APPLICATIONS

This application is a U.S. National Stage application of International Application No. PCT/EP2019/073838, filed on Sep. 6, 2019, said International Application No. PCT/EP2019/073838 claims benefit under 35 U.S.C. § 119(e) of the U.S. Provisional Application No. 62/728,184, filed Sep. 7, 2018. Each of the above listed applications is incorporated by reference herein in its entirety for all purposes.

REFERENCE TO THE SEQUENCE LISTING

This application incorporates by reference a Sequence Listing submitted with this application as text file entitled 200777_Sequence_Listing.txt, created on Mar. 4, 2021, and having a size of 154 kilobytes.

FIELD OF THE INVENTION

The present disclosure provides recombinant Cas9 proteins with a faster degradation rate than wild-type Cas9. The present disclosure also provides recombinant Cas9 proteins and CRISPR-Cas systems with reduced off-target modifications. Also provided herein are methods of site-specific modification with reduced off-target modifications utilizing the recombinant Cas9 proteins of the present disclosure.

BACKGROUND

Clustered Regularly Interspaced Short Palindromic Repeats (CRISPR) and CRISPR-associated (Cas) systems are prokaryotic immune systems first discovered by Ishino in *E. coli* (Ishino et al., Journal of Bacteriology 169(12): 5429-5433 (1987)). The prokaryotic immune system provides immunity against viruses and plasmids by targeting the nucleic acids of the viruses and plasmids in a sequence-specific manner. See also Soret et al., Nature Reviews Microbiology 6(3):181-186 (2008). There are two main stages involved in the CRISPR immune response: the first is acquisition, and the second is interference. The acquisition stage involves cutting the genome of invading viruses and plasmids and integrating segments of the invading virus and plasmid genome into the CRISPR locus of the organism. The segments that are integrated into the CRISPR locus of the organism are known as protospacers and help in protecting the organism from subsequent attack by the same virus or plasmid. The second stage involves attacking an invading virus or plasmid. In the second stage, the protospacers are transcribed to RNA, which, following some processing, hybridizes with a complementary sequence in the DNA of an invading virus or plasmid while also associating with a protein, or protein complex that effectively cleaves the DNA.

Depending on the bacterial species, CRISPR RNA processing proceeds differently. For example, in the Type II system, originally described in the bacterium *Streptococcus pyogenes*, the transcribed RNA is paired with a trans-activating RNA (tracrRNA) before being cleaved by RNase III to form an individual CRISPR-RNA (crRNA). The crRNA is further processed after binding by the Cas9 nuclease to produce the mature crRNA. The crRNA/Cas9 complex subsequently binds to DNA containing sequences complementary to the captured regions (termed protospacers). The Cas9 protein then cleaves both strands of DNA in a site-specific manner, forming a double-strand break (DSB). This provides a DNA-based "memory", resulting in rapid degradation of viral or plasmid DNA upon repeat exposure and/or infection. The native CRISPR system has been comprehensively reviewed (see, e.g., Barrangou et al., Cell 54(2):234-244 (2014)).

Since its original discovery, multiple groups have performed extensive research around potential applications of the CRISPR system in genetic engineering, including gene editing (Jinek et al., Science 337(6096):816-821 (2012); Cong et al., Science 339(6121):819-823 (2013); and Mali et al., Science 339(6121):823-826 (2013)). The CRISPR-Cas9 gene editing system has been used successfully in a wide range of organisms and cell lines. In addition to genome editing, the CRISPR system has a multitude of other applications, including regulating gene expression, genetic circuit construction, and functional genomics, amongst others (reviewed in Sander et al., Nature Biotechnology 32:347-355 (2014)).

The suitability of CRISPR/Cas9 for therapeutic applications is a topic of strong interest. However, off-target modifications (i.e., double-stranded DNA breaks at loci other than the intended target sequence) of the target genome may result in unpredictable and undesired results, raising concern for using the CRISPR system in clinical applications. See, e.g., Hsu et al., Nature Biotechnology 31(9):827-834 (2013); Hsu et al., Cell 157(6):1262-1278 (2014); and Schaefer et al., Nature Methods 14(6):547-548 (2017).

Cellular toxicity of the CRISPR/Cas9 system is also a concern. A study demonstrated that a tp53-dependent toxic response was triggered in cells when Cas9 nuclease efficiency was increased (Ihry et al., bioRxiv (2017), doi: 10.1101/168443).

Efforts have been directed towards reducing Cas9 off-target modifications. Fu et al. describe a method using truncated guide RNAs with short regions of target complementarity, to decrease the off-target effects of Cas9 by decreasing the length of the guide RNA-target DNA interface (Nature Biotechnology 32(3):279-284 (2014)). Kleinstiver et al. describe engineered Cas9 variants that have decreased contact with the target DNA sequence to minimize off-target binding (Nature 529(7587):490-495 (2016)). However, while Cas9 off-target activity was decreased, both studies also showed a corresponding decrease in on-target nuclease efficiency.

Thus, there remains a need in the field for an improved CRISPR/Cas9 system with decreased off-target activity, that retains on-target efficiency.

SUMMARY OF THE INVENTION

In some embodiments, the present disclosure provides recombinant Cas9 proteins with a faster degradation rate than wild-type Cas9. In some embodiments, the present disclosure also provides recombinant Cas9 proteins and CRISPR-Cas systems with reduced off-target modifications. In some embodiments, the present disclosure provides methods of site-specific modification with reduced off-target modifications utilizing the recombinant Cas9 proteins described herein.

In some embodiments, the present disclosure provides a recombinant Cas9 protein including an engineered KFERQ motif or KFERQ-like motif.

In some embodiments, the engineered KFERQ motif or KFERQ-like motif is selected from KFERQ (SEQ ID NO:24), RKVEQ (SEQ ID NO:25), QDLKF (SEQ ID NO:26), QRFFE (SEQ ID NO:27), NRVVD (SEQ ID NO:28), QRDKV (SEQ ID NO:29), QKILD (SEQ ID NO:30), QKKEL (SEQ ID NO:31), QFREL (SEQ ID NO:32), IKLDQ (SEQ ID NO:33), DVVRQ (SEQ ID NO:34), QRIVE (SEQ ID NO:35), VKELQ (SEQ ID NO:36), QKVFD (SEQ ID NO:37), QELLR (SEQ ID NO:38), VDKLN (SEQ ID NO:39), RIKEN (SEQ ID NO:40), NKKFE (SEQ ID NO:41), and combinations thereof. In some embodiments, the engineered KFERQ-like motif is VDKLN (SEQ ID NO:39).

In some embodiments, the engineered KFERQ motif or KFERQ-like motif is in a REC lobe of the recombinant Cas9 protein. In some embodiments, the engineered KFERQ motif or KFERQ-like motif is in a Rec2 domain of the REC lobe. In some embodiments, the engineered KFERQ motif or KFERQ-like motif is in an HNH domain, a RuvC domain, or a PI domain of the recombinant Cas9 protein.

In some embodiments, the engineered KFERQ motif or KFERQ-like motif is in a surface-exposed region of the recombinant Cas9 protein. In some embodiments, the engineered KFERQ motif or KFERQ-like motif is at an N-terminus or a C-terminus of the recombinant Cas9 protein.

In some embodiments, the present disclosure provides a recombinant Cas9 protein including one or more amino acid modifications of a wild-type Cas9 protein that introduce a chaperone mediated autophagy (CMA) target motif or an endosomal microautophagy (eMI) target motif in the Cas9 protein, wherein the recombinant Cas9 protein degrades at least 20% faster in vivo than the wild-type Cas9 protein or a Cas9 protein that does not include the CMA or eMI target motif. In some embodiments, the recombinant Cas9 protein degrades at least 50% faster in vivo than the wild-type Cas9 protein or the Cas9 protein that does not comprise the CMA or eMI target motif. In some embodiments, the recombinant Cas9 protein degrades at least 80% faster in vivo than the wild-type Cas9 protein or the Cas9 protein that does not comprise the CMA or eMI target motif.

In some embodiments, the present disclosure provides a recombinant Cas9 protein including one or more amino acid modifications in a wild-type Cas9 protein, wherein the recombinant Cas9 protein includes a CMA target motif or an eMI target motif.

In some embodiments, the CMA target motif or the eMI target motif is selected from KFERQ (SEQ ID NO:24), RKVEQ (SEQ ID NO:25), QDLKF (SEQ ID NO:26), QRFFE (SEQ ID NO:27), NRVVD (SEQ ID NO:28), QRDKV (SEQ ID NO:29), QKILD (SEQ ID NO:30), QKKEL (SEQ ID NO:31), QFREL (SEQ ID NO:32), IKLDQ (SEQ ID NO:33), DVVRQ (SEQ ID NO:34), QRIVE (SEQ ID NO:35), VKELQ (SEQ ID NO:36), QKVFD (SEQ ID NO:37), QELLR (SEQ ID NO:38), VDKLN (SEQ ID NO:39), RIKEN (SEQ ID NO:40), NKKFE (SEQ ID NO:41), and combinations thereof. In some embodiments, the CMA target motif or the eMI target motif is VDKLN (SEQ ID NO:39). In some embodiments, the one or more amino acid substitutions is in a surface-exposed region of the recombinant Cas9 protein.

In some embodiments, the present disclosure provides a recombinant Cas9 protein isolated from *Streptococcus pyogenes* (SpCas9) including an amino acid modification at one or more of position F185, A547, I548, T560, V561, D829, I830, L1087, S1088, P1199, K1200 of SEQ ID NO:1, or combinations thereof.

In some embodiments, the amino acid modification includes one or more of the following mutations: F185N; A547E/I548L; T560E/V561Q; D829L/I830R; L1087E/S1088Q; or P1199D/K1200Q. In some embodiments, the amino acid modification is a mutation at F185. In some embodiments, the mutation is F185N. In some embodiments, the amino acid modification results in a CMA target motif or an eMI target motif.

In some embodiments, the recombinant Cas9 protein of the present disclosure is at least 90% identical to SEQ ID NO:1.

In some embodiments, the present disclosure provides a recombinant Cas9 protein capable of binding to heat shock cognate protein of 70 kD (HSC70).

In some embodiments, the present disclosure provides a recombinant protein isolated from *Streptococcus pyogenes* (SpCas9), comprising an engineered KFERQ motif or KFERQ-like motif at amino acid position 185 of SEQ ID NO:1. In some embodiments, the KFERQ-like motif is VDKLN (SEQ ID NO:39).

In some embodiments, the recombinant Cas9 protein of the present disclosure further includes a mutation at position D10, H840, or combinations thereof in SEQ ID NO:1. In some embodiments, the mutation is selected from D10A or DION; H840A, H840N, or H840Y; and combinations thereof. In some embodiments, the recombinant Cas9 protein of the present disclosure generates cohesive ends.

In some embodiments, the recombinant Cas9 protein of the present disclosure further includes one or more nuclear localization signals.

In some embodiments, the present disclosure provides a polynucleotide sequence encoding the recombinant Cas9 of the present disclosure. In some embodiments, the polynucleotide sequence is codon optimized for expression in a eukaryotic cell.

In some embodiments, the present disclosure provides a non-naturally occurring CRISPR-Cas system including: the recombinant Cas9 protein of the present disclosure; and a guide polynucleotide that forms a complex with the recombinant Cas9 protein and includes a guide sequence.

In some embodiments, the present disclosure provides a non-naturally occurring CRISPR-Cas system including: a polynucleotide sequence encoding the recombinant Cas9 protein of the present disclosure; and a guide polynucleotide that forms a complex with the recombinant Cas9 protein and includes a guide sequence.

In some embodiments, the present disclosure provides a non-naturally occurring CRISPR-Cas system including: a regulatory element operably linked to a polynucleotide sequence encoding the recombinant Cas9 protein of the present disclosure; and a guide polynucleotide that forms a complex with the recombinant Cas9 protein and includes a guide sequence.

In some embodiments of the CRISPR-Cas system, the guide sequence is linked to a direct repeat sequence.

In some embodiments of the CRISPR-Cas system, the guide polynucleotide includes a tracrRNA sequence. In some embodiments, the CRISPR-Cas system includes a separate polynucleotide including a tracrRNA sequence.

In some embodiments of the CRISPR-Cas system, polynucleotide sequences encoding the recombinant Cas9 protein and the guide polynucleotide are on a single vector. In some embodiments of the CRISPR-Cas system, polynucleotide sequences encoding the recombinant Cas9 protein, the guide polynucleotide, and the tracrRNA sequence are on a single vector.

In some embodiments, a delivery particle includes the CRISPR-Cas system of the present disclosure. In some embodiments, a vesicle includes the CRISPR-Cas system of the present disclosure. In some embodiments, the vesicle is an exosome or a liposome.

In some embodiments, a viral vector includes the CRISPR-Cas system of the present disclosure. In some embodiments, the viral vector is of an adenovirus, a lentivirus, or an adeno-associated virus.

In some embodiments, the present disclosure provides a method of providing a site-specific modification at a target sequence in a genome of a cell, the method including introducing into the cell the CRISPR-Cas system of the present disclosure.

In some embodiments of the method, the modification includes deletion of at least part of the target sequence. In some embodiments of the method, the modification includes mutation of the target sequence. In some embodiments of the method, the modification includes inserting a sequence of interest (SoI) at the target sequence.

In some embodiments of the method, off-target modifications in the genome of the cell are less than about 5% of modifications in the genome made by the recombinant Cas9. In some embodiments of the method, off-target modifications in the genome of the cell are less than about 2% of modifications in the genome made by the recombinant Cas9. In some embodiments of the method, off-target modifications in the genome of the cell are less than about 1% of modifications in the genome made by the recombinant Cas9. In some embodiments of the method, off-target modifications in the genome of the cell are reduced by at least about 50% relative to wild-type CRISPR-Cas9 or a Cas9 that does not include a KFERQ motif or KFERQ-like motif.

In some embodiments of the method, the cell is a bacterial cell, a mammalian cell, or a plant cell. In some embodiments of the method, the cell is a human cell. In some embodiments of the method, the cell is a pluripotent stem cell. In some embodiments of the method, the cell is an induced pluripotent stem cell.

In some embodiments of the method, the guide sequence of the guide polynucleotide is capable of hybridizing to the target sequence in the genome of the cell. In some embodiments of the method, the CRISPR-Cas system is introduced into the cell via a delivery particle, a vesicle, or a viral vector.

BRIEF DESCRIPTION OF THE DRAWINGS

FIGS. 1 and 2 relate to the experiments described in Example 4.

FIG. 2, left panel is a microscopy image of induced pluripotent stem cells (iPSC). FIG. 2, right panel is a microscopy image of iPSC expressing Cas9.

FIGS. 5 to 12 relate to the experiments described in Example 1.

In FIG. 6A, wild-type Cas9 is detectable by a Cas9-specific antibody, but KFERQ-Cas9 is not detected. In FIG. 6B, FLAG-tagged wild-type Cas9 is detectable by antibodies specific to FLAG and Cas9, but FLAG-tagged KFERQ-Cas9 is not detected by either antibody.

FIG. 7B shows that mRNA transcript levels of Cas9 and FaDe-Cas9 are comparable at the same time points.

FIG. 8 shows a schematic of a dual-reporter vector that includes one promoter for expressing Cas9 fused to a GFP, and a second promoter for expressing mCherry.

FIGS. 9A and 9B are fluorescence microscopy images showing cells expressing Cas9-GFP and FaDe-Cas9-GFP, respectively.

FIG. 12 shows Western blots indicating expression levels over time of Cas9 and FaDe-Cas9 in different cell types, as detected by a Cas9-specific antibody.

FIGS. 13 to 16 relate to the experiments described in Example 2.

FIG. 13B shows an immunofluorescence image of Cas9 or FaDe-Cas9 and Lamp-2A.

FIG. 14 shows schematics of two plasmids: the first plasmid expresses Lamp-2A fused to dsRed, and the second plasmid expresses FaDe-Cas9 fused to GFP.

FIG. 15 shows a fluorescence microscopy image of Lamp-2A-dsRed, FaDe-Cas9-GFP, and a merged image showing colocalization of Lamp-2A and FaDe-Cas9.

FIG. 16 shows a Western blot indicating the localization of Cas9 and FaDe-Cas9 in the cytosol or nucleus.

FIGS. 17 to 19 relate to the experiments described in Example 3.

FIG. 18 shows the results of an assay testing Cas9 and FaDe-Cas9 nuclease activity in hiPSc. RNP: ribonucleoprotein; pl: plasmid.

FIG. 19 shows the results of an analysis of off-target modifications by Cas9 and FaDe-Cas9 at the EMX and FANCF loci. The left, middle, and right panels compare, respectively, the on-target efficiency, off-target efficiency, and normalized on-target efficiency, between Cas9 and FaDe-Cas9.

FIG. 22A shows a schematic of an experiment testing cell tolerance of Cas9 and FaDe-Cas9. FIGS. 22B and 22C show that cells can tolerate more copies of FaDe-Cas9 compared with Cas9.

FIG. 28A shows histopathological summaries in mice expressing Cas9 or FaDe-Cas9,including the number of mice, glycogen loss, inflammatory cell infiltrates, single-cell necrosis, and Ki67 expression.

FIG. 28B shows representative immunohistochemistry images comparing tissues from Cas9-and FaDe-Cas9-expressing mice, including CD4/CD8, phosphorylated H2AX (pH2AX), and cleaved caspase-3.

FIG. 28C shows a table summarizing pathology metrics for Cas9 versus FaDe-Cas9 cohorts.

DETAILED DESCRIPTION OF THE INVENTION

Figure 1A:
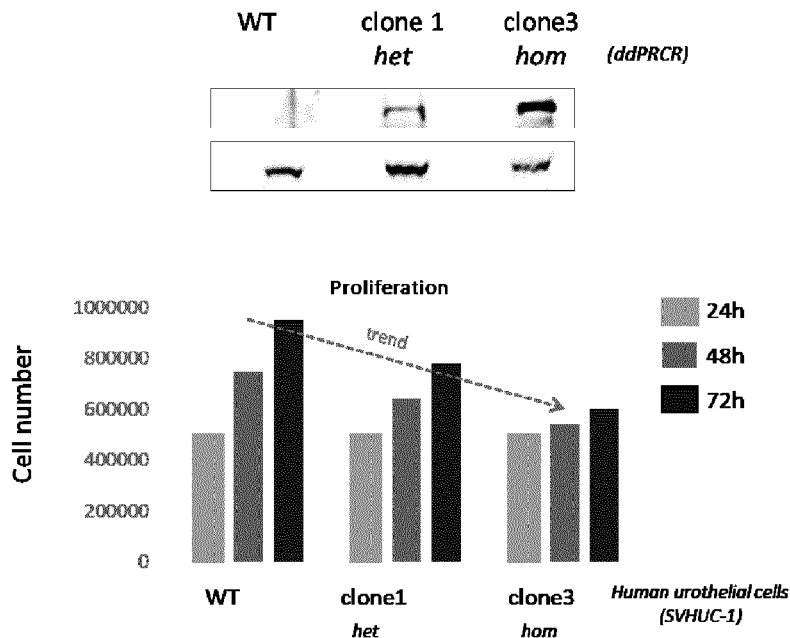
FIG. 1A shows that cell numbers are reduced after stable transfection of Cas9 into human urothelial cells (SVHUC-1).

Described herein are components of the CRISPR-Cas system, which can be utilized for genome editing, genome engineering, and altering the expression of a gene and/or genetic element. CRISPR-Cas systems may be useful in various therapeutic applications, including the treatment of genetic diseases. Also described herein are fast-degrading variants of Cas9 proteins (sometimes referred to as "FaDe-Cas9") that help reduce off-target activity of the CRISPR-Cas9 system. Further advantages of the fast-degrading Cas9 proteins are described herein and include, but are not limited to, on-target efficiency comparable to that of wild-type Cas9 and/or reduced toxicity compared with wild-type Cas9.

Definitions

As used herein, "a" or "an" may mean one or more. As used herein in the specification and claims, when used in conjunction with the word "comprising," the words "a" or "an" may mean one or more than one. As used herein, "another" or "a further" may mean at least a second or more.

Throughout this application, the term "about" is used to indicate that a value includes the inherent variation of error for the method/device being employed to determine the value, or the variation that exists among the study subjects. Typically, the term is meant to encompass approximately or less than 1%, 2%, 3%, 4%, 5%, 6%, 7%, 8%, 9%, 10%, 11%, 12%, 13%, 14%, 15%, 16%, 17%, 18%, 19% or 20% variability, depending on the situation.

The use of the term "or" in the claims is used to mean "and/or" unless explicitly indicated to refer only to alternatives or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited, elements or method steps. It is contemplated that any embodiment discussed in this specification can be implemented with respect to any method, system, host cells, expression vectors, and/or composition of the present disclosure. Furthermore, compositions, systems, host cells, and/or vectors of the present disclosure can be used to achieve methods and proteins of the present disclosure.

The use of the term "for example" and its corresponding abbreviation "e.g." (whether italicized or not) means that the specific terms recited are representative examples and embodiments of the disclosure that are not intended to be limited to the specific examples referenced or cited unless explicitly stated otherwise.

A "nucleic acid," "nucleic acid molecule," "nucleotide," "nucleotide sequence," "oligonucleotide," or "polynucleotide" means a polymeric compound including covalently linked nucleotides. The term "nucleic acid" includes ribonucleic acid (RNA) and deoxyribonucleic acid (DNA), both of which may be single- or double-stranded. DNA includes, but is not limited to, complementary DNA (cDNA), genomic DNA, plasmid or vector DNA, and synthetic DNA. In some embodiments, the disclosure provides a polynucleotide encoding any one of the polypeptides disclosed herein, e.g., is directed to a polynucleotide encoding a Cas protein or a variant thereof.

A "gene" refers to an assembly of nucleotides that encode a polypeptide, and includes cDNA and genomic DNA nucleic acid molecules. "Gene" also refers to a nucleic acid fragment that can act as a regulatory sequence preceding (5' non-coding sequences) and following (3' non-coding sequences) the coding sequence.

A nucleic acid molecule is "hybridizable" or "hybridized" to another nucleic acid molecule, such as a cDNA, genomic DNA, or RNA, when a single stranded form of the nucleic acid molecule can anneal to the other nucleic acid molecule under the appropriate conditions of temperature and solution ionic strength. Hybridization and washing conditions are known and exemplified in Sambrook et al., Molecular Cloning: A Laboratory Manual, Second Edition, Cold Spring Harbor Laboratory Press, Cold Spring Harbor (1989), particularly Chapter 11 and Table 11.1 therein. The conditions of temperature and ionic strength determine the "stringency" of the hybridization. Stringency conditions can be adjusted to screen for moderately similar fragments, such as homologous sequences from distantly related organisms, to highly similar fragments, such as genes that duplicate functional enzymes from closely related organisms. For preliminary screening for homologous nucleic acids, low stringency hybridization conditions, corresponding to a $T_m$ of 55° C., can be used, e.g., 5×SSC, 0.1% SDS, 0.25% milk, and no formamide; or 30% formamide, 5×SSC, 0.5% SDS. Moderate stringency hybridization conditions correspond to a higher $T_m$, e.g., 40% formamide, with 5× or 6×SCC. High stringency hybridization conditions correspond to the highest $T_m$, e.g., 50% formamide, 5× or 6×SCC. Hybridization requires that the two nucleic acids contain complementary sequences, although depending on the stringency of the hybridization, mismatches between bases are possible.

The term "complementary" is used to describe the relationship between nucleotide bases that are capable of hybridizing to one another. For example, with respect to DNA, adenosine is complementary to thymine and cytosine is complementary to guanine. Accordingly, the present disclosure also includes isolated nucleic acid fragments that are complementary to the complete sequences as disclosed or used herein as well as those substantially similar nucleic acid sequences.

A DNA "coding sequence" is a double-stranded DNA sequence that is transcribed and translated into a polypeptide in a cell in vitro or in vivo when placed under the control of appropriate regulatory sequences. "Suitable regulatory sequences" refer to nucleotide sequences located upstream (5' non-coding sequences), within, or downstream (3' non-coding sequences) of a coding sequence, and which influence the transcription, RNA processing or stability, or translation of the associated coding sequence. Regulatory sequences may include promoters, translation leader sequences, introns, polyadenylation recognition sequences, RNA processing site, effector binding site and stem-loop structure. The boundaries of the coding sequence are determined by a start codon at the 5' (amino) terminus and a translation stop codon at the 3' (carboxyl) terminus. A coding sequence can include, but is not limited to, prokaryotic sequences, cDNA from mRNA, genomic DNA sequences, and even synthetic DNA sequences. If the coding sequence is intended for expression in a eukaryotic cell, a polyadenylation signal and transcription termination sequence will usually be located 3' to the coding sequence.

"Open reading frame" is abbreviated ORF and means a length of nucleic acid sequence, either DNA, cDNA or RNA, that includes a translation start signal or initiation codon such as an ATG or AUG, and a termination codon and can be potentially translated into a polypeptide sequence.

The term "homologous recombination" refers to the insertion of a foreign DNA sequence into another DNA molecule, e.g., insertion of a vector in a chromosome. In some cases, the vector targets a specific chromosomal site for homologous recombination. For specific homologous recombination, the vector typically contains sufficiently long regions of homology to sequences of the chromosome to allow complementary binding and incorporation of the vector into the chromosome. Longer regions of homology, and greater degrees of sequence similarity, may increase the efficiency of homologous recombination.

Methods known in the art may be used to propagate a polynucleotide according to the disclosure herein. Once a suitable host system and growth conditions are established, recombinant expression vectors can be propagated and prepared in quantity. As described herein, the expression vectors which can be used include, but are not limited to, the following vectors or their derivatives: human or animal viruses such as vaccinia virus or adenovirus; insect viruses such as baculovirus; yeast vectors; bacteriophage vectors (e.g., lambda), and plasmid and cosmid DNA vectors.

As used herein, "operably linked" means that a polynucleotide of interest, e.g., the polynucleotide encoding a Cas9 protein, is linked to the regulatory element in a manner that allows for expression of the polynucleotide sequence. In some embodiments, the regulatory element is a promoter. In some embodiments, polynucleotide of interest is operably linked to a promoter on an expression vector.

As used herein, "promoter," "promoter sequence," or "promoter region" refers to a DNA regulatory region/sequence capable of binding RNA polymerase and involved in initiating transcription of a downstream coding or non-coding sequence. In some examples of the present disclosure, the promoter sequence includes the transcription initiation site and extends upstream to include the minimum number of bases or elements used to initiate transcription at levels detectable above background. In some embodiments, the promoter sequence includes a transcription initiation site, as well as protein binding domains responsible for the binding of RNA polymerase. Eukaryotic promoters will often, but not always, contain "TATA" boxes and "CAT" boxes. Various promoters, including inducible promoters, may be used to drive the various vectors of the present disclosure.

A "vector" is any means for the cloning of and/or transfer of a nucleic acid into a host cell. A vector may be a replicon to which another DNA segment may be attached so as to bring about the replication of the attached segment. A "replicon" is any genetic element (e.g., plasmid, phage, cosmid, chromosome, virus) that functions as an autonomous unit of DNA replication in vivo, i.e., capable of replication under its own control. In some embodiments of the present disclosure the vector is an episomal vector, which is removed/lost from a population of cells after a number of cellular generations, e.g., by asymmetric partitioning. The term "vector" includes both viral and non-viral means for introducing the nucleic acid into a cell in vitro, ex vivo, or in vivo. A large number of vectors known in the art may be used to manipulate nucleic acids, incorporate response elements and promoters into genes, etc. Possible vectors include, for example, plasmids or modified viruses including, for example, bacteriophages such as lambda derivatives, or plasmids such as PBR322 or pUC plasmid derivatives, or the Bluescript vector. For example, the insertion of the DNA fragments corresponding to response elements and promoters into a suitable vector can be accomplished by ligating the appropriate DNA fragments into a chosen vector that has complementary cohesive termini. Alternatively, the ends of the DNA molecules may be enzymatically modified, or any site may be produced by ligating nucleotide sequences (linkers) into the DNA termini. Such vectors may be engineered to contain selectable marker genes that provide for the selection of cells that have incorporated the marker into the cellular genome. Such markers allow identification and/or selection of host cells that incorporate and express the proteins encoded by the marker.

Viral vectors, and particularly retroviral vectors, have been used in a wide variety of gene delivery applications in cells, as well as living animal subjects. Viral vectors that can be used include, but are not limited to, retrovirus, adeno-associated virus, pox, baculovirus, vaccinia, herpes simplex, Epstein-Barr, adenovirus, geminivirus, and caulimovirus vectors. Non-viral vectors include, but are not limited to, plasmids, liposomes, electrically charged lipids (cytofectins), DNA-protein complexes, and biopolymers. In addition to a nucleic acid, a vector may also include one or more regulatory regions, and/or selectable markers useful in selecting, measuring, and monitoring nucleic acid transfer results (transfer to which tissues, duration of expression, etc.).

Vectors may be introduced into the desired host cells by known methods, including, but not limited to, transfection, transduction, cell fusion, and lipofection. Vectors can include various regulatory elements including promoters. In some embodiments, vector designs can be based on constructs designed by Mali et al., "Cas9 as a versatile tool for engineering biology," Nature Methods 10:957-63 (2013). In some embodiments, the present disclosure provides an expression vector including any of the polynucleotides described herein, e.g., an expression vector including polynucleotides encoding a Cas protein or variant thereof. In some embodiments, the present disclosure provides an expression vector including polynucleotides encoding a Cas9 protein or variant thereof.

The term "plasmid" refers to an extra chromosomal element often carrying a gene that is not part of the central metabolism of the cell, and usually in the form of circular double-stranded DNA molecules. Such elements may be autonomously replicating sequences, genome integrating sequences, phage or nucleotide sequences, linear, circular, or supercoiled, of a single- or double-stranded DNA or RNA, derived from any source, in which a number of nucleotide sequences have been joined or recombined into a unique construction which is capable of introducing a promoter fragment and DNA sequence for a selected gene product along with appropriate 3' untranslated sequence into a cell.

"Transfection" as used herein means the introduction of an exogenous nucleic acid molecule, including a vector, into a cell. A "transfected" cell includes an exogenous nucleic acid molecule inside the cell and a "transformed" cell is one in which the exogenous nucleic acid molecule within the cell induces a phenotypic change in the cell. The transfected nucleic acid molecule can be integrated into the host cell's genomic DNA and/or can be maintained by the cell, temporarily or for a prolonged period of time, extra-chromosomally. Host cells or organisms that express exogenous nucleic acid molecules or fragments are referred to as "recombinant," "transformed," or "transgenic" organisms. In some embodiments, the present disclosure provides a host cell including any of the expression vectors described herein, e.g., an expression vector including a polynucleotide encoding a Cas protein or variant thereof. In some embodiments, the present disclosure provides a host cell including an expression vector including a polynucleotide encoding a Cas9 protein or variant thereof.

The term "host cell" refers to a cell into which a recombinant expression vector has been introduced. The term "host cell" refers not only to the cell in which the expression vector is introduced (the "parent" cell), but also to the progeny of such a cell. Because modifications may occur in succeeding generations, for example, due to mutation or environmental influences, the progeny may not be identical to the parent cell, but are still included within the scope of the term "host cell."

The terms "peptide," "polypeptide," and "protein" are used interchangeably herein, and refer to a polymeric form of amino acids of any length, which can include coded and non-coded amino acids, chemically or biochemically modified or derivatized amino acids, and polypeptides having modified peptide backbones.

The start of the protein or polypeptide is known as the "N-terminus" (or amino-terminus, $NH_2$-terminus, N-terminal end or amine-terminus), referring to the free amine ($—NH_2$) group of the first amino acid residue of the protein or polypeptide. The end of the protein or polypeptide is known as the "C-terminus" (or carboxy-terminus, carboxyl-terminus, C-terminal end, or COOH-terminus), referring to the free carboxyl group (—COOH) of the last amino acid residue of the protein or peptide.

An "amino acid" as used herein refers to a compound including both a carboxyl (—COOH) and amino ($—NH_2$) group. "Amino acid" refers to both natural and unnatural, i.e., synthetic, amino acids. Natural amino acids, with their three-letter and single-letter abbreviations, include: Alanine (Ala; A); Arginine (Arg, R); Asparagine (Asn; N); Aspartic acid (Asp; D); Cysteine (Cys; C); Glutamine (Gln; Q); Glutamic acid (Glu; E); Glycine (Gly; G); Histidine (His; H); Isoleucine (Ile; I); Leucine (Leu; L); Lysine (Lys; K); Methionine (Met; M); Phenylalanine (Phe; F); Proline (Pro; P); Serine (Ser; S); Threonine (Thr; T); Tryptophan (Trp; W); Tyrosine (Tyr; Y); and Valine (Val; V).

An "amino acid substitution" refers to a polypeptide or protein including one or more substitutions of wild-type or naturally occurring amino acid with a different amino acid relative to the wild-type or naturally occurring amino acid at that amino acid residue. The substituted amino acid may be a synthetic or naturally occurring amino acid. In some embodiments, the substituted amino acid is a naturally occurring amino acid selected from the group consisting of: A, R, N, D, C, Q, E, G, H, I, L, K, M, F, P, S, T, W, Y, and V. Substitution mutants may be described using an abbreviated system. For example, a substitution mutation in which the fifth ($5^{th}$) amino acid residue is substituted may be abbreviated as "X5Y" wherein "X" is the wild-type or naturally occurring amino acid to be replaced, "5" is the amino acid residue position within the amino acid sequence of the protein or polypeptide, and "Y" is the substituted, or non-wild-type or non-naturally occurring, amino acid.

An "isolated" polypeptide, protein, peptide, or nucleic acid is a molecule that has been removed from its natural environment. It is also to be understood that "isolated" polypeptides, proteins, peptides, or nucleic acids may be formulated with excipients such as diluents or adjuvants and still be considered isolated.

The term "recombinant" when used in reference to a nucleic acid molecule, peptide, polypeptide, or protein means of, or resulting from, a new combination of genetic material that is not known to exist in nature. A recombinant molecule can be produced by any of the well-known techniques available in the field of recombinant technology, including, but not limited to, polymerase chain reaction (PCR), gene splicing (e.g., using restriction endonucleases), and solid-phase synthesis of nucleic acid molecules, peptides, or proteins.

The term "domain" when used in reference to a polypeptide or protein means a distinct functional and/or structural unit in a protein. Domains are sometimes responsible for a particular function or interaction, contributing to the overall role of a protein. Domains may exist in a variety of biological contexts. Similar domains may be found in proteins with different functions. Alternatively, domains with low sequence identity (i.e., less than about 50%, less than about 40%, less than about 30%, less than about 20%, less than about 10%, less than about 5%, or less than about 1% sequence identity) may have the same function. In some embodiments, a Cas9 domain is a RuvC domain. In some embodiments, a Cas9 domain is an HNH domain. In some embodiments, a Cas9 domain is a Rec domain.

The term "motif," when used in reference to a polypeptide or protein, generally refers to a set of conserved amino acid residues, typically shorter than 20 amino acids in length, that may be important for protein function. Specific sequence motifs may mediate a common function, such as protein-binding or targeting to a particular subcellular location, in a variety of proteins. Examples of motifs include, but are not limited to, nuclear localization signals, microbody targeting motifs, motifs that prevent or facilitate secretion, and motifs that facilitate protein recognition and binding. Motif databases and/or motif searching tools are known to the skilled artisan and include, for example, PROSITE (expasy.ch/sprot/prosite.html), Pfam (pfam.wustl.edu), PRINTS (biochem.ucl.ac.uk/bsm/dbbrowser/PRINTS/PRINTS.html), and MinimotifMiner (cse-mnm.engr.uconn.edu:8080/MNM/SMSSearchServlet).

An "engineered" protein, as used herein, means a protein that includes one or more modifications in a protein to achieve a desired property. Exemplary modifications include, but are not limited to, insertion, deletion, substitution, or fusion with another domain or protein. Engineered proteins of the present disclosure include engineered Cas9 proteins.

In some embodiments, engineered protein is generated from a wild-type protein. As used herein, a "wild-type" protein or nucleic acid is a naturally-occurring, unmodified protein or nucleic acid. For example, a wild-type Cas9 protein can be isolated from the organism *Streptococcus pyogenes* and can include the amino acid sequence of SEQ ID NO:1. Wild-type is contrasted with "mutant," which includes one or more modifications in the amino acid and/or nucleotide sequence of the protein or nucleic acid. For example, a mutant variant of *S. pyogenes* Cas9 can include the amino acid sequence of SEQ ID NO:2, which has a single amino acid substitution relative to wild-type *S. pyogenes* Cas9 (SEQ ID NO:1).

The terms "degrade" or "degradation," when used in reference to a polypeptide or protein, generally refer to the breakdown of a protein into smaller peptide fragments or individual amino acids via a process generally called proteolysis. Intracellular degradation of a protein may be achieved in either the lysosome or the proteasome. Lysosomal degradation is typically a non-selective process, with the exception of pathways such as, e.g., the selective chaperone-mediated autophagy pathway described herein. In lysosomal degradation, cytosolic proteins are endocytosed into the lysosome for degradation. Proteasome degradation is typically selective, wherein proteins to be degraded are tagged with ubiquitin. For an overview of the proteasome protein degradation pathway, see, e.g., Ciechanover, Cell 79(1):13-21 (1994); Hasselgren et al., Ann Surg 225(3):307-316 (1997); Collins et al., Cell 169(5):792-806 (2017). In general, a protein's degradation rate is related to its function in the cell and biochemical features. For example, proteins with segments rich in proline, glutamic acid, serine, and threonine (sometimes referred to as the PEST proteins) have short half-life (see, e.g., Voet & Voet, *Biochemistry* 2$^{nd}$ ed. John Wiley & Sons, pp. 1010-1014 (1995), incorporated by reference in its entirety). Other factors affecting degradation rate of a protein include: the rate of deamination of glutamine and asparagine; oxidation rate of cysteine, histidine, and methionine; the absence of stabilizing ligands; the presence of attached carbohydrate or phosphate groups; the presence of free α-amino group; the charge of the protein; and the flexibility and stability of a protein (see, e.g., Creighton "Chapter 10—Degradation" in *Proteins: Structures and Molecular Properties* 2$^{nd}$ ed. W H Freeman and Company, pp. 463-473 (1993), incorporated by reference in its entirety). Methods of measuring a protein's degradation rate include, for example, amino acid isotope pulse chase (such as, e.g., stable isotope labeling with amino acids in cell culture or SILAC), post-synthetic radiolabeling, or reporter-dependent approaches such as global protein stability profiling (GPSP), which utilize, for example, GFP as a reporter protein (see, e.g., Yewdell et al., Cell Biol Int 35(5):457-462 (2011)). Another method of measuring the degradation rate of a protein is by quantifying the amount of protein in a cell at different time points using, for example, densiometric analysis of an immunoblot, plotting the protein level over time, and determining the degradation rate from the protein level vs. time plot. The method of determining a protein's degradation rate may be selected by the skilled artisan.

As used herein, the terms "sequence similarity" or "% similarity" refers to the degree of identity or correspondence between nucleic acid sequences or amino acid sequences. As used herein, "sequence similarity" refers to nucleic acid sequences wherein changes in one or more nucleotide bases results in substitution of one or more amino acids, but do not affect the functional properties of the protein encoded by the DNA sequence. "Sequence similarity" also refers to modifications of the nucleic acid, such as deletion or insertion of one or more nucleotide bases that do not substantially affect the functional properties of the resulting transcript. It is therefore understood that the present disclosure encompasses more than the specific exemplary sequences. Methods of making nucleotide base substitutions are known, as are methods of determining the retention of biological activity of the encoded products.

Moreover, the skilled artisan recognizes that similar sequences encompassed by this disclosure are also defined by their ability to hybridize, under stringent conditions, with the sequences exemplified herein. Similar nucleic acid sequences of the present disclosure are those nucleic acids whose DNA sequences are at least 70%, at least 80%, at least 90%, at least 95%, or at least 99% identical to the DNA sequence of the nucleic acids disclosed herein. Similar nucleic acid sequences of the present disclosure are those nucleic acids whose DNA sequences are about 70%, at least about 70%, about 75%, at least about 75%, about 80%, at least about 80%, about 85%, at least about 85%, about 90%, at least about 90%, about 95%, at least about 95%, about 99%, at least about 99%, or about 100% identical to the DNA sequence of the nucleic acids disclosed herein.

As used herein, "sequence similarity" refers to two or more amino acid sequences wherein greater than about 40% of the amino acids are identical, or greater than about 60% of the amino acids are functionally identical. Functionally identical or functionally similar amino acids have chemically similar side chains. For example, amino acids can be grouped in the following manner according to functional similarity:
  Positively-charged side chains: Arg, His, Lys;
  Negatively-charged side chains: Asp, Glu;

Polar, uncharged side chains: Ser, Thr, Asn, Gln;
Hydrophobic side chains: Ala, Val, Ile, Leu, Met, Phe, Tyr, Trp;
Other: Cys, Gly, Pro.

In some embodiments, similar amino acid sequences of the present disclosure have at least 40%, at least 50%, at least 60%, at least 70%, at least 80%, at least 90%, or at least 99% identical amino acids.

In some embodiments, similar amino acid sequences of the present disclosure have at least 60%, at least 70%, at least 80%, at least 90%, or at least 95% functionally identical amino acids. In some embodiments, similar amino acid sequences of the present disclosure have about 40%, at least about 40%, about 45%, at least about 45%, about 50%, at least about 50%, about 55%, at least about 55%, about 60%, at least about 60%, about 65%, at least about 65%, about 70%, at least about 70%, about 75%, at least about 75%, about 80%, at least about 80%, about 85%, at least about 85%, about 90%, at least about 90%, about 95%, at least about 95%, about 97%, at least about 97%, about 98%, at least about 98%, about 99%, at least about 99%, or about 100% identical amino acids.

In some embodiments, similar amino acid sequences of the present disclosure have about 60%, at least about 60%, about 65%, at least about 65%, about 70%, at least about 70%, about 75%, at least about 75%, about 80%, at least about 80%, about 85%, at least about 85%, about 90%, at least about 90%, about 95%, at least about 95%, about 97%, at least about 97%, about 98%, at least about 98%, about 99%, at least about 99%, or about 100% functionally identical amino acids.

As used herein, the term "the same protein" refers to a protein having a substantially similar structure or amino acid sequence as a reference protein that performs the same biochemical function as the reference protein and can include proteins that differ from a reference protein by the substitution or deletion of one or more amino acids at one or more sites in the amino acid sequence, deletion of i.e., at least about 60%, at least about 60%, about 65%, at least about 65%, about 70%, at least about 70%, about 75%, at least about 75%, about 80%, at least about 80%, about 85%, at least about 85%, about 90%, at least about 90%, about 95%, at least about 95%, about 97%, at least about 97%, about 98%, at least about 98%, about 99%, at least about 99%, or about 100% identical amino acids. In one aspect, "the same protein" refers to a protein with an identical amino acid sequence as a reference protein.

Sequence similarity can be determined by sequence alignment using routine methods in the art, such as, for example, BLAST, MUSCLE, Clustal (including ClustalW and ClustalX), and T-Coffee (including variants such as, for example, M-Coffee, R-Coffee, and Expresso).

The terms "sequence identity" or "% identity" in the context of nucleic acid sequences or amino acid sequences refers to the percentage of residues in the compared sequences that are the same when the sequences are aligned over a specified comparison window. In some embodiments, only specific portions of two or more sequences are aligned to determine sequence identity. In some embodiments, only specific domains of two or more sequences are aligned to determine sequence similarity. A comparison window can be a segment of at least 10 to over 1000 residues, at least 20 to about 1000 residues, or at least 50 to 500 residues in which the sequences can be aligned and compared. Methods of alignment for determination of sequence identity are well-known and can be performed using publicly available databases such as BLAST. "Percent identity" or "% identity" when referring to amino acid sequences can be determined by methods known in the art. For example, in some embodiments, "percent identity" of two amino acid sequences is determined using the algorithm of Karlin and Altschul, Proc Nat Acad Sci USA 87:2264-2268 (1990), modified as in Karlin and Altschul, Proc Nat Acad Sci USA 90:5873-5877 (1993). Such an algorithm is incorporated into the BLAST programs, e.g., BLAST+ or the NBLAST and XBLAST programs described in Altschul et al., Journal of Molecular Biology, 215: 403-410 (1990). BLAST protein searches can be performed with programs such as, e.g., the XBLAST program, score=50, wordlength=3 to obtain amino acid sequences homologous to the protein molecules of the disclosure. Where gaps exist between two sequences, Gapped BLAST can be utilized as described in Altschul et al., Nucleic Acids Research 25(17): 3389-3402 (1997). When utilizing BLAST and Gapped BLAST programs, the default parameters of the respective programs (e.g., XBLAST and NBLAST) can be used.

In some embodiments, polypeptides or nucleic acid molecules have 70%, at least 70%, 75%, at least 75%, 80%, at least 80%, 85%, at least 85%, 90%, at least 90%, 95%, at least 95%, 97%, at least 97%, 98%, at least 98%, 99%, or at least 99% or 100% sequence identity with a reference polypeptide or nucleic acid molecule, respectively (or a fragment of the reference polypeptide or nucleic acid molecule). In some embodiments, polypeptides or nucleic acid molecules have about 70%, at least about 70%, about 75%, at least about 75%, about 80%, at least about 80%, about 85%, at least about 85%, about 90%, at least about 90%, about 95%, at least about 95%, about 97%, at least about 97%, about 98%, at least about 98%, about 99%, at least about 99% or about 100% sequence identity with a reference polypeptide or nucleic acid molecule, respectively (or a fragment of the reference polypeptide or nucleic acid molecule).

Overview of CRISPR-Cas Systems

CRISPR-associated protein 9 (Cas9) is an RNA-guided endonuclease of Type II CRISPR adaptive immunity system found in bacteria, including, but not limited to *Streptococcus pyogenes, Streptococcus thermophilus, Staphylococcus aureus,* and *Neisseria meningitidis*, among other bacteria. For an overview of CRISPR-Cas9 systems, see, e.g., Sander et al., Nature Biotechnology 32:347-355 (2014). In general, a CRISPR or CRISPR-Cas system is characterized by elements that promote the formation of a CRISPR complex, including a guide polynucleotide and a Cas9 endonuclease (interchangeably referred to herein as a "Cas9 protein" or "Cas9 nuclease"), at the site of a target sequence. In a naturally-occurring CRISPR-Cas system, foreign DNA is incorporated into CRISPR arrays, which then produce crRNAs (CRISPR-RNAs) bearing "protospacer" regions that are complementary to the foreign DNA site. crRNAs hybridize to tracrRNAs (also encoded by the CRISPR system), and this pair of RNAs associates with the Cas9 nuclease. crRNA/tracrRNA/Cas9 complexes recognize and cleave foreign DNAs bearing the protospacer sequences.

In some embodiments, the disclosure provides an engineered CRISPR-Cas system. In some embodiments, the engineered CRISPR-Cas system includes an engineered Cas9 protein, which includes one or more modifications relative to wild-type Cas9. In some embodiments, the engineered Cas9 protein includes one or more motifs that are not present in wild-type Cas9. The one or more motifs introduced into wild-type Cas9 can be called an "engineered"

motif. In some embodiments, one or more engineered motifs in the Cas9 protein is a chaperone-mediated autophagy (CMA) motif.

In some embodiments, the engineered CRISPR-Cas system includes an engineered guide polynucleotide, which includes one or more modifications relative to wild-type crRNA and/or tracrRNA. In some embodiments, engineered CRISPR-Cas systems utilize a fusion between a crRNA and part of the tracrRNA sequence, i.e., a single guide polynucleotide. Thus, in this case, a complex is formed between the Cas9 and the single guide polynucleotide. The single guide polynucleotide complexes with Cas9 to mediate cleavage of target sequences that are complementary to the first (5') 20 nucleotides of the guide polynucleotide (i.e., the guide sequence portion of the guide polynucleotide) and that lie next to a protospacer adjacent motif (PAM) sequence. In other embodiments, engineered CRISPR-Cas systems include a separate polynucleotide including a tracrRNA sequence, i.e., the tracrRNA is not part of the guide polynucleotide including the guide sequence. In this case, a complex is formed between the Cas9, the guide polynucleotide, and the tracrRNA. In some embodiments, the tracrRNA component of the guide polynucleotide activates the Cas9 protein. In some embodiments, activation of the Cas9 protein activates or increases the nuclease activity of Cas9. In some embodiments, the Cas9 protein is not active until it forms a complex with a crRNA and tracrRNA.

The Cas9 endonuclease generates a double-stranded DNA break at the target sequence, upstream of a protospacer adjacent motif (PAM). Repair of the double-stranded break may result in insertions or deletions at the double-stranded break site. In some embodiments, a sequence of interest is inserted into the target sequence using an endogenous DNA repair pathway of the cell. Endogenous DNA repair pathways include the Non-Homologous End Joining (NHEJ) pathway, Microhomology-Mediated End Joining (MMEJ) pathway, and the Homology-Directed Repair (HDR) pathway. NHEJ, MMEJ, and HDR pathways repair double-stranded DNA breaks. In NHEJ, a homologous template is not required for repairing breaks in the DNA. NHEJ repair can be error-prone, although errors are decreased when the DNA break includes compatible overhangs. NHEJ and MMEJ are mechanistically distinct DNA repair pathways with different subsets of DNA repair enzymes involved in each of them. Unlike NHEJ, which can be precise in some cases, or error-prone in some cases, MMEJ is always error-prone and results in both deletion and insertions at the site under repair. MMEJ-associated deletions are due to the micro-homologies (2-10 base pairs) at both sides of a double-strand break. In contrast, HDR requires a homologous template to direct repair, but HDR repairs are typically high-fidelity and less error-prone. In some embodiments, the error-prone nature of NHEJ and MMEJ repairs is exploited to introduce non-specific nucleotide substitutions in the target sequence.

As described herein, some CRISPR-Cas systems may have undesirable off-target activity or off-target genome editing. "Off-target" as used in the context of genome editing refers to non-specific and unintended genetic modifications, which is in contrast to "on-target," which refers to modifications at the intended loci. Off-target modifications may result when, for example, a Cas9 nuclease does not bind at its intended target sequence (i.e., the genome sequence complementary to the guide sequence on the guide polynucleotide), which may be caused by homologous sequences and/or mismatch tolerance. Off-target modifications can include, but are not limited to, unintended point mutations, deletions, insertions, inversions, and translocations. In some embodiments, the engineered Cas9 protein of the present disclosure has decreased off-target activity compared with a wild-type Cas9 protein. In some embodiments, the engineered Cas9 protein of the present disclosure has at least about 50% reduction of off-target activity compared with a wild-type Cas9 protein. In some embodiments, the engineered Cas9 protein of the present disclosure has at least about 60%, at least about 70%, at least about 80%, at least about 90%, at least about 95%, or at least about 100% reduction of off-target activity compared with a wild-type Cas9. Off-target modifications may be detected using, for example, targeted sequencing, exome sequencing, whole genome sequencing, BLESS (direct in situ Breaks Labeling, Enrichment on Streptavidin, and next-generation Sequencing), GUIDE-seq (Genome-wide, Un-biased Identification of DSBs Enabled by sequencing), LAM-HTGTS (Linear Amplification-Mediated High-Throughput Genome-wide Translocation Sequencing), and Digenome-seq (in vitro Cas9-digested whole genome sequencing). Methods of detection and quantification of off-target modifications are described in, e.g., Zhang et al., Mol Ther Nucleic Acids 4:e264 (2014); and Zischewski et al., Biotechnol Adv 35:95-104 (2017).

Cas9 Proteins

In some embodiments, the Cas9 protein is derived from the following species: *Streptococcus pyogenes*, *Streptococcus thermophilus*, *Streptococcus dysgalactiae*, *Streptococcus mutans*, *Listeria innocua*, *Staphylococcus aureus*, or *Klebsiella pneumoniae*. In some embodiments, the term Cas9 refers to a polypeptide including the amino acid sequence of *Streptococcus pyogenes* Cas9 protein (SEQ ID NO:1). In some embodiments, the term Cas9 refers to a polypeptide including the amino acid sequence of *Streptococcus thermophilus* Cas9 protein (SEQ ID NO:17). In some embodiments, the term Cas9 refers to a polypeptide including the amino acid sequence of *Streptococcus dysgalactiae* Cas9 protein (SEQ ID NO:18). In some embodiments, the term Cas9 refers to a polypeptide including the amino acid sequence of *Streptococcus mutans* Cas9 protein (SEQ ID NO:19). In some embodiments, the term Cas9 refers to a polypeptide including the amino acid sequence of *Listeria innocua* Cas9 protein (SEQ ID NO:20). In some embodiments, the term Cas9 refers to a polypeptide including the amino acid sequence of *Staphylococcus aureus* Cas9 protein (SEQ ID NO:21). In some embodiments, the term Cas9 refers to a polypeptide including the amino acid sequence of *Klebsiella pneumoniae* Cas9 protein (SEQ ID NO:22).

In some embodiments, the term Cas9 refers to a polypeptide including SEQ ID NO:1. In some embodiments, the Cas9 protein is at least 70%, at least 75%, at least 80%, at least 85%, at least 90%, at least 95%, at least 96%, at least 97%, at least 98%, at least 99%, or about 100% identical with the amino acid sequence of SEQ ID NO:1. In some embodiments, the Cas9 is a polypeptide encoded by a polynucleotide sequence having at least 70%, at least 75%, at least 80%, at least 85%, at least 90%, at least 95%, at least 96%, at least 97%, at least 98%, at least 99%, or about 100% identity with SEQ ID NO:3.

In some embodiments, the term Cas9 refers to a Cas9 capable of generating cohesive ends. As used herein, the term "cohesive ends," "staggered ends," or "sticky ends" refer to a nucleic acid fragment with strands of unequal length. In contrast to "blunt ends," cohesive ends are produced by a staggered cut on the nucleic acid, typically DNA. A sticky or cohesive end has protruding single-stranded strands with unpaired nucleotides, or "overhangs," e.g., a 3' or a 5' overhang. Each overhang can anneal with another complementary overhang to form base pairs. The two complementary cohesive ends can anneal together via interactions such as hydrogen-bonding. The stability of the annealed cohesive ends depends on the melting temperature of the paired overhangs. The two complementary cohesive ends can be joined together by chemical or enzymatic ligation, for example, by DNA ligase.

In some embodiments, the term Cas9 refers to a Cas9 variant having altered function such as, for example, a Cas9 hybrid protein. For example, the binding domain of a Cas9, or a Cas9 protein having an inactive DNA cleavage domain, can be used as a binding domain to specifically bind a desired target sequence via the guide polynucleotide. The binding domain (i.e., the inactive Cas9) can be fused or conjugated to a cleavage domain, e.g., the cleavage domain of the endonuclease FokI, to create an engineered hybrid nuclease. Cas9-FokI hybrid proteins are further described in, e.g., U.S. Patent Publication No. 2015/0071899 and Guilinger et al., Nature Biotechnology 32: 577-582 (2014). Other examples of engineered hybrid nucleases are described in, e.g., Wah et al., Proc Nat Acad Sci 95:10564-10569 (1996); Li et al., Nucl Acids Res 39(1):359-372 (2011); and Kim et al., Proc Nat Acad Sci 93:1156-1160 (1996).

Cpf1 (Centromere and Promoter Factor 1) is also an RNA-guided nuclease of a Type II CRISPR system. Cpf1 generates cohesive ends. A CRISPR/Cpf1 system is analogous to a CRISPR/Cas9 system. However, there are some differences between Cas9 and Cpf1. Unlike Cas9, Cpf1 does not utilize a tracrRNA. Cpf1 proteins recognize a different PAM sequence than Cas9, and Cpf1 cleaves at a different site from Cas9. While Cas9 cleaves at a sequence adjacent to the PAM, Cpf1 cleaves at a sequence further away from the PAM. Cpf1 proteins are further described in, e.g., foreign patent publication GB 1506509.7, U.S. Pat. No. 9,580,701, U.S. Patent Publication 2016/0208243, and Zetsche et al., Cell 163(3):759-771 (2015). Enzymes that are functionally similar to Cpf1 may be used in accordance with the present disclosure. Thus, in some embodiments, the present disclosure provides a recombinant Cpf1 protein including the amino acid modifications described herein.

Figure 3:
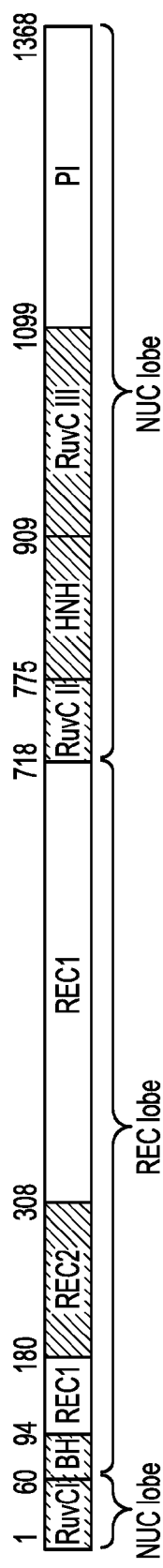
FIG. 3 shows a schematic of a Cas9 protein from *Streptococcus pyogenes* (SpCas9).
Figure 4:
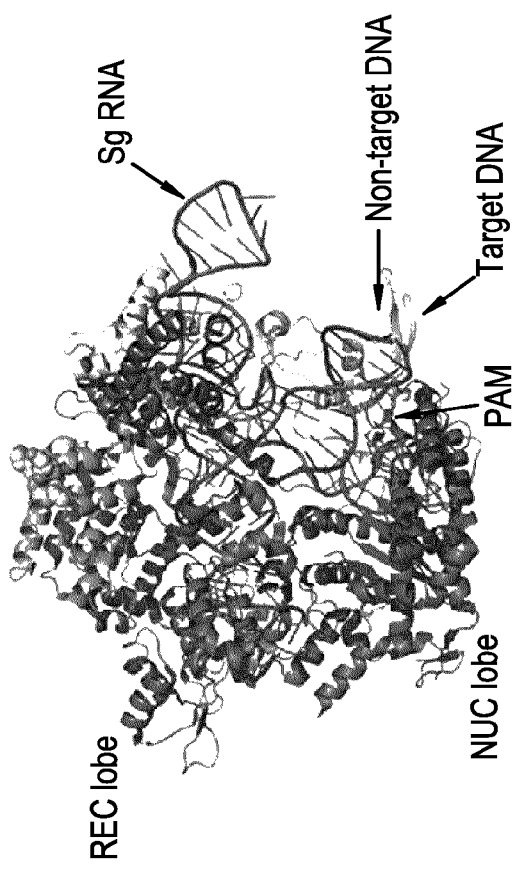
FIG. 4 shows a crystal structure of SpCas9 bound to a guide RNA (Sg RNA) and DNA.

Some wild-type or naturally-occurring Cas9 proteins, such as, for example, the Cas9 protein from *S. pyogenes*, have six domains: Rec1, Rec2, Bridge Helix (BH), PAM Interacting (PI), HNH, and RuvC. The Rec domain is responsible for binding the guide polynucleotide. The BH domain is responsible for initiating cleavage activity upon binding of the target sequence. The PI domain confers PAM specificity and is responsible for initiating binding to the target sequence. The HNH and RuvC domains are nuclease domains that cut DNA. Structural studies of the Cas9 proteins revealed that the protein has a recognition lobe ("REC lobe"), which includes the BH, Rec1, and Rec2 domains; and a nuclease lobe ("NUC lobe"), which includes the RuvC (divided into RuvC I, RuvC II, and RuvC III sub-domains), HNH, and PI domains. See FIGS. 3 and 4. Protein domains can be identified using domain architecture prediction tools based on the protein's amino acid sequence, such as, e.g., SMART (Letunic et al., Nucleic Acids Research (2017), doi:10.1093/nar/gkx922), PANDA (Wang et al., Scientific Reports 8:3484 (2018)), or InterPro (Finn et al., Nucleic Acids Research (2017), doi:10.1093/nar/gkw1 107). Protein domains can also be identified based on protein structure, for example, by visual inspection, or by using algorithms such as PUU (Holm et al., Proteins 19(3):256-268 (1994)), RigidFinder (Abyzov et al., Proteins 78(2): 309-324 (2010)), or PiSQRD (Aleksiev et al., Bioinformatics 25(20):2743-2744 (2009)). Identification of Cas9 domains based on structural characterization are described in, e.g., Jinek et al., Science 337:816-821 (2012); Nishimasu et al., Cell 156(5):935-949 (2014); Anders et al., Nature 513:569-573 (2014); and Sternberg et al., Nature 507(7490): 62-67 (2014).

In some embodiments, the Cas9 protein of the present disclosure includes a REC lobe having at least 70%, at least 75%, at least 80%, at least 85%, at least 90%, at least 95%, at least 96%, at least 97%, at least 98%, at least 99%, or about 100% identity with the amino acid sequence of SEQ ID NO:5. In some embodiments, the Cas9 protein of the present disclosure includes a NUC lobe having at least 70%, at least 75%, at least 80%, at least 85%, at least 90%, at least 95%, at least 96%, at least 97%, at least 98%, at least 99%, or about 100% identity with the amino acid sequence of SEQ ID NOS:6-7.

In some embodiments, the Cas9 protein of the present disclosure includes a BH domain having at least 70%, at least 75%, at least 80%, at least 85%, at least 90%, at least 95%, at least 96%, at least 97%, at least 98%, at least 99%, or about 100% identity with the amino acid sequence of SEQ ID NO:8. In some embodiments, the Cas9 protein of the present disclosure includes a Rec domain having at least 70%, at least 75%, at least 80%, at least 85%, at least 90%, at least 95%, at least 96%, at least 97%, at least 98%, at least 99%, or about 100% identity with the amino acid sequence of SEQ ID NOS:9-10. In some embodiments, the Cas9 protein of the present disclosure includes a Rec2 domain having at least 70%, at least 75%, at least 80%, at least 85%, at least 90%, at least 95%, at least 96%, at least 97%, at least 98%, at least 99%, or about 100% identity with the amino acid sequence of SEQ ID NO:11 In some embodiments, the Cas9 protein of the present disclosure includes a RuvC domain having at least 70%, at least 75%, at least 80%, at least 85%, at least 90%, at least 95%, at least 96%, at least 97%, at least 98%, at least 99%, or about 100% identity with the amino acid sequence of SEQ ID NOS:12-14. In some embodiments, the Cas9 protein of the present disclosure includes an HNH domain having at least 70%, at least 75%, at least 80%, at least 85%, at least 90%, at least 95%, at least 96%, at least 97%, at least 98%, at least 99%, or about 100% identity with the amino acid sequence of SEQ ID NO:15. In some embodiments, the Cas9 protein of the present disclosure includes a PI domain having at least 70%, at least 75%, at least 80%, at least 85%, at least 90%, at least 95%, at least 96%, at least 97%, at least 98%, at least 99%, or about 100% identity with the amino acid sequence of SEQ ID NO:16.

Structural studies, e.g., crystal structures, of Cas9 proteins can reveal regions of the protein that are surface-exposed. "Surface-exposed region," as used herein, refers to areas of a protein that are accessible to the surrounding environment, i.e., a region on the outer "surface" of the protein. Similarly, "surface-exposed residues" include amino acid residues of a protein which are in the surface-exposed region. Surface-exposed residues are in contrast to "buried" residues, which face inward, towards the center of the protein, and form a "buried region," which is not accessible by the surrounding environment. Surface-exposed residues on a protein may play an important role in interaction with other molecules, such as, e.g., other proteins or cellular structures. Thus, in some embodiments, certain residues on a protein, e.g., a Cas9 protein, are surface-exposed in one conformational state, but not surface-exposed in a different conformational state. For example, the Cas9 protein may undergo conformational changes upon binding to guide RNA, such that previously unexposed regions in the Cas9 protein become surface-exposed upon guide RNA binding, or vice versa (see, e.g., Fagerlund et al., Proc Nat Acad Sci 114(26): E5211-E5128 (2017)).

Surface-exposed residues may also determine physical properties of a protein and constrain a protein's folded structure. Surface-exposed residues can be determined when viewing a protein crystal structure in programs such as, e.g., PyMOL (pymol.org) or Swiss PDB Viewer (spdbv.vital-it.ch). Surface-exposed residues can also be calculated computationally using programs such as, e.g., NACCESS (bio-inf.manchester.ac.uk/naccess). Surface-exposed residues of a protein can also be determined by computational prediction, for example, when a crystal structure is not available. Computational prediction tools of surface-exposed residues in a protein sequence include, for example, SARpred (Garg et al., Proteins 61:318-24 (2005)), PSA/TEM from the JOY Package (Mizuguchi et al., Bioinformatics 14:617-623 (1998)), and RSARF (caps.ncbs.res.in/download/pugal/RSARF).

Overview of Chaperone-Mediated Autophagy

"Chaperone-mediated autophagy," or CMA, refers to a selective protein degradation process involving chaperone-dependent selection of cytosolic proteins, then targeting the proteins to lysosomes and translocating them across the lysosome membrane for degradation. An exemplary chaperone protein of CMA is heat shock cognate protein of 70 kD, or HSC70. "Endosomal microautophagy," or eMI, refers to a similar protein degradation process as CMA, with the difference being eMI selectively targets proteins including a KFERQ motif or KFERQ-like motif to late endosomes, rather than lysosomes, for degradation. Like CMA, HSC70 is also a chaperone protein for eMI. See, e.g., Kaushik et al., Trends Cell Biol 22(8):407-417 (2012); Tekirdag et al., J Biol Chem 293:5414-5424 (2018); and Pereira et al., Int J Cell Biol 2012(4):931956 (2012).

A "KFERQ motif," as referred to herein, is the pentapeptide sequence: Lys-Phe-Glu-Arg-Gln (SEQ ID NO:24). A "KFERQ-like motif," as referred to herein, is a biochemically similar or biochemically related motif to KFERQ. A biochemically similar or biochemically related motif may include functionally equivalent amino acid residues, as discussed herein. Thus, a KFERQ-motif can be any pentapeptide with the following parameters: one or two of a positively charged residue (e.g., Lys or Arg); one or two of a bulky hydrophobic residue (e.g., Phe, Ile, Leu, or Val); a negatively charged residue (e.g., Asp or Glu); and a Gln or Asn flanking either side of the pentapeptide. See, e.g., Dice et al., Trends Biochem Sci 15(8):305-309 (1990); and Kaushik et al., Trends Cell Biol 22(8):407-417 (2012). Examples of KFERQ-like motifs include, but are not limited to, the motifs listed in Table 1.

TABLE 1

| KFERQ-Like Motifs | |
| --- | --- |
| Amino Acid Sequence of Motif | SEQ ID NO. |
| KFERQ | 24 |
| RKVEQ | 25 |
| QDLKF | 26 |
| QRFFE | 27 |
| NRVVD | 28 |
| QRDKV | 29 |
| QKILD | 30 |
| QKKEL | 31 |
| QFREL | 32 |
| IKLDQ | 33 |

TABLE 1-continued

| KFERQ-Like Motifs | |
| --- | --- |
| Amino Acid Sequence of Motif | SEQ ID NO. |
| DVVRQ | 34 |
| QRIVE | 35 |
| VKELQ | 36 |
| QKVFD | 37 |
| QELLR | 38 |
| VDKLN | 39 |
| RIKEN | 40 |
| NKKFE | 41 |

Proteins that include at least one KFERQ motif or KFERQ-like motif may be recognized by components of CMA or eMI. Thus, in some embodiments, the KFERQ motif or KFERQ-like motif is a chaperone mediated autophagy (CMA) target motif. In some embodiments, the KFERQ motif or KFERQ-like motif is an endosomal microautophagy (eMI) target motif. Without being bound by a specific theory, CMA and eMI are described herein for the purposes of illustrating the present disclosure, with the understanding that the KFERQ motif or KFERQ-like motif may serve as a target for other protein degradation pathways, and that other consensus sequences or motifs (other than the KFERQ motif or KFERQ-like motifs described herein) may be CMA or eMI target motifs.

HSC70 recognizes and binds to a CMA or eMI target motif, such as, e.g., a KFERQ motif or KFERQ-like motif, on a protein, to form a chaperone-protein complex. The chaperone-protein complex then binds to the lysosome-associated membrane protein type 2A (LAMP-2A) receptor. The protein unfolds, triggering multimerization of LAMP-2A. Unfolded protein is subsequently translocated across the lysosome membrane via LAMP-2A, and finally the translocated protein is degraded. See, e.g., Kaushik et al., Trends Cell Biol 22(8):407-417 (2012).

Recombinant Cas9 Proteins

Recombinant Cas9 proteins of the present disclosure are functional Cas9 nucleases and have reduced off-target modifications compared with a wild-type Cas9. By "functional Cas9 nuclease," it is meant that the recombinant Cas9 protein has at least about the same level of nuclease activity as a wild-type Cas9 protein, as measured by a Cas9 activity assay. By "functional Cas9 nuclease," it is also meant that the recombinant Cas9 has about the same level of on-target modifications (i.e., genome editing efficiency) as a wild-type Cas9 protein, as measured by a Cas9 efficiency assay.

In some embodiments, the recombinant Cas9 proteins of the present disclosure has at least about 70%, at least about 75%, at least about 80%, at least about 85%, at least about 90%, at least about 95%, or at least about 100% of nuclease activity as a wild-type Cas9 protein, as measured by a Cas9 activity assay. In some embodiments, the recombinant Cas9 proteins of the present disclosure has higher nuclease activity than a wild-type Cas9 protein, as measured by a Cas9 activity assay. Non-limiting examples of Cas9 activity assays include the T7 endonuclease I assay and the SURVEYOR assay (reviewed in Vouillot et al., G3 (Bethesda) 5(3):407-415 (2015)). In some embodiments, the recombinant Cas9 proteins of the present disclosure has at least about 70%, at least about 75%, at least about 80%, at least about 85%, at least about 90%, at least about 95%, or at least about 100% of on-target modifications as a wild-type Cas9 protein, as measured by a Cas9 efficiency assay. In some embodiments, the recombinant Cas9 proteins of the present disclosure has higher on-target modifications than a wild-type Cas9 protein, as measured by a Cas9 efficiency assay. Non-limiting examples of Cas9 efficiency assays include mismatch detection assays and sequencing-based assays (reviewed in Zischewski et al., Biotechnol Adv 35:95-104 (2017)).

In some embodiments, the disclosure provides a recombinant Cas9 protein including an engineered KFERQ motif or KFERQ-like motif.

As described herein, KFERQ motif or KFERQ-like motifs are recognized by components of CMA or eMI. Thus, in some embodiments, the Cas9 protein including the engineered KFERQ motif or KFERQ-like motif is recognized by components of CMA or eMI. In some embodiments, the KFERQ motif or KFERQ-like motif is any one of SEQ ID NOS:24-41. Thus, in some embodiments, the KFERQ motif or KFERQ-like motif is KFERQ (SEQ ID NO:24), RKVEQ (SEQ ID NO:25), QDLKF (SEQ ID NO:26), QRFFE (SEQ ID NO:27), NRVVD (SEQ ID NO:28), QRDKV (SEQ ID NO:29), QKILD (SEQ ID NO:30), QKKEL (SEQ ID NO:31), QFREL (SEQ ID NO:32), IKLDQ (SEQ ID NO:33), DVVRQ (SEQ ID NO:34), QRIVE (SEQ ID NO:35), VKELQ (SEQ ID NO:36), QKVFD (SEQ ID NO:37), QELLR (SEQ ID NO:38), VDKLN (SEQ ID NO:39), RIKEN (SEQ ID NO:40), or NKKFE (SEQ ID NO:41). In some embodiments, the engineered KFERQ motif or KFERQ-like motif is VDKLN (SEQ ID NO:39).

In some embodiments, the recombinant Cas9 protein includes an engineered KFERQ motif or KFERQ-like motif with the amino acid sequence KFERQ (SEQ ID NO:24). In some embodiments, the recombinant Cas9 protein includes an engineered KFERQ motif or KFERQ-like motif with the amino acid sequence RKVEQ (SEQ ID NO:25). In some embodiments, the recombinant Cas9 protein includes an engineered KFERQ motif or KFERQ-like motif with the amino acid sequence QDLKF (SEQ ID NO:26). In some embodiments, the recombinant Cas9 protein includes an engineered KFERQ motif or KFERQ-like motif with the amino acid sequence QRFFE (SEQ ID NO:27). In some embodiments, the recombinant Cas9 protein includes an engineered KFERQ motif or KFERQ-like motif with the amino acid sequence NRVVD (SEQ ID NO:28). In some embodiments, the recombinant Cas9 protein includes an engineered KFERQ motif or KFERQ-like motif with the amino acid sequence QRDKV (SEQ ID NO:29).

In some embodiments, the recombinant Cas9 protein includes an engineered KFERQ motif or KFERQ-like motif with the amino acid sequence QKILD (SEQ ID NO:30). In some embodiments, the recombinant Cas9 protein includes an engineered KFERQ motif or KFERQ-like motif with the amino acid sequence QKKEL (SEQ ID NO:31). In some embodiments, the recombinant Cas9 protein includes an engineered KFERQ motif or KFERQ-like motif with the amino acid sequence QFREL (SEQ ID NO:32). In some embodiments, the recombinant Cas9 protein includes an engineered KFERQ motif or KFERQ-like motif with the amino acid sequence IKLDQ (SEQ ID NO:33). In some embodiments, the recombinant Cas9 protein includes an engineered KFERQ motif or KFERQ-like motif with the amino acid sequence DVVRQ (SEQ ID NO:34). In some embodiments, the recombinant Cas9 protein includes an engineered KFERQ motif or KFERQ-like motif with the amino acid sequence QRIVE (SEQ ID NO:35). In some embodiments, the recombinant Cas9 protein includes an engineered KFERQ motif or KFERQ-like motif with the amino acid sequence VKELQ (SEQ ID NO:36).

In some embodiments, the recombinant Cas9 protein includes an engineered KFERQ motif or KFERQ-like motif with the amino acid sequence QKVFD (SEQ ID NO:37). In some embodiments, the recombinant Cas9 protein includes an engineered KFERQ motif or KFERQ-like motif with the amino acid sequence QELLR (SEQ ID NO:38). In some embodiments, the recombinant Cas9 protein includes an engineered KFERQ motif or KFERQ-like motif with the amino acid sequence VDKLN (SEQ ID NO:39). In some embodiments, the recombinant Cas9 protein includes an engineered KFERQ motif or KFERQ-like motif with the amino acid sequence RIKEN (SEQ ID NO:40). In some embodiments, the recombinant Cas9 protein includes an engineered KFERQ motif or KFERQ-like motif with the amino acid sequence NKKFE (SEQ ID NO:41).

In some embodiments, the engineered KFERQ motif or KFERQ-like motif is before the first amino acid residue of SEQ ID NO:1. In some embodiments, the engineered KFERQ motif or KFERQ-like motif is between amino acid residues 1 to 100 of SEQ ID NO:1. In some embodiments, the engineered KFERQ motif or KFERQ-like motif is between amino acid residues 100 to 300 of SEQ ID NO:1. In some embodiments, the engineered KFERQ motif or KFERQ-like motif is between amino acid residues 300 to 700 of SEQ ID NO:1. In some embodiments, the engineered KFERQ motif or KFERQ-like motif is between amino acid residues 700 to 900 of SEQ ID NO:1. In some embodiments, the engineered KFERQ motif or KFERQ-like motif is between amino acid residues 900 to 1100 of SEQ ID NO:1. In some embodiments, the engineered KFERQ motif or KFERQ-like motif is between amino acid residues 1100 to 1300 of SEQ ID NO:1. In some embodiments, the engineered KFERQ motif or KFERQ-like motif is after the last amino acid residue of SEQ ID NO:1.

In some embodiments, the engineered KFERQ motif or KFERQ-like motif is in a REC lobe of the Cas9 protein. In some embodiments, the REC lobe of a Cas9 protein includes a BH domain, a Rec1 domain, and a Rec2 domain. In some embodiments, the REC lobe has an amino acid sequence of SEQ ID NO:5. In some embodiments, the engineered KFERQ motif or KFERQ-like motif is in a Rec1 domain of the REC lobe. In some embodiments, the Rec1 domain has an amino acid sequence of SEQ ID NOS:9-10. In some embodiments, the engineered KFERQ motif or KFERQ-like motif is in a Rec2 domain of the REC lobe. In some embodiments, the Rec2 domain has an amino acid sequence of SEQ ID NO:11. In some embodiments, the engineered KFERQ motif or KFERQ-like motif is in a BH domain of the REC lobe. In some embodiments, the BH domain has an amino acid sequence of SEQ ID NO:8.

In some embodiments, the engineered KFERQ motif or KFERQ-like motif is in a NUC lobe of the Cas9 protein. In some embodiments, the NUC lobe of a Cas9 protein includes a RuvC domain, an HNH domain, and a PI domain. In some embodiments, the NUC lobe has an amino acid sequence of SEQ ID NOS:6-7. In some embodiments, the engineered KFERQ motif or KFERQ-like motif is in a RuvC domain, an HNH domain, or a PI domain of the Cas9 protein. In some embodiments, the engineered KFERQ motif or KFERQ-like motif is in a RuvC domain. In some embodiments, the RuvC domain has an amino acid sequence of SEQ ID NOS:12-14. In some embodiments, the engineered KFERQ motif or KFERQ-like motif is in an HNH domain. In some embodiments, the HNH domain has an amino acid sequence of SEQ ID NO: 15. In some embodiments, the engineered KFERQ motif or KFERQ-like motif is in a PI domain. In some embodiments, the PI domain has an amino acid sequence of SEQ ID NO:16.

In some embodiments, the Cas9 protein including an engineered KFERQ motif or KFERQ-like motif includes a lobe having at least 70%, at least 75%, at least 80%, at least 85%, at least 90%, at least 95%, at least 96%, at least 97%, at least 98%, at least 99%, or about 100% identity with the amino acid sequence of SEQ ID NO:5. In some embodiments, the Cas9 protein including an engineered KFERQ motif or KFERQ-like motif includes a lobe having at least 70%, at least 75%, at least 80%, at least 85%, at least 90%, at least 95%, at least 96%, at least 97%, at least 98%, at least 99%, or about 100% identity with the amino acid sequence of SEQ ID NOS:6-7.

In some embodiments, the Cas9 protein including an engineered KFERQ motif or KFERQ-like motif includes a BH domain having at least 70%, at least 75%, at least 80%, at least 85%, at least 90%, at least 95%, at least 96%, at least 97%, at least 98%, at least 99%, or about 100% identity with the amino acid sequence of SEQ ID NO:8. In some embodiments, the Cas9 protein including an engineered KFERQ motif or KFERQ-like motif includes a Rec1 domain having at least 70%, at least 75%, at least 80%, at least 85%, at least 90%, at least 95%, at least 96%, at least 97%, at least 98%, at least 99%, or about 100% identity with the amino acid sequence of SEQ ID NOS:9-10. In some embodiments, the Cas9 protein including an engineered KFERQ motif or KFERQ-like motif includes a Rec2 domain having at least 70%, at least 75%, at least 80%, at least 85%, at least 90%, at least 95%, at least 96%, at least 97%, at least 98%, at least 99%, or about 100% identity with the amino acid sequence of SEQ ID NO:11.

In some embodiments, the Cas9 protein including an engineered KFERQ motif or KFERQ-like motif includes a RuvC domain having at least 70%, at least 75%, at least 80%, at least 85%, at least 90%, at least 95%, at least 96%, at least 97%, at least 98%, at least 99%, or about 100% identity with the amino acid sequence of SEQ ID NOS:12-14. In some embodiments, the Cas9 protein including an engineered KFERQ motif or KFERQ-like motif includes an HNH domain having at least 70%, at least 75%, at least 80%, at least 85%, at least 90%, at least 95%, at least 96%, at least 97%, at least 98%, at least 99%, or about 100% identity with the amino acid sequence of SEQ ID NO:15. In some embodiments, the Cas9 protein including an engineered KFERQ motif or KFERQ-like motif includes a PI domain having at least 70%, at least 75%, at least 80%, at least 85%, at least 90%, at least 95%, at least 96%, at least 97%, at least 98%, at least 99%, or about 100% identity with the amino acid sequence of SEQ ID NO:16.

In some embodiments, the engineered KFERQ motif or KFERQ-like motif is in a surface-exposed region of the recombinant Cas9 protein. As described herein, a surface-exposed region refers to areas of a Cas9 protein that are accessible to the surrounding environment, for example, accessible to components of a protein degradation pathway. In some embodiments, the surface-exposed region of the recombinant Cas9 protein is in a REC lobe of the Cas9 protein. In some embodiments, the surface-exposed region of the recombinant Cas9 protein is in a NUC lobe of the Cas9 protein. In some embodiments, the surface-exposed region of the recombinant Cas9 protein is in a Rec1 domain, a Rec2 domain, a BH domain, a RuvC domain, an HNH domain, or a PI domain of the Cas9 protein. In some embodiments, a surface-exposed region of the recombinant Cas9 protein is between amino acid residues 150 to 250 of the Cas9 protein.

In some embodiments, the engineered KFERQ motif or KFERQ-like motif is at an N-terminus or C-terminus of the recombinant Cas9 protein. As described herein, the N-terminus is the "start" of a protein or polypeptide, and the C-terminus is the "end" of a protein or polypeptide. Thus, in some embodiments, the KFERQ motif or KFERQ-like motif is at the N-terminus "start" of the Cas9 protein. In some embodiments, the KFERQ motif or KFERQ-like motif is at the C-terminus "end" of the Cas9 protein. In some embodiments, addition of an engineered motif to the N-terminus or C-terminus of a protein does not affect the protein's folding, structure, or dynamics. In some embodiments, the N-terminus of the Cas9 is surface-exposed. In some embodiments, the C-terminus of the Cas9 is surface-exposed.

In some embodiments, the disclosure provides a recombinant Cas9 protein including one or more amino acid modifications of a wild-type Cas9 protein that introduce a chaperone mediated autophagy (CMA) target motif or an endosomal microautophagy (eMI) target motif in the Cas9 protein, wherein the recombinant Cas9 protein degrades at least 20% faster in vivo than the wild-type Cas9 protein or a Cas9 protein that does not include a CMA or eMI target motif. In some embodiments, the recombinant Cas9 protein degrades at least 50% faster in vivo than the wild-type Cas9 protein or a Cas9 protein that does not include a CMA or eMI target motif. In some embodiments, the recombinant Cas9 protein degrades at least 80% faster in vivo than the wild-type Cas9 protein or a Cas9 protein that does not include a CMA or eMI target motif.

In some embodiments, the disclosure provides a recombinant Cas9 protein including one or more amino acid modifications in a wild-type Cas9 protein, wherein the recombinant Cas9 protein includes a CMA target motif or an eMI target motif.

As described herein, a protein containing a CMA motif or an eMI motif is a target of the CMA or eMI protein degradation pathway. Thus, in some embodiments, the recombinant Cas9 protein of the present disclosure that includes one or more amino acid modifications introducing a CMA or eMI target motif is targeted for protein degradation via CMA or eMI. Likewise, in some embodiments, the recombinant Cas9 protein of the present disclosure that includes a CMA target motif or an eMI target motif is targeted for protein degradation via CMA or eMI.

In some embodiments, the recombinant Cas9 protein including a CMA or eMI target motif degrades at least 20% faster, at least 30% faster, at least 40% faster, at least 50% faster, at least 60% faster, at least 70% faster, at least 80% faster, at least 90% faster, at least 100% faster, at least 150% faster, at least 200% faster, at least 500% faster in vivo than wild-type Cas9 protein or a Cas9 protein that does not include a CMA or eMI target motif, as measured by an immunoblotting or GFP reporter assay. In some embodiments, if the same cell expresses: (a) the recombinant Cas9 including one or more amino acid modifications that introduce a CMA or eMI target motif, and (b) the wild-type Cas9, then the recombinant Cas9 is completely degraded while at least 50% of wild-type Cas9 still remains inside the cell. Similarly, in some embodiments, if the same cell expresses: (a) the recombinant Cas9 including one or more amino acid modifications that introduce a CMA or eMI target motif, and (b) the Cas9 protein that does not include a CMA or eMI target motif, then the recombinant Cas9 is completely degraded while at least 50% of the Cas9 protein that does not include a CMA or eMI target motif still remains inside the cell. In some embodiments, the recombinant Cas9 is completely degraded while at least 60%, at least 70%, at least 80%, at least 90%, or at least 100% of the wild-type Cas9 or the Cas9 protein that does not include a CMA or eMI target motif still remains inside the cell. In some embodiments, the recombinant Cas9 is completely degraded within 12 hours, within 24 hours, within 36 hours, within 48 hours, or within 72 hours of introduction into the cell. As used in embodiments herein, "completely degraded" refers to protein that is below the detection level of a GFP reporter assay or immunoblotting. As described herein, methods of measuring a protein's degradation rate include, for example, amino acid isotope pulse chase (such as, e.g., stable isotope labeling with amino acids in cell culture or SILAC), post-synthetic radiolabeling, or reporter-dependent approaches such as global protein stability profiling (GPSP), which utilize, for example, GFP as a reporter protein (see, e.g., Yewdell et al., Cell Biol Int 35(5): 457-462 (2011)). In some embodiments, the degradation rate of a Cas9 protein is measured by quantifying the amount of Cas9 protein in a cell at different time points using, for example, densiometric analysis of an immunoblot, plotting the protein level over time, and determining the degradation rate from the Cas9 protein level vs. time plot.

In some embodiments, the one or more amino acid modifications in the recombinant Cas9 includes a mutation at position F185 of SEQ ID NO:1. In some embodiments, the mutation is F185N. In some embodiments, the one or more amino acid modifications in the recombinant Cas9 includes a mutation at positions A547 and I548 of SEQ ID NO:1. In some embodiments, the mutations are A547E and I548L. In some embodiments, the one or more amino acid modifications in the recombinant Cas9 includes a mutation at positions T560 and V561 of SEQ ID NO:1. In some embodiments, the mutations are T560E and V561Q. In some embodiments, the one or more amino acid modifications in the recombinant Cas9 includes a mutation at positions D829 and I830 of SEQ ID NO:1. In some embodiments, the mutations are D829L and I830R. In some embodiments, the one or more amino acid modifications in the recombinant Cas9 includes a mutation at positions L1087 and S1088 of SEQ ID NO:1. In some embodiments, the mutations are L1087E and S1088Q. In some embodiments, the one or more amino acid modifications in the recombinant Cas9 includes a mutation at positions P1199 and K1200 of SEQ ID NO:1. In some embodiments, the mutations are P1199D and K1200Q.

In some embodiments, the one or more amino acid modifications in the recombinant Cas9 includes a combination of any of the mutations described herein. In some embodiments, one or more amino acid modifications in the recombinant Cas9 includes mutations selected from F185N, A547E, I548L and combinations thereof. In some embodiments, one or more amino acid modifications in the recombinant Cas9 includes mutations selected from F185N, T560E, V561Q and combinations thereof. In some embodiments, one or more amino acid modifications in the recombinant Cas9 includes mutations selected from F185N, D829L, I830R and combinations thereof. In some embodiments, one or more amino acid modifications in the recombinant Cas9 includes mutations selected from F185N, L1087E. S1088Q and combinations thereof. In some embodiments, one or more amino acid modifications in the recombinant Cas9 includes mutations selected from F185N, P1199D, K1200Q and combinations thereof.

In some embodiments, one or more amino acid modifications in the recombinant Cas9 includes mutations selected from A547E, I548L, T560E, V561Q, and combinations thereof. In some embodiments, one or more amino acid modifications in the recombinant Cas9 includes mutations selected from A547E, I548L, D829L, I830R, and combinations thereof. In some embodiments, one or more amino acid modifications in the recombinant Cas9 includes mutations selected from A547E, I548L, L1087E, S1088Q, and combinations thereof. In some embodiments, one or more amino acid modifications in the recombinant Cas9 includes mutations selected from A547E, I548L, P1199D, K1200Q, and combinations thereof. In some embodiments, one or more amino acid modifications in the recombinant Cas9 includes mutations selected from T560E, V561Q, D829L, I830R, and combinations thereof. In some embodiments, one or more amino acid modifications in the recombinant Cas9 includes mutations selected from T560E, V561Q, L1087E, S1088Q, and combinations thereof. In some embodiments, one or more amino acid modifications in the recombinant Cas9 includes mutations selected from T560E, V561Q, P1199D, K1200Q, and combinations thereof. In some embodiments, one or more amino acid modifications in the recombinant Cas9 includes mutations selected from D829L, I830R, L1087E, S1088Q, and combinations thereof. In some embodiments, one or more amino acid modifications in the recombinant Cas9 includes mutations selected from D829L, I830R, P1199D, K1200Q, and combinations thereof. In some embodiments, one or more amino acid modifications in the recombinant Cas9 includes mutations selected from L1087E, S1088Q, P1199D, K1200Q, and combinations thereof. In some embodiments, one or more amino acid modifications in the recombinant Cas9 protein results in one or more CMA target motifs or eMI target motifs, as described herein.

In some embodiments, the recombinant Cas9 protein has an amino acid sequence that is at least 50% identical to SEQ ID NO:1, and includes the one or more amino acid modifications described herein. In some embodiments, the recombinant Cas9 protein has an amino acid sequence that is at least 60% identical to SEQ ID NO:1, and includes the one or more amino acid modifications described herein. In some embodiments, the recombinant Cas9 protein has an amino acid sequence that is at least 70% identical to SEQ ID NO:1, and includes the one or more amino acid modifications described herein. In some embodiments, the recombinant Cas9 protein has an amino acid sequence that is at least 80% identical to SEQ ID NO:1, and includes the one or more amino acid modifications described herein. In some embodiments, the recombinant Cas9 protein has an amino acid sequence that is at least 90% identical to SEQ ID NO:1 and includes the one or more amino acid modifications described herein. In some embodiments, the recombinant Cas9 protein has an amino acid sequence that is at least 91%, at least 92%, at least 93%, at least 94%, at least 95%, at least 96%, at least 97%, at least 98%, or at least 99% identical to SEQ ID NO:1 and includes the one or more amino acid modifications described herein.

In some embodiments, the disclosure provides a recombinant Cas9 protein isolated from *Streptococcus pyogenes* (SpCas9) including an amino acid modification at one or more of position F185, A547, I548, T560, V561, D829, I830, L1087, S1088, P1199, K1200 of SEQ ID NO:1, or combinations thereof.

In some embodiments, the one or more amino acid modifications in the recombinant SpCas9 includes a mutation at position F185 of SEQ ID NO:1. In some embodiments, the mutation is F185N. In some embodiments, the one or more amino acid modifications in the recombinant SpCas9 includes mutations at positions A547 and I548 of SEQ ID NO:1. In some embodiments, the mutations are A547E and I548L. In some embodiments, the one or more amino acid modifications in the recombinant SpCas9 includes mutations at positions T560 and V561 of SEQ ID NO:1. In some embodiments, the mutations are T560E and V561Q. In some embodiments, the one or more amino acid modifications in the recombinant SpCas9 includes mutations at positions D829 and I830 of SEQ ID NO:1. In some embodiments, the mutations are D829L and I830R. In some embodiments, the one or more amino acid modifications in the recombinant SpCas9 includes mutations at positions L1087 and S1088 of SEQ ID NO:1. In some embodiments, the mutations are L1087E and S1088Q. In some embodiments, the one or more amino acid modifications in the recombinant SpCas9 includes mutations at positions P1199 and K1200 of SEQ ID NO:1. In some embodiments, the mutations are P1199D and K1200Q.

In some embodiments, the one or more amino acid modifications in the recombinant SpCas9 includes a combination of any of the mutations described herein. In some embodiments, one or more amino acid modifications in the recombinant SpCas9 includes mutations selected from F185N, A547E, I548L, and combinations thereof. In some embodiments, one or more amino acid modifications in the recombinant SpCas9 includes mutations selected from F185N, T560E, V561Q, and combinations thereof. In some embodiments, one or more amino acid modifications in the recombinant SpCas9 includes mutations selected from F185N, D829L, I830R, and combinations thereof. In some embodiments, one or more amino acid modifications in the recombinant SpCas9 includes mutations selected from F185N, L1087E, S1088Q, and combinations thereof. In some embodiments, one or more amino acid modifications in the recombinant SpCas9 includes mutations selected from F185N, P1199D, K1200Q, and combinations thereof.

In some embodiments, one or more amino acid modifications in the recombinant SpCas9 includes mutations selected from A547E, I548L, T560E, V561Q, and combinations thereof. In some embodiments, one or more amino acid modifications in the recombinant SpCas9 includes mutations selected from A547E, I548L, D829L, I830R, and combinations thereof. In some embodiments, one or more amino acid modifications in the recombinant SpCas9 includes mutations selected from A547E, I548L, L1087E, S1088Q, and combinations thereof. In some embodiments, one or more amino acid modifications in the recombinant SpCas9 includes mutations selected from A547E, I548L, P1199D, K1200Q, and combinations thereof. In some embodiments, one or more amino acid modifications in the recombinant SpCas9 includes mutations selected from T560E, V561Q, D829L, I830R, and combinations thereof. In some embodiments, one or more amino acid modifications in the recombinant SpCas9 includes mutations selected from T560E, V561Q, L1087E, S1088Q, and combinations thereof. In some embodiments, one or more amino acid modifications in the recombinant SpCas9 includes mutations selected from T560E, V561Q, P1199D, K1200Q, and combinations thereof. In some embodiments, one or more amino acid modifications in the recombinant SpCas9 includes mutations selected from D829L, I830R, L1087E, S1088Q, and combinations thereof. In some embodiments, one or more amino acid modifications in the recombinant SpCas9 includes mutations selected from D829L, I830R, P1199D, K1200Q, and combinations thereof. In some embodiments, one or more amino acid modifications in the recombinant SpCas9 includes mutations selected from L1087E, S1088Q, P1199D, K1200Q, and combinations thereof. In some embodiments, one or more amino acid modifications in the recombinant SpCas9 protein results in one or more CMA target motifs or eMI target motifs. CMA target motifs and eMI target motifs are described herein.

In some embodiments, the recombinant SpCas9 protein has an amino acid sequence that is at least 50% identical to SEQ ID NO:1, and includes the one or more amino acid modifications described herein. In some embodiments, the recombinant SpCas9 protein has an amino acid sequence that is at least 60% identical to SEQ ID NO:1, and includes the one or more amino acid modifications described herein. In some embodiments, the recombinant SpCas9 protein has an amino acid sequence that is at least 70% identical to SEQ ID NO:1, and includes the one or more amino acid modifications described herein. In some embodiments, the recombinant SpCas9 protein has an amino acid sequence that is at least 80% identical to SEQ ID NO:1, and includes the one or more amino acid modifications described herein. In some embodiments, the recombinant SpCas9 protein has an amino acid sequence that is at least 90% identical to SEQ ID NO:1 and includes the one or more amino acid modifications described herein. In some embodiments, the recombinant SpCas9 protein has an amino acid sequence that is at least 91%, at least 92%, at least 93%, at least 94%, at least 95%, at least 96%, at least 97%, at least 98%, or at least 99% identical to SEQ ID NO:1 and includes the one or more amino acid modifications described herein.

In some embodiments, the disclosure provides a recombinant Cas9 protein capable of binding to heat shock cognate protein of 70 kD (HSC70).

As described herein, HSC70 is a chaperone protein in both the CMA and eMI protein degradation pathways. HSC70 binds to proteins targeted for degradation, and transports the protein to the lysosome (in the case of CMA) or the late endosome (in the case of eMI) for degradation. Thus, in some embodiments, a protein with higher binding affinity to HSC70 is degraded more quickly compared with a protein with lower binding affinity to HSC70. In some embodiments, a protein's binding ability and/or affinity to HSC70 is determined by presence of a CMA or an eMI target motif, e.g., a KFERQ motif or KFERQ-like motif, on the protein.

In some embodiments, the recombinant Cas9 protein of the present disclosure is capable of binding to HSC70. Wild-type Cas9, or a Cas9 protein that does not include a KFERQ motif or KFERQ-like motif, does not bind to HSC70, as described and exemplified herein. In some embodiments, the recombinant Cas9 protein of the present disclosure is capable of binding to HSC70 with at least 50%, at least 60%, at least 70%, at least 80%, at least 90%, or at least 100% higher affinity than a wild-type Cas9 protein or a Cas9 protein that does not include a KFERQ motif or KFERQ-like motif. Methods of determining binding affinity between proteins are known in the art and include, for example, biochemical methods such as: co-immunoprecipitation, bimolecular fluorescence complementation, affinity electrophoresis, pull-down assays, phage display, in vivo cross-linking, tandem affinity purification, cross-linking followed by mass spectrometry, and proximity ligation assay; biophysical methods such as: bio-layer interferometry, dynamic light scattering, surface plasmon resonance, fluorescence resonance energy transfer, and isothermal titration calorimetry; and/or genetic methods such as: yeast two-hybrid screen and bacterial two-hybrid screen. For an overview of methods of measuring binding affinity and detecting protein interactions, see, e.g., Meyerkord and Fu, *Protein-Protein Interactions: Methods and Applications* $2^{nd}$ Ed. 2015, Humana Press. In some embodiments, the recombinant Cas9 of the present disclosure is capable of being detected by an HSC70 antibody after an incubation time period with HSC70, whereas a wild-type Cas9 or a Cas9 protein that does not include a KFERQ motif or KFERQ-like motif is not detected by the HSC70 antibody after the same incubation time period.

In some embodiments, the binding affinity between HSC70 and the recombinant Cas9 is at least 2-fold higher, at least 3-fold higher, at least 4-fold higher, at least 5-fold higher, at least 6-fold higher, at least 7-fold higher, at least 8-fold higher, at least 9-fold higher, at least 10-fold higher, at least 20-fold higher, at least 30-fold higher, at least 40-fold higher, at least 50-fold higher, at least 60-fold higher, at least 70-fold higher, at least 80-fold higher, at least 90-fold higher, at least 100-folder higher, at least 500-fold higher, or at least 1000-fold higher than the binding affinity between HSC70 and a wild-type Cas9 or a Cas9 protein that does not include a KFERQ motif or KFERQ-like motif.

In some embodiments, the disclosure provides a recombinant Cas9 protein isolated from *Streptococcus pyogenes* (SpCas9), including an engineered KFERQ motif or KFERQ-like motif at amino acid position 185 of SEQ ID NO:1.

As described herein, SEQ ID NO:1 includes the amino acid sequence of the wild-type Cas9 protein from *S. pyogenes* (SpCas9). Amino acid position 185 of SEQ ID NO:1 is in the region corresponding to the Rec2 domain of SpCas9. In some embodiments, the amino acid residue at position 185 of SEQ ID NO:1 is modified in order to generate a KFERQ motif or KFERQ-like motif. In some embodiments, the KFERQ-like motif at position 185 of SEQ ID NO:1 is VDKLN. In some embodiments, the recombinant SpCas9 protein includes a mutation at position 185 of SEQ ID NO:1. In some embodiments, the mutation is F185N.

In some embodiments, the recombinant Cas9 of the present disclosure further includes a mutation at position D10 and/or H840 of SEQ ID NO:1. Mutations at positions D10 and/or H840 of wild-type Cas9 generate a Cas9 with nickase activity, also referred to herein as a "Cas9 nickase." Cas9 nickases are capable of cleaving only one strand of double-stranded DNA (i.e., "nicking" the DNA). Cas9 nickases are described in, e.g., Cho et al., Genome Res 24:132-141 (2013). In some embodiments, the recombinant Cas9 protein of the present disclosure further includes a mutation at amino acid position D10 of SEQ ID NO:1. In some embodiments, the recombinant Cas9 protein of the present disclosure further includes a mutation at amino acid position H840 of SEQ ID NO:1. In some embodiments, the recombinant Cas9 protein of the present disclosure further includes a mutation at amino acid position D10 and a mutation at amino acid position H840 of SEQ ID NO:1. In some embodiments, the mutation at position D10 is D10A. In some embodiments, the mutation at position D10 is D10N. In some embodiments, the mutation at position H840 is H840A. In some embodiments, the mutation at position H840 is H840N. In some embodiments, the mutation at position H840 is H840Y. In some embodiments, the recombinant Cas9 protein has a F185N mutation and a D10A mutation. In some embodiments, the recombinant Cas9 protein has a F185N mutation and a D10N mutation. In some embodiments, the recombinant Cas9 protein has a F185N mutation and a H840A mutation. In some embodiments, the recombinant Cas9 protein has a F185N mutation and a H840N mutation. In some embodiments, the recombinant Cas9 protein has a F185N mutation and a H840Y mutation.

In some embodiments, the recombinant Cas9 protein has a F185N mutation, a D10A mutation and an H840A mutation. In some embodiments, the recombinant Cas9 protein has a F185N mutation, a D10A mutation and an H840N mutation. In some embodiments, the recombinant Cas9 protein has a F185N mutation, a D10A mutation and an H840Y mutation. In some embodiments, the recombinant Cas9 protein has a F185N mutation, a D10N mutation and an H840A mutation. In some embodiments, the recombinant Cas9 protein has a F185N mutation, a D10N mutation and an H840N mutation. In some embodiments, the recombinant Cas9 protein has a F185N mutation, a D10N mutation and an H840Y mutation. In some embodiments, the recombinant Cas9 protein has a F185N mutation, a D10A mutation and an H840A mutation. In some embodiments, the recombinant Cas9 protein has a F185N mutation, a D10A mutation and an H840N mutation. In some embodiments, the recombinant Cas9 protein has a F185N mutation, a D10A mutation and an H840Y mutation. In some embodiments, the recombinant Cas9 protein has a F185N mutation, a D10N mutation and an H840A mutation. In some embodiments, the recombinant Cas9 protein has a F185N mutation, a D10N mutation and an H840N mutation. In some embodiments, the recombinant Cas9 protein has a F185N mutation, a D10N mutation and an H840Y mutation.

In some embodiments, the recombinant Cas9 protein of the present disclosure generates cohesive ends. As described herein, cohesive ends refer to a nucleic acid fragment with strands of unequal length. In some embodiments, the recombinant Cas9 protein that generates cohesive ends is a recombinant Cas9-FokI hybrid protein. In some embodiments, the recombinant Cas9-FokI hybrid protein has a F185N mutation in the Cas9. In some embodiments, the recombinant Cas9-FokI hybrid protein has a F185N mutation and a D10A mutation in the Cas9. In some embodiments, the recombinant Cas9-FokI hybrid protein has a F185N mutation and a D10N mutation in the Cas9. In some embodiments, the recombinant Cas9-FokI hybrid protein has a F185N mutation and a H840A mutation in the Cas9. In some embodiments, the recombinant Cas9-FokI hybrid protein has a F185N mutation and a H840N mutation in the Cas9. In some embodiments, the recombinant Cas9-FokI hybrid protein has a F185N mutation and a H840Y mutation in the Cas9.

In some embodiments, the recombinant Cas9-FokI hybrid protein has a F185N mutation, a D10A mutation and an H840A mutation in the Cas9. In some embodiments, the recombinant Cas9-FokI hybrid protein has a F185N mutation, a D10A mutation and an H840N mutation in the Cas9. In some embodiments, the recombinant Cas9-FokI hybrid protein has a F185N mutation, a D10A mutation and an H840Y mutation in the Cas9. In some embodiments, the recombinant Cas9-FokI hybrid protein has a F185N mutation, a D10N mutation and an H840A mutation in the Cas9. In some embodiments, the recombinant Cas9-FokI hybrid protein has a F185N mutation, a D10N mutation and an H840N mutation in the Cas9. In some embodiments, the recombinant Cas9-FokI hybrid protein has a F185N mutation, a D10N mutation and an H840Y mutation in the Cas9. In some embodiments, the recombinant Cas9-FokI hybrid protein has a F185N mutation, a D10A mutation and an H840A mutation in the Cas9. In some embodiments, the recombinant Cas9-FokI hybrid protein has a F185N mutation, a D10A mutation and an H840N mutation in the Cas9. In some embodiments, the recombinant Cas9-FokI hybrid protein has a F185N mutation, a D10A mutation and an H840Y mutation in the Cas9. In some embodiments, the recombinant Cas9-FokI hybrid protein has a F185N mutation, a D10N mutation and an H840A mutation in the Cas9. In some embodiments, the recombinant Cas9-FokI hybrid protein has a F185N mutation, a D10N mutation and an H840N mutation in the Cas9. In some embodiments, the recombinant Cas9-FokI hybrid protein has a F185N mutation, a D10N mutation and an H840Y mutation in the Cas9.

In some embodiments, the recombinant Cas9 protein that generates cohesive ends includes an engineered KFERQ motif or KFERQ-like motif on a wild-type Cas9 protein capable of generating cohesive ends. In some embodiments, the wild-type Cas9 protein capable of generating cohesive ends is isolated from *Francisella novicida* (FnCas9) (SEQ ID NO:23). In some embodiments, the recombinant Cas9 protein has an amino acid sequence with at least about 90% sequence identity to SEQ ID NO:23 and includes an engineered KFERQ motif or KFERQ-like motif described herein. In some embodiments, the recombinant Cas9 protein has an amino acid sequence with at least about 90% sequence identity to SEQ ID NO:23 and includes a CMA target motif or an eMI target motif. In some embodiments, the recombinant Cas9 has an amino acid sequence with at least about 90% sequence identity to SEQ ID NO:23 and is capable of binding HSC70 with higher affinity than the wild-type Cas9. In some embodiments, the recombinant Cas9 has an amino acid sequence with at least about 90% sequence identity to SEQ ID NO:23 and degrades faster than the wild-type Cas9.

In some embodiments, the recombinant Cas9 of the present disclosure includes one or more nuclear localization signals. A "nuclear localization signal" or "nuclear localization sequence" (NLS) is an amino acid sequence that "tags" a protein for import into the cell nucleus by nuclear transport, i.e., a protein having an NLS is transported into the cell nucleus. Typically, the NLS includes positively-charged Lys or Arg residues exposed on the protein surface. Exemplary nuclear localization sequences include, but are not limited to the NLS from: SV40 Large T-Antigen, nucleoplasmin, EGL-13, c-Myc, and TUS-protein. In some embodiments, the NLS includes the sequence PKKKRKV (SEQ ID NO:42). In some embodiments, the NLS includes the sequence AVKRPAATKKAGQAKKKKLD (SEQ ID NO:43). In some embodiments, the NLS includes the sequence PAAKRVKLD (SEQ ID NO:44). In some embodiments, the NLS includes the sequence MSRRRKANPTKLSENAKKLAKEVEN (SEQ ID NO:45). In some embodiments, the NLS includes the sequence KLKIKRPVK (SEQ ID NO:46). Other nuclear localization sequences include, but are not limited to, the acidic M9 domain of hnRNP A1, the sequence KIPIK (SEQ ID NO:47) in yeast transcription repressor Mata2, and PY-NLSs.

Nucleotides

In some embodiments, the present disclosure provides a polynucleotide sequence encoding the recombinant Cas9 proteins described herein. In some embodiments, the present disclosure provides a polynucleotide sequence encoding a recombinant Cas9 including an engineered KFERQ motif or KFERQ-like motif. In some embodiments, the present disclosure provides a polynucleotide sequence encoding a recombinant Cas9 protein including one or more amino acid modifications of a wild-type Cas9 protein that introduce a CMA target motif or an eMI target motif in the Cas9 protein, wherein the recombinant Cas9 protein degrades at least 20% faster in vivo than the wild-type Cas9 protein. In some embodiments, the present disclosure provides a polynucleotide sequence encoding a recombinant Cas9 protein including one or more amino acid modifications in a wild-type Cas9 protein, wherein the recombinant Cas9 protein includes a CMA target motif or an eMI target motif. In some embodiments, the present disclosure provides a polynucleotide sequence encoding a recombinant Cas9 protein isolated from *Streptococcus pyogenes* (SpCas9) including an amino acid modification at one or more of position F185, A547, I548, T560, V561, D829, I830, L1087, S1088, P1199, K1200 of SEQ ID NO:1, or combinations thereof. In some embodiments, the present disclosure provides a polynucleotide sequence encoding a recombinant Cas9 protein capable of binding to HSC70. In some embodiments, the present disclosure provides a polynucleotide sequence encoding a recombinant Cas9 protein isolated from *Streptococcus pyogenes* (SpCas9), including, an engineered KFERQ motif or KFERQ-like motif at amino acid position 185 of SEQ ID NO:1.

In some embodiments, the polynucleotide sequence has at least 50% sequence identity to SEQ ID NO:3. In some embodiments, the polynucleotide sequence has at least 60% sequence identity to SEQ ID NO:3. In some embodiments, the polynucleotide sequence has at least 70% sequence identity to SEQ ID NO:3. In some embodiments, the polynucleotide sequence has at least 80% sequence identity to SEQ ID NO:3. In some embodiments, the polynucleotide sequence has at least 90% sequence identity to SEQ ID NO:3. In some embodiments, the polynucleotide sequence has at least 91%, at least 92%, at least 93%, at least 94%, at least 95%, at least 96%, at least 97%, at least 98%, or at least 99% sequence identity to SEQ ID NO:3.

In some embodiments, the polynucleotide sequence encoding the recombinant Cas9 is codon optimized for expression in a eukaryotic cell. In some embodiments, the polynucleotide sequence encoding a stiCas9 is codon optimized for expression in an animal cell. In some embodiments, the polynucleotide sequence encoding the recombinant Cas9 is codon optimized for expression in a human cell. In some embodiments, the polynucleotide sequence encoding the recombinant Cas9 is codon optimized for expression in a plant cell. Codon optimization is the adjustment of codons to match the expression host's tRNA abundance in order to increase yield and efficiency of recombinant or heterologous protein expression. Codon optimization methods are routine in the art and may be performed using software programs such as, for example, Integrated DNA Technologies' Codon Optimization tool, Entelechon's Codon Usage Table analysis tool, GENEMAKER's Blue Heron software, Aptagen's Gene Forge software, DNA Builder Software, General Codon Usage Analysis software, the publicly available OPTIMIZER software, and Genscript's OptimumGene algorithm.

CRISPR-Cas Systems

In some embodiments, the present disclosure provides a non-naturally occurring CRISPR-Cas system including: a recombinant Cas9 protein provided herein, and a guide polynucleotide that forms a complex with the recombinant Cas9 protein and includes a guide sequence.

In some embodiments, the recombinant Cas9 protein of the non-naturally occurring CRISPR-Cas system includes an engineered KFERQ motif or KFERQ-like motif. In some embodiments, the recombinant Cas9 protein of the non-naturally occurring CRISPR-Cas system includes one or more amino acid modifications of a wild-type Cas9 protein that introduce a CMA target motif or an eMI target motif in the Cas9 protein, wherein the recombinant Cas9 protein degrades at least 20% faster in vivo than the wild-type Cas9 protein or a Cas9 protein that does not include a CMA or eMI target motif. In some embodiments, the recombinant Cas9 protein of the non-naturally occurring CRISPR-Cas system includes one or more amino acid modifications in a wild-type Cas9 protein, wherein the recombinant Cas9 protein includes a CMA target motif or an eMI target motif. In some embodiments, the recombinant Cas9 protein of the non-naturally occurring CRISPR-Cas system is isolated from *S. pyogenes* (SpCas9) and includes an amino acid modification at one or more of position F185, A547, I548, T560, V561, D829, I830, L1087, S1088, P1199, K1200 of SEQ ID NO:1, or combinations thereof. In some embodiments, the recombinant Cas9 protein of the non-naturally occurring CRISPR-Cas system is capable of binding to HSC70. In some embodiments, the recombinant Cas9 protein of the non-naturally occurring CRISPR-Cas system is isolated from *S. pyogenes* (SpCas9) and includes an engineered KFERQ motif or KFERQ-like motif at amino acid position 185 of SEQ ID NO:1.

In some embodiments, the present disclosure provides a non-naturally occurring CRISPR-Cas system including: a polynucleotide sequence encoding a recombinant Cas9 protein provided herein, and a guide polynucleotide that forms a complex with the recombinant Cas9 protein and includes a guide sequence.

In some embodiments, the present disclosure provides a non-naturally occurring CRISPR-Cas system including: a regulatory element operably linked to a polynucleotide sequence encoding a recombinant Cas9 protein provided herein, and a guide polynucleotide that forms a complex with the recombinant Cas9 protein and includes a guide sequence.

In some embodiments, the polynucleotide of the non-naturally occurring CRISPR-Cas system encodes a recombinant Cas9 including an engineered KFERQ motif or KFERQ-like motif. In some embodiments, the polynucleotide of the non-naturally occurring CRISPR-Cas system encodes a recombinant Cas9 protein including one or more amino acid modifications of a wild-type Cas9 protein that introduce a CMA target motif or an eMI target motif in the Cas9 protein, wherein the recombinant Cas9 protein degrades at least 20% faster in vivo than the wild-type Cas9 protein or a Cas9 protein that does not include a CMA or eMI target motif. In some embodiments, the polynucleotide of the non-naturally occurring CRISPR-Cas system encodes a recombinant Cas9 protein including one or more amino acid modifications in a wild-type Cas9 protein, wherein the recombinant Cas9 protein includes a CMA target motif or an eMI target motif. In some embodiments, the polynucleotide of the non-naturally occurring CRISPR-Cas system encodes a recombinant Cas9 protein isolated from *Streptococcus pyogenes* (SpCas9) including an amino acid modification at one or more of position F185, A547, I548, T560, V561, D829, I830, L1087, S1088, P1199, K1200 of SEQ ID NO:1, or combinations thereof. In some embodiments, the polynucleotide of the non-naturally occurring CRISPR-Cas system encodes a recombinant Cas9 protein capable of binding to HSC70. In some embodiments, the polynucleotide of the non-naturally occurring CRISPR-Cas system encodes a recombinant Cas9 protein isolated from *Streptococcus pyogenes* (SpCas9), including, an engineered KFERQ motif or KFERQ-like motif at amino acid position 185 of SEQ ID NO:1.

In some embodiments, the regulatory element linked to the polynucleotide sequence encoding a recombinant Cas9 protein is a promoter. In some embodiments, the regulatory element is a bacterial promoter. In some embodiments, the regulatory element is a viral promoter. In some embodiments, the regulatory element is a eukaryotic regulatory element, i.e., a eukaryotic promoter. In some embodiments, the eukaryotic regulatory element is a mammalian promoter.

In some embodiments, the guide polynucleotide of the non-naturally occurring CRISPR-Cas system is an RNA molecule. The RNA molecule that binds to CRISPR-Cas components and targets them to a specific location within the target DNA is referred to herein as "guide RNA," "gRNA," or "small guide RNA" and may also be referred to herein as a "DNA-targeting RNA." A guide polynucleotide, e.g., guide RNA, includes at least two nucleotide segments: at least one "DNA-binding segment" and at least one "polypeptide-binding segment." By "segment" is meant a part, section, or region of a molecule, e.g., a contiguous stretch of nucleotides of guide polynucleotide molecule. The definition of "segment," unless otherwise specifically defined, is not limited to a specific number of total base pairs.

In some embodiments, the DNA-binding segment (or "DNA-targeting sequence") of the guide polynucleotide hybridizes with a target sequence in a cell. In some embodiments, the DNA-binding segment of the guide polynucleotide, e.g., guide RNA, includes a polynucleotide sequence that is complementary to a specific sequence within a target DNA.

In some embodiments, the guide polynucleotide of the present disclosure has a guide sequence that hybridizes to a target sequence in a bacterial cell. In some embodiments the of method, the target sequence is in a bacterial cell. In some embodiments, the bacterial cell is a laboratory strain. Examples of such cells include, but are not limited to, *E. coli, S. aureus, V. cholerae, S. pneumoniae, B. subtilis, C. crescentus, M. genitalium, A. fischeri, Synechocystis, P. fluorescens, A. vinelandii, S. coelicolor*. In some embodiments, the bacterial cell is of bacteria used in preparation of food and/or beverages. Non-limiting exemplary genera of such cells include, but are not limited to, *Acetobacter, Arthrobacter, Bacillus, Bifidobacterium, Brachybacterium, Brevibacterium, Carnobacterium, Corynebacterium, Enterococcus, Gluconacetobacter, Hafnia, Halomonas, Kocuria, Lactobacillus* (including *L. acetotolerans, L. acidipiscis, L. acidophilus, L. alimentarius, L. brevis, L. bucheri, L. casei, L. curvatus, L. fermentum, L. hilgardii, L. jensenii, L. kimchii, L. lactis, L. paracasei, L. plantarum,* and *L. sakei*), *Leuconostoc, Microbacterium, Pediococcus, Propionibacterium, Weissella,* and *Zymomonas*.

In some embodiments, the guide polynucleotide of the present disclosure has a guide sequence that hybridizes to a target sequence in a eukaryotic cell. In some embodiments, the eukaryotic cell is an animal or human cell. In some embodiments, the eukaryotic cell is a human or rodent or bovine cell line or cell strain. Examples of such cells, cell lines, or cell strains include, but are not limited to, mouse myeloma (NSO)-cell lines, Chinese hamster ovary (CHO)-cell lines, HT1080, H9, HepG2, MCF7, MDBK Jurkat, NIH3T3, PC12, BHK (baby hamster kidney cell), VERO, SP2/0, YB2/0, Y0, C127, L cell, COS, e.g., COS1 and COS7, QC1-3, HEK-293, VERO, PER.C6, HeLA, EB1, EB2, EB3, oncolytic or hybridoma-cell lines. In some embodiments, the eukaryotic cells are CHO-cell lines. In some embodiments, the eukaryotic cell is a CHO cell. In some embodiments, the cell is a CHO-K1 cell, a CHO-K1 SV cell, a DG44 CHO cell, a DUXB11 CHO cell, a CHOS, a CHO GS knock-out cell, a CHO FUT8 GS knock-out cell, a CHOZN, or a CHO-derived cell. The CHO GS knock-out cell (e.g., GSKO cell) is, for example, a CHO-K1 SV GS knockout cell. The CHO FUT8 knockout cell is, for example, the POTELLIGENT CHOK1 SV (Lonza Biologics, Inc.). Eukaryotic cells can also be avian cells, cell lines or cell strains, such as, for example, EBX cells, EB14, EB24, EB26, EB66, or EBvl3.

In some embodiments, the eukaryotic cell is a human cell. In some embodiments, the human cell is a stem cell. The stem cells can be, for example, pluripotent stem cells, including embryonic stem cells (ESCs), adult stem cells, induced pluripotent stem cells (iPSCs), tissue specific stem cells (e.g., hematopoietic stem cells) and mesenchymal stem cells (MSCs). In some embodiments, the human cell is a differentiated form of any of the cells described herein. In some embodiments, the eukaryotic cell is a cell derived from any primary cell in culture.

In some embodiments, the eukaryotic cell is a hepatocyte such as a human hepatocyte, animal hepatocyte, or a non-parenchymal cell. For example, the eukaryotic cell can be a plateable metabolism qualified human hepatocyte, a plateable induction qualified human hepatocyte, plateable human hepatocyte, suspension qualified human hepatocyte (including 10-donor and 20-donor pooled hepatocytes), human hepatic kupffer cells, human hepatic stellate cells, dog hepatocytes (including single and pooled Beagle hepatocytes), mouse hepatocytes (including CD-1 and C57Bl/6 hepatocytes), rat hepatocytes (including Sprague-Dawley, Wistar Han, and Wistar hepatocytes), monkey hepatocytes (including Cynomolgus or Rhesus monkey hepatocytes), cat hepatocytes (including Domestic Shorthair hepatocytes), and rabbit hepatocytes (including New Zealand White hepatocytes).

In some embodiments, the eukaryotic cell is a plant cell. For example, the plant cell can be of a crop plant such as cassava, corn, sorghum, wheat, or rice. The plant cell can be of an algae, tree, or vegetable. The plant cell can be of a monocot or dicot or of a crop or grain plant, a production plant, fruit, or vegetable. For example, the plant cell can be of a tree, e.g., a citrus tree such as orange, grapefruit, or lemon tree; peach or nectarine trees; apple or pear trees; nut trees such as almond or walnut or pistachio trees; nightshade plants, e.g., potatoes, plants of the genus *Brassica*, plants of the genus *Lactuca*; plants of the genus *Spinacia*; plants of the genus *Capsicum*; cotton, tobacco, asparagus, carrot, cabbage, broccoli, cauliflower, tomato, eggplant, pepper, lettuce, spinach, strawberry, blueberry, raspberry, blackberry, grape, coffee, cocoa, etc.

In some embodiments, the guide sequence of the guide polynucleotide is about 5 to about 50 nucleotides. In some embodiments, the guide sequence of the guide polynucleotide is about 6 to about 45 nucleotides. In some embodiments, the guide sequence of the guide polynucleotide is about 7 to about 40 nucleotides. In some embodiments, the guide sequence of the guide polynucleotide is about 8 to about 35 nucleotides. In some embodiments, the guide sequence of the guide polynucleotide is about 9 to about 30 nucleotides. In some embodiments, the guide sequence of the guide polynucleotide is about 10 to about 20 nucleotides. In some embodiments, the guide sequence of the guide polynucleotide is about 12 to about 20 nucleotides. In some embodiments, the guide sequence of the guide polynucleotide is about 14 to about 20 nucleotides. In some embodiments, the guide sequence of the guide polynucleotide is about 16 to about 20 nucleotides. In some embodiments, the guide sequence of the guide polynucleotide is about 18 to about 20 nucleotides. In some embodiments, the guide sequence of the guide polynucleotide is about 5 to about 10 nucleotides. In some embodiments, the guide sequence of the guide polynucleotide is about 6 to about 10 nucleotides. In some embodiments, the guide sequence of the guide polynucleotide is about 7 to about 10 nucleotides. In some embodiments, the guide sequence of the guide polynucleotide is about 8 to about 10 nucleotides. The length of the guide sequence may be determined by the skilled artisan using guide sequence design tools such as, e.g., CRISPR Design Tool (Hsu et al., Nat Biotechnol 31(9):827-832 (2013)), ampliCan (Labun et al., bioRxiv 2018, doi: 10.1101/249474), CasFinder (Alach et al., bioRxiv 2014, doi: 10.1101/005074), CHOPCHOP (Labun et al., Nucleic Acids Res 2016, doi: 10.1093/nar/gkw398), and the like.

In some embodiments, the guide polynucleotide, e.g., guide RNA, of the present disclosure includes a polypeptide-binding sequence/segment. The polypeptide-binding segment (or "protein-binding sequence") of the guide polynucleotide, e.g., guide RNA, interacts with the polynucleotide-binding domain of a Cas protein of the present disclosure. Such polypeptide-binding segments or sequences are known to those of skill in the art, e.g., those disclosed in U.S. Patent Publications 2014/0068797, 2014/0273037, 2014/0273226, 2014/0295556, 2014/0295557, 2014/0349405, 2015/0045546, 2015/0071898, 2015/0071899, and 2015/0071906, the disclosures of which are incorporated herein in their entireties. In some embodiments, the polypeptide-binding segment of the guide polynucleotide binds to Cas9. In some embodiments, the polypeptide-binding segment of the guide polynucleotide binds to the recombinant Cas9 proteins provided herein.

In some embodiments, the guide polynucleotide is at least about 10, 15, 20, 25 or 30 nucleotides and up to about 25, 30, 35, 40, 45, 50, 60, 70, 80, 90, 100, 110, 120, 130, 140 or 150 nucleotides. In some embodiments, the guide polynucleotide is between about 10 to about 150 nucleotides. In some embodiments, the guide polynucleotide is between about 20 to about 120 nucleotides. In some embodiments, the guide polynucleotide is between about 30 to about 100 nucleotides. In some embodiments, the guide polynucleotide is between about 40 to about 80 nucleotides. In some embodiments, the guide polynucleotide is between about 50 to about 60 nucleotides. In some embodiments, the guide polynucleotide is between about 10 to about 35 nucleotides. In some embodiments, the guide polynucleotide is between about 15 to about 30 nucleotides. In some embodiments, the guide polynucleotide is between about 20 to about 25 nucleotides.

The guide polynucleotide, e.g., guide RNA, can be introduced into the target cell as an isolated molecule, e.g., RNA molecule, or is introduced into the cell using an expression vector containing DNA encoding the guide polynucleotide, e.g., guide RNA.

In some embodiments, the guide polynucleotide of the CRISPR-Cas system is linked to a direct repeat sequence. A direct repeat, or DR, sequence is an array of repetitive sequences in the CRISPR locus, interspaced by short stretches of non-repetitive sequences (spacers). The spacer sequences target the Protospacer Adjacent Motifs (PAM) on the target sequence. When the non-coding portion of the CRISPR locus (i.e., the guide polynucleotide and the tracrRNA) is transcribed, the transcript is cleaved at the DR sequences into short crRNAs containing individual spacer sequences, which direct the Cas9 nuclease to the PAM. In some embodiments, the DR sequence is RNA. In some embodiments, the DR sequence is encoded by a nucleic acid. In some embodiments, the DR sequence is linked to the guide polynucleotide. In some embodiments, the DR sequence is linked to the guide sequence of the guide polynucleotide. In some embodiments, the DR sequence includes a secondary structure. In some embodiments, the DR sequence includes a stem loop structure. In some embodiments, the DR sequence is 10 to 20 nucleotides. In some embodiments, the DR sequence is at least 16 nucleotides. In some embodiments, the DR sequence is at least 16 nucleotides and includes a single stem loop. In some embodiments, the DR sequence includes an RNA aptamer. In some embodiments, the secondary structure or stem loop in the DR is the recognized by a nuclease for cleavage. In some embodiments, the nuclease is a ribonuclease. In some embodiments, the nuclease is RNase III.

In some embodiments, the CRISPR-Cas systems of the present disclosure further include a tracrRNA. A "tracrRNA," or trans-activating CRISPR-RNA, forms an RNA duplex with a pre-crRNA, or pre-CRISPR-RNA, and is then cleaved by the RNA-specific ribonuclease RNase III to form a crRNA/tracrRNA hybrid. In some embodiments, the guide RNA includes the crRNA/tracrRNA hybrid. In some embodiments, the tracrRNA component of the guide RNA activates the Cas9 protein. In some embodiments, the guide polynucleotide of the CRISPR-cas system includes a tracrRNA sequence. In some embodiments, the CRISPR-Cas system includes a separate polynucleotide including a tracrRNA sequence.

In some embodiments, the polynucleotide encoding a recombinant Cas9 and a guide polynucleotide is on a single vector. In some embodiments, the polynucleotide encoding a recombinant Cas9, a guide polynucleotide (or nucleotide that can be transcribed into a guide polynucleotide), and a tracrRNA are on a single vector. In some embodiments, the polynucleotide encoding a recombinant Cas9, a guide polynucleotide (or nucleotide that can be transcribed into a guide polynucleotide), a tracrRNA, and a direct repeat sequence are on a single vector. In some embodiments, the vector is an expression vector. In some embodiments, the vector is a mammalian expression vector. In some embodiments, the vector is a human expression vector. In some embodiments, the vector is a plant expression vector.

In some embodiments, the polynucleotide encoding a recombinant Cas9 and a guide polynucleotide is a single nucleic acid molecule. In some embodiments, the polynucleotide encoding a recombinant Cas9, a guide polynucleotide, and a tracrRNA is a single nucleic acid molecule. In some embodiments, the polynucleotide encoding a recombinant Cas9, a guide polynucleotide, a tracrRNA, and a direct repeat sequence is a single nucleic acid molecule. In some embodiments, the single nucleic acid molecule is an expression vector. In some embodiments, the single nucleic acid molecule is a mammalian expression vector. In some embodiments, the single nucleic acid molecule is a human expression vector. In some embodiments, the single nucleic acid molecule is a plant expression vector.

In some embodiments, the recombinant Cas9 and guide polynucleotide are capable of forming a complex. In some embodiments, the complex of the recombinant Cas9 and the guide polynucleotide does not occur in nature.

Various methods are known in the art for delivery of CRISPR-Cas systems. In some embodiments, the CRISPR-Cas system of the present disclosure is delivered by a delivery particle. A delivery particle is a biological delivery system or formulation which includes a particle. A "particle," as defined herein, is an entity having a maximum diameter of about 100 microns (μm). In some embodiments, the particle has a maximum diameter of about 10 μm. In some embodiments, the particle has a maximum diameter of about 2000 nanometers (nm). In some embodiments, the particle has a maximum diameter of about 1000 nm. In some embodiments, the particle has a maximum diameter of about 900 nm, about 800 nm, about 700 nm, about 600 nm, about 500 nm, about 400 nm, about 300 nm, about 200 nm, or about 100 nm. In some embodiments, the particle has a diameter of about 25 nm to about 200 nm. In some embodiments, the particle has a diameter of about 50 nm to about 150 nm. In some embodiments, the particle has a diameter of about 75 nm to about 100 nm.

Delivery particles may be provided in any form, including but not limited to: solid, semi-solid, emulsion, or colloidal particles. In some embodiments, the delivery particle is a lipid-based system, a liposome, a micelle, a microvesicle, an exosome, or a gene gun. In some embodiments, the delivery particle includes a CRISPR-Cas system. In some embodiments, the delivery particle includes a CRISPR-Cas system including a recombinant Cas9 and a guide polynucleotide. In some embodiments, the delivery particle includes a CRISPR-Cas system including a recombinant Cas9 and a guide polynucleotide, wherein the recombinant Cas9 and the guide polynucleotide are in a complex. In some embodiments, the delivery particle includes a CRISPR-Cas system including a recombinant Cas9, a guide polynucleotide, and polynucleotide including a tracrRNA. In some embodiments, the delivery particle includes a CRISPR-Cas system including a recombinant Cas9, a guide polynucleotide, and a tracrRNA.

In some embodiments, the delivery particle further includes a lipid, a sugar, a metal or a protein. In some embodiments, the delivery particle is a lipid envelope. Delivery of mRNA using lipid envelopes or delivery particles including lipids is described, for example, in Su et al., Molecular Pharmacology 8(3):774-784 (2011). In some embodiments, the delivery particle is a sugar-based particle, for example, GalNAc. Sugar-based particles are described in WO 2014/118272 and Nair et al., J Am Chem Soc 136(49): 16958-16961 (2014).

In some embodiments, the delivery particle is a nanoparticle. Nanoparticles encompassed in the present disclosure may be provided in different forms, e.g., as solid nanoparticles (e.g., metal such as silver, gold, iron, titanium), non-metal, lipid-based solids, polymers, suspensions of nanoparticles, or combinations thereof. Metal, dielectric, and semiconductor nanoparticles may be prepared, as well as hybrid structures (e.g., core-shell nanoparticles). Nanoparticles made of semiconducting material may also be labeled quantum dots if they are small enough (typically sub 10 nm) that quantization of electronic energy levels occurs. Such nanoscale particles are used in biomedical applications as drug carriers or imaging agents and may be adapted for similar purposes in the present disclosure.

Preparation of delivery particles is further described in U.S. Patent Publications 2011/0293703, 2012/0251560, and 2013/0302401; and U.S. Pat. Nos. 5,543,158, 5,855,913, 5,895,309, 6,007,845, and 8,709,843.

In some embodiments, a vesicle includes the CRISPR-Cas system of the present disclosure. A "vesicle" is a small structure within a cell having a fluid enclosed by a lipid bilayer. In some embodiments, the CRISPR-Cas system of the present disclosure is delivered by a vesicle. In some embodiments, the vesicle includes a recombinant Cas9 and a guide polynucleotide. In some embodiments, the vesicle includes a recombinant Cas9 and a guide polynucleotide, wherein the recombinant Cas9 and the guide polynucleotide are in a complex. In some embodiments, the vesicle includes a CRISPR-Cas system including a recombinant Cas9, a guide polynucleotide, and a polynucleotide including a tracrRNA. In some embodiments, the vesicle includes a CRISPR-Cas system including a recombinant Cas9, a guide polynucleotide, and a tracrRNA.

In some embodiments, the vesicle including the recombinant Cas9 and guide polynucleotide is an exosome or a liposome. In some embodiments, the vesicle is an exosome. In some embodiments, the exosome is used to deliver the CRISPR-Cas systems of the present disclosure. Exosomes are endogenous nano-vesicles (i.e., having a diameter of about 30 to about 100 nm) that transport RNAs and proteins, and which can deliver RNA to the brain and other target organs. Engineered exosomes for delivery of exogenous biological materials into target organs is described, for example, by Alvarez-Erviti et al., Nature Biotechnology 29:341 (2011), El-Andaloussi et al., Nature Protocols 7:2112-2116 (2012), and Wahlgren et al., Nucleic Acids Research 40(17):e130 (2012).

In some embodiments, the vesicle including the stiCas9 and guide polynucleotide is a liposome. In some embodiments, the liposome is used to deliver the CRISPR-Cas systems of the present disclosure. Liposomes are spherical vesicle structures having at least one lipid bilayer and can be used as a vehicle for administration of nutrients and pharmaceutical drugs. Liposomes are often composed of phospholipids, in particular phosphatidylcholine, but also other lipids such as egg phosphatidylethanolamine. Types of liposomes include, but are not limited to, multilamellar vesicle, small unilamellar vesicle, large unilamellar vesicle, and cochleate vesicle. See, e.g., Spuch and Navarro, Journal of Drug Delivery, Article ID 469679 (2011). Liposomes for delivery of biological materials such as CRISPR-Cas components are described, for example, by Morrissey et al., Nature Biotechnology 23(8):1002-1007 (2005), Zimmerman et al., Nature Letters 441:111-114 (2006), and Li et al., Gene Therapy 19:775-780 (2012).

In some embodiments, a viral vector includes the CRISPR-Cas systems of the present disclosure. In some embodiments, the CRISPR-Cas system of the present disclosure is delivered by a viral vector. In some embodiments, the viral vector includes a recombinant Cas9 and a guide polynucleotide. In some embodiments, the viral vector includes a recombinant Cas9 and a guide polynucleotide, wherein the recombinant Cas9 and the guide polynucleotide are in a complex. In some embodiments, the viral vector includes a CRISPR-Cas system including a recombinant Cas9, a guide polynucleotide, and a polynucleotide including a tracrRNA. In some embodiments, the viral vector includes a CRISPR-Cas system including a recombinant Cas9, a guide polynucleotide, and a tracrRNA. In some embodiments, the viral vector is of an adenovirus, a lentivirus, or an adeno-associated virus. Examples of viral vectors are provided herein.

In some embodiments, adeno-associated virus (AAV) and/or lentiviral vectors can be used as a viral vector including the elements of the CRISPR-Cas systems as described herein. In some embodiments of the present disclosure, the Cas protein is expressed intracellularly by cells transduced by a viral vector.

In some embodiments, the Cas proteins and methods of the present disclosure are used in ex vivo gene editing, such as CAR-T type therapies. These embodiments may involve modification of cells from human donors. In these instances, viral vectors can be also used; however, there is the additional option to directly transfect the Cas9 protein (along with in vitro transcribed guide RNA and donor DNA) into cultured cells.

In some embodiments, the recombinant Cas9 proteins of the present disclosure are part of a fusion protein including one or more heterologous protein domains (e.g., about or at least about 1, 2, 3, 4, 5, 6, 7, 8, 9, or 10 or more domains in addition to the recombinant Cas9 protein). A Cas9 fusion protein can include any additional protein sequence, and optionally a linker sequence between any two domains. Examples of protein domains that may be fused to a recombinant Cas9 protein include, without limitation: epitope tags, reporter gene sequences, and protein domains having one or more of the following activities: methylase activity, demethylase activity, transcription activation activity, transcription repression activity, transcription release factor activity, histone modification activity, RNA cleavage activity, and nucleic acid binding activity. Non-limiting examples of epitope tags include: histidine (His) tags, V5 tags, FLAG tags, influenza hemagglutinin (HA) tags, Myc tags, VSV-G tags, and thioredoxin (Trx) tags. Examples of reporter genes include, but are not limited to, glutathione-5-transferase (GST), horseradish peroxidase (HRP), chloramphenicol acetyltransferase (CAT), beta-galactosidase, beta-glucuronidase, luciferase, green fluorescent protein (GFP), HcRed, DsRed, cyan fluorescent protein (CFP), yellow fluorescent protein (YFP), autofluorescent proteins including blue fluorescent protein (BFP), and mCherry. In some embodiments, a recombinant Cas9 protein is fused to a protein or a fragment of a protein that binds DNA molecules or bind other cellular molecules, including but not limited to: maltose binding protein (MBP), S-tag, Lex A DNA binding domain (DBD), GAL4 DNA binding domain, and herpes simplex virus (HSV) BP16 protein. Additional domains that may form part of a fusion protein including a Cas9 protein are described in U.S. Patent Publication 2011/0059502. In some embodiments, a tagged recombinant Cas9 protein is used to identify the location of a target sequence.

In some embodiments, a recombinant Cas9 protein may form a component of an inducible system. The inducible nature of the system allows for spatiotemporal control of gene editing or gene expression using a form of energy. The form of energy can include, but is not limited to: electromagnetic radiation, sound energy, chemical energy, and thermal energy. Non-limiting examples of inducible system include: tetracycline inducible promoters (Tet-On or Tet-Off), small molecule two-hybrid transcription activations systems (FKBP, ABA, etc), or light inducible systems (Phytochrome, LOV domains, or cryptochrome). In some embodiments, the Cas9 protein is a part of a Light Inducible Transcriptional Effector (LITE) to direct changes in transcriptional activity in a sequence-specific manner. The components of a light may include a Cas9 protein, a light-responsive cytochrome heterodimer (e.g., from *Arabidopsis thaliana*), and a transcriptional activation/repression domain. Further examples of inducible DNA binding proteins and methods for their use are provided in International Application Publication Nos. WO 2014/018423 and WO 2014/093635; U.S. Pat. Nos. 8,889,418 and 8,895,308; and U.S. Patent Publication Nos. 2014/0186919, 2014/0242700, 2014/0273234, and 2014/0335620.

Methods for Site-Specific Modifications

In some embodiments, the present disclosure provides a method of providing a site-specific modification at a target sequence in a genome of a cell, the method including introducing into the cell the non-naturally occurring CRISPR-Cas systems described herein.

In some embodiments of the method, the recombinant Cas9 protein of the non-naturally occurring CRISPR-Cas system includes an engineered KFERQ motif or KFERQ-like motif. In some embodiments of the method, the recombinant Cas9 protein of the non-naturally occurring CRISPR- Cas system includes one or more amino acid modifications of a wild-type Cas9 protein that introduce a CMA target motif or an eMI target motif in the Cas9 protein, wherein the recombinant Cas9 protein degrades at least 20% faster in vivo than the wild-type Cas9 protein or a Cas9 protein that does not include a CMA or eMI target motif. In some embodiments of the method, the recombinant Cas9 protein of the non-naturally occurring CRISPR-Cas system includes one or more amino acid modifications in a wild-type Cas9 protein, wherein the recombinant Cas9 protein includes a CMA target motif or an eMI target motif. In some embodiments of the method, the recombinant Cas9 protein of the non-naturally occurring CRISPR-Cas system is isolated from S. pyogenes (SpCas9) and includes an amino acid modification at one or more of position F185, A547, I548, T560, V561, D829, I830, L1087, S1088, P1199, K1200 of SEQ ID NO:1, or combinations thereof. In some embodiments of the method, the recombinant Cas9 protein of the non-naturally occurring CRISPR-Cas system is capable of binding to HSC70. In some embodiments of the method, the recombinant Cas9 protein of the non-naturally occurring CRISPR-Cas system is isolated from S. pyogenes (SpCas9) and includes an engineered KFERQ motif or KFERQ-like motif at amino acid position 185 of SEQ ID NO:1.

A "modification" of a target sequence encompasses single-nucleotide substitutions, multiple-nucleotide substitutions, insertions (i.e., knock-in) and deletions (i.e., knock-out) of a nucleic acid, frameshift mutations, and other nucleic acid modifications.

In some embodiments of the method, the modification is a deletion of at least part of the target sequence. A target sequence can be cleaved at two different sites and generate complementary cohesive ends, and the complementary cohesive ends can be re-ligated, thereby removing the sequence portion in between the two sites.

In some embodiments of the method, the modification is a mutation of the target sequence. Site-specific mutagenesis may be achieved by the use of site-specific nucleases that promote homologous recombination of an exogenous polynucleotide template (also called a "donor polynucleotide" or "donor vector") containing a mutation of interest. In some embodiments, a sequence of interest (SoI) includes a mutation of interest.

In some embodiments of the method, the modification is inserting a sequence of interest (SoI) into the target sequence. The SoI can be introduced as an exogenous polynucleotide template. In some embodiments, the exogenous polynucleotide includes blunt ends. In some embodiments, the exogenous polynucleotide template includes cohesive ends. In some embodiments, the exogenous polynucleotide template includes cohesive ends complementary to cohesive ends in the target sequence.

The exogenous polynucleotide template can be of any suitable length, such as about or at least about 10, 15, 20, 25, 50, 75, 100, 150, 200, 250, 500 or 1000 or more nucleotides in length. In some embodiments, the exogenous polynucleotide template is complementary to a portion of a polynucleotide including the target sequence. When optimally aligned, the exogenous polynucleotide template overlaps with one or more nucleotides of a target sequence (e.g., about or at least about 1, 5, 10, 15, 20, 25, 30, 35, 40, 45, 50, 60, 70, 80, 90, or 100 or more nucleotides). In some embodiments, when the exogenous polynucleotide template and a polynucleotide including the target sequence are optimally aligned, the nearest nucleotide of the exogenous polynucleotide template is within about 1, 5, 10, 15, 20, 25, 50, 75, 100, 200, 300, 400, 500, 100, 1500, 2000, 2500, 5000, 10000 or more nucleotides from the target sequence.

In some embodiments, the exogenous polynucleotide is DNA, such as, e.g., a DNA plasmid, a bacterial artificial chromosome (BAC), a yeast artificial chromosome (YAC), a viral vector, a linear piece of single-stranded or double-stranded DNA, an oligonucleotide, a PCR fragment, a naked nucleic acid, or a nucleic acid complexed with a delivery vehicle such as a liposome.

In some embodiments, the exogenous polynucleotide is inserted into the target sequence using an endogenous DNA repair pathway of the cell. Endogenous DNA repair pathways include NHEJ, MMEJ, and HDR, each of which is described herein. During the repair process, an exogenous polynucleotide template including the SoI can be introduced into the target sequence. In some embodiments, an exogenous polynucleotide template including the SoI flanked by an upstream sequence and a downstream sequence is introduced into the cell, wherein the upstream and downstream sequences share sequence similarity with either side of the site of integration in the target sequence. In some embodiments, the exogenous polynucleotide including the SoI includes, for example, a mutated gene. In some embodiments, the exogenous polynucleotide includes a sequence endogenous or exogenous to the cell. In some embodiments, the SoI includes polynucleotides encoding a protein, or a non-coding sequence such as, e.g., a microRNA. In some embodiments, the SoI is operably linked to a regulatory element. In some embodiments, the SoI is a regulatory element. In some embodiments, the SoI includes a resistance cassette, e.g., a gene that confers resistance to an antibiotic. In some embodiments, the SoI includes a mutation of the wild-type target sequence. In some embodiments, the SoI disrupts or corrects the target sequence by creating a frameshift mutation or nucleotide substitution. In some embodiments, the SoI includes a marker. Introduction of a marker into a target sequence can make it easy to screen for targeted integrations. In some embodiments, the marker is a restriction site, a fluorescent protein, or a selectable marker. In some embodiments, the SoI is introduced as a vector including the SoI.

The upstream and downstream sequences in the exogenous polynucleotide template are selected to promote homologous recombination between the target sequence and the exogenous polynucleotide. The upstream sequence is a nucleic acid sequence that shares sequence similarity with the sequence upstream of the targeted site for integration (i.e., the target sequence). Similarly, the downstream sequence is a nucleic acid sequence that shares sequence similarity with the sequence downstream of the targeted site for integration. Thus, in some embodiments, the exogenous polynucleotide template including the SoI is inserted into the target sequence by homologous recombination at the upstream and downstream sequences. In some embodiments, the upstream and downstream sequences in the exogenous polynucleotide template have at least 70%, at least 75%, at least 80%, at least 85%, at least 90%, at least 95%, at least 96%, at least 97%, at least 98%, at least 99%, or 100% sequence identity with the upstream and downstream sequences of the targeted genome sequence, respectively. In some embodiments, the upstream or downstream sequence has at least about 20, 50, 100, 150, 200, 250, 300, 350, 400, or 500 base pairs and up to about 600, 750, 1000, 1250, 1500, 1750 or 2000 base pairs. In some embodiments, the upstream or downstream sequence has about 20 to 2000 base pairs, or about 50 to 1750 base pairs, or about 100 to 1500 base pairs, or about 200 to 1250 base pairs, or about 300 to 1000 base pairs, or about 400 to about 750 base pairs, or about 500 to 600 base pairs. In some embodiments, the upstream or downstream sequence has about 50, about 100, about 250, about 500, about 100, about 1250, about 1500, about 1750, about 2000, about 2250, or about 2500 base pairs.

In some embodiments of the method, the modification in the target sequence is inactivation of expression of the target sequence in the cell. For example, upon the binding of a CRISPR-Cas complex to the target sequence, the target sequence is inactivated such that the sequence is not transcribed, the coded protein is not produced, and/or the sequence does not function as the wild-type sequence does. For example, a protein or microRNA coding sequence may be inactivated such that the protein is not produced.

In some embodiments, a regulatory sequence can be inactivated such that it no longer functions as a regulatory sequence. Examples of a regulatory sequence include a promoter, a transcription terminator, an enhancer, and other regulatory elements described herein. The inactivated target sequence may include a deletion mutation (i.e., deletion of one or more nucleotides), an insertion mutation (i.e., insertion of one or more nucleotides), or a nonsense mutation (i.e., substitution of a single nucleotide for another nucleotide such that a stop codon is introduced). In some embodiments, the inactivation of a target sequence results in "knockout" of the target sequence.

In some embodiments of the method including a recombinant Cas9 provided herein, off-target modifications in the genome of the cell are reduced by at least about 50% relative to wild-type Cas9 or a Cas9 that does not include a KFERQ motif or KFERQ-like motif. As described herein, off-target modifications are non-specific and unintended genetic modifications such as, e.g., unintended point mutations, deletions, insertions, inversions, and translocations. In some embodiments, the recombinant Cas9 protein of the present disclosure has reduced off-targeting in the cell due to a faster degradation rate. In some embodiments, the recombinant Cas9 protein of the present disclosure has reduced off-targeting in the cell due to lower cellular availability of the Cas9. In some embodiments, the recombinant Cas9 protein of the present disclosure has reduced off-targeting in the cell due to a shorter exposure time of the cell to Cas9.

In some embodiments of the method including a recombinant Cas9 provided herein, off-target modifications are reduced, and on-target modifications are at least about the same level relative to wild-type Cas9. In some embodiments, on-target modifications of the recombinant Cas9 is within at least about 20%, at least about 15%, at least about 10%, at least about 5%, at least about 4%, at least about 3%, at least about 2%, at least about 1%, at least about 0.5% of on-target modifications of wild-type Cas9. In some embodiments including a recombinant Cas9 provided herein, off-target modifications are reduced, and on-target modifications are increased relative to wild-type Cas9. In some embodiments, on-target modifications of the recombinant Cas9 is at least about 5% higher, at least about 10% higher, at least about 11% higher, at least about 12% higher, at least about 13% higher, at least about 14% higher, at least about 15% higher, at least about 16% higher, at least about 17% higher, at least about 18% higher, at least about 19% higher, or at least about 20% higher than wild-type Cas9.

In some embodiments, off-target modifications in the genome of the cell are reduced by at least about 10%, at least about 20%, at least about 30%, at least about 40%, at least about 50%, at least about 60%, at least about 70%, at least about 80%, at least about 90%, at least about 100%, at least about 150%, or at least about 200% relative to wild-type Cas9 or a Cas9 that does not include a KFERQ motif or KFERQ-like motif.

In some embodiments of the method including a recombinant Cas9 provided herein, off-target modifications in the genome of the cell are reduced by at least about 2-fold, at least about 3-fold, at least about 4-fold, at least about 5-fold, at least about 6-fold, at least about 7-fold, at least about 8-fold, at least about 9-fold, at least about 10-fold, at least about 20-fold, at least about 30-fold, at least about 40-fold, at least about 50-fold, at least about 60-fold, at least about 70-fold, about at least 80-fold, at least about 90-fold, at least about 100-folder, at least about 500-fold, or at least about 1000-fold relative to wild-type Cas9 or a Cas9 that does not include a KFERQ motif or KFERQ-like motif.

In some embodiments of the method, off-target modifications in the genome of the cell are less than about 5% of all the modifications in the genome made by the recombinant Cas9 having the KFERQ motif or KFERQ-like motif. In some embodiments of the method, off-target modifications in the genome of the cell are less than about 2% of all the modifications in the genome made by the recombinant Cas9 having the KFERQ motif or KFERQ-like motif. In some embodiments of the method, off-target modifications in the genome of the cell are less than about 1% of all the modifications in the genome made by the recombinant Cas9 having the KFERQ motif or KFERQ-like motif. As described herein, off-target modifications by wild-type Cas9 can be at least about 2%, at least about 3%, at least about 4%, at least about 5%, at least about 6%, at least about 7%, at least about 8%, at least about 9%, or at least about 10% of all modifications in the genome by the wild-type Cas9. In some embodiments, off-target modifications by the recombinant Cas9 having the KFERQ motif or KFERQ-like motif are less than about 5%, less than about 4%, less than about 3%, less than about 2%, less than about 1.5%, less than about 1%, less than about 0.5%, or less than about 0.1% of all modifications in the genome made by the recombinant Cas9 having the KFERQ motif or KFERQ-like motif. The amount of off-target modifications can vary, depending on the sequence of the guide polynucleotide and the target genomic locus. Generally, when using the same guide polynucleotide, the recombinant Cas9 protein having the KFERQ motif or KFERQ-like motif has reduced off-target modifications compared with the wild-type Cas9.

In some embodiments the of method, the target sequence is in a bacterial cell. In some embodiments, the bacterial cell is a laboratory strain. Examples of such cells include, but are not limited to, *E. coli, S. aureus, V. cholerae, S. pneumoniae, B. subtilis, C. crescentus, M. genitalium, A. fischeri, Synechocystis, P. fluorescens, A. vinelandii, S. coelicolor*. In some embodiments, the bacterial cell is of bacteria used in preparation of food and/or beverages. Non-limiting exemplary genera of such cells include, but are not limited to, *Acetobacter, Arthrobacter, Bacillus, Bifidobacterium, Brachybacterium, Brevibacterium, Carnobacterium, Corynebacterium, Enterococcus, Gluconacetobacter, Hafnia, Halomonas, Kocuria, Lactobacillus* (including *L. acetotolerans, L. acidipiscis, L. acidophilus, L. alimentarius, L. brevis, L. bucheri, L. casei, L. curvatus, L. fermentum, L. hilgardii, L. jensenii, L. kimchii, L. lactis, L. paracasei, L. plantarum,* and *L. sakei*), *Leuconostoc, Microbacterium, Pediococcus, Propionibacterium, Weissella,* and *Zymomonas*.

In some embodiments of the method, the target cell is in a eukaryotic cell. In some embodiments, the eukaryotic cell is an animal or human cell. In some embodiments, the eukaryotic cell is a human or rodent or bovine cell line or cell strain. Examples of such cells, cell lines, or cell strains include, but are not limited to, mouse myeloma (NSO)-cell lines, Chinese hamster ovary (CHO)-cell lines, HT1080, H9, HepG2, MCF7, MDBK Jurkat, NIH3T3, PC12, BHK (baby hamster kidney cell), VERO, SP2/0, YB2/0, Y0, C127, L cell, COS, e.g., COS1 and COS7, QC1-3, HEK-293, VERO, PER.C6, HeLA, EB1, EB2, EB3, oncolytic or hybridoma-cell lines. In some embodiments, the eukaryotic cells are CHO-cell lines. In some embodiments, the eukaryotic cell is a CHO cell. In some embodiments, the cell is a CHO-K1 cell, a CHO-K1 SV cell, a DG44 CHO cell, a DUXB11 CHO cell, a CHOS, a CHO GS knock-out cell, a CHO FUT8 GS knock-out cell, a CHOZN, or a CHO-derived cell. The CHO GS knock-out cell (e.g., GSKO cell) is, for example, a CHO-K1 SV GS knockout cell. The CHO FUT8 knockout cell is, for example, the POTELLIGENT CHOK1 SV (Lonza Biologics, Inc.). Eukaryotic cells can also be avian cells, cell lines or cell strains, such as, for example, EBX cells, EB14, EB24, EB26, EB66, or EBvl3.

In some embodiments, the eukaryotic cell is a human cell. In some embodiments, the human cell is a stem cell. The stem cells can be, for example, pluripotent stem cells, including embryonic stem cells (ESCs), adult stem cells, induced pluripotent stem cells (iPSCs), tissue specific stem cells (e.g., hematopoietic stem cells) and mesenchymal stem cells (MSCs). In some embodiments, the cell is a pluripotent stem cell. In some embodiments, the cell is an induced pluripotent stem cell. In some embodiments, the human cell is a differentiated form of any of the cells described herein. In some embodiments, the eukaryotic cell is a cell derived from any primary cell in culture.

In some embodiments, the eukaryotic cell is a hepatocyte such as a human hepatocyte, animal hepatocyte, or a non-parenchymal cell. For example, the eukaryotic cell can be a plateable metabolism qualified human hepatocyte, a plateable induction qualified human hepatocyte, plateable human hepatocyte, suspension qualified human hepatocyte (including 10-donor and 20-donor pooled hepatocytes), human hepatic kupffer cells, human hepatic stellate cells, dog hepatocytes (including single and pooled Beagle hepatocytes), mouse hepatocytes (including CD-1 and C57Bl/6 hepatocytes), rat hepatocytes (including Sprague-Dawley, Wistar Han, and Wistar hepatocytes), monkey hepatocytes (including Cynomolgus or Rhesus monkey hepatocytes), cat hepatocytes (including Domestic Shorthair hepatocytes), and rabbit hepatocytes (including New Zealand White hepatocytes).

In some embodiments, the eukaryotic cell is a plant cell. For example, the plant cell can be of a crop plant such as cassava, corn, sorghum, wheat, or rice. The plant cell can be of an algae, tree, or vegetable. The plant cell can be of a monocot or dicot or of a crop or grain plant, a production plant, fruit, or vegetable. For example, the plant cell can be of a tree, e.g., a citrus tree such as orange, grapefruit, or lemon tree; peach or nectarine trees; apple or pear trees; nut trees such as almond or walnut or pistachio trees; nightshade plants, e.g., potatoes, plants of the genus *Brassica*, plants of the genus *Lactuca*; plants of the genus *Spinacia*; plants of the genus *Capsicum*; cotton, tobacco, asparagus, carrot, cabbage, broccoli, cauliflower, tomato, eggplant, pepper, lettuce, spinach, strawberry, blueberry, raspberry, blackberry, grape, coffee, cocoa, etc.

In some embodiments of the method, the guide sequence of the guide polynucleotide is capable of hybridizing to the target sequence in the cell. In some embodiments, the DNA-binding segment of the guide polynucleotide hybridizes with a target sequence in a cell. In some embodiments, the DNA-binding segment of the guide polynucleotide, e.g., guide RNA, includes a polynucleotide sequence that is complementary to a specific sequence within a target DNA. In some embodiments, the guide sequence of the guide polynucleotide is capable of hybridizing to the target sequence in the bacterial cell. In some embodiments, the guide sequence of the guide polynucleotide is capable of hybridizing to the target sequence in the eukaryotic cell. In some embodiments, the guide sequence of the guide polynucleotide is capable of hybridizing to the target sequence in the mammalian cell. In some embodiments, the guide sequence of the guide polynucleotide is capable of hybridizing to the target sequence in the human cell. In some embodiments, the guide sequence of the guide polynucleotide is capable of hybridizing to the target sequence in the pluripotent stem cell. In some embodiments, the guide sequence of the guide polynucleotide is capable of hybridizing to the target sequence in the induced pluripotent stem cell. In some embodiments, the guide sequence of the guide polynucleotide is capable of hybridizing to the target sequence in the plant cell.

In some embodiments, the guide sequence of the guide polynucleotide is at least about 5, 6, 7, 8, 9, 10, 12, 14, 16, 18 or 20 nucleotides and up to about 20, 25, 30, 35, 40, 45 or 50 nucleotides. In some embodiments, the guide sequence of the guide polynucleotide is about 5 to about 50 nucleotides. In some embodiments, the guide sequence of the guide polynucleotide is about 6 to about 45 nucleotides. In some embodiments, the guide sequence of the guide polynucleotide is about 7 to about 40 nucleotides. In some embodiments, the guide sequence of the guide polynucleotide is about 8 to about 35 nucleotides. In some embodiments, the guide sequence of the guide polynucleotide is about 9 to about 30 nucleotides. In some embodiments, the guide sequence of the guide polynucleotide is about 10 to about 20 nucleotides. In some embodiments, the guide sequence of the guide polynucleotide is about 12 to about 20 nucleotides. In some embodiments, the guide sequence of the guide polynucleotide is about 14 to about 20 nucleotides. In some embodiments, the guide sequence of the guide polynucleotide is about 16 to about 20 nucleotides. In some embodiments, the guide sequence of the guide polynucleotide is about 18 to about 20 nucleotides. In some embodiments, the guide sequence of the guide polynucleotide is about 5 to about 10 nucleotides. In some embodiments, the guide sequence of the guide polynucleotide is about 6 to about 10 nucleotides. In some embodiments, the guide sequence of the guide polynucleotide is about 7 to about 10 nucleotides. In some embodiments, the guide sequence of the guide polynucleotide is about 8 to about 10 nucleotides. The length of the guide sequence may be determined by the skilled artisan using guide sequence design tools as described herein.

In some embodiments of the method, the CRISPR-Cas system is introduced into the cell via a delivery particle, a vesicle, or a viral vector. In some embodiments of the method, the CRISPR-Cas system including a recombinant Cas9 and guide polynucleotide are introduced into the cell via a delivery particle. In some embodiments of the method, the CRISPR-Cas system including a recombinant Cas9 and guide polynucleotide are introduced into the cell via a vesicle. In some embodiments of the method, the CRISPR-Cas system including a recombinant Cas9 and guide polynucleotide are introduced into the cell via a vector. In some embodiments of the method, the CRISPR-Cas system including a recombinant Cas9 and guide polynucleotide are introduced into the cell via a viral vector. In some embodiments of the method, the polynucleotides encoding components of the complex including a recombinant Cas9 and guide polynucleotide are introduced on one or more vectors. Examples of delivery particles, vesicles, vectors, viral vectors, and methods of delivery into cells (e.g., transfection of vectors) are provided herein.

All references cited herein, including patents, patent applications, papers, text books and the like, and the references cited therein, to the extent that they are not already, are hereby incorporated herein by reference in their entirety.

Additional Exemplary Embodiments

Embodiment 1 is a recombinant Cas9 protein including an engineered KFERQ motif or KFERQ-like motif.

Embodiment 2 includes the recombinant Cas9 protein of embodiment 1, wherein the engineered KFERQ motif or KFERQ-like motif is selected from KFERQ (SEQ ID NO:24), RKVEQ (SEQ ID NO:25), QDLKF (SEQ ID NO:26), QRFFE (SEQ ID NO:27), NRVVD (SEQ ID NO:28), QRDKV (SEQ ID NO:29), QKILD (SEQ ID NO:30), QKKEL (SEQ ID NO:31), QFREL (SEQ ID NO:32), IKLDQ (SEQ ID NO:33), DVVRQ (SEQ ID NO:34), QRIVE (SEQ ID NO:35), VKELQ (SEQ ID NO:36), QKVFD (SEQ ID NO:37), QELLR (SEQ ID NO:38), VDKLN (SEQ ID NO:39), RIKEN (SEQ ID NO:40), NKKFE (SEQ ID NO:41), and combinations thereof.

Embodiment 3 includes the recombinant Cas9 protein of embodiment 1 or 2, wherein the engineered KFERQ-like motif is VDKLN (SEQ ID NO:39).

Embodiment 4 includes the recombinant Cas9 protein of embodiment 1, wherein the engineered KFERQ motif or KFERQ-like motif is in a REC lobe of the Cas9 protein.

Embodiment 5 includes the recombinant Cas9 protein of embodiment 2, wherein the engineered KFERQ motif or KFERQ-like motif is in a Rec2 domain of the REC lobe.

Embodiment 6 includes the recombinant Cas9 protein of embodiment 1, wherein the engineered KFERQ motif or KFERQ-like motif is in an HNH domain, a RuvC domain, or a PI domain of the recombinant Cas9 protein.

Embodiment 7 includes the recombinant Cas9 protein of any one of embodiments 1 to 4, wherein the engineered KFERQ motif or KFERQ-like motif is in a surface-exposed region of the recombinant Cas9 protein.

Embodiment 8 includes the recombinant Cas9 protein of any one of embodiments 1 to 6, wherein the engineered KFERQ motif or KFERQ-like motif is at an N-terminus or a C-terminus of the recombinant Cas9 protein.

Embodiment 9 is a recombinant Cas9 protein including one or more amino acid modifications of a wild-type Cas9 protein that introduce a chaperone mediated autophagy (CMA) target motif or an endosomal microautophagy (eMI) target motif in the Cas9 protein, wherein the recombinant Cas9 protein degrades at least 20% faster in vivo than the wild-type Cas9 protein or a Cas9 protein that does not comprise the CMA or eMI target motif.

Embodiment 10 includes the recombinant Cas9 protein of embodiment 9, wherein the recombinant Cas9 protein degrades at least 50% faster in vivo than the wild-type Cas9 protein or the Cas9 protein that does not comprise the CMA or eMI target motif.

Embodiment 11 includes the recombinant Cas9 protein of embodiment 9 or 10, wherein the recombinant Cas9 protein degrades at least 80% faster in vivo than the wild-type Cas9 protein or the Cas9 protein that does not comprise the CMA or eMI target motif.

Embodiment 12 is a recombinant Cas9 protein including one or more amino acid modifications in a wild-type Cas9 protein, wherein the recombinant Cas9 protein includes a CMA target motif or an eMI target motif.

Embodiment 13 includes the recombinant Cas9 protein of any one of embodiments 9 to 12, wherein the CMA target motif or the eMI target motif is selected from KFERQ (SEQ ID NO:24), RKVEQ (SEQ ID NO:25), QDLKF (SEQ ID NO:26), QRFFE (SEQ ID NO:27), NRVVD (SEQ ID NO:28), QRDKV (SEQ ID NO:29), QKILD (SEQ ID NO:30), QKKEL (SEQ ID NO:31), QFREL (SEQ ID NO:32), IKLDQ (SEQ ID NO:33), DVVRQ (SEQ ID NO:34), QRIVE (SEQ ID NO:35), VKELQ (SEQ ID NO:36), QKVFD (SEQ ID NO:37), QELLR (SEQ ID NO:38), VDKLN (SEQ ID NO:39), RIKEN (SEQ ID NO:40), NKKFE (SEQ ID NO:41), and combinations thereof.

Embodiment 14 includes the recombinant Cas9 protein of embodiment 13, wherein the CMA target motif or the eMI target motif is VDKLN (SEQ ID NO:39).

Embodiment 15 includes the recombinant Cas9 protein of any one of embodiments 9 to 14, wherein the one or more amino acid substitutions is in a surface-exposed region of the recombinant Cas9 protein.

Embodiment 16 includes a recombinant Cas9 protein isolated from *Streptococcus pyogenes* (SpCas9) including an amino acid modification at one or more of position F185, A547, I548, T560, V561, D829, I830, L1087, S1088, P1199, K1200 of SEQ ID NO:1, or combinations thereof.

Embodiment 17 includes the recombinant Cas9 protein of any one of embodiments 9 to 16, wherein the amino acid modification includes one or more of the following mutations: F185N; A547E/I548L; T560E/V561Q; D829L/I830R; L1087E/S1088Q; or P1199D/K1200Q.

Embodiment 18 includes the recombinant Cas9 protein of any one of embodiments 9 to 17, wherein the amino acid modification is a mutation at F185.

Embodiment 19 includes the recombinant Cas9 protein of embodiment 18, wherein the mutation is F185N.

Embodiment 20 includes the recombinant Cas9 protein of any one of embodiments 16 to 19, wherein the amino acid modification results in a CMA target motif or an eMI target motif.

Embodiment 21 includes the recombinant Cas9 protein of any one of embodiments 9 to 20, wherein the recombinant Cas9 protein is at least 90% identical to SEQ ID NO:1.

Embodiment 22 is a recombinant Cas9 protein capable of binding to heat shock cognate protein of 70 kD (HSC70).

Embodiment 23 is recombinant Cas9 protein isolated from *Streptococcus pyogenes* (SpCas9), including an engineered KFERQ motif or KFERQ-like motif at amino acid position 185 of SEQ ID NO:1.

Embodiment 24 includes the recombinant Cas9 protein of embodiment 23, wherein the KFERQ-like motif is VDKLN (SEQ ID NO:39).

Embodiment 25 includes the recombinant Cas9 protein of any one of embodiments 1 to 24, further including a mutation at position D10, H840, or combinations thereof in SEQ ID NO:1.

Embodiment 26 includes the recombinant Cas9 protein of embodiment 25, wherein the mutation is selected from D10A or D0N; H840A, H840N, or H840Y; and combinations thereof.

Embodiment 27 includes the recombinant Cas9 protein of any one of embodiments 1 to 26, wherein the recombinant Cas9 protein generates cohesive ends.

Embodiment 28 includes the recombinant Cas9 protein of any one of embodiments 1 to 27, further including one or more nuclear localization signals.

Embodiment 29 is a polynucleotide sequence encoding the recombinant Cas9 protein of any one of embodiments 1 to 28.

Embodiment 30 includes the polynucleotide sequence of embodiment 29, wherein the polynucleotide sequence is codon optimized for expression in a eukaryotic cell.

Embodiment 31 is a non-naturally occurring CRISPR-Cas system including: the recombinant Cas9 protein of any one of embodiments 1 to 28; and a guide polynucleotide that forms a complex with the recombinant Cas9 protein and includes a guide sequence.

Embodiment 32 is a non-naturally occurring CRISPR-Cas system including: the polynucleotide sequence of embodiment 29 or 30; and a nucleotide sequence encoding a guide polynucleotide that forms a complex with the recombinant Cas9 protein and includes a guide sequence.

Embodiment 33 is a non-naturally occurring CRISPR-Cas system including: a regulatory element operably linked to the polynucleotide sequence of embodiment 29 or 30; and a guide polynucleotide that forms a complex with the recombinant Cas9 protein and includes a guide sequence.

Embodiment 34 includes the system of any one of embodiments 31 to 33, wherein the guide sequence is linked to a direct repeat sequence.

Embodiment 35 includes the system of any one of embodiments 31 to 34, wherein the guide polynucleotide includes a tracrRNA sequence.

Embodiment 36 includes the system of any one of embodiments 31 to 34, further including a separate polynucleotide including a tracrRNA sequence.

Embodiment 37 includes the system of any one of embodiments 31 to 35, wherein polynucleotide sequences encoding the recombinant Cas9 protein and the guide polynucleotide are on a single vector.

Embodiment 38 includes the system of embodiment 36, wherein polynucleotide sequences encoding the recombinant Cas9 protein, the guide polynucleotide, and the tracrRNA sequence are on a single vector.

Embodiment 39 is a delivery particle including the system according to any one of embodiments 31 to 38.

Embodiment 40 is a vesicle including the system according to any one of embodiments 31 to 38.

Embodiment 41 includes the vesicle of embodiment 40, wherein the vesicle is an exosome or a liposome.

Embodiment 42 is a viral vector including the system according to any one of embodiments 31 to 38.

Embodiment 43 includes the viral vector of embodiment 42, wherein the viral vector is of an adenovirus, a lentivirus, or an adeno-associated virus.

Embodiment 44 is a method of providing a site-specific modification at a target sequence in a genome of a cell, the method including introducing into the cell the CRISPR-Cas system of any one of embodiments 31 to 38.

Embodiment 45 includes the method of embodiment 44, wherein the modification includes deletion of at least part of the target sequence.

Embodiment 46 includes the method of embodiment 44, wherein the modification includes mutation of the target sequence.

Embodiment 47 includes the method of embodiment 44, wherein the modification includes inserting a sequence of interest (SoI) at the target sequence.

Embodiment 48 includes the method of any one of embodiments 44 to 47, wherein off-target modifications in the genome of the cell are less than about 5% of modifications in the genome made by the recombinant Cas9.

Embodiment 49 includes the method of any one of embodiments 44 to 48, wherein off-target modifications in the genome of the cell are less than about 2% of modifications in the genome made by the recombinant Cas9.

Embodiment 50 includes the method of any one of embodiments 44 to 49, wherein off-target modifications in the genome of the cell are less than about 1% of modifications in the genome made by the recombinant Cas9.

Embodiment 51 includes the method of any one of embodiments 44 to 50, wherein off-target modifications in the genome of the cell are reduced by at least about 50% relative to wild-type CRISPR-Cas9 or a Cas9 that does not include a KFERQ motif or KFERQ-like motif.

Embodiment 52 includes the method of any one of embodiments 44 to 51, wherein the cell is a bacterial cell, a mammalian cell, or a plant cell.

Embodiment 53 includes the method of embodiment 52, wherein the cell is a human cell.

Embodiment 54 includes the method of embodiment 53, wherein the cell is a pluripotent stem cell.

Embodiment 55 includes the method of embodiment 54 wherein the cell is an induced pluripotent stem cell.

Embodiment 56 includes the method of any one of embodiments 44 to 55, wherein the guide sequence of the guide polynucleotide is capable of hybridizing to the target sequence in the genome of the cell.

Embodiment 57 includes the method of any one of embodiments 44 to 56, wherein the CRISPR-Cas system is introduced into the cell via a delivery particle, a vesicle, or a viral vector.

Sequences

Table 4 below lists the sequences provided herein.

TABLE 4

List of Sequences

| SEQ ID NO. | Amino Acid (AA) or Nucleotide (NT) | Sequence |
| --- | --- | --- |
| 1 | AA | SpCas9 |
| 2 | AA | FaDe-SpCas9 |
| 3 | NT | SpCas9 |
| 4 | NT | FaDe-SpCas9 |
| 5 | AA | SpCas9 REC lobe |
| 6 | AA | SpCas9 NUC lobe 1 |
| 7 | AA | SpCas9 NUC lobe 2 |
| 8 | AA | SpCas9 BH domain |
| 9 | AA | SpCas9 Rec1 domain 1 |
| 10 | AA | SpCas9 Rec1 domain 2 |
| 11 | AA | SpCas9 Rec2 domain |
| 12 | AA | SpCas9 RuvC I domain |
| 13 | AA | SpCas9 RuvC II domain |
| 14 | AA | SpCas9 RuvC III domain |
| 15 | AA | SpCas9 HNH domain |
| 16 | AA | SpCas9 PI domain |
| 17 | AA | *S. thermophilus* Cas9 |
| 18 | AA | *S. dysgalactiae* Cas9 |
| 19 | AA | *S. mutans* Cas9 |
| 20 | AA | *L. innocua* Cas9 |
| 21 | AA | *S. aureus* Cas9 |
| 22 | AA | *K. pneumoniae* Cas9 |
| 23 | AA | *F. novicida* Cas9 |
| 24-41 | AA | KFERQ motif or KFERQ-like motifs |
| 42-47 | AA | Nuclear Localization Signals |
| 48-65 | NT | Primers used herein |
| 66-70 | NT | Guide RNAs used herein |

SpCas9 - Cas9 from *Streptococcus pyogenes*

(SEQ ID NO: 1)

MDKKYSIGLDIGTNSVGWAVITDDYKVPSKKFKVLGNTDRHSIKKNLIGALLFDSGETAEATRLKRTARRRYTRRKN
RICYLQEIFSNEMAKVDDSFFHRLEESFLVEEDKKHERHPIFGNIVDEVAYHEKYPTIYHLRKKLVDSTDKADLRLI
YLALAHMIKFRGHFLIEGDLNPDNSDVDKLFIQLVQTYNQLFEENPINASGVDAKAILSARLSKSRRLENLIAQLPG
EKKNGLFGNLIALSLGLTPNFKSNFDLAEDAKLQLSKDTYDDDLDNLLAQIGDQYADLFLAAKNLSDAILLSDILRV
NTEITKAPLSASMIKRYDEHHQDLTLLKALVRQQLPEKYKEIFFDQSKNGYAGYIDGGASQEEFYKFIKPILEKMDG
TEELLVKLNREDLLRKQRTFDNGSIPHQIHLGELHAILRRQEDFYPFLKDNREKIEKILTFRIPYYVGPLARGNSRF
AWMTRKSEETITPWNFEEVVDKGASAQSFIERMTNFDKNLPNEKVLPKHSLLYEYFTVYNELTKVKYVTEGMRKPAF
LSGEQKKAIVDLLFKTNRKVTVKQLKEDYFKKIECFDSVEISGVEDRENASLGTYHDLLKIIKDKDELDNEENEDIL
EDIVLTLTLFEDREMIEERLKTYAHLFDDKVMKQLKRRRYTGWGRLSRKLINGIRDKQSGKTILDFLKSDGFANRNF
MQLIHDDSLTFKEDIQKAQVSGQGDSLHEHIANLAGSPAIKKGILQTVKVVDELVKVMGRHKPENIVIEMARENQTT
QKGQKNSRERMKRIEEGIKELGSQILKEHPVENTQLQNEKLYLYYLQNGRDMYVDQELDINRLSDYDVDHIVPQSFL
KDDSIDNKVLTRSDKNRGKSDNVPSEEVVKKMKNYWRQLLNAKLITQRKFDNLTKAERGGLSELDKAGFIKRQLVET
RQITKHVAQILDSRMNTKYDENDKLIREVKVITLKSKLVSDFRKDFQFYKVREINNYHHAHDAYLNAVVGTALIKKY
PKLESEFVYGDYKVYDVRKMIAKSEQEIGKATAKYFFYSNIMNFFKTEITLANGEIRKRPLIETNGETGEIVWDKGR
DFATVRKVLSMPQVNIVKKTEVQTGGFSKESILPKRNSDKLIARKKDWDPKKYGGFDSPTVAYSVLVVAKVEKGKSK
KLKSVKELLGITIMERSSFEKNPIDFLEAKGYKEVKKDLIIKLPKYSLFELENGRKRMLASAGELQKGNELALPSKY
VNFLYLASHYEKLKGSPEDNEQKQLFVEQHKHYLDEIIEQISEFSKRVILADANLDKVLSAYNKHRDKPIREQAENI
IHLFTLTNLGAPAAFKYFDTTIDRKRYTSTKEVLDATLIHQSITGLYETRIDLSQLGGD

FaDe-SpCas9 - SpCas9 with F185N mutation (SEQ ID NO: 2)

MDKKYSIGLDIGTNSVGWAVITDDYKVPSKKFKVLGNTDRHSIKKNLIGALLFDSGETAEATRLKRTARRRYTRRKN
RICYLQEIFSNEMAKVDDSFFHRLEESFLVEEDKKHERHPIFGNIVDEVAYHEKYPTIYHLRKKLVDSTDKADLRLI
YLALAHMIKFRGHFLIEGDLNPDNSDVDKLNIQLVQTYNQLFEENPINASGVDAKAILSARLSKSRRLENLIAQLPG
EKKNGLFGNLIALSLGLTPNFKSNFDLAEDAKLQLSKDTYDDDLDNLLAQIGDQYADLFLAAKNLSDAILLSDILRV
NTEITKAPLSASMIKRYDEHHQDLTLLKALVRQQLPEKYKEIFFDQSKNGYAGYIDGGASQEEFYKFIKPILEKMDG
TEELLVKLNREDLLRKQRTFDNGSIPHQIHLGELHAILRRQEDFYPFLKDNREKIEKILTFRIPYYVGPLARGNSRF
AWMTRKSEETITPWNFEEVVDKGASAQSFIERMTNFDKNLPNEKVLPKHSLLYEYFTVYNELTKVKYVTEGMRKPAF
LSGEQKKAIVDLLFKTNRKVTVKQLKEDYFKKIECFDSVEISGVEDRENASLGTYHDLLKIIKDKDFLDNEENEDIL
EDIVLTLTLFEDREMIEERLKTYAHLFDDKVMKQLKRRRYTGWGRLSRKLINGIRDKQSGKTILDFLKSDGFANRNF
MQLIHDDSLTFKEDIQKAQVSGQGDSLHEHIANLAGSPAIKKGILQTVKVVDELVKVMGRHKPENIVIEMARENQTT
QKGQKNSRERMKRIEEGIKELGSQILKEHPVENTQLQNEKLYLYYLQNGRDMYVDQELDINRLSDYDVDHIVPQSFL
KDDSIDNKVLTRSDKNRGKSDNVPSEEVVKKMKNYWRQLLNAKLITQRKFDNLTKAERGGLSELDKAGFIKRQLVET
RQITKHVAQILDSRMNTKYDENDKLIREVKVITLKSKLVSDFRKDFQFYKVREINNYHHAHDAYLNAVVGTALIKKY
PKLESEFVYGDYKVYDVRKMIAKSEQEIGKATAKYFFYSNIMNFFKTEITLANGEIRKRPLIETNGETGEIVWDKGR
DFATVRKVLSMPQVNIVKKTEVQTGGFSKESILPKRNSDKLIARKKDWDPKKYGGFDSPTVAYSVLVVAKVEKGKSK
KLKSVKELLGITIMERSSFEKNPIDFLEAKGYKEVKKDLIIKLPKYSLFELENGRKRMLASAGELQKGNELALPSKY
VNFLYLASHYEKLKGSPEDNEQKQLFVEQHKHYLDEIIEQISEFSKRVILADANLDKVLSAYNKHRDKPIREQAENI
IHLFTLTNLGAPAAFKYFDTTIDRKRYTSTKEVLDATLIHQSITGLYETRIDLSQLGGD

SpCas9 nucleotide sequence (SEQ ID NO: 3)

ATGGCTCCTAAGAAAAAGCGGAAGGTGGACAAGAAATACTCAATCGGGCTGGACATCGGAACTAACTCAGTGGGGTG
GGCAGTCATTACTGACGAGTACAAAGTGCCAAGCAAGAAATTTAAGGTCCTGGGCAACACCGATAGGCACTCCATCA

-continued

```
AGAAAAATCTGATTGGGGCCCTGCTGTTCGACTCTGGAGAGACAGCTGAAGCAACTAGACTGAAAAGGACTGCTAGA
AGGCGCTATACCCGGCGAAAGAATCGCATCTGCTACCTGCAGGAGATTTTCTCTAACGAAATGGCCAAGGTGGACGA
TAGTTTCTTTCATCGGCTGGAGGAATCATTCCTGGTCGAGGAAGATAAGAAACACGAGAGACATCCTATCTTTGGAA
ACATTGTGGACGAGGTCGCTTATCACGAAAAATACCCCACCATCTATCATCTGCGCAAGAAACTGGTGGACTCTACA
GATAAAGCAGACCTGCGGCTGATCTATCTGGCCCTGGCTCACATGATTAAGTTCAGAGGCCATTTTCTGATCGAGGG
AGATCTGAACCCAGACAATAGCGATGTGGACAAGCTGTTCATCCAGCTGGTCCAGACATACAATCAGCTGTTTGAGG
AAAACCCTATTAATGCATCTGGCGTGGACGCAAAAGCCATCCTGAGTGCCAGGCTGTCTAAGAGTAGAAGGCTGGAG
AACCTGATCGCTCAGCTGCCAGGCGAAAAGAAAAACGGCCTGTTTGGAAATCTGATTGCACTGTCACTGGGACTGAC
ACCTAACTTCAAGAGCAATTTTGATCTGGCCGAGGACGCTAAACTGCAGCTGAGCAAGGACACTTATGACGATGACC
TGGATAACCTGCTGGCTCAGATCGGAGATCAGTACGCAGACCTGTTCCTGGCCGCTAAGAATCTGTCTGACGCTATC
CTGCTGAGTGATATTCTGCGGGTGAACACCGAGATTACAAAAGCCCCTCTGTCAGCTAGCATGATCAAGAGATATGA
CGAGCACCATCAGGATCTGACCCTGCTGAAGGCACTGGTGCGCCAGCAGCTGCCCGAGAAGTACAAGGAAATCTTCT
TTGATCAGAGTAAGAACGGGTACGCCGGTTATATTGACGGCGGAGCTTCACAGGAGGAATTCTACAAGTTTATCAAA
CCTATTCTGGAGAAGATGGACGGCACCGAGGAACTGCTGGTGAAACTGAATCGCGAGGACCTGCTGCGCAAGCAGCG
GACATTTGATAACGGCTCCATCCCCCACCAGATTCATCTGGGAGAGCTGCACGCAATCCTGCGACGACAGGAAGACT
TCTACCCATTTCTGAAGGATAACCGCGAGAAGATCGAAAAAATTCTGACCTTCCGGATCCCTTACTATGTGGGGCCC
CTGGCAAGGGGTAATTCCCGCTTTGCCTGGATGACACGGAAATCTGAGGAAACAATCACTCCTTGGAACTTCGAGGA
AGTGGTCGATAAGGGAGCTTCCGCACAGTCTTTCATCGAGAGAATGACAAACTTCGACAAAAACCTGCCAAATGAGA
AAGTGCTGCCTAAGCACAGTCTGCTGTACGAGTATTTCACAGTCTATAACGAACTGACTAAGGTGAAATACGTCACC
GAGGGGATGAGGAAGCCCGCCTTCCTGAGCGGTGAACAGAAGAAAGCTATCGTGGACCTGCTGTTTAAAACCAATCG
CAAGGTGACAGTCAAGCAGCTGAAGGAGGACTACTTCAAGAAAATTGAATGTTTCGATTCTGTGGAGATCAGTGGCG
TCGAAGACAGATTTAACGCTTCTCTGGGAACCTACCACGATCTGCTGAAGATCATTAAGGATAAAGACTTCCTGGAC
AACGAGGAAAATGAGGATATCCTGGAAGACATTGTGCTGACCCTGACACTGTTTGAGGATCGCGAAATGATCGAGGA
ACGGCTGAAAACTTATGCCCATCTGTTCGATGACAAGGTGATGAAACAGCTGAAGCGAAGAAGGTACACCGGCTGGG
GACGACTGAGCAGAAAGCTGATCAACGGCATTCGGGACAAACAGAGTGGAAAGACTATCCTGGACTTTCTGAAATCA
GATGGCTTCGCTAACAGAAATTTTATGCAGCTGATTCACGATGACAGCCTGACCTTCAAAGAGGATATCCAGAAGGC
ACAGGTGTCCGGGCAGGGTGACTCTCTGCACGAGCATATCGCAAACCTGGCCGGGTCCCCCGCCATCAAGAAAGGTA
TTCTGCAGACCGTGAAGGTGGTCGATGAGCTGGTGAAAGTCATGGGCAGGCATAAGCCAGAAAACATCGTGATTGAG
ATGGCCCGCGAAAATCAGACCACACAGAAAGGACAGAAGAACAGCCGCGAGCGGATGAAAAGGATCGAGGAAGGCAT
TAAGGAACTGGGATCCCAGATCCTGAAAGAGCACCCTGTGGAAAACACTCAGCTGCAGAATGAGAAGCTGTATCTGT
ACTATCTGCAGAATGGGCGGGATATGTACGTGGACCAGGAGCTGGATATTAACCGACTGTCTGATTACGACGTGGAT
CATATCGTCCCACAGTCATTCCTGAAAGATGACAGCATTGACAATAAGGTGCTGACCCGGAGTGACAAAAACCGAGG
AAAGAGTGATAATGTCCCTTCAGAGGAAGTGGTCAAGAAAATGAAGAACTACTGGAGACAGCTGCTGAATGCCAAAC
TGATCACACAGCGAAAGTTTGATAACCTGACTAAAGCTGAGAGAGGGGTCTGTCAGAACTGGACAAAGCAGGCTTC
ATCAAGCGACAGCTGGTGGAGACCAGACAGATCACAAAGCACGTCGCTCAGATTCTGGATAGCAGGATGAACACAAA
GTACGATGAGAATGACAAACTGATCCGCGAAGTGAAGGTCATTACTCTGAAGTCAAAACTTGTGAGCGACTTCAGAA
AGGATTTCCAGTTCTACAAAGTCAGGGAGATCAACAATTATCACCATGCTCATGACGCATACCTGAACGCAGTGGTC
GGGACCGCCCTGATTAAGAAATACCCCAAACTGGAGAGCGAATTCGTGTACGGTGACTATAAGGTGTACGATGTCAG
AAAAATGATCGCCAAGAGTGAGCAGGAAATTGGAAAAGCCACCGCTAAGTATTTCTTTTACTCAAACATCATGAATT
TCTTTAAGACTGAGATCACCCTGGCAAATGGGGAAATCCGAAAGAGACCACTGATTGAGACTAACGGCGAGACCGGA
```

-continued

```
GAAATCGTGTGGGACAAGGGTAGGGATTTTGCCACAGTGCGCAAGGTCCTGTCCATGCCTCAAGTGAATATTGTCAA
GAAAACAGAGGTGCAGACTGGCGGATTCAGTAAGGAATCAATTCTGCCCAAACGGAACTCTGATAAGCTGATCGCCC
GAAAGAAAGACTGGGATCCCAAGAAATATGGGGGTTTCGACTCCCCAACAGTGGCTTACTCTGTCCTGGTGGTCGCA
AAGGTGGAGAAGGGGAAAAGCAAGAAACTGAAATCCGTCAAGGAGCTGCTGGGTATCACTATTATGGAGAGGAGCTC
CTTCGAGAAGAACCCCATCGATTTTCTGGAGGCTAAAGGCTATAAGGAAGTGAAGAAAGACCTGATCATTAAACTGC
CAAAGTACAGCCTGTTTGAGCTGGAAAACGGAAGGAAGCGAATGCTGGCATCCGCAGGAGAGCTGCAGAAGGGTAAT
GAACTGGCCCTGCCTTCTAAGTACGTGAACTTCCTGTATCTGGCTAGCCACTACGAGAAGCTGAAAGGCTCCCCCGA
GGATAACGAACAGAAACAGCTGTTTGTGGAGCAGCACAAGCATTATCTGGACGAGATCATTGAACAGATTAGCGAGT
TCTCCAAAAGAGTGATCCTGGCTGACGCAAATCTGGATAAGGTCCTGAGCGCATACAACAAACACAGAGATAAGCCA
ATCAGGGAGCAGGCCGAAAATATCATTCATCTGTTCACTCTGACCAACCTGGGAGCCCCTGCAGCCTTCAAGTATTT
TGACACTACCATCGATCGGAAACGATACACATCCACTAAGGAGGTGCTGGACGCTACCCTGATTCACCAGAGCATTA
CCGGCCTGTATGAAACAAGGATTGACCTGTCTCAGCTGGGGGGCGACTGA
```

FaDe-SpCas9 nucleotide sequence
(SEQ ID NO: 4)
```
ATGGCTCCTAAGAAAAAGCGGAAGGTGGACAAGAAATACTCAATCGGGCTGGACATCGGAACTAACTCAGTGGGGTG
GGCAGTCATTACTGACGAGTACAAAGTGCCAAGCAAGAAATTTAAGGTCCTGGGCAACACCGATAGGCACTCCATCA
AGAAAAATCTGATTGGGGCCCTGCTGTTCGACTCTGGAGAGACAGCTGAAGCAACTAGACTGAAAAGGACTGCTAGA
AGGCGCTATACCCGGCGAAAGAATCGCATCTGCTACCTGCAGGAGATTTTCTCTAACGAAATGGCCAAGGTGGACGA
TAGTTTCTTTCATCGGCTGGAGGAATCATTCCTGGTCGAGGAAGATAAGAAACACGAGAGACATCCTATCTTTGGAA
ACATTGTGGACGAGGTCGCTTATCACGAAAAATACCCCACCATCTATCATCTGCGCAAGAAACTGGTGGACTCTACA
GATAAAGCAGACCTGCGGCTGATCTATCTGGCCCTGGCTCACATGATTAAGTTCAGAGGCCATTTTCTGATCGAGGG
AGATCTGAACCCAGACAATAGCGATGTGGACAAGCTGAACATCCAGCTGGTCCAGACATACAATCAGCTGTTTGAGG
AAAACCCTATTAATGCATCTGGCGTGGACGCAAAAGCCATCCTGAGTGCCAGGCTGTCTAAGAGTAGAAGGCTGGAG
AACCTGATCGCTCAGCTGCCAGGCGAAAAGAAAAACGGCCTGTTTGGAAATCTGATTGCACTGTCACTGGGACTGAC
ACCTAACTTCAAGAGCAATTTTGATCTGGCCGAGGACGCTAAACTGCAGCTGAGCAAGGACACTTATGACGATGACC
TGGATAACCTGCTGGCTCAGATCGGAGATCAGTACGCAGACCTGTTCCTGGCCGCTAAGAATCTGTCTGACGCTATC
CTGCTGAGTGATATTCTGCGGGTGAACACCGAGATTACAAAAGCCCCTCTGTCAGCTAGCATGATCAAGAGATATGA
CGAGCACCATCAGGATCTGACCCTGCTGAAGGCACTGGTGCGCCAGCAGCTGCCCGAGAAGTACAAGGAAATCTTCT
TTGATCAGAGTAAGAACGGGTACGCCGGTTATATTGACGGCGGAGCTTCACAGGAGGAATTCTACAAGTTTATCAAA
CCTATTCTGGAGAAGATGGACGGCACCGAGGAACTGCTGGTGAAACTGAATCGCGAGGACCTGCTGCGCAAGCAGCG
GACATTTGATAACGGCTCCATCCCCCACCAGATTCATCTGGGAGAGCTGCACGCAATCCTGCGACGACAGGAAGACT
TCTACCCATTTCTGAAGGATAACCGCGAGAAGATCGAAAAAATTCTGACCTTCCGGATCCCTTACTATGTGGGGCCC
CTGGCAAGGGGTAATTCCCGCTTTGCCTGGATGACACGGAAATCTGAGGAAACAATCACTCCTTGGAACTTCGAGGA
AGTGGTCGATAAGGGAGCTTCCGCACAGTCTTTCATCGAGAGAATGACAAACTTCGACAAAAACCTGCCAAATGAGA
AAGTGCTGCCTAAGCACAGTCTGCTGTACGAGTATTTCACAGTCTATAACGAACTGACTAAGGTGAAATACGTCACC
GAGGGGATGAGGAAGCCCGCCTTCCTGAGCGGTGAACAGAAGAAAGCTATCGTGGACCTGCTGTTTAAAACCAATCG
CAAGGTGACAGTCAAGCAGCTGAAGGAGGACTACTTCAAGAAAATTGAATGTTTCGATTCTGTGGAGATCAGTGGCG
TCGAAGACAGATTTAACGCTTCTCTGGGAACCTACCACGATCTGCTGAAGATCATTAAGGATAAAGACTTCCTGGAC
AACGAGGAAAATGAGGATATCCTGGAAGACATTGTGCTGACCCTGACACTGTTTGAGGATCGCGAAATGATCGAGGA
ACGGCTGAAAACTTATGCCCATCTGTTCGATGACAAGGTGATGAAACAGCTGAAGCGAAGAAGGTACACCGGCTGGG
GACGACTGAGCAGAAAGCTGATCAACGGCATTCGGGACAAACAGAGTGGAAAGACTATCCTGGACTTTCTGAAATCA
GATGGCTTCGCTAACAGAAATTTTATGCAGCTGATTCACGATGACAGCCTGACCTTCAAAGAGGATATCCAGAAGGC
```

```
ACAGGTGTCCGGGCAGGGTGACTCTCTGCACGAGCATATCGCAAACCTGGCCGGGTCCCCCGCCATCAAGAAAGGTA

TTCTGCAGACCGTGAAGGTGGTCGATGAGCTGGTGAAAGTCATGGGCAGGCATAAGCCAGAAAACATCGTGATTGAG

ATGGCCCGCGAAAATCAGACCACACAGAAAGGACAGAAGAACAGCCGCGAGCGGATGAAAAGGATCGAGGAAGGCAT

TAAGGAACTGGGATCCCAGATCCTGAAAGAGCACCCTGTGGAAAACACTCAGCTGCAGAATGAGAAGCTGTATCTGT

ACTATCTGCAGAATGGGCGGGATATGTACGTGGACCAGGAGCTGGATATTAACCGACTGTCTGATTACGACGTGGAT

CATATCGTCCCACAGTCATTCCTGAAAGATGACAGCATTGACAATAAGGTGCTGACCCGGAGTGACAAAACCGAGG

AAAGAGTGATAATGTCCCTTCAGAGGAAGTGGTCAAGAAAATGAAGAACTACTGGAGACAGCTGCTGAATGCCAAAC

TGATCACACAGCGAAAGTTTGATAACCTGACTAAAGCTGAGAGAGGGGGTCTGTCAGAACTGGACAAAGCAGGCTTC

ATCAAGCGACAGCTGGTGGAGACCAGACAGATCACAAAGCACGTCGCTCAGATTCTGGATAGCAGGATGAACACAAA

GTACGATGAGAATGACAAACTGATCCGCGAAGTGAAGGTCATTACTCTGAAGTCAAAACTTGTGAGCGACTTCAGAA

AGGATTTCCAGTTCTACAAAGTCAGGGAGATCAACAATTATCACCATGCTCATGACGCATACCTGAACGCAGTGGTC

GGGACCGCCCTGATTAAGAAATACCCCAAACTGGAGAGCGAATTCGTGTACGGTGACTATAAGGTGTACGATGTCAG

AAAAATGATCGCCAAGAGTGAGCAGGAAATTGGAAAAGCCACCGCTAAGTATTTCTTTTACTCAAACATCATGAATT

TCTTTAAGACTGAGATCACCCTGGCAAATGGGGAAATCCGAAAGAGACCACTGATTGAGACTAACGGCGAGACCGGA

GAAATCGTGTGGGACAAGGGTAGGGATTTTGCCACAGTGCGCAAGGTCCTGTCCATGCCTCAAGTGAATATTGTCAA

GAAAACAGAGGTGCAGACTGGCGGATTCAGTAAGGAATCAATTCTGCCCAAACGGAACTCTGATAAGCTGATCGCCC

GAAAGAAAGACTGGGATCCCAAGAAATATGGGGGTTTCGACTCCCCAACAGTGGCTTACTCTGTCCTGGTGGTCGCA

AAGGTGGAGAAGGGGAAAAGCAAGAAACTGAAATCCGTCAAGGAGCTGCTGGGTATCACTATTATGGAGAGGAGCTC

CTTCGAGAAGAACCCCATCGATTTTCTGGAGGCTAAAGGCTATAAGGAAGTGAAGAAAGACCTGATCATTAAACTGC

CAAAGTACAGCCTGTTTGAGCTGGAAAACGGAAGGAAGCGAATGCTGGCATCCGCAGGAGAGCTGCAGAAGGGTAAT

GAACTGGCCCTGCCTTCTAAGTACGTGAACTTCCTGTATCTGGCTAGCCACTACGAGAAGCTGAAAGGCTCCCCCGA

GGATAACGAACAGAAACAGCTGTTTGTGGAGCAGCACAAGCATTATCTGGACGAGATCATTGAACAGATTAGCGAGT

TCTCCAAAAGAGTGATCCTGGCTGACGCAAATCTGGATAAGGTCCTGAGCGCATACAACAAACACAGAGATAAGCCA

ATCAGGGAGCAGGCCGAAAATATCATTCATCTGTTCACTCTGACCAACCTGGGAGCCCCTGCAGCCTTCAAGTATTT

TGACACTACCATCGATCGGAAACGATACACATCCACTAAGGAGGTGCTGGACGCTACCCTGATTCACCAGAGCATTA

CCGGCCTGTATGAAACAAGGATTGACCTGTCTCAGCTGGGGGGCGACTGA
```

SpCas9 REC Lobe: amino acids 61-718 of SpCas9

(SEQ ID NO: 5)

ATRLKRTARRRYTRRKNRICYLQEIFSNEMAKVDDSFFHRLEESFLVEEDKKHERHPIFGNIVDEVAYHEKYPTIYH

LRKKLVDSTDKADLRLIYLALAHMIKFRGHFLIEGDLNPDNSDVDKLNIQLVQTYNQLFEENPINASGVDAKAILSA

RLSKSRRLENLIAQLPGEKKNGLFGNLIALSLGLTPNFKSNFDLAEDAKLQLSKDTYDDDLDNLLAQIGDQYADLFL

AAKNLSDAILLSDILRVNTEITKAPLSASMIKRYDEHHQDLTLLKALVRQQLPEKYKEIFFDQSKNGYAGYIDGGAS

QEEFYKFIKPILEKMDGTEELLVKLNREDLLRKQRTFDNGSIPHQIHLGELHAILRRQEDFYPFLKDNREKIEKILT

FRIPYYVGPLARGNSRFAWMTRKSEETITPWNFEEVVDKGASAQSFIERMTNFDKNLPNEKVLPKHSLLYEYFTVYN

ELTKVKYVTEGMRKPAFLSGEQKKAIVDLLFKTNRKVTVKQLKEDYFKKIECFDSVEISGVEDRFNASLGTYHDLLK

IIKDKDFLDNEENEDILEDIVLTLTLFEDREMIEERLKTYAHLFDDKVMKQLKRRRYTGWGRLSRKLINGIRDKQSG

KTILDFLKSDGFANRNFMQLIHDDSLTFKEDIQKAQVSGQGD

SpCas9 NUC Lobe 1: amino acids 1-60 of SpCas9

(SEQ ID NO: 6)

MDKKYSIGLDIGTNSVGWAVITDDYKVPSKKFKVLGNTDRHSIKKNLIGALLFDSGETAE

SpCas9 NUC Lobe 2: amino acids 719-1368 of SpCas9
(SEQ ID NO: 7)
SLHEHIANLAGSPAIKKGILQTVKVVDELVKVMGRHKPENIVIEMARENQTTQKGQKNSRERMKRIEEGIKELGSQI

LKEHPVENTQLQNEKLYLYYLQNGRDMYVDQELDINRLSDYDVDHIVPQSFLKDDSIDNKVLTRSDKNRGKSDNVPS

EEVVKKMKNYWRQLLNAKLITQRKFDNLTKAERGGLSELDKAGFIKRQLVETRQITKHVAQILDSRMNTKYDENDKL

IREVKVITLKSKLVSDFRKDFQFYKVREINNYHHAHDAYLNAVVGTALIKKYPKLESEFVYGDYKVYDVRKMIAKSE

QEIGKATAKYFFYSNIMNFFKTEITLANGEIRKRPLIETNGETGEIVWDKGRDFATVRKVLSMPQVNIVKKTEVQTG

GFSKESILPKRNSDKLIARKKDWDPKKYGGFDSPTVAYSVLVVAKVEKGKSKKLKSVKELLGITIMERSSFEKNPID

FLEAKGYKEVKKDLIIKLPKYSLFELENGRKRMLASAGELQKGNELALPSKYVNFLYLASHYEKLKGSPEDNEQKQL

FVEQHKHYLDEIIEQISEFSKRVILADANLDKVLSAYNKHRDKPIREQAENIIHLFTLTNLGAPAAFKYFDTTIDRK

RYTSTKEVLDATLIHQSITGLYETRIDLSQLGGD

SpCas9 BH domain: amino acids 61-94 of SpCas9
(SEQ ID NO: 8)
ATRLKRTARRRYTRRKNRICYLQEIFSNEMAKVD SpCas9 Rec1 domain 1: amino acids 95-180 of SpCas9
(SEQ ID NO: 9)
DSFFHRLEESFLVEEDKKHERHPIFGNIVDEVAYHEKYPTIYHLRKKLVDSTDKADLRLIYLALAHMIKFRGHFLIE

GDLNPDNSD

SpCas9 Rec1 domain 2: amino acids 309-718 of SpCas9
(SEQ ID NO: 10)
NTEITKAPLSASMIKRYDEHHQDLTLLKALVRQQLPEKYKEIFFDQSKNGYAGYIDGGASQEEFYKFIKPILEKMDG

TEELLVKLNREDLLRKQRTFDNGSIPHQIHLGELHAILRRQEDFYPFLKDNREKIEKILTFRIPYYVGPLARGNSRF

AWMTRKSEETITPWNFEEVVDKGASAQSFIERMTNFDKNLPNEKVLPKHSLLYEYFTVYNELTKVKYVTEGMRKPAF

LSGEQKKAIVDLLFKTNRKVTVKQLKEDYFKKIECFDSVEISGVEDRFNASLGTYHDLLKIIKDKDELDNEENEDIL

EDIVLTLTLFEDREMIEERLKTYAHLFDDKVMKQLKRRRYTGWGRLSRKLINGIRDKQSGKTILDFLKSDGFANRNF

MQLIHDDSLTFKEDIQKAQVSGQGD

SpCas9 Rec2 domain: amino acids 181-308 of SpCas9
(SEQ ID NO: 11)
VDKLNIQLVQTYNQLFEENPINASGVDAKAILSARLSKSRRLENLIAQLPGEKKNGLFGNLIALSLGLTPNFKSNFD

LAEDAKLQLSKDTYDDDLDNLLAQIGDQYADLFLAAKNLSDAILLSDILRV

SpCas9 RuvC I domain: amino acids 1-59 of SpCas9
(SEQ ID NO: 12)
MDKKYSIGLDIGTNSVGWAVITDDYKVPSKKFKVLGNTDRHSIKKNLIGALLFDSGETA SpCas9 RuvC II domain: amino acids 718-774 of SpCas9
(SEQ ID NO: 13)
DSLHEHIANLAGSPAIKKGILQTVKVVDELVKVMGRHKPENIVIEMARENQTTQKGQ SpCas9 RuvC III domain: amino acids 909-1098 of SpCas9
(SEQ ID NO: 14)
SELDKAGFIKRQLVETRQITKHVAQILDSRMNTKYDENDKLIREVKVITLKSKLVSDFRKDFQFYKVREINNYHHAH

DAYLNAVVGTALIKKYPKLESEFVYGDYKVYDVRKMIAKSEQEIGKATAKYFFYSNIMNFFKTEITLANGEIRKRPL

IETNGETGEIVWDKGRDFATVRKVLSMPQVNIVKKT

SpCas9 HNH domain: amino acids 775-908 of SpCas9
(SEQ ID NO: 15)
KNSRERMKRIEEGIKELGSQILKEHPVENTQLQNEKLYLYYLQNGRDMYVDQELDINRLSDYDVDHIVPQSFLKDDS

IDNKVLTRSDKNRGKSDNVPSEEVVKKMKNYWRQLLNAKLITQRKFDNLTKAERGGL

SpCas9 PI domain: amino acids 1099-1368 of SpCas9
(SEQ ID NO: 16)
EVQTGGFSKESILPKRNSDKLIARKKDWDPKKYGGFDSPTVAYSVLVVAKVEKGKSKKLKSVKELLGITIMERSSFE

KNPIDFLEAKGYKEVKKDLIIKLPKYSLFELENGRKRMLASAGELQKGNELALPSKYVNFLYLASHYEKLKGSPEDN

-continued

EQKQLFVEQHKHYLDEIIEQISEFSKRVILADANLDKVLSAYNKHRDKPIREQAENIIHLFTLTNLGAPAAFKYFDT

TIDRKRYTSTKEVLDATLIHQSITGLYETRIDLSQLGGD

Cas9 from *Streptococcus thermophilus*

(SEQ ID NO: 17)

MLFNKCIIISINLDFSNKEKCMTKPYSIGLDIGTNSVGWAVITDNYKVPSKKMKVLGNTSKKYIKKNLLGVLLFDSG

ITAEGRRLKRTARRRYTRRRNRILYLQEIFSTEMATLDDAFFQRLDDSFLVPDDKRDSKYPIFGNLVEEKVYHDEFP

TIYHLRKYLADSTKKADLRLVYLALAHMIKYRGHFLIEGEFNSKNNDIQKNFQDFLDTYNAIFESDLSLENSKQLEE

IVKDKISKLEKKDRILKLFPGEKNSGIFSEFLKLIVGNQADFRKCFNLDEKASLHFSKESYDEDLETLLGYIGDDYS

DVFLKAKKLYDAILLSGFLTVTDNETEAPLSSAMIKRYNEHKEDLALLKEYIRNISLKTYNEVFKDDTKNGYAGYID

GKTNQEDFYVYLKNLLAEFEGADYFLEKIDREDFLRKQRTFDNGSIPYQIHLQEMRAILDKQAKFYPFLAKNKERIE

KILTFRIPYYVGPLARGNSDFAWSIRKRNEKITPWNFEDVIDKESSAEAFINRMTSFDLYLPEEKVLPKHSLLYETF

NVYNELTKVRFIAESMRDYQFLDSKQKKDIVRLYFKDKRKVTDKDIIEYLHAIYGYDGIELKGIEKQFNSSLSTYHD

LLNIINDKEFLDDSSNEAIIEEIIHTLTIFEDREMIKQRLSKFENIFDKSVLKKLSRRHYTGWGKLSAKLINGIRDE

KSGNTILDYLIDDGISNRNFMQLIHDDALSFKKKIQKAQIIGDEDKGNIKEVVKSLPGSPAIKKGILQSIKIVDELV

KVMGGRKPESIVVEMARENQYTNQGKSNSQQRLKRLEKSLKELGSKILKENIPAKLSKIDNNALQNDRLYLYYLQNG

KDMYTGDDLDIDRLSNYDIDHIIPQAFLKDNSIDNKVLVSSASNRGKSDDFPSLEVVKKRKTFWYQLLKSKLISQRK

FDNLTKAERGGLLPEDKAGFIQRQLVETRQITKHVARLLDEKFNNKKDENNRAVRTVKIITLKSTLVSQFRKDFELY

KVREINDFHHAHDAYLNAVIASALLKKYPKLEPEFVYGDYPKYNSFRERKSATEKVYFYSNIMNIFKKSISLADGRV

IERPLIEVNEETGESVWNKESDLATVRRVLSYPQVNVVKKVEEQNHGLDRGKPKGLFNANLSSKPKPNSNENLVGAK

EYLDPKKYGGYAGISNSFAVLVKGTIEKGAKKKITNVLEFQGISILDRINYRKDKLNFLLEKGYKDIELIIELPKYS

LFELSDGSRRMLASILSTNNKRGEIHKGNQIFLSQKFVKLLYHAKRISNTINENHRKYVENHKKEFEELFYYILEFN

ENYVGAKKNGKLLNSAFQSWQNHSIDELCSSFIGPTGSERKGLFELTSRGSAADFEFLGVKIPRYRDYTPSSLLKDA

TLIHQSVTGLYETRIDLAKLGEG

Cas9 from *Streptococcus dysgalactiae*

(SEQ ID NO: 18)

MDKKYSIGLDIGTNSVGWAVITDDYKVPSKKFKVLGNTDRHSIKKNLIGALLFDSGETAEATRLKRTARRRYTRRKN

RIRYLQEIFSSEMSKVDDSFFHRLEESFLVEEDKKHERHPIFGNIVDEVAYHEKYPTIYHLRKKLADSTDKADLRLI

YLALAHMIKFRGHFLIEGDLNPDNSDMDKLFIQLVQTYNQLFEENPINASRVDAKAILSARLSKSRRLENLIAQLPG

EKRNGLFGNLIALSLGLTPNFKSNFDLAEDAKLQLSKDTYDDDLDNLLAQIGDQYADLFLAAKNLSDAILLSDILRV

NSEITKAPLSASMIKRYDEHHQDLTLLKALVRQQLPEKYKEIFFDQSKNGYAGYIDGGASQEEFYKFIKPILEKMDG

TEELLAKLNREDLLRKQRTFDNGSIPHQIHLGELHAILRRQEDFYPFLKDNREKIEKILTFRIPYYVGPLARGNSRF

AWMTRKSEETITPWNFEEVVDKGASAQSFIERMTNFDKNLPNEKVLPKHSLLYEYFTVYNELTKVKYVTEGMRKPEF

LSGKQKEAIVDLLFKTNRKVTVKQLKEDYFKKIECFDSVEISGVEDRFNASLGTYHDLLKIIKDKDFLDNEENEDIL

EDIVLTLTLFEDKEMIEERLKTYAHLFDDKVMKQLKRRHYTGWGRLSRKLINGIRDKQSGKTILDFLKSDGFANRNF

IQLIHDDSLTFKEAIQKAQVSGQGHSLHEQIANLAGSPAIKKGILQSVKVVDELVKVMGHKPENIVIEMARENQTTQ

KGQKNSRERMKRIEEGIKELGSQILKEHPVENTQLQNEKLYLYYLQNGRDMYVDQELDINRLSDYDVDHIVPQSFIK

DDSIDNKVLTRSDKNRGKSDDVPSEEVVKKMKNYWRQLLNAKLITQRKFDNLTKAERGGLSELDKAGFIKRQLVETR

QITKHVAQILDSRMNTKYDENDKLIREVKVITLKSKLVSDFRKDFQFYKVREINNYHHAHDAYLNAVVGTALIKKYP

KLESEFVYGDYKVYDVRKMIAKSEQEIGKATAKRFFYSNIMNFFKTEITLANGEIRKRPLIETNEETGEIVWNKGRD

FATVRKVLSMPQVNIVKKTEVQTGALTNESIYARGSFDKLISRKHRFESSKYGGEGSPTVTYSVLVVAKSKVQDGKV

-continued

KKIKTGKELIGITLLDKLVFEKNPLKFIEDKGYGNVQIDKCIKLPKYSLFEFENGTRRMLASVMANNNSRGDLQKAN

EMFLPAKLVTLLYHAHKIESSKELEHEAYILDHYNDLYQLLSYIERFASLYVDVEKNISKVKELFSNIESYSISEIC

SSVINLLTLTASGAPADFKFLGTTIPRKRYGSPQSILSSTLIHQSITGLYETRIDLSQLGGD

Cas9 from *Streptococcus mutans*
(SEQ ID NO: 19)

MKKPYSIGLDIGTNSVGWAVVTDDYKVPAKKMKVLGNTDKSHIEKNLLGALLFDSGNTAEDRRLKRTARRRYTRRRN

RILYLQEIFSEEMGKVDDSFFHRLEDSFLVTEDKRGERHPIFGNLEEEVKYHENFPTIYHLRQYLADNPEKVDLRLV

YLALAHIIKFRGHFLIEGKFDTRNNDVQRLFQEFLAVYDNTFENSSLQEQNVQVEEILTDKISKSAKKDRVLKLFPN

EKSNGRFAEFLKLIVGNQADFKKHFELEEKAPLQFSKDTYEEELEVLLAQIGDNYAELFLSAKKLYDSILLSGILTV

TDVGTKAPLSASMIQRYNEHQMDLAQLKQFIRQKLSDKYNEVFSDVSKDGYAGYIDGKTNQEAFYKYLKGLLNKIEG

SGYFLDKIEREDFLRKQRTFDNGSIPHQIHLQEMRAIIRRQAEFYPFLADNQDRIEKLLTFRIPYYVGPLARGKSDF

AWLSRKSADKITPWNFDEIVDKESSAEAFINRMTNYDLYLPNQKVLPKHSLLYEKFTVYNELTKVKYKTEQGKTAFF

DANMKQEIFDGVFKVYRKVTKDKLMDFLEKEFDEFRIVDLTGLDKENKVFNASYGTYHDLCKILDKDFLDNSKNEKI

LEDIVLTLTLFEDREMIRKRLENYSDLLTKEQVKKLERRHYTGWGRLSAELIHGIRNKESRKTILDYLIDDGNSNRN

FMQLINDDALSFKEEIAKAQVIGETDNLNQVVSDIAGSPAIKKGILQSLKIVDELVKIMGHQPENIVVEMARENQFT

NQGRRNSQQRLKGLTDSIKEFGSQILKEHPVENSQLQNDRLFLYYLQNGRDMYTGEELDIDYLSQYDIDHIIPQAFI

KDNSIDNRVLTSSKENRGKSDDVPSKDVVRKMKSYWSKLLSAKLITQRKFDNLTKAERGGLTDDDKAGFIKRQLVET

RQITKHVARILDERFNTETDENNKKIRQVKIVTLKSNLVSNFRKEFELYKVREINDYHHAHDAYLNAVIGKALLGVY

PQLEPEFVYGDYPHFHGHKENKATAKKFFYSNIMNFFKKDDVRTDKNGEIIWKKDEHISNIKKVLSYPQVNIVKKVE

EQTGGFSKESILPKGNSDKLIPRKTKKFYWDTKKYGGFDSPIVAYSILVIADIEKGKSKKLKTVKALVGVTIMEKMT

FERDPVAFLERKGYRNVQEENIIKLPKYSLFKLENGRKRLLASARELQKGNEIVLPNHLGTLLYHAKNIHKVDEPKH

LDYVDKHKDEFKELLDVVSNFSKKYTLAEGNLEKIKELYAQNNGEDLKELASSFINLLTFTAIGAPATFKFFDKNID

RKRYTSTTEILNATLIHQSITGLYETRIDLNKLGGD

Cas9 from *Listeria innocua*
(SEQ ID NO: 20)

MKKPYTIGLDIGTNSVGWAVLTDQYDLVKRKMKIAGDSEKKQIKKNFWGVRLFDEGQTAADRRMARTARRRIERRRN

RISYLQGIFAEEMSKTDANFFCRLSDSFYVDNEKRNSRHPFFATIEEEVEYHKNYPTIYHLREELVNSSEKADLRLV

YLALAHIIKYRGNFLIEGALDTQNTSVDGIYKQFIQTYNQVFASGIEDGSLKKLEDNKDVAKILVEKVTRKEKLERI

LKLYPGEKSAGMFAQFISLIVGSKGNFQKPFDLIEKSDIECAKDSYEEDLESLLALIGDEYAELFVAAKNAYSAVVL

SSIITVAETETNAKLSASMIERFDTHEEDLGELKAFIKLHLPKHYEEIFSNTEKHGYAGYIDGKTKQADFYKYMKMT

LENIEGADYFIAKIEKENFLRKQRTEDNGAIPHQLHLEELEAILHQQAKYYPFLKENYDKIKSLVTFRIPYFVGPLA

NGQSEFAWLTRKADGEIRPWNIEEKVDFGKSAVDFIEKMTNKDTYLPKENVLPKHSLCYQKYLVYNELTKVRYINDQ

GKTSYFSGQEKEQIFNDLFKQKRKVKKKDLELFLRNMSHVESPTIEGLEDSFNSSYSTYHDLLKVGIKQEILDNPVN

TEMLENIVKILTVFEDKRMIKEQLQQFSDVLDGVVLKKLERRHYTGWGRLSAKLLMGIRDKQSHLTILDYLMNDDGL

NRNLMQLINDSNLSFKSIIEKEQVTTADKDIQSIVADLAGSPAIKKGILQSLKIVDELVSVMGYPPQTIVVEMAREN

QTTGKGKNNSRPRYKSLEKAIKEFGSQILKEHPTDNQELRNNRLYLYYLQNGKDMYTGQDLDIHNLSNYDIDHIVPQ

SFITDNSIDNLVLTSSAGNREKGDDVPPLEIVRKRKVFWEKLYQGNLMSKRKFDYLTKAERGGLTEADKARFIHRQL

VETRQITKNVANILHQRFNYEKDDHGNTMKQVRIVTLKSALVSQFRKQFQLYKVRDVNDYHHAHDAYLNGVVANTLL

KVYPQLEPEFVYGDYHQFDWFKANKATAKKQFYTNIMLFFAQKDRIIDENGEILWDKKYLDTVKKVMSYRQMNIVKK

TEIQKGEFSKATIKPKGNSSKLIPRKTNWDPMKYGGLDSPNMAYAVVIEYAKGKNKLVFEKKIIRVTIMERKAFEKD

EKAFLEEQGYRQPKVLAKLPKYTLYECEEGRRRMLASANEAQKGNQQVLPNHLVTLLHHAANCEVSDGKSLDYIESN

-continued

REMFAELLAHVSEFAKRYTLAEANLNKINQLFEQNKEGDIKAIAQSFVDLMAFNAMGAPASFKFFETTIERKRYNNL

KELLNSTIIYQSITGLYESRKRLDD

Cas9 from *Staphylococcus aureus*
(SEQ ID NO: 21)

MKRNYILGLDIGITSVGYGIIDYETRDVIDAGVRLFKEANVENNEGRRSKRGARRLKRRRRHRIQRVKKLLFDYNLL

TDHSELSGINPYEARVKGLSQKLSEEEFSAALLHLAKRRGVHNVNEVEEDTGNELSTKEQISRNSKALEEKYVAELQ

LERLKKDGEVRGSINRFKTSDYVKEAKQLLKVQKAYHQLDQSFIDTYIDLLETRRTYYEGPGEGSPFGWKDIKEWYE

MLMGHCTYFPEELRSVKYAYNADLYNALNDLNNLVITRDENEKLEYYEKFQIIENVFKQKKKPTLKQIAKEILVNEE

DIKGYRVTSTGKPEFTNLKVYHDIKDITARKEIIENAELLDQIAKILTIYQSSEDIQEELTNLNSELTQEEIEQISN

LKGYTGTHNLSLKAINLILDELWHINDNQIAIFNRLKLVPKKVDLSQQKEIPTTLVDDFILSPVVKRSFIQSIKVIN

AIIKKYGLPNDIIIELAREKNSKDAQKMINEMQKRNRQTNERIEEIIRTTGKENAKYLIEKIKLHDMQEGKCLYSLE

AIPLEDLLNNPFNYEVDHIIPRSVSFDNSFNNKVLVKQEENSKKGNRTPFQYLSSSDSKISYETFKKHILNLAKGKG

RISKTKKEYLLEERDINRFSVQKDFINRNLVDTRYATRGLMNLLRSYFRVNNLDVKVKSINGGETSFLRRKWKFKKE

RNKGYKHHAEDALIIANADFIFKEWKKLDKAKKVMENQMFEEKQAESMPEIETEQEYKEIFITPHQIKHIKDFKDYK

YSHRVDKKPNRELINDTLYSTRKDDKGNTLIVNNLNGLYDKDNDKLKKLINKSPEKLLMYHHDPQTYQKLKLIMEQY

GDEKNPLYKYYEETGNYLTKYSKKDNGPVIKKIKYYGNKLNAHLDITDDYPNSRNKVVKLSLKPYRFDVYLDNGVYK

FVTVKNLDVIKKENYYEVNSKCYEEAKKLKKISNQAEFIASFYNNDLIKINGELYRVIGVNNDLLNRIEVNMIDITY

REYLENMNDKRPPRIIKTIASKTQSIKKYSTDILGNLYEVKSKKHPQIIKKG

Cas9 from *Klebsiella pneumoniae*
(SEQ ID NO: 22)

MAPKKKRKVGIHGVPAADKKYSIGLDIGTNSVGWAVITDEYKVPSKKFKVLGNTDRHSIKKNLIGALLFDSGETAEA

TRLKRTARRRYTRRKNRICYLQEIFSNEMAKVDDSFFHRLEESFLVEEDKKHERHPIFGNIVDEVAYHEKYPTIYHL

RKKLVDSTDKADLRLIYLALAHMIKFRGHFLIEGDLNPDNSDVDKLFIQLVQTYNQLFEENPINASGVDAKAILSAR

LSKSRRLENLIAQLPGEKKNGLFGNLIALSLGLTPNFKSNFDLAEDAKLQLSKDTYDDDLDNLLAQIGDQYADLFLA

AKNLSDAILLSDILRVNTEITKAPLSASMIKRYDEHHQDLTLLKALVRQQLPEKYKEIFFDQSKNGYAGYIDGGASQ

EEFYKFIKPILEKMDGTEELLVKLNREDLLRKQRTFDNGSIPHQIHLGELHAILRRQEDFYPFLKDNREKIEKILTF

RIPYYVGPLARGNSRFAWMTRKSEETITPWNFEEVVDKGASAQSFIERMTNFDKNLPNEKVLPKHSLLYEYFTVYNE

LTKVKYVTEGMRKPAFLSGEQKKAIVDLLFKTNRKVTVKQLKEDYFKKIECFDSVEISGVEDRFNASLGTYHDLLKI

IKDKDFLDNEENEDILEDIVLTLTLFEDREMIEERLKTYAHLFDDKVMKQLKRRRYTGWGRLSRKLINGIRDKQSGK

TILDFLKSDGFANRNFMQLIHDDSLTFKEDIQKAQVSGQGDSLHEHIANLAGSPAIKKGILQTVKVVDELVKVMGRH

KPENIVIEMARENQTTQKGQKNSRERMKRIEEGIKELGSQILKEHPVENTQLQNEKLYLYYLQNGRDMYVDQELDIN

RLSDYDVDHIVPQSFLKDDSIDNKVLTRSDKNRGKSDNVPSEEVVKKMKNYWRQLLNAKLITQRKFDNLTKAERGGL

SELDKAGFIKRQLVETRQITKHVAQILDSRMNTKYDENDKLIREVKVITLKSKLVSDFRKDFQFYKVREINNYHHAH

DAYLNAVVGTALIKKYPKLESEFVYGDYKVYDVRKMIAKSEQEIGKATAKYFFYSNIMNFFKTEITLANGEIRKRPL

IETNGETGEIVWDKGRDFATVRKVLSMPQVNIVKKTEVQTGGFSKESILPKRNSDKLIARKKDWDPKKYGGFDSPTV

AYSVLVVAKVEKGKSKKLKSVKELLGITIMERSSFEKNPIDFLEAKGYKEVKKDLIIKLPKYSLFELENGRKRMLAS

AGELQKGNELALPSKYVNFLYLASHYEKLKGSPEDNEQKQLFVEQHKHYLDEIIEQISEFSKRVILADANLDKVLSA

YNKHRDKPIREQAENIIHLFTLTNLGAPAAFKYFDTTIDRKRYTSTKEVLDATLIHQSITGLYETRIDLSQLGGDKR

PAATKKAGQAKKKK

-continued

FnCas9 - Cas9 from *Francisella novicida*

(SEQ ID NO: 23)

MNFKILPIAIDLGVKNTGVFSAFYQKGTSLERLDNKNGKVYELSKDSYTLLMNNRTARRHQRRGIDRKQLVKRLFKL
IWTEQLNLEWDKDTQQAISFLFNRRGFSFITDGYSPEYLNIVPEQVKAILMDIFDDYNGEDDLDSYLKLATEQESKI
SEIYNKLMQKILEFKLMKLCTDIKDDVSTKTLKEITSYEFELLADYLANYSESLKTQKFSYTDKQGNLKELSYYHH
DKYNIQEFLKRHATINDRILDTLLTDDLDIWNFNFEKEDFDKNEEKLQNQEDKDHIQAHLHHFVFAVNKIKSEMASG
GRHRSQYFQEITNVLDENNHQEGYLKNFCENLHNKKYSNLSVKNLVNLIGNLSNLELKPLRKYFNDKIHAKADHWDE
QKFTETYCHWILGEWRVGVKDQDKKDGAKYSYKDLCNELKQKVTKAGLVDFLLELDPCRTIPPYLDNNNRKPPKCQS
LILNPKFLDNQYPNWQQYLQELKKLQSIQNYLDSFETDLKVLKSSKDQPYFVEYKSSNQQIASGQRDYKDLDARILQ
FIFDRVKASDELLLNEIYFQAKKLKQKASSELEKLESSKKLDEVIANSQLSQILKSQHTNGIFEQGTFLHLVCKYYK
QRQRARDSRLYIMPEYRYDKKLHKYNNTGRFDDDNQLLTYCNHKPRQKRYQLLNDLAGVLQVSPNFLKDKIGSDDDL
FISKWLVEHIRGFKKACEDSLKIQKDNRGLLNHKINIARNTKGKCEKEIFNLICKIEGSEDKKGNYKHGLAYELGVL
LFGEPNEASKPEFDRKIKKFNSIYSFAQIQQIAFAERKGNANTCAVCSADNAHRMQQIKITEPVEDNKDKIILSAKA
QRLPAIPTRIVDGAVKKMATILAKNIVDDNWQNIKQVLSAKHQLHIPIITESNAFEFEPALADVKGKSLKDRRKKAL
ERISPENIFKDKNNRIKEFAKGISAYSGANLTDGDFDGAKEELDHIIPRSHKKYGTLNDEANLICVTRGDNKNKGNR
IFCLRDLADNYKLKQFETTDDLEIEKKIADTIWDANKKDFKFGNYRSFINLTPQEQKAFRHALFLADENPIKQAVIR
AINNRNRTFVNGTQRYFAEVLANNIYLRAKKENLNTDKISFDYFGIPTIGNGRGIAEIRQLYEKVDSDIQAYAKGDK
PQASYSHLIDAMLAFCIAADEHRNDGSIGLEIDKNYSLYPLDKNTGEVFTKDIFSQIKITDNEFSDKKLVRKKAIEG
FNTHRQMTRDGIYAENYLPILIHKELNEVRKGYTWKNSEEIKIFKGKKYDIQQLNNLVYCLKFVDKPISIDIQISTL
EELRNILTINNIAATAEYYYINLKTQKLHEYYIENYNTALGYKKYSKEMEFLRSLAYRSERVKIKSIDDVKQVLDKD
SNFIIGKITLPFKKEWQRLYREWQNTTIKDDYEFLKSFFNVKSITKLHKKVRKDFSLPISTNEGKFLVKRKTWDNNF
IYQILNDSDSRADGTKPFIPAFDISKNEIVEAIIDSFTSKNIFWLPKNIELQKVDNKNIFAIDTSKWFEVETPSDLR
DIGIATIQYKIDNNSRPKVRVKLDYVIDDDSKINYFMNHSLLKSRYPDKVLEILKQSTIIEFESSGFNKTIKEMLGM
KLAGIYNETSNN

TABLE 5

| KFERQ and KFERQ-Like Motifs | |
|---|---|
| SEQ ID NO: 24 | KFERQ |
| SEQ ID NO: 25 | RKVEQ |
| SEQ ID NO: 26 | QDLKF |
| SEQ ID NO: 27 | QRFFE |
| SEQ ID NO: 28 | NRVVD |
| SEQ ID NO: 29 | QRDKV |
| SEQ ID NO: 30 | QKILD |
| SEQ ID NO: 31 | QKKEL |
| SEQ ID NO: 32 | QFREL |
| SEQ ID NO: 33 | IKLDQ |
| SEQ ID NO: 34 | DVVRQ |
| SEQ ID NO: 35 | QRIVE |
| SEQ ID NO: 36 | VKELQ |
| SEQ ID NO: 37 | QKVFD |

TABLE 5-continued

| KFERQ and KFERQ-Like Motifs | |
|---|---|
| SEQ ID NO: 38 | QELLR |
| SEQ ID NO: 39 | VDKLN |
| SEQ ID NO: 40 | RIKEN |
| SEQ ID NO: 41 | NKKFE |

TABLE 6

| Nuclear Localization Signals | |
|---|---|
| SEQ ID NO: 42 | PKKKRKV |
| SEQ ID NO: 43 | AVKRPAATKKAGQAKKKKLD |
| SEQ ID NO: 44 | PAAKRVKLD |
| SEQ ID NO: 45 | MSRRRKANPTKLSENAKKLAKEVEN |
| SEQ ID NO: 46 | KLKIKRPVK |
| SEQ ID NO: 47 | KIPIK |

TABLE 7

Primers

| SEQ ID NO. | Gene | Sequence |
|---|---|---|
| SEQ ID NO: 48 | EMX1-T Forward | TTCCAGAACCGGAGGACAAAG |
| SEQ ID NO: 49 | EMX1-T Reverse | CCACCCTAGTCATTGGAGGT |
| SEQ ID NO: 50 | EMX1-OT1 Forward | TTTATTATCTGCACATGTATG |
| SEQ ID NO: 51 | EMX1-OT1 Reverse | CTACCTGTACATCTGCACAAG |
| SEQ ID NO: 52 | EMX1-OT2 Forward | ATGTGCTTCAACCCATCACG |
| SEQ ID NO: 53 | EMX1-OT2 Reverse | GTTGGCTTTCACAAGGATGC |
| SEQ ID NO: 54 | FANCF-T Forward | CACGGATAAAGACGCTGGGA |
| SEQ ID NO: 55 | FANCF-T Reverse | TCCCAGGTGCTGACGTAGG |
| SEQ ID NO: 56 | FANCF-OT1 Forward | TAGCACTGGGTGCTTAATCCG |
| SEQ ID NO: 57 | FANCF-OT2 Reverse | GGGTTTGGTTGGCTGCTCAT |
| SEQ ID NO: 58 | AAVS1 T2 Forward | ACCGGGGCCACTAGGGACAGGAT |
| SEQ ID NO: 59 | AAVS1 T2 Reverse | AAACATCCTGTCCCTAGTGGCCC |
| SEQ ID NO: 60 | Cas9 Forward | GATAAAGCAGACCTGCGGCTGATCTATC |
| SEQ ID NO: 61 | Cas9 Reverse | CTGGCAGCTGAGCGATCAGGTTCTC |
| SEQ ID NO: 62 | A1AT Forward | GATGCCCACCTTCCCCTCTC |
| SEQ ID NO: 63 | A1AT Reverse | AGTGGTGGCCTCATTCTGGA |
| SEQ ID NO: 64 | ABCB1 Forward | GGCTTCACGAGAAAAGTTGATG |
| SEQ ID NO: 65 | ABCB1 Reverse | GGATTCACAGGCTTCACCTAC |

TABLE 8

Guide RNA Sequences

| SEQ ID NO. | Target | Sequence |
|---|---|---|
| SEQ ID NO: 66 | EMX1 | GAGTCCGAGCAGAAGAAGAA |
| SEQ ID NO: 67 | FANCF1 | GGAATCCCTTCTGCAGCACC |
| SEQ ID NO: 68 | AAVS1-T2 | CACTTTGGGAGGCCGAGGC |
| SEQ ID NO: 69 | A1A1 | GAACTTGGTGATGATATCGT GCCCTCTGGCCAGTCCTGAT |
| SEQ ID NO: 70 | ABCB1 | TTTATAGTAGGATTTACACG ACCAATTCCTTCATTAATCT |

Examples

Materials and Methods

The following materials and methods are used in the experiments described in the Examples. Oligonucleotides and guide RNA synthesis was provided by Sigma and Synthego. Reagents and kits were obtained from ThermoFisher, unless otherwise indicated.

List of Reagents and Kits
 Subcellular Fractionation Kit;
 EDTA-free Protease Inhibitor Cocktail (Sigma);
 NOVEX NUPAGE protein gels, Bis-Tris 4-12%, 1.5 mm thick, 10-well;
 4× Laemmli Buffer (BioRad);
 NUPAGE MOPS 20×SDS Running Buffer;
 NUPAGE 20× Transfer Buffer;
 NOVEX Sharp Pre-Stained Protein Standard molecular weight markers;
 Nitrocellulose Pre-Cut Blotting Membranes, 0.45 m pore size;
 Primary antibody: Cas9 Mouse monoclonal (Abcam);
 Monoclonal ANTI-FLAG M2 antibody (Sigma);
 Monoclonal Anti-α-Tubulin (Sigma);
 Secondary antibody: IRDYE 680RD Donkey anti-Mouse IgG (H+L), 0.1 mg (Li-COR);
 HSC70 Mouse monoclonal (Santa Cruz);
 Protein A SEPHAROSE (Abcam);
 REVERTAID RT Kit;
 DNase I, RNase-free;
 Phusion Flash High-Fidelity PCR Master Mix;
 Q5 Hot Start High-Fidelity 2× Master Mix;
 Gentra Puregene Kit (Qiagen);
 Lipofectamine LTX Plus (Invitrogen);
 FUGENE HD (Promega).
 Cas9 (CRISPR Associated Protein 9) ELISA Kit (Cell Biolabs)
 Cycloheximide CHX (Sigma)
 Leupeptin (SIGMA)
 Anti-CRISPR-Cas9 antibody [EPR19799](ab203933)
 Anti-Ki67 antibody (ab15580)
 Anti-Cleaved Caspase-3 antibody (ab2302)
 Anti-gamma H2A.X (phospho S139) antibody [9F3] (ab26350)
 Anti-CD8 alpha antibody [144B] (ab17147)
 Anti-CD4 antibody [EPR19514]—Low endotoxin, Azide free (ab221775)

Primers used in the experiments described herein are listed in Table 2.

TABLE 2

Primers

| Gene | Primer set (F: forward, R: reverse) | SEQ ID NO. |
|---|---|---|
| EMX1-T | F: TTCCAGAACCGGAGGACAAAG | 48 |
|  | R: CCACCCTAGTCATTGGAGGT | 49 |
| EMX1-OT1 | F: TTTATTATCTGCACATGTATG | 50 |
|  | R: CTACCTGTACATCTGCACAAG | 51 |
| EMX1-OT2 | F: ATGTGCTTCAACCCATCACG | 52 |
|  | R: GTTGGCTTTCACAAGGATGC | 53 |
| FANCF-T | F: CACGGATAAAGACGCTGGGA | 54 |
|  | R: TCCCAGGTGCTGACGTAGG | 55 |
| FANCF-OT1 | F: TAGCACTGGGTGCTTAATCCG | 56 |
|  | R: GGGTTTGGTTGGCTGCTCAT | 57 |
| AAVS1 T2 | F: ACCGGGGCCACTAGGGACAGGAT | 58 |
|  | R: AAACATCCTGTCCCTAGTGGCCC | 59 |
| Cas9 | F: GATAAAGCAGACCTGCGGCTGATCTATC | 60 |
|  | R: CTGGCAGCTGAGCGATCAGGTTCTC | 61 |
| A1AT | F: GATGCCCACCTTCCCCTCTC | 62 |
|  | R: AGTGGTGGCCTCATTCTGGA | 63 |
| ABCB1 | F: GGCTTCACGAGAAAAGTTGATG | 64 |
|  | R: GGATTCACAGGCTTCACCTAC | 65 |

Guide RNAs used in the experiments described herein are listed in Table 3.

TABLE 3

Guide RNA Sequences.

| Target | gRNAs | SEQ ID NO. |
|---|---|---|
| EMX1 | GAGTCCGAGCAGAAGAAGAA | 66 |
| FANCF1 | GGAATCCCTTCTGCAGCACC | 67 |
| AAVS1-T2 | CACTTTGGGAGGCCGAGGC | 68 |
| A1AT | GAACTTGGTGATGATATCGT GCCCTCTGGCCAGTCCTGAT | 69 |
| ABCB1 | TTTATAGTAGGATTTACACG ACCAATTCCTTCATTAATCT | 70 |
| Mouse and human PCSK9 | CAGGTTCCATGGGATGCTCT | 71 |
| mouse PCSK9 | AGCAGCAGCGGCGGCAACAG | 72 |

Experimental Procedures

Cell Culture. SV-HUC-1 cells were cultured in F-12K Medium (Kaighn's Modification of Ham's) supplemented with 10% (v/v) fetal bovine serum (Gibco) and 10% antibiotics (100 U/mL penicillin and 100 mg/L streptomycin sulfate).

HEK293 cells were cultured in Dulbecco's modified Eagle's medium (Invitrogen) supplemented with 10% (v/v) fetal bovine serum (Gibco) and 1% antibiotics (100 U/mL penicillin and 100 mg/L streptomycin sulfate). All cells were grown in a humidified atmosphere at 37° C. with 5% $CO_2$.

Neuro-2a cells were cultured in Eagle's Minimum Essential Medium (EMEM) supplemented with 10% (v/v) fetal bovine serum (Gibco) and 1% antibiotics (100 U/mL penicillin and 100 mg/L streptomycin sulfate).

HCT cells were cultured in RPMI-1640 medium (ATCC 30-2001) supplemented with 10% (v/v) fetal bovine serum (Gibco) and 1% antibiotics (100 U/mL penicillin and 100 mg/L streptomycin sulfate).

Human iPSCs were cultured in CELLARTIS DEF-CS Basal medium supplemented with GF-1 Additive (diluted 1:333), GF-2 Additive (diluted 1:1000) and GF-3 Additive (diluted 1:1000).

Plasmid Mutations. Mutations were made by G-Blocks gene fragments and synthesis.

Example 1. Cas9 vs. FaDe-Cas9: Analysis of Protein Turnover

Figure 5A:
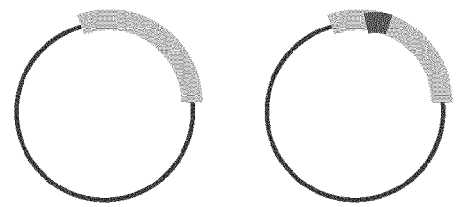
FIG. 5A shows schematics of plasmids containing wild-type Cas9 and Cas9 including a KFERQ motif.
Figure 5B:
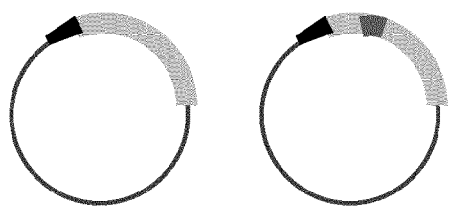
FIG. 5B shows schematics of plasmids containing wild-type Cas9 and FaDe-Cas9, each tagged with a FLAG tag.

Plasmid transfection. Immortalized human or mouse cell lines were transfected with plasmids encoding Cas9 or FaDe-Cas9 (FaDe-Cas9: wild-type Cas9 with the F185N mutation; shown as KFERQ-Cas9 in FIG. 5A) by reverse transfection. 3 g of plasmid (Cas9 or FaDe-Cas9) were mixed with the transfection agent (Lipofectamine LTX) in the OPTIMEM medium and incubated for 25 minutes into a 6-well plate. After incubation, the cells were detached, counted ($50 \times 10^4$), and resuspended in 2 mL of full medium and added to the wells containing the transfection reagent mix. At 24 hours after transfection, the cells were analyzed by GFP expression to evaluate the transfection efficiency and harvested at different time points for Western Blot analysis.

Cell Lysis and Protein Extraction for Western Blot. Transfected cells were harvested with trypsin and centrifuged at 2000 rpm for 5 minutes. After washing with cold PBS 1×, the cell pellets were suspended in cold "2 steps lysis buffer" plus protease inhibitors (2 steps lysis buffer: 10 mM KCl, 20 mM Tris HCl pH 7.4, 10 mM $MgCl_2$, 20 mM EDTA, 10% glycerol, 0.8% TRITON), vortexed, sonicated, and incubated for 20 minutes on ice. The sonication program included two treatments: Peak Power 20.0—Duty Factor 40.0—Cycles Burst 50—Duration 15 seconds. The cell lysates were then incubated with 420 nM NaCl for 5 minutes for separation of proteins from the nucleic acids, and cleared by centrifugation at 15,000 rpm for 30 minutes at 4° C. After centrifugation, the pellet containing DNA and membranes was discarded, and the protein concentration of the supernatant was measured by NANODROP.

Immunoblotting. Cleared lysates from cells transfected as described above were mixed with loading buffer (10% beta-mercaptoethanol) and boiled for 8 minutes. The samples were loaded into NUPAGE Bis-Tris SDS protein gels and separated by running at 200V (MOPS 1×) for 40 minutes. The protein gel was then transferred to nitrocellulose membrane with NUPAGE Transfer Buffer plus 20% methanol, at 35 V (tank transfer). The membranes were blocked in 1% BSA for 1 hour and incubated with primary antibody at 4° C. After washing three times with PBS TWEEN 0.2%, the membranes were incubated with secondary antibody (1:10000 in 1% BSA) for 1 hour at room temperature and washed three times with PBS TWEEN 0.2%. The detection was performed with the ODYSSEY imaging system.

Figure 6A:
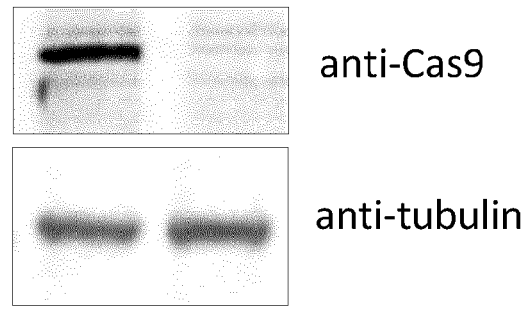
FIGS. 6A and 6B show Western blots (immunoblots) detecting the presence of Cas9 or FaDe-Cas9.
Figure 6B:
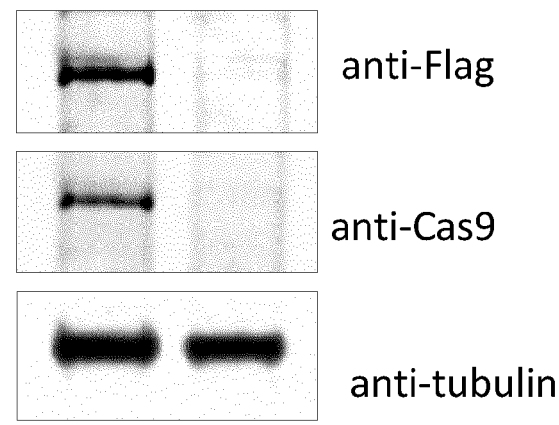
Figure 7A:
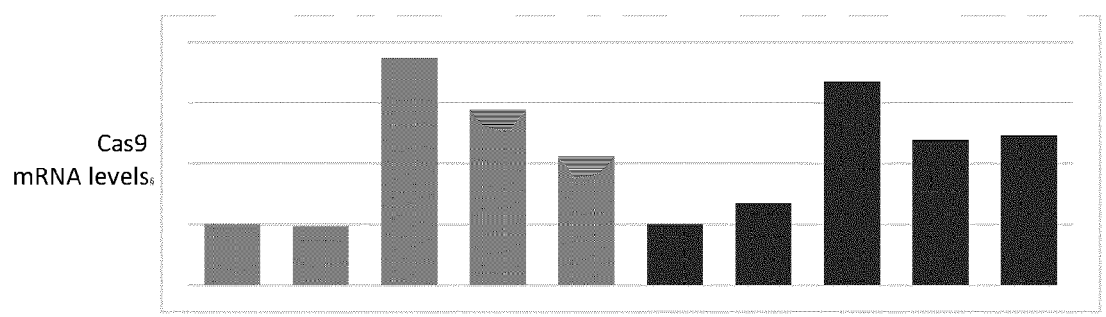
FIGS. 7A and 7B show expression over time of Cas9 or FaDe-Cas9. The Western blots in FIG. 7A show that wild-type Cas9 levels increase over time, but FaDe-Cas9 is not detected by a Cas9-specific antibody. Low exp: low exposure; high exp: high exposure; ctr: control (no Cas9).

Results are shown in FIGS. 6A, 6B and 7. Analysis of Cas9 vs. FaDe-Cas9 showed that expression of FaDe-Cas9 was below the detection levels of Western Blot (FIG. 6A). As shown in FIG. 6B, the mutation in Cas9 to generate FaDe-Cas9 does not impair Cas9 antibody specificity. As shown in FIG. 7A, FaDe-Cas9 showed very low expression in a short time window compared with Cas9. While Cas9 was detectable by anti-Cas9 at increasing levels from 8 hours until 72 hours after transfection, FaDe-Cas9 was not detected by anti-Cas9 even at 8 hours post-transfection.

Analysis of Protein Turnover by GFP-Fused Protein Expression. HEK293 cells, seeded at $7 \times 10^3$ cell density into a 96-well plate, were transfected with 100 ng of dual promoter-driven reporter vector encoding Cas9-GFP-Fused or FaDe-Cas9-GFP-Fused, and mCherry expressed under its own promoter. The transfection was performed with FUGENE HD transfection reagent. The plate was then placed in the INCUCYTE to monitor the in vivo levels of Cas9 and FaDe-Cas9 proteins by measuring the GFP fluorescence signal over the time. The mCherry fluorescence was analyzed to evaluate the transfection efficiency. See FIG. 8 for a schematic of the dual-reporter vector transfected into the cells for transfection efficiency evaluation.

Figure 10A:
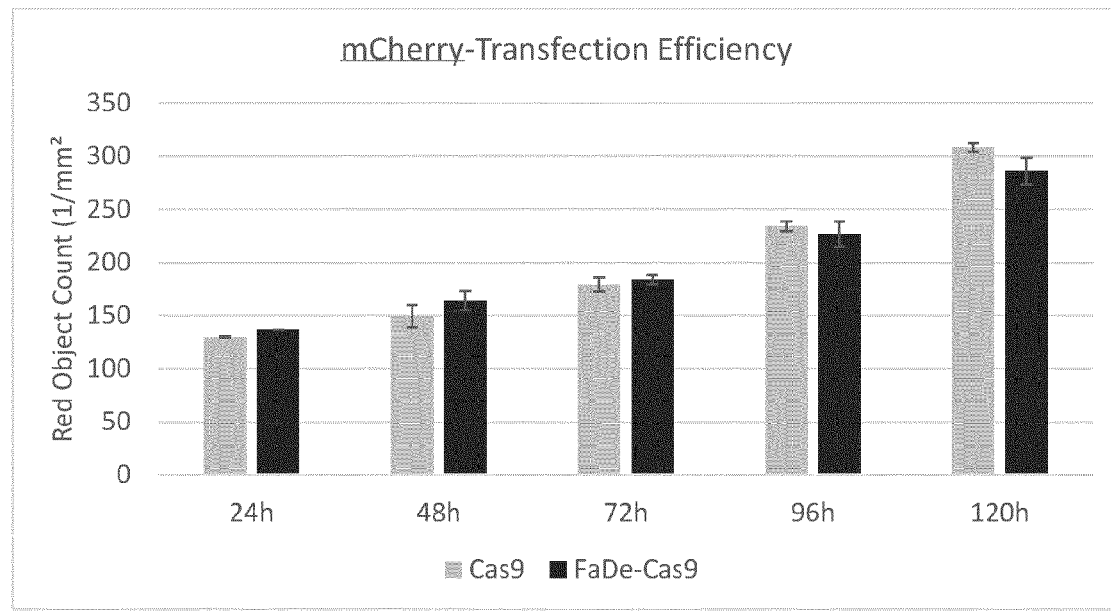
FIG. 10A shows the transfection efficiency of Cas9 and FaDe-Cas9, as measured by mCherry fluorescence.
Figure 10B:
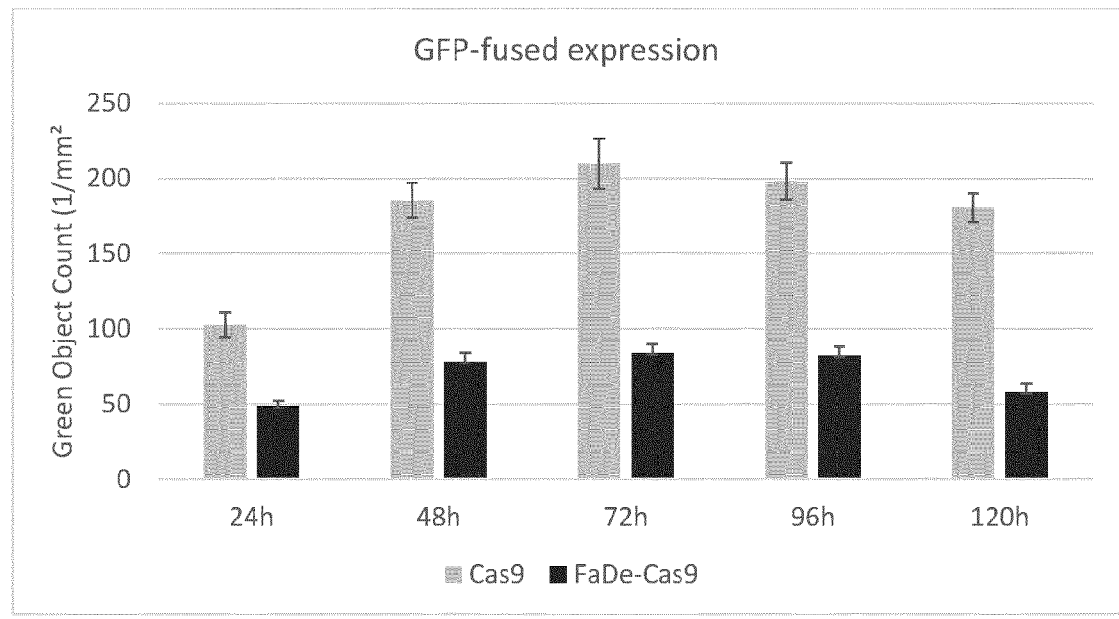
FIG. 10B shows the expression level of Cas9 and FaDe-Cas9, as measured by GFP fluorescence.
Figure 11A:
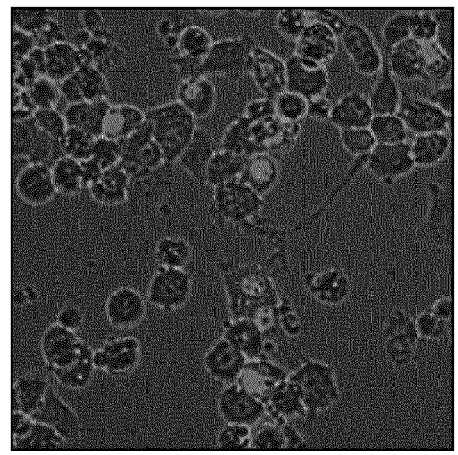
FIGS. 11A and 11B respectively show fluorescence microscopy images of Cas9-GFP and mCherry.
Figure 11B:
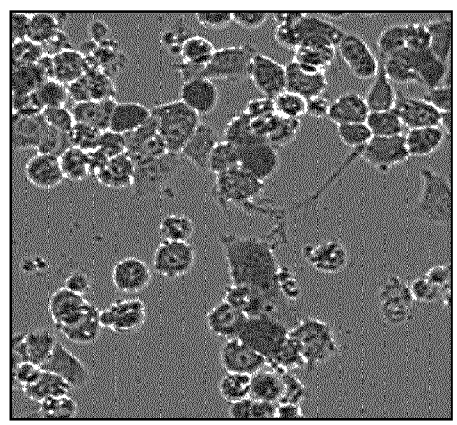
Figure 11C:
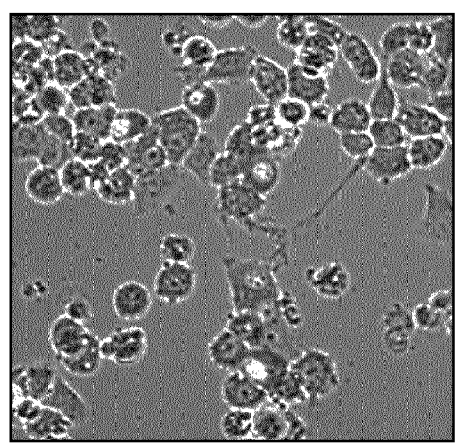
FIG. 11C shows a merge of FIGS. 11A and 11B, indicating that the same cells expressing GFP also express mCherry.
Figure 12:
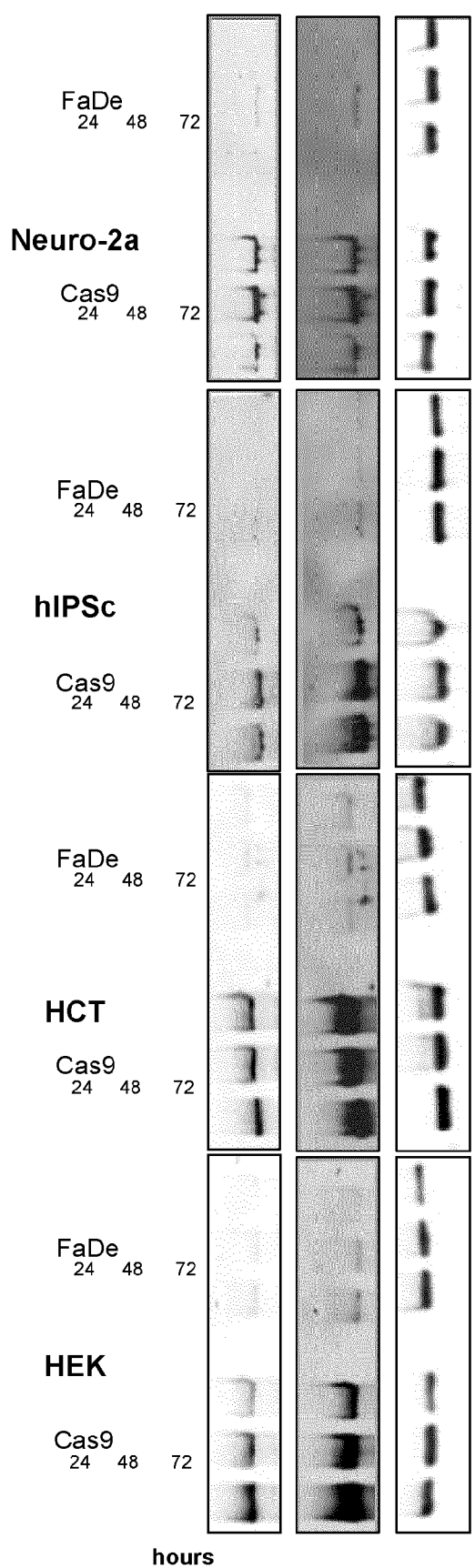

Results are shown in FIGS. 9 to 11. While transfection efficiency is comparable (as measured by mCherry fluorescence, FIG. 10A), FaDe-Cas9-GFP-Fused shows lower expression levels when compared with Cas9-GFP-Fused (as measured by GFP fluorescence, FIG. 10B). FIG. 12 shows the results of similar Cas9 and FaDe-Cas9 protein turnover experiments in HEK, HCT, hIPSc, and Neuro-2a cells, indicating that the high turnover of FaDe-Cas9 is independent of cell type.

Evaluation of mRNA Stability by Semiquantitative RT-PCR. RNA was isolated from SVHUC1 cells transfected with plasmid encoding Cas9 or FaDe-Cas9. Cell pellets, harvested at different time points, were suspended in 1 ml of TRIZOL. After 5 minutes at RT, 200 μL of chloroform was added followed by 3 minutes incubation at room temperature. The samples were centrifuged at 15,000 rpm at 4° C. for 15 minutes, and the aqueous phase (containing the RNA) was collected in a separated tube. The RNA was then precipitated by adding 500 μL of isopropanol to the aqueous phase, 10 minutes incubation at room temperature, and centrifugation at 15,000 rpm. The RNA was collected as a gel-like pellet in bottom, washed with 70% ethanol and dissolved in RNAse-free water. The RNA samples were treated with DNase in a 10 μL reaction containing 1 μg of RNA, 1× of DNase buffer, and 1 μL of DNase-plus ultra-pure water. The mix was incubated for 30 minutes at 37° C., and the RNA concentration was measured with NANO-DROP.

cDNA Synthesis. The reaction was carried out in a 20 μL reaction with 500 ng RNA, 1 L of Random Hexamer primer, 4 μL of 5× Reaction buffer, 1 μL of RIBOLOCK RNase Inhibitor (20 U/μL), 2 μL of 10 mM dNTP Mix, 1 μL of REVERTAID RT (200 U/μL) and nuclease-free water. The reaction was incubated for 60 minutes at 42° C. and terminated by heating at 70° C. for 5 minutes.

PCR. The PCR was carried out with 1 μL of Q5 Hot Start High-Fidelity 2× Master Mix in a 20 μL reaction volume: 0.5 μL forward and reverse primer (10 M), 1 μL cDNA, and water. Each reaction was run in triplicate. The PCR was performed as follows: denaturation at 95° C. for 1 minute, followed by 24 cycles of denaturation at 95° C. for 30 seconds, annealing at 58° C. for 30 seconds, extension at 72° C. for 30 seconds, and a final extension for 2 minutes.

Figure 7B:
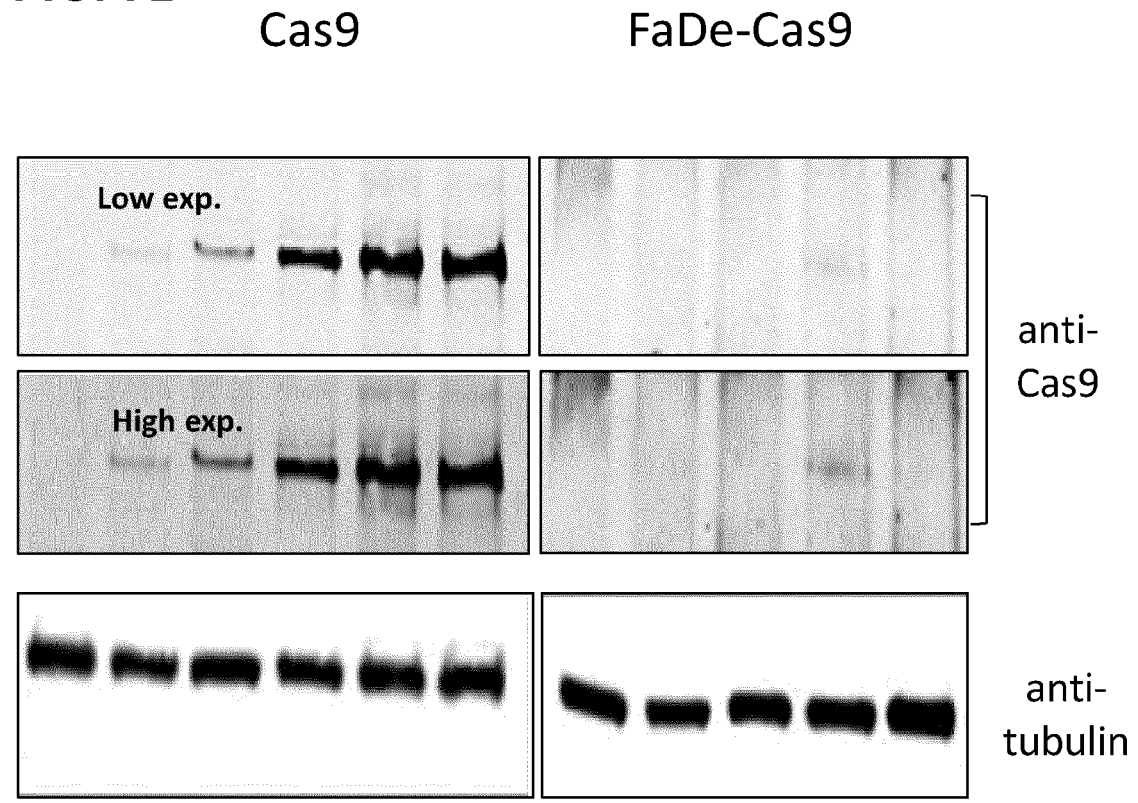

Results are shown in FIG. 7B and indicate similar mRNA transcript levels from Cas9 and FaDe-Cas9. These data confirm that transfection efficiency of Cas9 and FaDe-Cas9 were comparable.

Example 2. Evaluating the Role of CMA on Protein Turnover and Subcellular Location of FaDe-Cas9

Cas9-HSC70 Co-Immunoprecipitation. SV-HUC-1 cells seeded at 70% of confluency were transfected with plasmid encoding Cas9 or FaDe-Cas9. The cells were harvested 48 hours post transfection and lysed with CO—IP lysis buffer: 140 mM KCl, 3 mM $MgCl_2$, 0.5% NONIDET P-40, 20 mM HEPES pH 7.4, 1 mM EDTA, 1.5 mM EGTA, Protease inhibitors (EDTA-free Protease Inhibitor Cocktail). The cell pellets were suspended in cold, freshly-prepared lysis buffer and passed through a 25-gauge needle 5-6 times using a 1 mL syringe. The lysates were incubated on ice for 30 minutes and centrifuged for 20 minutes at 4° C. at 15,000 rpm. The cleared lysates were collected in new tubes and analyzed with NANODROP to measure protein concentration. Cas9 immunoprecipitation was performed on 800 μg of cleared lysate, diluted in lysis buffer, and incubated with Cas9 primary antibody (1:100) overnight at 4° C. The following day, the immunocomplexes were immobilized on 50 μL of Protein G SEPHAROSE beads on a tumbling wheel at 4° C. for 4 hours. The beads were then washed with CO—IP lysis buffer (3×), resuspended in 30 μL SDS sample buffer, boiled for 5 minutes, and subjected to Western Blot with HSC70 primary antibody (1:1000).

Figure 13A:
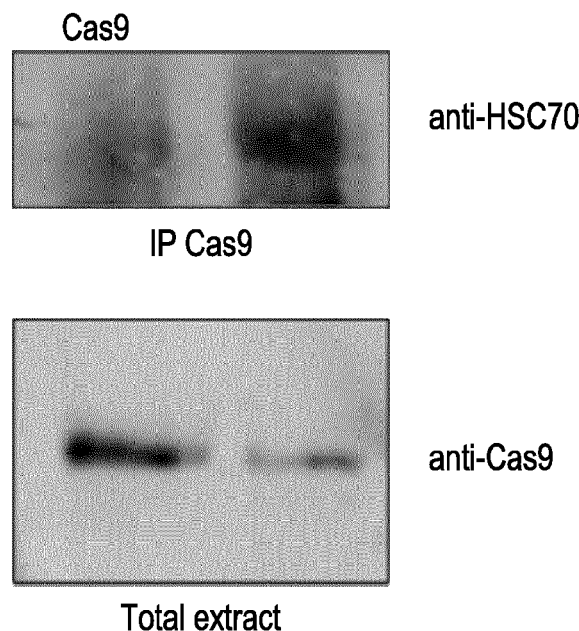
FIG. 13A shows a co-immunoprecipitation blot of Cas9 or FaDe-Cas9 with HSC70, as detected by an HSC70-specific antibody.
Figure 13A:
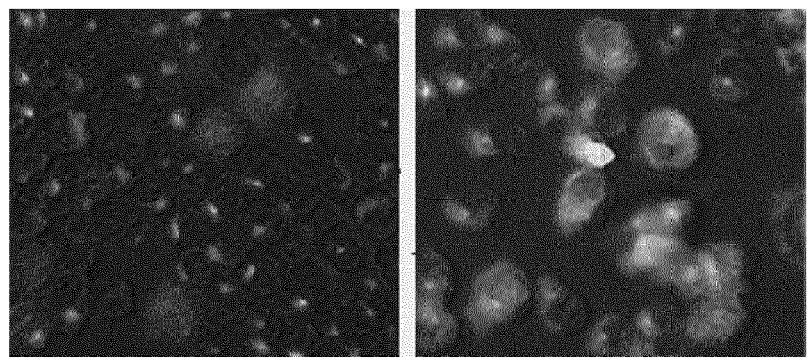

Results are shown in FIG. 13A. The co-immunoprecipitation showed that FaDe-Cas9, but not Cas9, interacts with the CMA chaperone HSC70. As shown by the anti-HSC70 blot, FaDe-Cas9, but not Cas9, was detected using the anti-HSC70 antibody.

Figure 14:
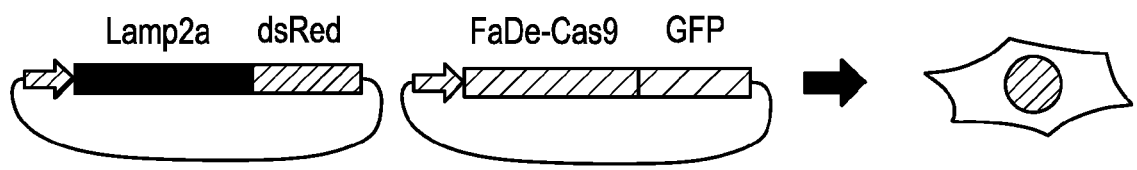

Colocalization of FaDe-Lamp2A. HEK293 cells, seeded at $7 \times 10^3$ cell density in a 96-wellplate, were co-transfected with 50 ng of Cas9-GFP-Fused or FaDe-Cas9-GFP-Fused and 30 ng Lamp2A-dsRed-Fused. The cells were analyzed by INCUCYTE zoom at 24 hours after transfection. See FIG. 14 for a schematic of the plasmids transfected into the cells.

Figure 15:
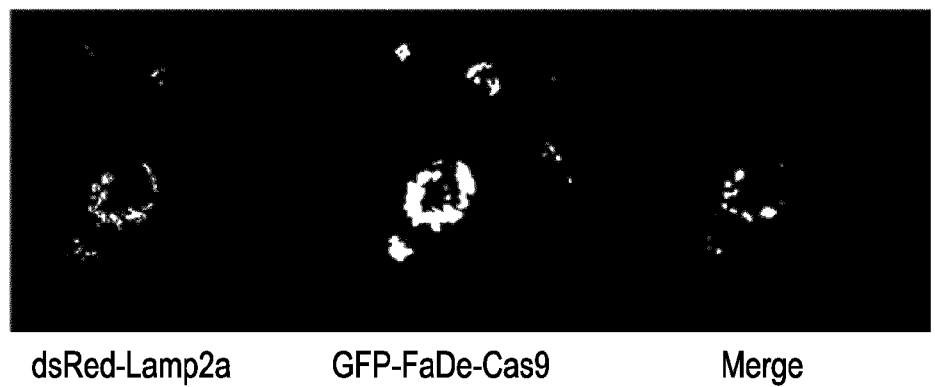

Results are shown in FIGS. 13B and 15. GFP-tagged Cas9 or FaDe-Cas9 exhibited green fluorescence while mCherry-tagged Lamp2A showed red fluorescence. Visualization of the immunofluorescence signal indicated that FaDe-Cas9 co-localized with the lysosomal protein and CMA regulator Lamp2A in the cytosol. Co-localization with Lamp2A suggests active degradation.

Subcellular Protein Fractionation. Cells were harvested with trypsin-EDTA and then centrifuged at 500×g for 5 minutes. The cell pellets were washed with ice-cold PBS and dried removing and discarding the supernatant. Ice-cold cell extraction buffer (CEB) containing protease inhibitors was added to the cell pellet for cytoplasmic extract and incubate at 4° C. for 10 minutes. The lysates were centrifuged at 500×g for 5 minutes. The supernatant (cytoplasmic extract) was then transferred to a clean pre-chilled tube on ice. Ice-cold membrane extraction buffer (MEB) containing protease inhibitors was added to the pellet to extract the membranes and incubated at 4° C. for 10 minutes followed by centrifugation at 3000×g for 5 minutes. For nuclear extraction, ice-cold nuclear extraction buffer (NEB) containing protease inhibitors plus 5 μL of 100 mM $CaCl_2$) and 3 μL of Micrococcal Nuclease (300 units) per 100 μL was added to the pellet and incubated at 4° C. for 10 minutes and at room temperature for 5 minutes. The lysates were then cleared by centrifugation at 15,000 rpm at 4° C. for 10 minutes. Protein extract from each cellular compartment was measured to quantify the protein concentration and separated on NUPAGE Bis-Tris SDS protein gels.

Figure 16:
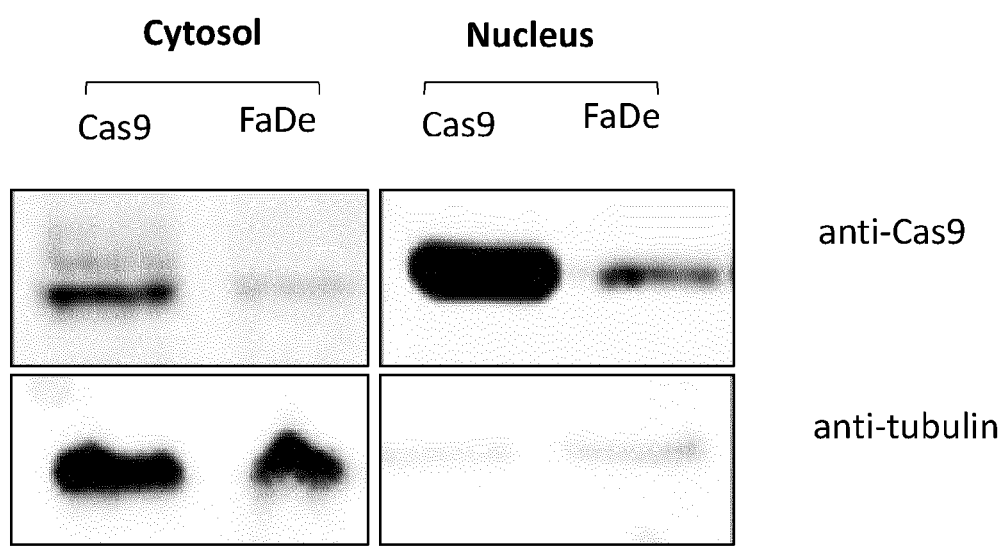

Results of the subcellular localization of Cas9 and FaDe-Cas9, 48 hours after transfection, are shown in FIG. 16. Cas9 and FaDe-Cas9 were found in the same subcellular locations, indicating that the F185N mutation in FaDe-Cas9 did not affect compartmentalization.

Example 3. Analysis of Enzymatic Activity, On-Target and Off-Target Indels

Genomic DNA Extraction. Genomic DNA extraction was performed using the Gentra Puregene Kit. Cell pellets were suspended in 300 μL of lysis buffer and after adding protein precipitation buffer (100 μL) were incubated for 5 minutes on ice. The lysate was then centrifugated at 14,000 rpm for 10 minutes; the supernatant was mixed with 300 μL of isopropanol for DNA precipitation followed by centrifugation at 14,000 rpm for 10 minutes. The DNA pellets were washed with 100 µL 70% ethanol and suspended in 30 µL of water. The DNA concentration was measured with NANODROP.

Surveyor Nuclease Assay. PCR: PCR was performed in 20 µL of total volume with 100 ng of gDNA and 10 µL of 2× Master Mix (PHUSION Flash High-Fidelity PCR) plus 1 µL of forward and reverse primers (10 M). The PCR was performed as follows: denaturation at 95° C. for 3 minutes, followed by 35 cycles of denaturation at 95° C. for 5 seconds, annealing at 58° C. for 30 seconds, and extension at 72° C. (1 min/1,000 bps), and a final extension for 5 minutes.

Digestion: The PCR products were denatured by heating at 99° C. for 5 minutes followed by re-annealing for heteroduplexes formation by cooling down to 65° C. for 30 minutes and to 23° C. for 30 minutes.

Hybridized heteroduplexes or homoduplexes were treated with Surveyor nuclease (also known as CEL nuclease) which recognizes mismatches present in heteroduplex DNA and cleaves both strands on the 3' side of the mismatch distortion. Thus, 20 µL of unpurified PCR products (~250 ng) in a reaction volume of 50 µL were digested with 1 µL of surveyor enzyme+1 µL enhancer at 42° C. for 20 minutes. 10 µL of treated DNA were then separated by electrophoresis on 10% acrylamide gel for 40 minutes.

Figure 17A:
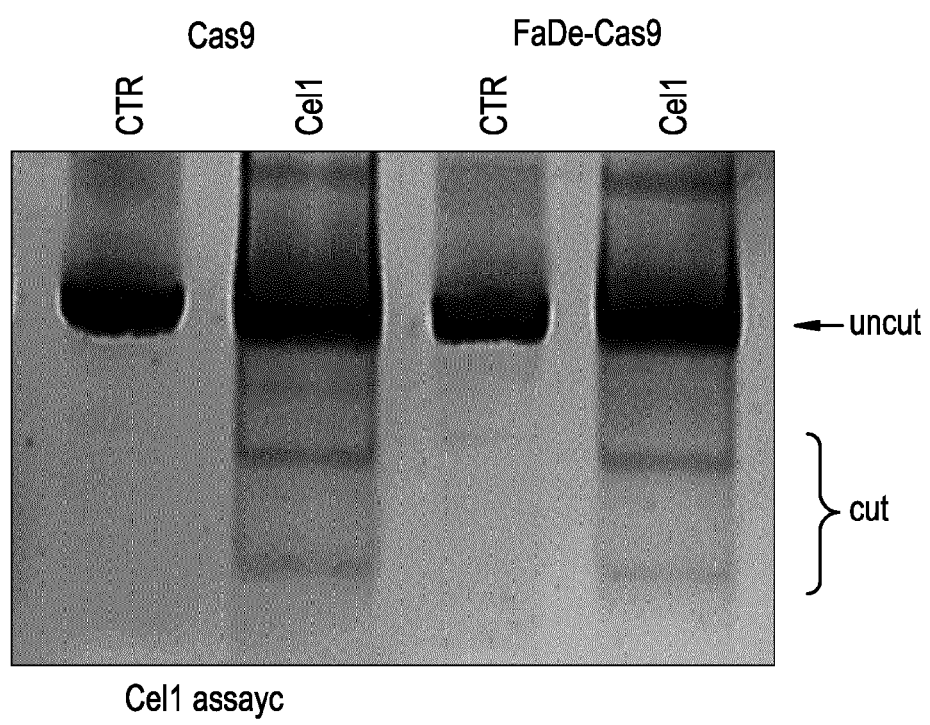
FIG. 17A shows the results of a Surveyor nuclease assay (Cell assay) testing Cas9 and FaDe-Cas9 nuclease activity in HEK cells.
Figure 17B:
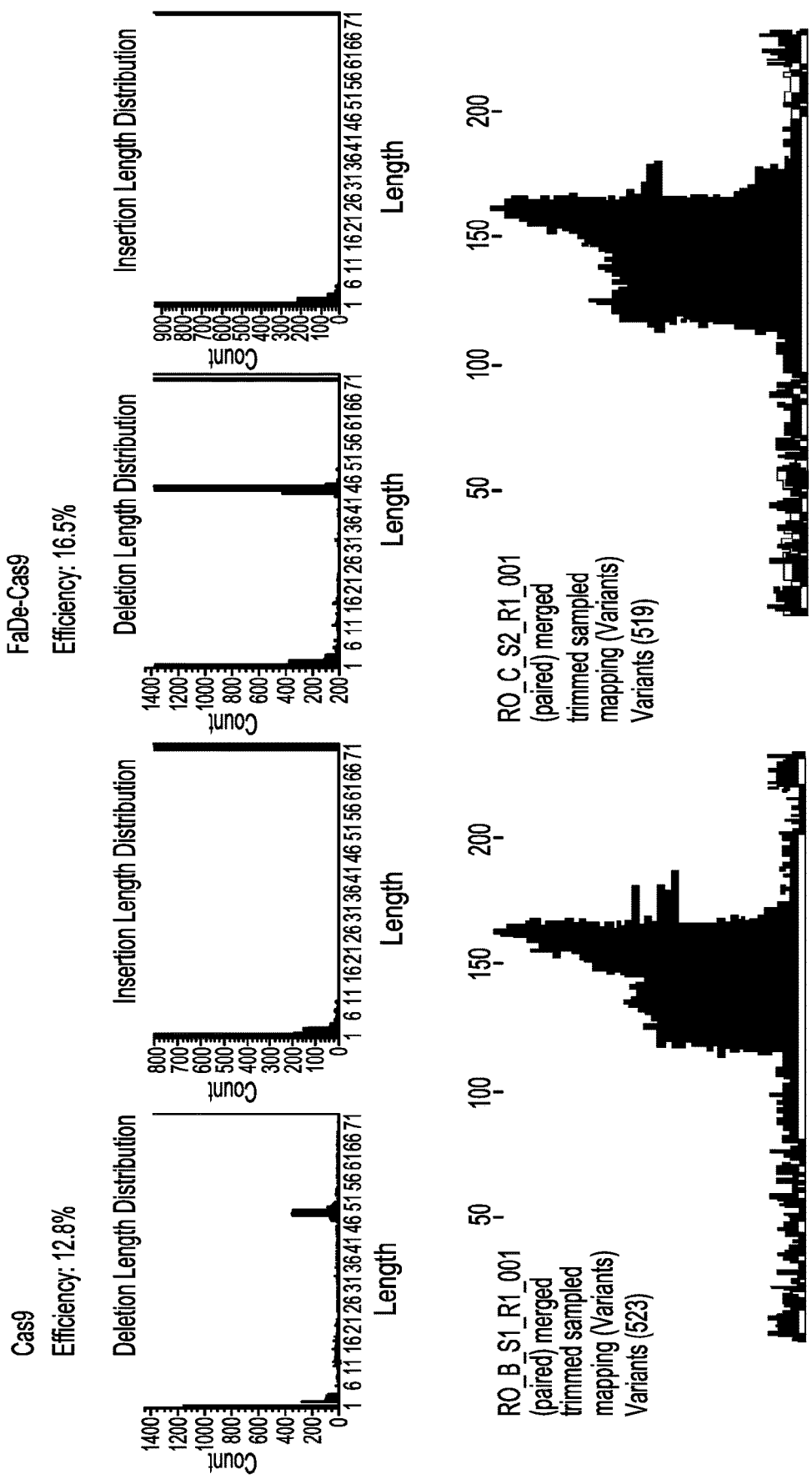
FIG. 17B shows next-generation sequencing results indicating the nuclease efficiency of Cas9 and FaDe-Cas9.
Figure 18:
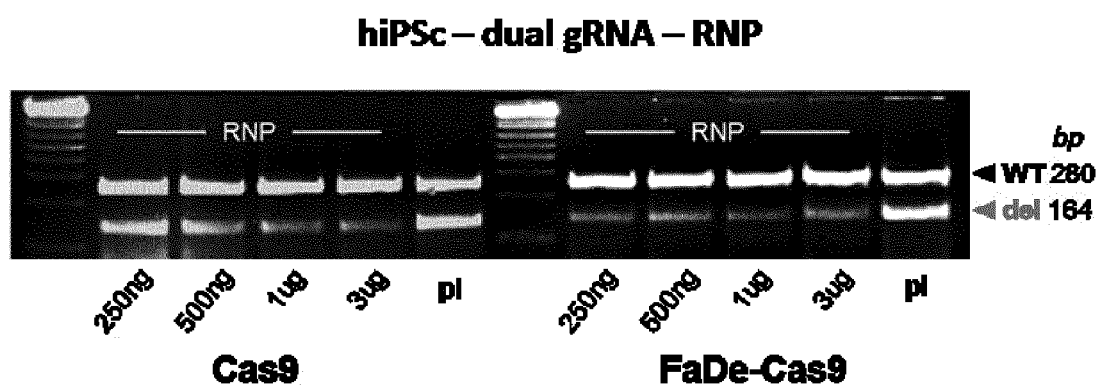

Results of the assay to determine nuclease efficiency of Cas9 and FaDe-Cas9 in HEK cells are shown in FIG. 17A. As indicated by the gel bands showing "cut" DNA, Cas9 and FaDe-Cas9 nuclease activity were comparable. Next-generation sequencing analysis, shown in FIG. 17B, confirmed comparable nuclease efficiency for Cas9 (12.8%) and FaDe-Cas9 (16.5%). FIG. 18 shows that FaDe-Cas9 had comparable levels of nuclease activity as Cas9 in hiPSCs.

EMX1/FANCF1 Off-Target Analysis. HEK293 cells were plated into a 12-well plate at 60×10⁴ density and co-transfected with 800 ng of plasmids encoding Cas9 or FaDe-Cas9 and 200 ng of plasmids encoding gRNA (EMX1 or FANCF1). The transfection was performed using FUGENE HD transfection reagent. The cells were harvested at 72 hours post transfection and lysed for genomic DNA extraction. The PCR amplification of the On-target and Off-target regions was performed with 100 ng of gDNA, 1 of PHUSION FLASH High-Fidelity PCR Master Mix, and forward and reverse primers fused to adaptors designed according to manufacturer's recommendations from Illumina. The PCR was performed as follows: denaturation at 95° C. for 1 minute, followed by 30 cycles of denaturation at 95° C. for 30 seconds, annealing at 58° C. for 30 seconds, and extension at 72° C. for 30 seconds, and a final extension for 2 minutes. The PCR products were purified and analyzed by next-generation sequencing.

Figure 19:
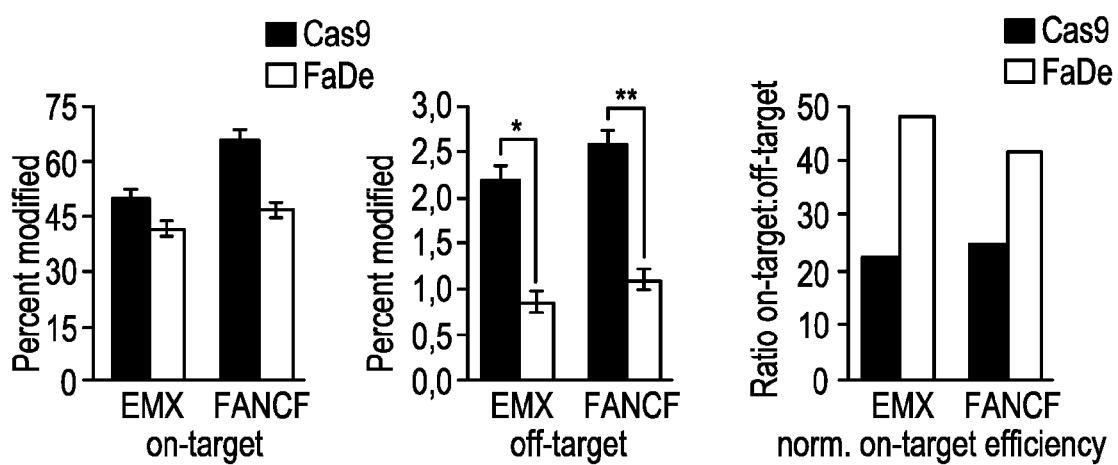
Figure 20A:
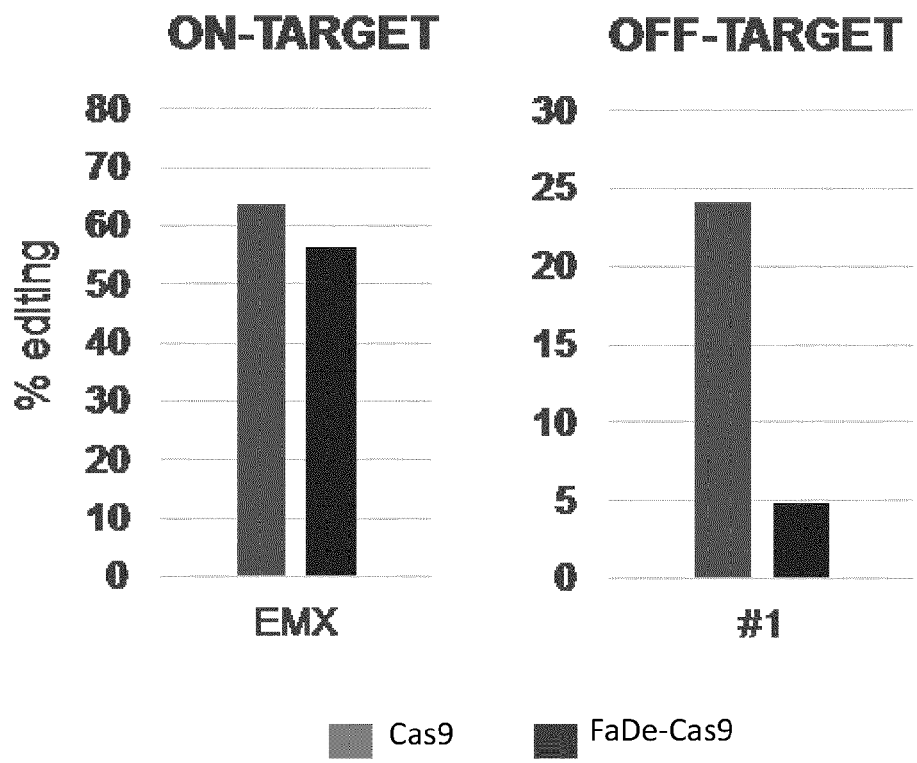
FIG. 20A represents data showing that FaDe-Cas9 has comparable on-target efficiency and reduced off-target activity compared with Cas9.
Figure 20B:
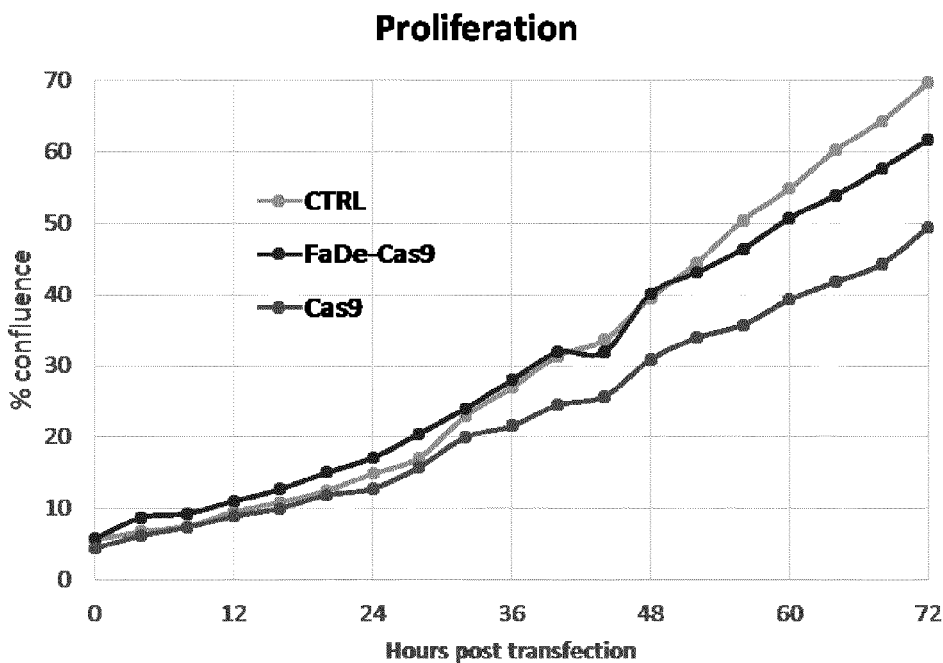
FIG. 20B shows that cells transfected with Cas9 have reduced proliferation rate compared with FaDe-Cas9 and non-transfected cells.
Figure 21:
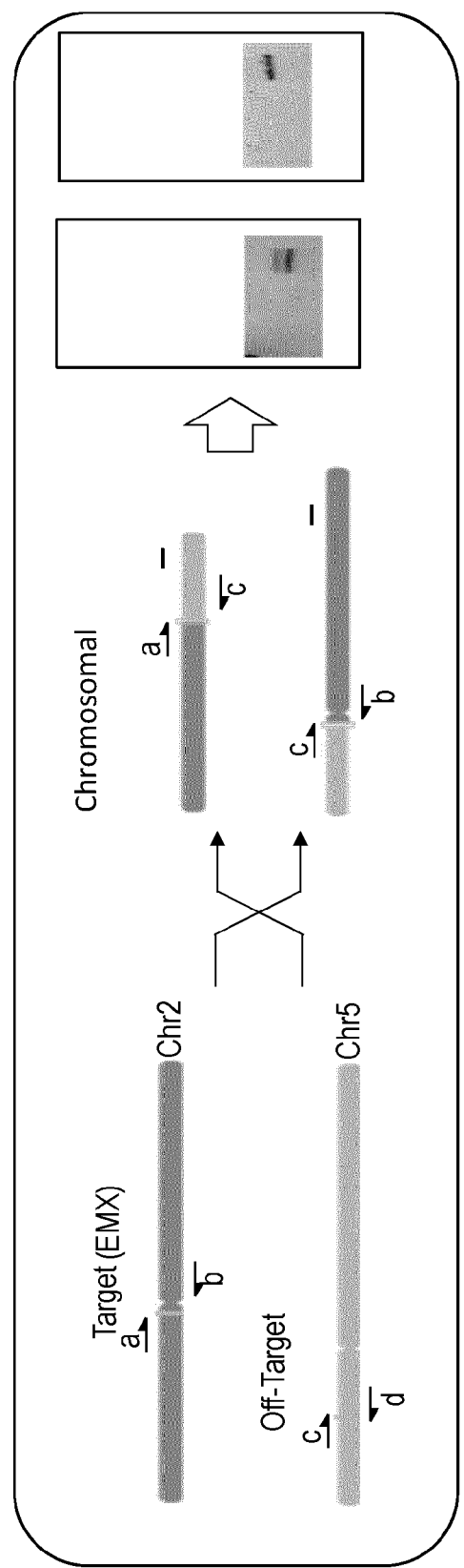
FIG. 21 shows that cells edited with FaDe-Cas9 results in decreased chromosomal translocations compared with Cas9.
Figure 23A:
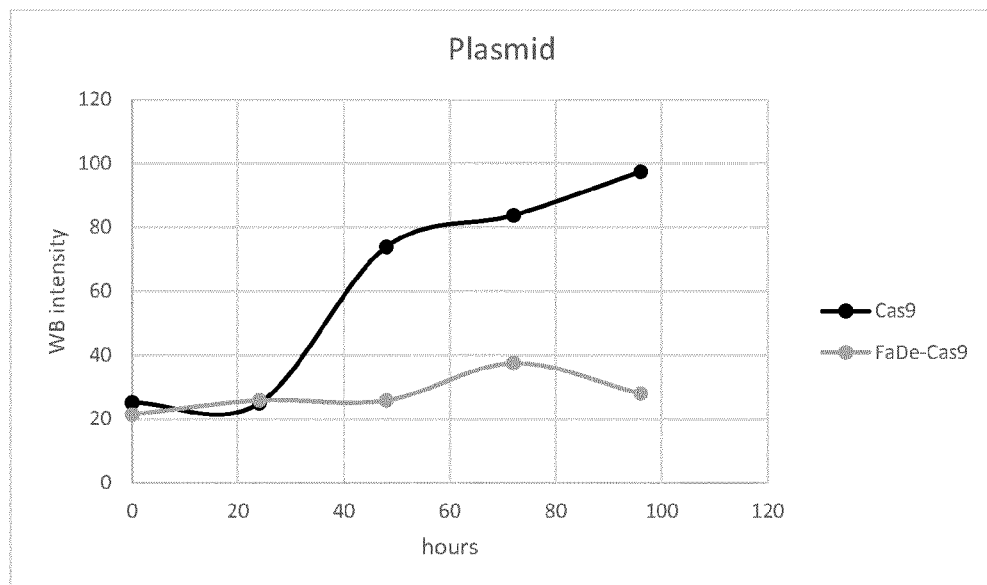
FIGS. 23A and 23B show the quantification of Western blots for Cas9 of cells transfected with Cas9 or FaDe-Cas9 at time points from 0 to 100 hours (FIG. 23A), and a close-up of time points from 0 to 24 hours (FIG. 23B).
Figure 23B:
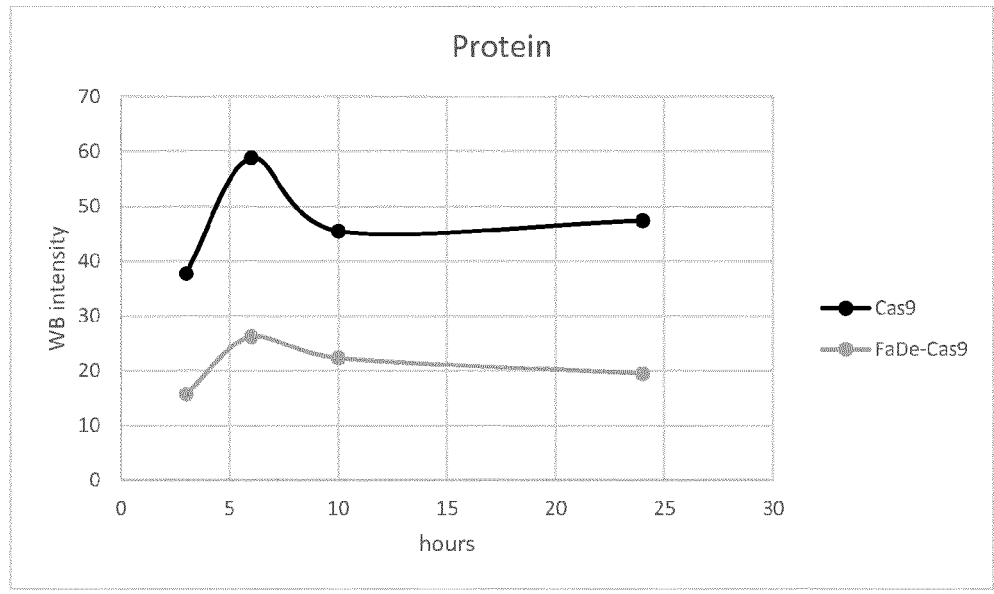

Results are shown in FIG. 19. While FaDe-Cas9 had slightly lower on-target modification compared with Cas9, the off-target modifications of FaDe-Cas9 were significantly reduced compared with Cas9. Thus, FaDe-Cas9 showed an increased efficiency of normalized on-target modifications over Cas9.

Ribonucleoprotein (RNP) Electroporation. Pre-complexing of Cas9/RNP: In a 1.5 mL tube, 100 pmol of Cas9 or FaDe-Cas9 were mixed with 120 pmol of synthetic dual-gRNA in 10 µL of 1× Cas9 buffer and incubated for 20 minutes at room temperature. HEK293 cells at 20×10⁴ density were suspended in 20 µL of electroporation buffer SF and incubated for two minutes with the RNP complexes. Cells were electroporated using a 4D NUCLEOFECTOR (Lonza). After nucleofection, the cells were plated in 12-well plate with 1 mL of full media (DMEM) and harvested at different time points (3 hours; 6 hours; 10 hours; 24 hours).

RNP Transfection. Human iPSCs were plated at 20×10⁴ density and transfected with increasing concentration of Cas9 or FaDe-Cas9 and 3 M of dual-gRNAs. The transfection was performed with Lipofectamine CRISPRMAX transfection reagent. The cells were lysed for genomic DNA extraction at 48 hours post infection, and the deletion was confirmed by PCR.

Example 4. Effects of Cas9 Expression on Cells

Example 4.1

Human urothelial cells (SVHUC-1) were transfected with wild-type Cas9. Cell clones containing Cas9 were confirmed by ddPCR (FIG. 1A, top panel). Four weeks after Cas9 stable cell line generation, cells were proliferated and counted at 24, 48, and 72 hours. Cell counts from wild-type cells (no Cas9), clone 1 (heterozygous Cas9 integration), and clone 3 (homozygous Cas9 integration) showed a decreasing trend (FIG. 1A, bottom panel).

Example 4.2

Figure 1B:
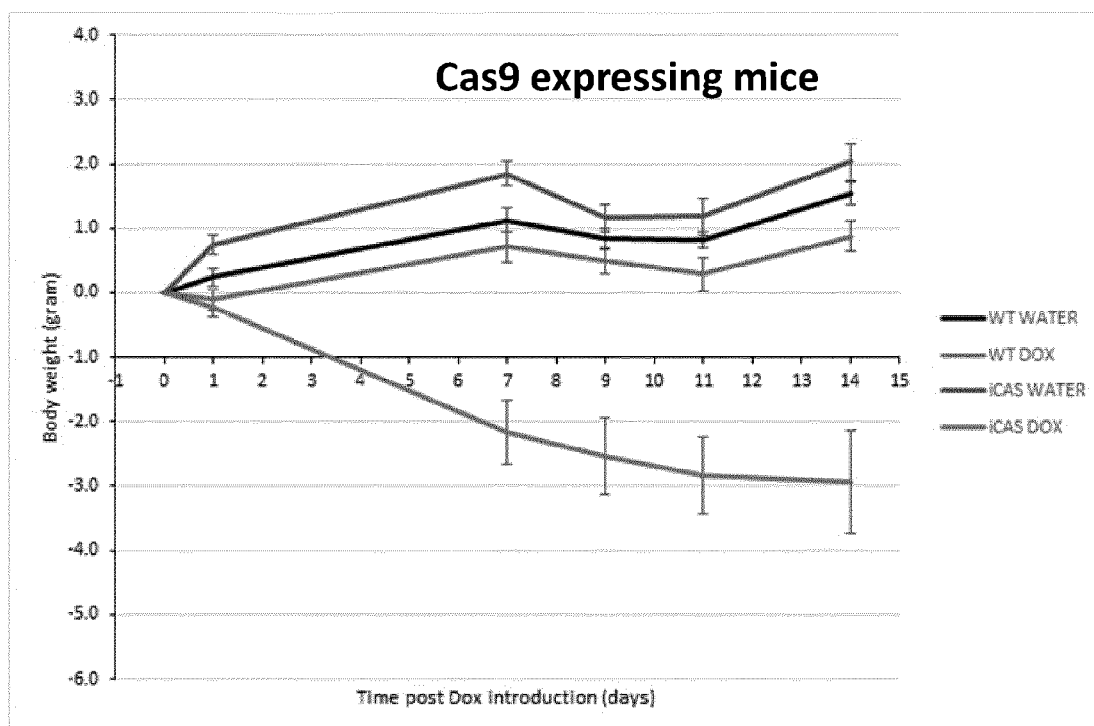
FIG. 1B shows that body weight of mice expressing Cas9 decreases upon induction of Cas9 expression.

Mice were transfected with wild-type Cas9 on a doxycycline-inducible promoter. Body weight of the mice was measured after induction ("iCas dox") and compared with wild-type mice ("WT water"), wild-type mice with doxycycline ("WT dox"), and mice transfected with, but not expressing Cas9 ("iCas water"). Results in FIG. 1B show that mice transfected with and expressing wild-type Cas9 exhibit body weight loss compared with mice not expressing the Cas9.

Example 4.3

Figure 2:
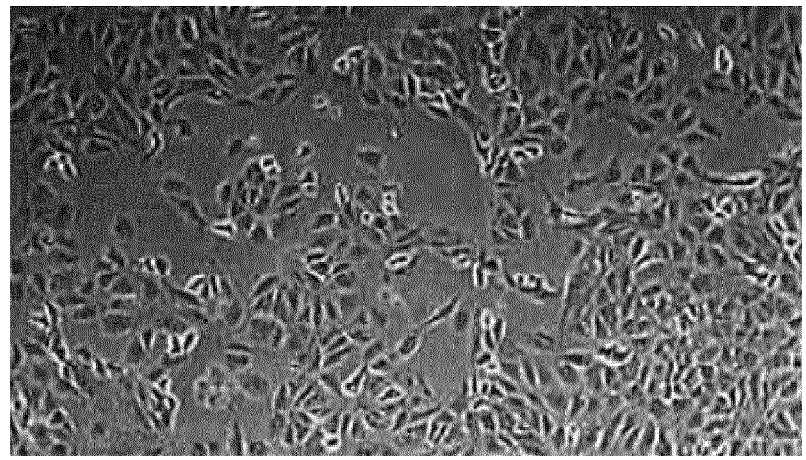
Figure 2:
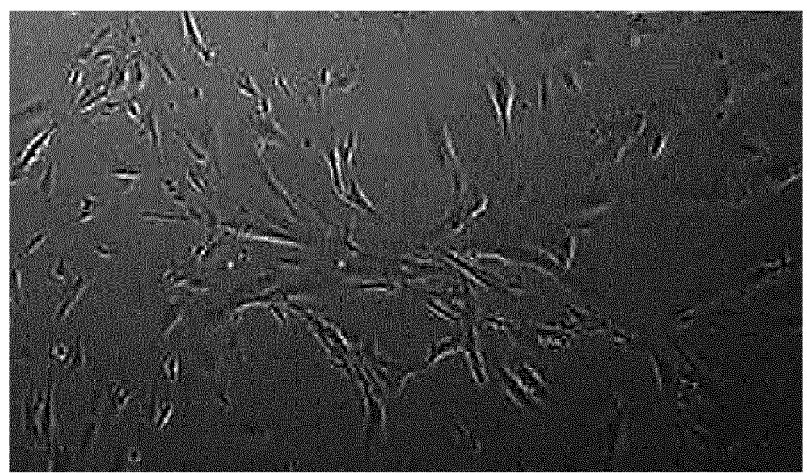

Human induced pluripotent stem cells (hiPSCs) were transiently transfected with wild-type Cas9. Microscopy images of the cells were taken five weeks after Cas9 transient expression. As shown in FIG. 2, hiPSCs lose their undifferentiated phenotype when transiently expressing Cas9.

Example 5. Cas9 vs FaDe-Cas9-Analysis of Protein Turnover

Example 5.1 Cas9 and FaDe-Cas9 Intracellular Protein Levels Measured by ELISA Assay HEK293 cells at 20×10⁴ density were suspended in 20 ul of electroporation buffer SF and incubated for two minutes with the RNP complexes. Cells were electroporated using a 4D nucleofector (4D-Nucleofector Core Unit: Lonza, AAF-1002B; 4D-Nucleofector X Unit: AAF-1002X; Lonza). After nucleofection, the cells were plated in 12 well plate with 1 ml of full media (DMEM) and harvested at 24 h. The cells were lysed and the protein levels analysed by commercial kit ELISA assay (Cell Biolabs) following instructions manual: Cell or Tissue Lysate were sonicated or homogenized in Lysis Buffer such as RIPA buffer (25 mM Tris·HCl pH 7.6, 150 mM NaCl, 1% NP-40, 1% sodium deoxycholate, 0.1% SDS) and centrifuged at 10,000×g for 10 minutes at 4° C. prior to assay.

Figure 24A:
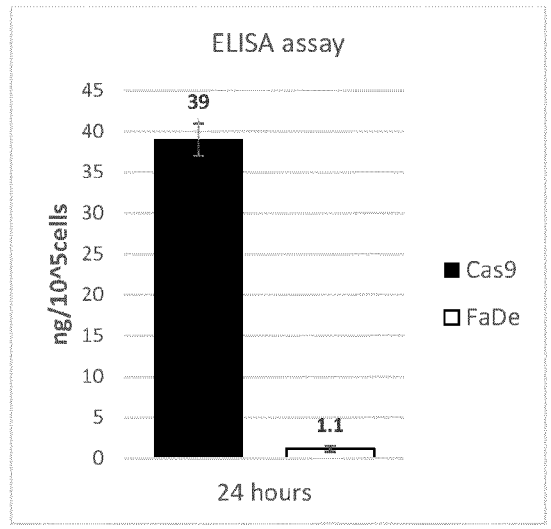
FIG. 24A shows ELISA-based quantification of extracellular Cas9 comparing wild-type Cas9 and FaDe-Cas9 at 24 hours, reported as ng per 1045 cells

Results are shown in FIG. 24A. At RNP electroporation of 7.5 ug/10^5 cells ~5% intracellular Cas9 was recovered at 24 h compared to <0.1% FaDe-Cas9. FaDe-Cas9 was >97% less abundant in the cells at 24 h post electroporation.

Example 5.2 Measurement of Protein Turnover and Degradation

HEK 293 cells were transfected at $30 \times 10^4$ density with GFP fused Cas9 or FaDe-Cas9 and the GFP expression analyzed over the time by the incucyte.

At 12 hours post-transfection the cells were treated with CHX (10 ug/ml) to inhibit the protein synthesis and the degradation protein of Cas9 vs FaDe-Cas9 was measured following GFP signal in comparison to the untreated cells.

Figure 24B:
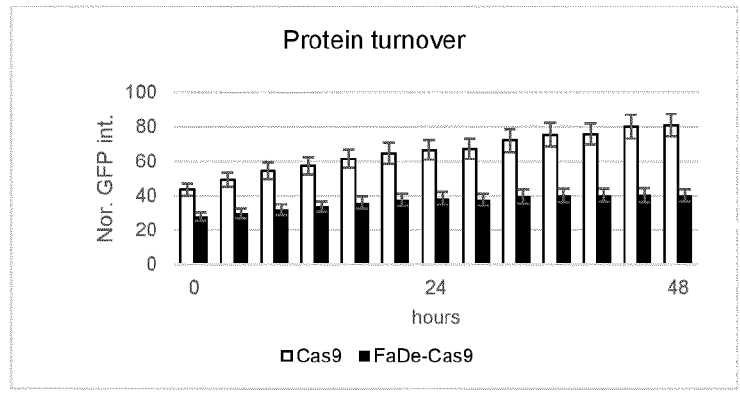
FIG. 24B shows normalized GFP fluorescence over time (0-48 hours) from Cas9-GFP and FaDe-Cas9-GFP fusion constructs, indicating relative protein turnover.
Figure 24C:
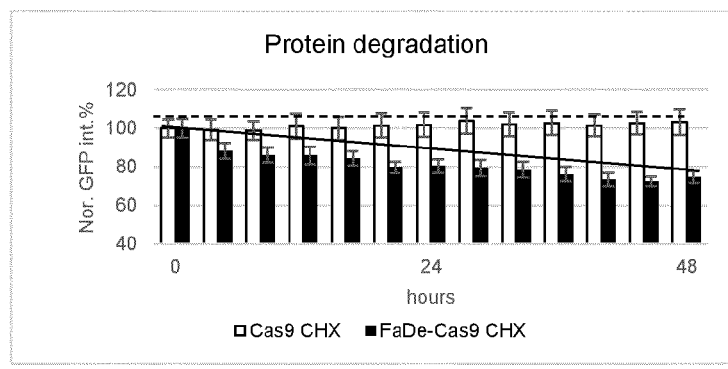
FIG. 24C shows normalized GFP fluorescence over time (0-48 hours) following cycloheximide (CHX) treatment, comparing degradation kinetics of Cas9-GFP and FaDe-Cas9-GFP.

By GFP expression, FaDe-Cas9 was less abundant and never reached the intracellular protein levels observed with Cas9 (FIG. 24B). The cells exposed to the protein translation-inhibitor cycloheximide (CHX) showed a time dependent decrease of FaDe-Cas9 level, in contrast Cas9 protein level remained constant over the time (FIG. 24C).

Example 6. Role of CMA on the High Protein Turnover of FaDe-Cas9 and Protein Subcellular Localization

Example 6.1. Lamp2A Knockdown

HEK293 cells at $7 \times 10^3$ density were co-transfected with GFP fused expression vectors Cas9 or FaDe-Cas9 plus Ds-Red lamp2a vector (2:1), plus gRNA (3:1) and increasing doses of siRNA (10-20-40-60-90-100 ng) using RNAiMAX transfection reagent and OPTIMEM. As a control, HEK293 cells were co-transfected with scrambled siRNA. The transfected cells were monitored at the incucyte zoom over time to analyze the KD lamp2a efficiency and protein accumulation by GFP signal.

Figure 25A:
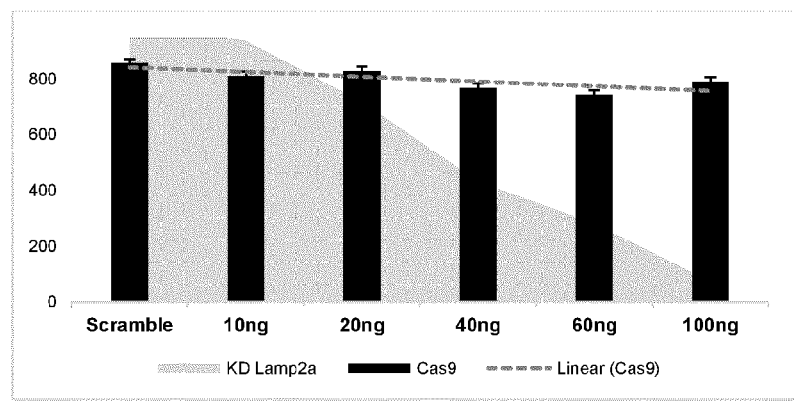
FIG. 25A shows ELISA-measured Cas9 levels under scramble control and Lamp-2A knockdown across siRNA dosages (10-100 ng), illustrating the effect of Lamp-2A reduction on Cas9 clearance.
Figure 25B:
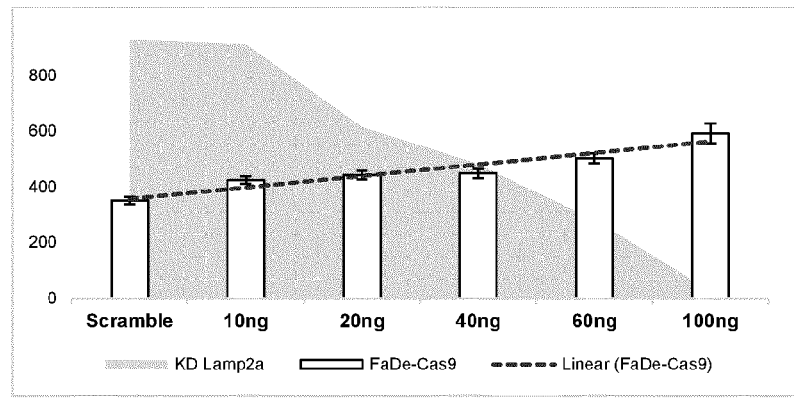
FIG. 25B shows ELISA-measured FaDe-Cas9 levels under scramble control and Lamp-2A knockdown across siRNA dosages (10-100 ng), indicating attenuation of FaDe-Cas9degradation upon Lamp-2A reduction.

To inhibit the CMA the expression of the lysosomal receptor Lampa2a was lowered by siRNA. The siRNA transfection resulted in a dose-dependent reduction of the Lamp2a receptor (FIG. 25A/B) but while the protein levels of Cas9 were unaltered (FIG. 25A), FaDe-Cas9 showed a dose dependent accumulation indicating that its degradation is CMA dependent (FIG. 25B).

Example 6.2 Cas9-HSC70-Co-Immunoprecipitation

HEK293s cells (50 million) were electroporated with 20 ug of flag tag fused Cas9 of FaDe-Cas9 using MaxCyte. At 24 hours post electroporation, the cells were treated with 100 uM of Leupeptin (cathepsin B inhibitor) to temporally inhibit the degradation by lysosomes. The cells were harvested 48 hours post electroporation and lysed with CO—IP lysis buffer: KCl 140 mM, 3 mM MgCl2, 0.5% Nonidet P-40, 20 mM Hepes pH 7.4, 1 mM EDTA, 1.5 mM EGTA, Protease inhibitors (EDTA-free Protease Inhibitor Cocktail-Sigma). The cell pellets were suspended in cold and fresh papered lysis buffer and passed through a 25 Ga needle 5-6 times using a 1 ml syringe. The lysates were incubated on ice for 30 minutes and centrifuged for 20 minutes at 4° C. at 15,000. The cleared lysates were collected in new tubes and analyzed with Nanodrop to measure protein concentration. Cas9 immunoprecipitation was performed on 800 ug of cleared lysates, diluted in lysis buffer and incubated with flag primary antibody (Anti-FLAG F7425 SIGMA 1:500) overnight at 4° C. The day after, the immunocomplexes were immobilized on protein G-Sepharose beads (50 ul) on a tumbling wheel at 4° C. for 4 hours. The beads were washed with CO—IP lysis buffer (3×), resuspended in SDS sample buffer (30 ul) and boiled for 5 min and subjected to Western Blot with Cas9 and HSC70 primary antibodies (1:1000). 30 ug of lystes were used as INPUT to confirm the total amount of protein.

Figure 26:
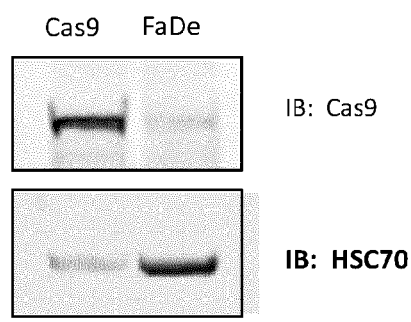
FIG. 26 shows immunoblot analyses of Cas9 and HSC70 following co- immunoprecipitation in cells expressing Cas9 or FaDe-Cas9, demonstrating interaction consistent with chaperone-mediated autophagy targeting.

The Immunoprecipitation showed that FaDe-Cas9 has a high affinity binding to the master regulator of chaperone-mediated autophagy HSC70. Results are shown in FIG. 26.

Example 7. Cas9 vs. FaDe-Cas9 In Vivo Mouse Model

Example 7.1 Adenoviral Constructs

Adenoviruses that express Cas9 or FaDe-Cas9 and gRNAs (Ad-Cas9-gMH and Ad-Cas9-gP and Ad-FaDe-Cas9-gMH and Ad-FaDe-Cas9-gP) were generated by Vector Biolabs (Malvern). The Adv Cas9/FaDe and gRNAs were expressed from chicken β-actin hybrid (CBh) and U6 promoters, respectively, in a replication-deficient adenoviral-serotype 5 (dE1/E3) backbone. A negative control adenovirus (Ad-Cas9-GFP and Ad-FaDe-Cas9-GFP) that expresses Cas9 and GFP from the CBh and CMV promoters, respectively, but no gRNA was also generated.

Example 7.2 In Vivo ON/OFF Target Analysis

Figures 27A, 27B:
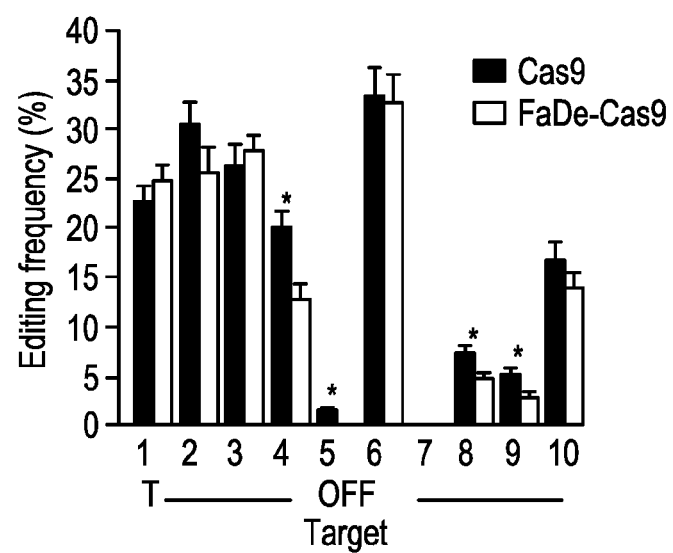
FIG. 27A shows sequences of a promiscuous guide RNA targeting the mouse PCSK9locus selected for a high likelihood of inducing multiple off-target mutations across the mouse genome.
FIG. 27B shows indel analysis from liver genomic DNA collected at day 7 post adenoviral treatment: off-targets were identified by CIRCLE-seg (sites with read counts >50% of on-target plus lower-ranked sites with up to 6 mismatches) followed by targeted deep sequencing, demonstrating that four out of nine off-target sites exhibited significantly reduced editing by FaDe-Cas9 compared to Cas9 while maintaining on-target activity.

For in vivo off-target editing analysis, (gP) a promiscuous guide RNA targeting mouse PCSK9 locus selected for its high likelihood of inducing multiple off-target mutations mouse genome (FIG. 27A).

Nine- to eleven-week-old male mice received a tail vein injection with a dose of $1 \times 10^9$ infection units (IFU) of adenovirus (Ad-Cas9-gp or Ad-FaDe-Cas9-gp, or Ad-Cas9-GFP or Ad-FaDe-Cas9-GFP) in 200 µl diluted with phosphate-buffered saline. Peripheral blood was sampled before virus administration (baseline), a week after virus administration and at termination (four days or three weeks after virus administration).

Genomic DNA from liver tissue of adenovirus-injected mice was extracted at day 7 post-treatment for indel analysis. The off-targets were identified by CIRCLE-seq by selecting sites with read counts above 50% of the on-target and a variety of lower-ranked sites (containing up to 6 mismatches relative to the on-target) for targeted deep sequencing. The assessment of the gene editing frequencies at on-target+9 off-target sites of gP in mouse model showed that out of nine, four different off-targets sites showed significantly reduced gene editing by FaDe-Cas9 compared to Cas9 (FIG. 27B).

Example 7.3 Next Generation Sequencing (NGS)

PCR products were purified using magnetic beads, quantified using a QuantiFlor dsDNA System kit (Promega), normalized to 10 ng/l per amplicon and pooled. Pooled samples were end-repaired and A-tailed using an End Prep Enzyme Mix and reaction buffer from NEBNext Ultra II DNA Library Prep Kit for Illumina, and ligated to Illumina TruSeq adapters using a ligation master mix and ligation enhancer from the same kit. Library samples were then purified with magnetic beads, size-selected using PEG/NaCl SPRI solution (KAPA Biosystems), quantified using droplet digital PCR (BioRad) and loaded onto an Illumina MiSeq for deep sequencing.

Example 7.4 In Vivo Genome Editing and Viability Assessment

For in vivo Pcsk9 gene editing, nine- to eleven-week-old Humanized PCSK9 mice (PCSK9KIKO) harbouring a single allele of either mouse or human PSCK9 received a tail vein injection with a dose of 1×109 infection units (IFU) of adenovirus (Ad-Cas9-gMH or Ad-FaDe-Cas9-gMH and Ad-Cas9-GFP or Ad-FaDe-Cas9-GFP) in 200 l diluted with phosphate-buffered saline. Genomic DNA from liver tissue of adenovirus-injected mice was extracted at day 7 post-treatment for indel analysis on respectively human and mouse PCSK9 locus by NGS. Liver lobes were included in paraffin block and stained for Haematoxylin & Eosin (H&E), mitotic marker Ki6, Cas9, Cleaved Caspases 3, p-H2AX, and CD4/CD8.

Figure 28D:
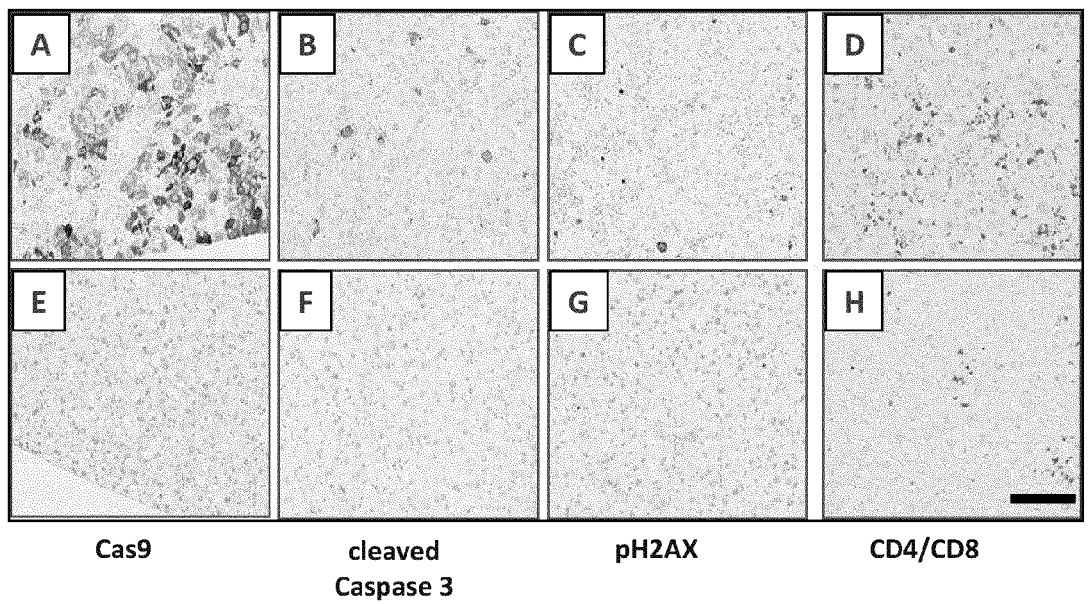
FIG. 28D shows a multi-panel layout (A-H) of histological and immunohistochemical images for markers including CD4/CD8, pH2AX, and cleaved caspase-3, contrasting Cas9 and FaDe-Cas9 tissues.

Mouse livers exposed to FaDe-Cas9 showed higher gene editing as a consequence of its rapid degradation in liver tissues which in turn lead to increased survival rate of the edited cells as shown in FIG. 28A. The rapid turnover of FaDe-Cas9 in vivo resulted in less hepatic toxicity in comparison to Cas9, confirmed by the unaltered liver glycogen, almost undetectable mitotic marker Ki67, less number of infiltrates and minimal cell necrosis. (FIG. 28B/C).

Moreover, it was found that that virus-mediated expression of FaDe-Cas9 in vivo resulted in lower cytotoxic T-lymphocyte immune response (FIG. 29). One week post AdV delivery, Cas9 was still highly expressed in hepatocytes, while FaDe-Cas9 was undetectable (A, E). The shorter latency of FaDe-Cas9 led to lower levels of apoptosis (cleaved-Caspase 3 IHC; B, F) and DNA double-strand breaks (phospho-H2AX IHC; C, G) in hepatocytes. Whilst the immune reaction to Cas9 delivery in murine livers was composed of moderate numbers of $CD4^+$ (memory) lymphocytes and numerous $CD8^+$ (cytotoxic) lymphocytes, the latter was markedly reduced in the liver infected with FaDe-Cas9 AdV (CD4-CD8 IHC; D, H).

What is claimed is:

1. A recombinant SpCas9 protein comprising a mutation resulting in an engineered KFERQ motif or KFERQ-like motif selected from KFERQ (SEQ ID NO:24), RKVEQ (SEQ ID NO:25), QDLKF (SEQ ID NO:26), QRFFE (SEQ ID NO:27), NRVVD (SEQ ID NO:28), QRDKV (SEQ ID NO:29), QKILD (SEQ ID NO:30), QKKEL (SEQ ID NO:31), QFREL (SEQ ID NO:32), IKLDQ (SEQ ID NO:33), DVVRQ (SEQ ID NO:34), QRIVE (SEQ ID NO:35), VKELQ (SEQ ID NO:36), QKVFD (SEQ ID NO:37), QELLR (SEQ ID NO:38), VDKLN (SEQ ID NO:39), RIKEN (SEQ ID NO:40), or NKKFE (SEQ ID NO:41) and wherein the engineered KFERQ motif or KFERQ-like motif is present in a surface-exposed region or at an N-terminus or a C-terminus of the recombinant SpCas9 protein.

2. The recombinant SpCas9 protein of claim 1, wherein the engineered KFERQ-like motif is VDKLN (SEQ ID NO:39).

3. The recombinant SpCas9 protein of claim 1, wherein the engineered KFERQ motif or KFERQ-like motif is in a REC lobe of the Cas9 protein.

4. The recombinant SpCas9 protein of claim 3, wherein the engineered KFERQ motif or KFERQ-like motif is in a Rec2 domain of the REC lobe.

5. The recombinant SpCas9 protein of claim 1, wherein the engineered KFERQ motif or KFERQ-like motif is in an HNH domain, a RuvC domain, or a PI domain of the recombinant SpCas9 protein.

6. The recombinant SpCas9 protein of claim 1, further comprising a mutation resulting in amino acid changes at position D10, H840, or a combination thereof in SEQ ID NO:1.

7. The recombinant SpCas9 protein of claim 1, wherein the recombinant Cas9 protein generates cohesive ends.

8. The recombinant SpCas9 protein of claim 1, further comprising one or more nuclear localization signals.

9. A polynucleotide sequence encoding the recombinant SpCas9 Cas9 protein of claim 1.

10. A recombinant SpCas9 protein, comprising a mutation resulting in an engineered KFERQ motif or KFERQ-like motif, wherein the mutation results in modification at amino acid position 185 of SEQ ID NO:1.

11. The recombinant SpCas9 protein of claim 10, wherein the KFERQ-like motif is VDKLN (SEQ ID NO:39).

12. A non-naturally occurring CRISPR-Cas system comprising:
 a. the recombinant SpCas9 protein of claim 1; and
 b. a guide polynucleotide that forms a complex with the recombinant Cas9 protein and comprises a guide sequence.

13. A delivery particle comprising the system according to claim 12.

14. A vesicle comprising the system according to claim 12.

15. A viral vector comprising the system according to claim 12.

16. A method of providing a site-specific modification at a target sequence in a genome of a cell, the method comprising introducing into the cell the CRISPR-Cas system of claim 12.

* * * * *

SEQUENCE LISTING

```
<160> NUMBER OF SEQ ID NOS: 87

<210> SEQ ID NO 1
<211> LENGTH: 1368
<212> TYPE: PRT
<213> ORGANISM: Streptococcus pyogenes

<400> SEQUENCE: 1

Met Asp Lys Lys Tyr Ser Ile Gly Leu Asp Ile Gly Thr Asn Ser Val
1               5                   10                  15

Gly Trp Ala Val Ile Thr Asp Asp Tyr Lys Val Pro Ser Lys Lys Phe
            20                  25                  30

Lys Val Leu Gly Asn Thr Asp Arg His Ser Ile Lys Lys Asn Leu Ile
        35                  40                  45

Gly Ala Leu Leu Phe Asp Ser Gly Glu Thr Ala Glu Ala Thr Arg Leu
    50                  55                  60

Lys Arg Thr Ala Arg Arg Arg Tyr Thr Arg Arg Lys Asn Arg Ile Cys
65                  70                  75                  80

Tyr Leu Gln Glu Ile Phe Ser Asn Glu Met Ala Lys Val Asp Asp Ser
                85                  90                  95

Phe Phe His Arg Leu Glu Glu Ser Phe Leu Val Glu Glu Asp Lys Lys
            100                 105                 110

His Glu Arg His Pro Ile Phe Gly Asn Ile Val Asp Glu Val Ala Tyr
        115                 120                 125

His Glu Lys Tyr Pro Thr Ile Tyr His Leu Arg Lys Lys Leu Val Asp
    130                 135                 140

Ser Thr Asp Lys Ala Asp Leu Arg Leu Ile Tyr Leu Ala Leu Ala His
145                 150                 155                 160

Met Ile Lys Phe Arg Gly His Phe Leu Ile Glu Gly Asp Leu Asn Pro
                165                 170                 175

Asp Asn Ser Asp Val Asp Lys Leu Phe Ile Gln Leu Val Gln Thr Tyr
            180                 185                 190

Asn Gln Leu Phe Glu Glu Asn Pro Ile Asn Ala Ser Gly Val Asp Ala
        195                 200                 205

Lys Ala Ile Leu Ser Ala Arg Leu Ser Lys Ser Arg Arg Leu Glu Asn
    210                 215                 220

Leu Ile Ala Gln Leu Pro Gly Glu Lys Lys Asn Gly Leu Phe Gly Asn
225                 230                 235                 240
```

```
Leu Ile Ala Leu Ser Leu Gly Leu Thr Pro Asn Phe Lys Ser Asn Phe
                245                 250                 255

Asp Leu Ala Glu Asp Ala Lys Leu Gln Leu Ser Lys Asp Thr Tyr Asp
            260                 265                 270

Asp Asp Leu Asp Asn Leu Leu Ala Gln Ile Gly Asp Gln Tyr Ala Asp
        275                 280                 285

Leu Phe Leu Ala Ala Lys Asn Leu Ser Asp Ala Ile Leu Leu Ser Asp
    290                 295                 300

Ile Leu Arg Val Asn Thr Glu Ile Thr Lys Ala Pro Leu Ser Ala Ser
305                 310                 315                 320

Met Ile Lys Arg Tyr Asp Glu His His Gln Asp Leu Thr Leu Leu Lys
                325                 330                 335

Ala Leu Val Arg Gln Gln Leu Pro Glu Lys Tyr Lys Glu Ile Phe Phe
            340                 345                 350

Asp Gln Ser Lys Asn Gly Tyr Ala Gly Tyr Ile Asp Gly Gly Ala Ser
        355                 360                 365

Gln Glu Glu Phe Tyr Lys Phe Ile Lys Pro Ile Leu Glu Lys Met Asp
    370                 375                 380

Gly Thr Glu Glu Leu Leu Val Lys Leu Asn Arg Glu Asp Leu Leu Arg
385                 390                 395                 400

Lys Gln Arg Thr Phe Asp Asn Gly Ser Ile Pro His Gln Ile His Leu
                405                 410                 415

Gly Glu Leu His Ala Ile Leu Arg Arg Gln Glu Asp Phe Tyr Pro Phe
            420                 425                 430

Leu Lys Asp Asn Arg Glu Lys Ile Glu Lys Ile Leu Thr Phe Arg Ile
        435                 440                 445

Pro Tyr Tyr Val Gly Pro Leu Ala Arg Gly Asn Ser Arg Phe Ala Trp
    450                 455                 460

Met Thr Arg Lys Ser Glu Glu Thr Ile Thr Pro Trp Asn Phe Glu Glu
465                 470                 475                 480

Val Val Asp Lys Gly Ala Ser Ala Gln Ser Phe Ile Glu Arg Met Thr
                485                 490                 495

Asn Phe Asp Lys Asn Leu Pro Asn Glu Lys Val Leu Pro Lys His Ser
            500                 505                 510

Leu Leu Tyr Glu Tyr Phe Thr Val Tyr Asn Glu Leu Thr Lys Val Lys
        515                 520                 525

Tyr Val Thr Glu Gly Met Arg Lys Pro Ala Phe Leu Ser Gly Glu Gln
    530                 535                 540

Lys Lys Ala Ile Val Asp Leu Leu Phe Lys Thr Asn Arg Lys Val Thr
545                 550                 555                 560

Val Lys Gln Leu Lys Glu Asp Tyr Phe Lys Lys Ile Glu Cys Phe Asp
                565                 570                 575

Ser Val Glu Ile Ser Gly Val Glu Asp Arg Phe Asn Ala Ser Leu Gly
            580                 585                 590

Thr Tyr His Asp Leu Leu Lys Ile Ile Lys Asp Lys Asp Phe Leu Asp
        595                 600                 605

Asn Glu Glu Asn Glu Asp Ile Leu Glu Asp Ile Val Leu Thr Leu Thr
    610                 615                 620

Leu Phe Glu Asp Arg Glu Met Ile Glu Glu Arg Leu Lys Thr Tyr Ala
625                 630                 635                 640

His Leu Phe Asp Asp Lys Val Met Lys Gln Leu Lys Arg Arg Arg Tyr
                645                 650                 655

Thr Gly Trp Gly Arg Leu Ser Arg Lys Leu Ile Asn Gly Ile Arg Asp
```

```
                660             665                 670
Lys Gln Ser Gly Lys Thr Ile Leu Asp Phe Leu Lys Ser Asp Gly Phe
            675                 680             685

Ala Asn Arg Asn Phe Met Gln Leu Ile His Asp Asp Ser Leu Thr Phe
690                 695                 700

Lys Glu Asp Ile Gln Lys Ala Gln Val Ser Gly Gln Gly Asp Ser Leu
705                 710                 715                 720

His Glu His Ile Ala Asn Leu Ala Gly Ser Pro Ala Ile Lys Lys Gly
                725                 730                 735

Ile Leu Gln Thr Val Lys Val Val Asp Glu Leu Val Lys Val Met Gly
            740                 745                 750

Arg His Lys Pro Glu Asn Ile Val Ile Glu Met Ala Arg Glu Asn Gln
            755                 760                 765

Thr Thr Gln Lys Gly Gln Lys Asn Ser Arg Glu Arg Met Lys Arg Ile
770                 775                 780

Glu Glu Gly Ile Lys Glu Leu Gly Ser Gln Ile Leu Lys Glu His Pro
785                 790                 795                 800

Val Glu Asn Thr Gln Leu Gln Asn Glu Lys Leu Tyr Leu Tyr Tyr Leu
                805                 810                 815

Gln Asn Gly Arg Asp Met Tyr Val Asp Gln Glu Leu Asp Ile Asn Arg
            820                 825                 830

Leu Ser Asp Tyr Asp Val Asp His Ile Val Pro Gln Ser Phe Leu Lys
            835                 840                 845

Asp Asp Ser Ile Asp Asn Lys Val Leu Thr Arg Ser Asp Lys Asn Arg
850                 855                 860

Gly Lys Ser Asp Asn Val Pro Ser Glu Glu Val Val Lys Lys Met Lys
865                 870                 875                 880

Asn Tyr Trp Arg Gln Leu Leu Asn Ala Lys Leu Ile Thr Gln Arg Lys
                885                 890                 895

Phe Asp Asn Leu Thr Lys Ala Glu Arg Gly Gly Leu Ser Glu Leu Asp
            900                 905                 910

Lys Ala Gly Phe Ile Lys Arg Gln Leu Val Glu Thr Arg Gln Ile Thr
            915                 920                 925

Lys His Val Ala Gln Ile Leu Asp Ser Arg Met Asn Thr Lys Tyr Asp
930                 935                 940

Glu Asn Asp Lys Leu Ile Arg Glu Val Lys Val Ile Thr Leu Lys Ser
945                 950                 955                 960

Lys Leu Val Ser Asp Phe Arg Lys Asp Phe Gln Phe Tyr Lys Val Arg
                965                 970                 975

Glu Ile Asn Asn Tyr His His Ala His Asp Ala Tyr Leu Asn Ala Val
            980                 985                 990

Val Gly Thr Ala Leu Ile Lys Lys Tyr Pro Lys Leu Glu Ser Glu Phe
            995                 1000                1005

Val Tyr Gly Asp Tyr Lys Val Tyr Asp Val Arg Lys Met Ile Ala
    1010                1015                1020

Lys Ser Glu Gln Glu Ile Gly Lys Ala Thr Ala Lys Tyr Phe Phe
    1025                1030                1035

Tyr Ser Asn Ile Met Asn Phe Phe Lys Thr Glu Ile Thr Leu Ala
    1040                1045                1050

Asn Gly Glu Ile Arg Lys Arg Pro Leu Ile Glu Thr Asn Gly Glu
    1055                1060                1065

Thr Gly Glu Ile Val Trp Asp Lys Gly Arg Asp Phe Ala Thr Val
    1070                1075                1080
```

-continued

Arg Lys Val Leu Ser Met Pro Gln Val Asn Ile Val Lys Lys Thr
1085                1090                1095

Glu Val Gln Thr Gly Gly Phe Ser Lys Glu Ser Ile Leu Pro Lys
1100                1105                1110

Arg Asn Ser Asp Lys Leu Ile Ala Arg Lys Lys Asp Trp Asp Pro
1115                1120                1125

Lys Lys Tyr Gly Gly Phe Asp Ser Pro Thr Val Ala Tyr Ser Val
1130                1135                1140

Leu Val Val Ala Lys Val Glu Lys Gly Lys Ser Lys Lys Leu Lys
1145                1150                1155

Ser Val Lys Glu Leu Leu Gly Ile Thr Ile Met Glu Arg Ser Ser
1160                1165                1170

Phe Glu Lys Asn Pro Ile Asp Phe Leu Glu Ala Lys Gly Tyr Lys
1175                1180                1185

Glu Val Lys Lys Asp Leu Ile Ile Lys Leu Pro Lys Tyr Ser Leu
1190                1195                1200

Phe Glu Leu Glu Asn Gly Arg Lys Arg Met Leu Ala Ser Ala Gly
1205                1210                1215

Glu Leu Gln Lys Gly Asn Glu Leu Ala Leu Pro Ser Lys Tyr Val
1220                1225                1230

Asn Phe Leu Tyr Leu Ala Ser His Tyr Glu Lys Leu Lys Gly Ser
1235                1240                1245

Pro Glu Asp Asn Glu Gln Lys Gln Leu Phe Val Glu Gln His Lys
1250                1255                1260

His Tyr Leu Asp Glu Ile Ile Glu Gln Ile Ser Glu Phe Ser Lys
1265                1270                1275

Arg Val Ile Leu Ala Asp Ala Asn Leu Asp Lys Val Leu Ser Ala
1280                1285                1290

Tyr Asn Lys His Arg Asp Lys Pro Ile Arg Glu Gln Ala Glu Asn
1295                1300                1305

Ile Ile His Leu Phe Thr Leu Thr Asn Leu Gly Ala Pro Ala Ala
1310                1315                1320

Phe Lys Tyr Phe Asp Thr Thr Ile Asp Arg Lys Arg Tyr Thr Ser
1325                1330                1335

Thr Lys Glu Val Leu Asp Ala Thr Leu Ile His Gln Ser Ile Thr
1340                1345                1350

Gly Leu Tyr Glu Thr Arg Ile Asp Leu Ser Gln Leu Gly Gly Asp
1355                1360                1365

<210> SEQ ID NO 2
<211> LENGTH: 1368
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 2

Met Asp Lys Lys Tyr Ser Ile Gly Leu Asp Ile Gly Thr Asn Ser Val
1               5                   10                  15

Gly Trp Ala Val Ile Thr Asp Asp Tyr Lys Val Pro Ser Lys Lys Phe
                20                  25                  30

Lys Val Leu Gly Asn Thr Asp Arg His Ser Ile Lys Lys Asn Leu Ile
            35                  40                  45

```
Gly Ala Leu Leu Phe Asp Ser Gly Glu Thr Ala Glu Ala Thr Arg Leu
        50                  55                  60
Lys Arg Thr Ala Arg Arg Tyr Thr Arg Arg Lys Asn Arg Ile Cys
 65                  70                  75                  80
Tyr Leu Gln Glu Ile Phe Ser Asn Glu Met Ala Lys Val Asp Asp Ser
                     85                  90                  95
Phe Phe His Arg Leu Glu Glu Ser Phe Leu Val Glu Glu Asp Lys Lys
                    100                 105                 110
His Glu Arg His Pro Ile Phe Gly Asn Ile Val Asp Glu Val Ala Tyr
                    115                 120                 125
His Glu Lys Tyr Pro Thr Ile Tyr His Leu Arg Lys Lys Leu Val Asp
                130                 135                 140
Ser Thr Asp Lys Ala Asp Leu Arg Leu Ile Tyr Leu Ala Leu Ala His
145                 150                 155                 160
Met Ile Lys Phe Arg Gly His Phe Leu Ile Glu Gly Asp Leu Asn Pro
                    165                 170                 175
Asp Asn Ser Asp Val Asp Lys Leu Asn Ile Gln Leu Val Gln Thr Tyr
                180                 185                 190
Asn Gln Leu Phe Glu Glu Asn Pro Ile Asn Ala Ser Gly Val Asp Ala
                195                 200                 205
Lys Ala Ile Leu Ser Ala Arg Leu Ser Lys Ser Arg Arg Leu Glu Asn
210                 215                 220
Leu Ile Ala Gln Leu Pro Gly Glu Lys Lys Asn Gly Leu Phe Gly Asn
225                 230                 235                 240
Leu Ile Ala Leu Ser Leu Gly Leu Thr Pro Asn Phe Lys Ser Asn Phe
                    245                 250                 255
Asp Leu Ala Glu Asp Ala Lys Leu Gln Leu Ser Lys Asp Thr Tyr Asp
                260                 265                 270
Asp Asp Leu Asp Asn Leu Leu Ala Gln Ile Gly Asp Gln Tyr Ala Asp
                275                 280                 285
Leu Phe Leu Ala Ala Lys Asn Leu Ser Asp Ala Ile Leu Leu Ser Asp
                290                 295                 300
Ile Leu Arg Val Asn Thr Glu Ile Thr Lys Ala Pro Leu Ser Ala Ser
305                 310                 315                 320
Met Ile Lys Arg Tyr Asp Glu His His Gln Asp Leu Thr Leu Leu Lys
                    325                 330                 335
Ala Leu Val Arg Gln Gln Leu Pro Glu Lys Tyr Lys Glu Ile Phe Phe
                    340                 345                 350
Asp Gln Ser Lys Asn Gly Tyr Ala Gly Tyr Ile Asp Gly Gly Ala Ser
                355                 360                 365
Gln Glu Glu Phe Tyr Lys Phe Ile Lys Pro Ile Leu Glu Lys Met Asp
                370                 375                 380
Gly Thr Glu Glu Leu Leu Val Lys Leu Asn Arg Glu Asp Leu Leu Arg
385                 390                 395                 400
Lys Gln Arg Thr Phe Asp Asn Gly Ser Ile Pro His Gln Ile His Leu
                    405                 410                 415
Gly Glu Leu His Ala Ile Leu Arg Arg Gln Glu Asp Phe Tyr Pro Phe
                420                 425                 430
Leu Lys Asp Asn Arg Glu Lys Ile Glu Lys Ile Leu Thr Phe Arg Ile
                435                 440                 445
Pro Tyr Tyr Val Gly Pro Leu Ala Arg Gly Asn Ser Arg Phe Ala Trp
                450                 455                 460
Met Thr Arg Lys Ser Glu Glu Thr Ile Thr Pro Trp Asn Phe Glu Glu
```

-continued

```
            465                 470                 475                 480
    Val Val Asp Lys Gly Ala Ser Ala Gln Ser Phe Ile Glu Arg Met Thr
                        485                 490                 495

Asn Phe Asp Lys Asn Leu Pro Asn Glu Lys Val Leu Pro Lys His Ser
                        500                 505                 510

Leu Leu Tyr Glu Tyr Phe Thr Val Tyr Asn Glu Leu Thr Lys Val Lys
                        515                 520                 525

Tyr Val Thr Glu Gly Met Arg Lys Pro Ala Phe Leu Ser Gly Glu Gln
                        530                 535                 540

Lys Lys Ala Ile Val Asp Leu Leu Phe Lys Thr Asn Arg Lys Val Thr
    545                 550                 555                 560

Val Lys Gln Leu Lys Glu Asp Tyr Phe Lys Lys Ile Glu Cys Phe Asp
                        565                 570                 575

Ser Val Glu Ile Ser Gly Val Glu Asp Arg Phe Asn Ala Ser Leu Gly
                        580                 585                 590

Thr Tyr His Asp Leu Leu Lys Ile Ile Lys Asp Lys Asp Phe Leu Asp
                        595                 600                 605

Asn Glu Glu Asn Glu Asp Ile Leu Glu Asp Ile Val Leu Thr Leu Thr
                        610                 615                 620

Leu Phe Glu Asp Arg Glu Met Ile Glu Glu Arg Leu Lys Thr Tyr Ala
    625                 630                 635                 640

His Leu Phe Asp Asp Lys Val Met Lys Gln Leu Lys Arg Arg Arg Tyr
                        645                 650                 655

Thr Gly Trp Gly Arg Leu Ser Arg Lys Leu Ile Asn Gly Ile Arg Asp
                        660                 665                 670

Lys Gln Ser Gly Lys Thr Ile Leu Asp Phe Leu Lys Ser Asp Gly Phe
                        675                 680                 685

Ala Asn Arg Asn Phe Met Gln Leu Ile His Asp Asp Ser Leu Thr Phe
                        690                 695                 700

Lys Glu Asp Ile Gln Lys Ala Gln Val Ser Gly Gln Gly Asp Ser Leu
    705                 710                 715                 720

His Glu His Ile Ala Asn Leu Ala Gly Ser Pro Ala Ile Lys Lys Gly
                        725                 730                 735

Ile Leu Gln Thr Val Lys Val Val Asp Glu Leu Val Lys Val Met Gly
                        740                 745                 750

Arg His Lys Pro Glu Asn Ile Val Ile Glu Met Ala Arg Glu Asn Gln
                        755                 760                 765

Thr Thr Gln Lys Gly Gln Lys Asn Ser Arg Glu Arg Met Lys Arg Ile
                        770                 775                 780

Glu Glu Gly Ile Lys Glu Leu Gly Ser Gln Ile Leu Lys Glu His Pro
    785                 790                 795                 800

Val Glu Asn Thr Gln Leu Gln Asn Glu Lys Leu Tyr Leu Tyr Tyr Leu
                        805                 810                 815

Gln Asn Gly Arg Asp Met Tyr Val Asp Gln Glu Leu Asp Ile Asn Arg
                        820                 825                 830

Leu Ser Asp Tyr Asp Val Asp His Ile Val Pro Gln Ser Phe Leu Lys
                        835                 840                 845

Asp Asp Ser Ile Asp Asn Lys Val Leu Thr Arg Ser Asp Lys Asn Arg
    850                 855                 860

Gly Lys Ser Asp Asn Val Pro Ser Glu Glu Val Val Lys Lys Met Lys
                        865                 870                 875                 880

Asn Tyr Trp Arg Gln Leu Leu Asn Ala Lys Leu Ile Thr Gln Arg Lys
                        885                 890                 895
```

-continued

Phe Asp Asn Leu Thr Lys Ala Glu Arg Gly Gly Leu Ser Glu Leu Asp
            900                 905                 910

Lys Ala Gly Phe Ile Lys Arg Gln Leu Val Glu Thr Arg Gln Ile Thr
            915                 920                 925

Lys His Val Ala Gln Ile Leu Asp Ser Arg Met Asn Thr Lys Tyr Asp
            930                 935                 940

Glu Asn Asp Lys Leu Ile Arg Glu Val Lys Val Ile Thr Leu Lys Ser
945                 950                 955                 960

Lys Leu Val Ser Asp Phe Arg Lys Asp Phe Gln Phe Tyr Lys Val Arg
                965                 970                 975

Glu Ile Asn Asn Tyr His His Ala His Asp Ala Tyr Leu Asn Ala Val
            980                 985                 990

Val Gly Thr Ala Leu Ile Lys Lys Tyr Pro Lys Leu Glu Ser Glu Phe
            995                 1000                1005

Val Tyr Gly Asp Tyr Lys Val Tyr Asp Val Arg Lys Met Ile Ala
            1010                1015                1020

Lys Ser Glu Gln Glu Ile Gly Lys Ala Thr Ala Lys Tyr Phe Phe
            1025                1030                1035

Tyr Ser Asn Ile Met Asn Phe Phe Lys Thr Glu Ile Thr Leu Ala
            1040                1045                1050

Asn Gly Glu Ile Arg Lys Arg Pro Leu Ile Glu Thr Asn Gly Glu
            1055                1060                1065

Thr Gly Glu Ile Val Trp Asp Lys Gly Arg Asp Phe Ala Thr Val
            1070                1075                1080

Arg Lys Val Leu Ser Met Pro Gln Val Asn Ile Val Lys Lys Thr
            1085                1090                1095

Glu Val Gln Thr Gly Gly Phe Ser Lys Glu Ser Ile Leu Pro Lys
            1100                1105                1110

Arg Asn Ser Asp Lys Leu Ile Ala Arg Lys Lys Asp Trp Asp Pro
            1115                1120                1125

Lys Lys Tyr Gly Gly Phe Asp Ser Pro Thr Val Ala Tyr Ser Val
            1130                1135                1140

Leu Val Val Ala Lys Val Glu Lys Gly Lys Ser Lys Lys Leu Lys
            1145                1150                1155

Ser Val Lys Glu Leu Leu Gly Ile Thr Ile Met Glu Arg Ser Ser
            1160                1165                1170

Phe Glu Lys Asn Pro Ile Asp Phe Leu Glu Ala Lys Gly Tyr Lys
            1175                1180                1185

Glu Val Lys Lys Asp Leu Ile Ile Lys Leu Pro Lys Tyr Ser Leu
            1190                1195                1200

Phe Glu Leu Glu Asn Gly Arg Lys Arg Met Leu Ala Ser Ala Gly
            1205                1210                1215

Glu Leu Gln Lys Gly Asn Glu Leu Ala Leu Pro Ser Lys Tyr Val
            1220                1225                1230

Asn Phe Leu Tyr Leu Ala Ser His Tyr Glu Lys Leu Lys Gly Ser
            1235                1240                1245

Pro Glu Asp Asn Glu Gln Lys Gln Leu Phe Val Glu Gln His Lys
            1250                1255                1260

His Tyr Leu Asp Glu Ile Ile Glu Gln Ile Ser Glu Phe Ser Lys
            1265                1270                1275

Arg Val Ile Leu Ala Asp Ala Asn Leu Asp Lys Val Leu Ser Ala
            1280                1285                1290

```
Tyr Asn Lys His Arg Asp Lys Pro Ile Arg Glu Gln Ala Glu Asn
    1295                1300                1305

Ile Ile His Leu Phe Thr Leu Thr Asn Leu Gly Ala Pro Ala Ala
    1310                1315                1320

Phe Lys Tyr Phe Asp Thr Thr Ile Asp Arg Lys Arg Tyr Thr Ser
    1325                1330                1335

Thr Lys Glu Val Leu Asp Ala Thr Leu Ile His Gln Ser Ile Thr
    1340                1345                1350

Gly Leu Tyr Glu Thr Arg Ile Asp Leu Ser Gln Leu Gly Gly Asp
    1355                1360                1365

<210> SEQ ID NO 3
<211> LENGTH: 4131
<212> TYPE: DNA
<213> ORGANISM: Streptococcus pyogenes

<400> SEQUENCE: 3
```

| | | | | | |
|---|---|---|---|---|---|
| atggctccta | agaaaaagcg | gaaggtggac | aagaaatact | caatcgggct | ggacatcgga | 60 |
| actaactcag | tggggtgggc | agtcattact | gacgagtaca | agtgccaag | caagaaattt | 120 |
| aaggtcctgg | gcaacaccga | taggcactcc | atcaagaaaa | atctgattgg | ggccctgctg | 180 |
| ttcgactctg | agagacagc | tgaagcaact | agactgaaaa | ggactgctag | aaggcgctat | 240 |
| acccggcgaa | agaatcgcat | ctgctacctg | caggagattt | tctctaacga | atgccaag | 300 |
| gtggacgata | gtttctttca | tcggctggag | gaatcattcc | tggtcgagga | agataagaaa | 360 |
| cacgagagac | atcctatctt | tggaaacatt | gtggacgagg | tcgcttatca | cgaaaaatac | 420 |
| cccaccatct | atcatctgcg | caagaaactg | gtggactcta | cagataaagc | agacctgcgg | 480 |
| ctgatctatc | tggccctggc | tcacatgatt | aagttcagag | gccatttctc | tgatcgaggga | 540 |
| gatctgaacc | cagacaatag | cgatgtggac | aagctgttca | tccagctggt | ccagacatac | 600 |
| aatcagctgt | ttgaggaaaa | ccctattaat | gcatctggcg | tggacgcaaa | agccatcctg | 660 |
| agtgccaggc | tgtctaagag | tagaaggctg | agaaacctga | tcgctcagct | gccaggcgaa | 720 |
| aagaaaaacg | gcctgtttgg | aaatctgatt | gcactgtcac | tgggactgac | acctaacttc | 780 |
| aagagcaatt | ttgatctggc | cgaggacgct | aaactgcagc | tgagcaagga | cacttatgac | 840 |
| gatgacctgg | ataacctgct | ggctcagatc | ggagatcagt | acgcagacct | gttcctggcc | 900 |
| gctaagaatc | tgtctgacgc | tatcctgctg | agtgatattc | tgcgggtgaa | caccgagatt | 960 |
| acaaagcccc | tctgtcagc | tagcatgatc | aagagatatg | acgagcacca | tcaggatctg | 1020 |
| accctgctga | aggcactggt | gcgccagcag | ctgcccgaga | gtacaaagga | atcttctttt | 1080 |
| gatcagagta | agaacgggta | cgccggttat | attgacggcg | gagcttcaca | ggaggaattc | 1140 |
| tacaagttta | tcaaacctat | tctggagaag | atggacggca | ccgaggaact | gctggtgaaa | 1200 |
| ctgaatcgcg | aggacctgct | gcgcaagcag | cggacatttg | ataacggctc | catccccac | 1260 |
| cagattcatc | tgggagagct | gcacgcaatc | ctgcgacgac | aggaagactt | ctacccattt | 1320 |
| ctgaaggata | accgcgagaa | gatcgaaaaa | attctgacct | tccggatccc | ttactatgtg | 1380 |
| ggcccctgg | caaggggtaa | ttccgcttt | gcctggatga | cacggaaatc | tgaggaaaca | 1440 |
| atcactcctt | ggaacttcga | ggaagtggtc | gataagggag | cttccgcaca | gtctttcatc | 1500 |
| gagagaatga | caaacttcga | caaaaacctg | ccaaatgaga | agtgctgcc | taagcacagt | 1560 |
| ctgctgtacg | agtatttcac | agtctataac | gaactgacta | aggtgaaata | cgtcaccgag | 1620 |
| gggatgagga | agcccgcctt | cctgagcggt | gaacagaaga | agctatcgt | ggacctgctg | 1680 |

```
tttaaaacca atcgcaaggt gacagtcaag cagctgaagg aggactactt caagaaaatt    1740
gaatgtttcg attctgtgga gatcagtggc gtcgaagaca gatttaacgc ttctctggga    1800
acctaccacg atctgctgaa gatcattaag gataaagact tcctggacaa cgaggaaaat    1860
gaggatatcc tggaagacat tgtgctgacc ctgacactgt ttgaggatcg cgaaatgatc    1920
gaggaacggc tgaaaactta tgcccatctg ttcgatgaca aggtgatgaa acagctgaag    1980
cgaagaaggt acaccggctg gggacgactg agcagaaagc tgatcaacgg cattcgggac    2040
aaacagagtg gaaagactat cctggacttt ctgaaatcag atggcttcgc taacagaaat    2100
tttatgcagc tgattcacga tgacagcctg accttcaaag aggatatcca gaaggcacag    2160
gtgtccgggc agggtgactc tctgcacgag catatcgcaa acctgccgg gtcccccgcc    2220 atcaagaaag gtattctgca gaccgtgaag gtggtcgatg agctggtgaa agtcatgggc    2280
aggcataagc cagaaaacat cgtgattgag atggcccgcg aaaatcagac cacacagaaa    2340
ggacagaaga cagccgcga gcggatgaaa aggatcgagg aaggcattaa ggaactggga    2400
tcccagatcc tgaaagagca ccctgtggaa acactcagc tgcagaatga aagctgtat    2460 ctgtactatc tgcagaatgg gcgggatatg tacgtggacc aggagctgga tattaaccga    2520
ctgtctgatt acgacgtgga tcatatcgtc ccacagtcat tcctgaaaga tgacagcatt    2580
gacaataagg tgctgacccg gagtgacaaa aaccgaggaa agagtgataa tgtcccttca    2640
gaggaagtgg tcaagaaaat gaagaactac tggagacagc tgctgaatgc caactgatc    2700 acacagcgaa agtttgataa cctgactaaa gctgagagag ggggtctgtc agaactggac    2760
aaagcaggct tcatcaagcg acagctggtg gagaccagac agatcacaaa gcacgtcgct    2820
cagattctgg atagcaggat gaacacaaag tacgatgaga atgacaaact gatccgcgaa    2880
gtgaaggtca ttactctgaa gtcaaaactt gtgagcgact tcagaaagga tttccagttc    2940
tacaaagtca gggagatcaa caattatcac catgctcatg acgcatacct gaacgcagtg    3000
gtcgggaccg ccctgattaa gaaatacccc aaactggaga gcgaattcgt gtacggtgac    3060
tataaggtgt acgatgtcag aaaaatgatc gccaagagtg agcaggaaat tggaaaagcc    3120
accgctaagt atttctttta ctcaaacatc atgaatttct ttaagactga gatcaccctg    3180
gcaaatgggg aaatccgaaa gagaccactg attgagacta acggcgagac cggagaaatc    3240
gtgtgggaca agggtaggga ttttgccaca gtgcgcaagg tcctgtccat gcctcaagtg    3300
aatattgtca agaaaacaga ggtgcagact ggcggattca gtaaggaatc aattctgccc    3360
aaacggaact ctgataagct gatcgcccga aagaaagact gggatcccaa gaaatatggg    3420
ggtttcgact ccccaacagt ggcttactct gtcctggtgg tcgcaaaggt ggagaagggg    3480
aaaagcaaga aactgaaatc cgtcaaggag ctgctgggta tcactattat ggagaggagc    3540
tccttcgaga agaaccccat cgattttctg gaggctaaag ctataagga agtgaagaaa    3600 gacctgatca ttaaactgcc aaagtacagc ctgtttgagc tggaaaacgg aaggaagcga    3660
atgctggcat ccgcaggaga gctgcagaag ggtaatgaac tggccctgcc ttctaagtac    3720
gtgaacttcc tgtatctggc tagccactac gagaagctga aggctccccc gaggataac    3780 gaacagaaac agctgtttgt ggagcagcac aagcattatc tggacgagat cattgaacag    3840
attagcgagt tctccaaaag agtgatcctg gctgacgcaa atctggataa ggtcctgagc    3900
gcatacaaca aacacagaga taagccaatc agggagcagg ccgaaaatat cattcatctg    3960
ttcactctga ccaacctggg agcccctgca gccttcaagt attttgacac taccatcgat    4020
cggaaacgat acacatccac taaggaggtg ctggacgcta ccctgattca ccagagcatt    4080
```

```
accggcctgt atgaaacaag gattgacctg tctcagctgg ggggcgactg a         4131
```

<210> SEQ ID NO 4
<211> LENGTH: 4131
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 4

```
atggctccta agaaaaagcg gaaggtggac aagaaatact caatcgggct ggacatcgga   60
actaactcag tggggtgggc agtcattact gacgagtaca agtgccaag caagaaattt   120
aaggtcctgg caacaccga taggcactcc atcaagaaaa atctgattgg ggccctgctg   180
ttcgactctg gagagacagc tgaagcaact agactgaaaa ggactgctag aaggcgctat   240
acccggcgaa agaatcgcat ctgctacctg caggagattt tctctaacga atggccaag   300
gtggacgata gtttctttca tcggctggag gaatcattcc tggtcgagga agataagaaa   360
cacgagagac atcctatctt ggaaacatt gtggacgagg tcgcttatca cgaaaaatac   420
cccaccatct atcatctgcg caagaaactg gtggactcta cagataaagc agacctgcgg   480
ctgatctatc tggccctggc tcacatgatt aagttcagag gccattttct gatcgaggga   540
gatctgaacc cagacaatag cgatgtggac aagctgaaca tccagctggt ccagacatac   600
aatcagctgt ttgaggaaaa ccctattaat gcatctggcg tggacgcaaa agccatcctg   660
agtgccaggc tgtctaagag tagaaggctg gagaacctga tcgctcagct gccaggcgaa   720
aagaaaaacg gcctgtttgg aaatctgatt gcactgtcac tgggactgac acctaacttc   780
aagagcaatt ttgatctggc cgaggacgct aaactgcagc tgagcaagga cacttatgac   840
gatgacctgg ataacctgct ggctcagatc ggagatcagt acgcagacct gttcctggcc   900
gctaagaatc tgtctgacgc tatcctgctg agtgatattc tgcgggtgaa caccgagatt   960
acaaaagccc ctctgtcagc tagcatgatc aagagatatg acgagcacca tcaggatctg  1020
accctgctga aggcactggt gcgccagcag ctgcccgaga gtacaaggga atcttctttt  1080
gatcagagta gaacgggta cgccggttat attgacggcg agcttcaca ggaggaattc  1140
tacaagttta tcaaacctat tctggagaag atggacggca ccgaggaact gctggtgaaa  1200
ctgaatcgcg aggacctgct gcgcaagcag cggacatttg ataacggctc catccccac  1260
cagattcatc tgggagagct gcacgcaatc ctgcgacgac aggaagactt ctacccattt  1320
ctgaaggata accgcgagaa gatcgaaaaa attctgacct tccggatccc ttactatgtg  1380
gggcccctgg caagggtaa ttcccgcttt gcctggatga cacggaaatc tgaggaaaca  1440
atcactcctt ggaacttcga ggaagtggtc gataagggag cttccgcaca gtctttcatc  1500
gagagaatga caaacttcga caaaaacctg ccaaatgaga agtgctgcc taagcacagt  1560
ctgctgtacg agtatttcac agtctataac gaactgacta aggtgaaata cgtcaccgag  1620
gggatgagga agcccgcctt cctgagcggt gaacagaaga agctatcgt ggacctgctg  1680
tttaaaacca atcgcaaggt gacagtcaag cagctgaagg aggactactt caagaaaatt  1740
gaatgtttcg attctgtgga gatcagtggc gtcgaagaca gattaacgc ttctctggga  1800
acctaccacg atctgctgaa gatcattaag gataaagact cctggacaa cgaggaaaat  1860
gaggatatcc tggaagacat tgtgctgacc ctgacactgt ttgaggatcg cgaaatgatc  1920
```

-continued

```
gaggaacggc tgaaaactta tgcccatctg ttcgatgaca aggtgatgaa acagctgaag    1980
cgaagaaggt acaccggctg gggacgactg agcagaaagc tgatcaacgg cattcgggac    2040
aaacagagtg gaaagactat cctggacttt ctgaaatcag atggcttcgc taacagaaat    2100
tttatgcagc tgattcacga tgacagcctg accttcaaag aggatatcca aaggcacag    2160
gtgtccggc agggtgactc tctgcacgag catatcgcaa acctggccgg tcccccgcc    2220
atcaagaaag gtattctgca gaccgtgaag gtggtcgatg agctggtgaa agtcatgggc    2280
aggcataagc cagaaaacat cgtgattgag atggcccgcg aaaatcagac cacacagaaa    2340
ggacagaaga acagccgcga gcggatgaaa aggatcgagg aaggcattaa ggaactggga    2400
tcccagatcc tgaaagagca ccctgtggaa acactcagc tgcagaatga aagctgtat    2460
ctgtactatc tgcagaatgg gcgggatatg tacgtggacc aggagctgga tattaaccga    2520
ctgtctgatt acgacgtgga tcatatcgtc ccacagtcat tcctgaaaga tgacagcatt    2580
gacaataagg tgctgacccg gagtgacaaa aaccgaggaa agagtgataa tgtccccttca    2640
gaggaagtgg tcaagaaaat gaagaactac tggagacagc tgctgaatgc caaactgatc    2700
acacagcgaa agtttgataa cctgactaaa gctgagagag ggggtctgtc agaactggac    2760
aaagcaggct tcatcaagcg acagctggtg agaccagac agatcacaaa gcacgtcgct    2820
cagattctgg atagcaggat gaacacaaaa tacgatgaga atgacaaact gatccgcgaa    2880
gtgaaggtca ttactctgaa gtcaaaactt gtgagcgact tcagaaagga tttccagttc    2940
tacaaagtca gggagatcaa caattatcac catgctcatg acgcatacct gaacgcagtg    3000
gtcgggaccg ccctgattaa gaaatacccc aaactggaga gcgaattcgt gtacggtgac    3060
tataaggtgt acgatgtcag aaaaatgatc gccaagagtg agcaggaaat tggaaaagcc    3120
accgctaagt atttctttta ctcaaacatc atgaatttct ttaagactga gatcaccctg    3180
gcaaatgggg aaatccgaaa gagaccactg attgagacta acggcgagac cggagaaatc    3240
gtgtgggaca agggtaggga tttttgccaca gtgcgcaagg tcctgtccat gcctcaagtg    3300
aatattgtca agaaaacaga ggtgcagact ggcggattca gtaaggaatc aattctgccc    3360
aaacggaact ctgataagct gatcgcccga aagaaagact gggatcccaa gaaatatggg    3420
ggtttcgact ccccaacagt ggcttactct gtcctggtgg tcgcaaaggt ggagaagggg    3480
aaaagcaaga aactgaaatc cgtcaaggag ctgctgggta tcactattat ggagaggagc    3540
tccttcgaga agaaccccat cgatttcctg gaggctaaag gctataagga agtgaagaaa    3600
gacctgatca ttaaactgcc aaagtacagc ctgtttgagc tggaaaacgg aaggaagcga    3660
atgctggcat ccgcaggaga gctgcagaag ggtaatgaac tggccctgcc ttctaagtac    3720
gtgaacttcc tgtatctggc tagccactac gagaagctga aggctccccc cgaggataac    3780
gaacagaaac agctgtttgt ggagcagcac aagcattatc tggacgagat cattgaacag    3840
attagcgagt ctccaaaaag agtgatcctg gctgacgcaa atctggataa ggtcctgagc    3900
gcatacaaca aacacagaga taagccaatc agggagcagg ccgaaaatat cattcatctg    3960
ttcactctga ccaacctggg agcccctgca gccttcaagt attttgacac taccatcgat    4020
cggaaacgat acacatccac taaggaggtg ctggacgcta ccctgattca ccagagcatt    4080
accggcctgt atgaaacaag gattgacctg tctcagctgg ggggcgactg a            4131
```

<210> SEQ ID NO 5
<211> LENGTH: 658
<212> TYPE: PRT
<213> ORGANISM: Artificial Sequence

```
<220> FEATURE:
<221> NAME/KEY: source
<223> OTHER INFORMATION: /note="Description of Artificial Sequence:
      Synthetic polypeptide"

<400> SEQUENCE: 5

Ala Thr Arg Leu Lys Arg Thr Ala Arg Arg Tyr Thr Arg Arg Lys
1               5                   10                  15

Asn Arg Ile Cys Tyr Leu Gln Glu Ile Phe Ser Asn Glu Met Ala Lys
            20                  25                  30

Val Asp Asp Ser Phe Phe His Arg Leu Glu Glu Ser Phe Leu Val Glu
            35                  40                  45

Glu Asp Lys Lys His Glu Arg His Pro Ile Phe Gly Asn Ile Val Asp
    50                  55                  60

Glu Val Ala Tyr His Glu Lys Tyr Pro Thr Ile Tyr His Leu Arg Lys
65                  70                  75                  80

Lys Leu Val Asp Ser Thr Asp Lys Ala Asp Leu Arg Leu Ile Tyr Leu
                85                  90                  95

Ala Leu Ala His Met Ile Lys Phe Arg Gly His Phe Leu Ile Glu Gly
                100                 105                 110

Asp Leu Asn Pro Asp Asn Ser Asp Val Asp Lys Leu Asn Ile Gln Leu
                115                 120                 125

Val Gln Thr Tyr Asn Gln Leu Phe Glu Glu Asn Pro Ile Asn Ala Ser
130                 135                 140

Gly Val Asp Ala Lys Ala Ile Leu Ser Ala Arg Leu Ser Lys Ser Arg
145                 150                 155                 160

Arg Leu Glu Asn Leu Ile Ala Gln Leu Pro Gly Glu Lys Lys Asn Gly
                165                 170                 175

Leu Phe Gly Asn Leu Ile Ala Leu Ser Leu Gly Leu Thr Pro Asn Phe
                180                 185                 190

Lys Ser Asn Phe Asp Leu Ala Glu Asp Ala Lys Leu Gln Leu Ser Lys
                195                 200                 205

Asp Thr Tyr Asp Asp Asp Leu Asp Asn Leu Leu Ala Gln Ile Gly Asp
                210                 215                 220

Gln Tyr Ala Asp Leu Phe Leu Ala Ala Lys Asn Leu Ser Asp Ala Ile
225                 230                 235                 240

Leu Leu Ser Asp Ile Leu Arg Val Asn Thr Glu Ile Thr Lys Ala Pro
                245                 250                 255

Leu Ser Ala Ser Met Ile Lys Arg Tyr Asp Glu His His Gln Asp Leu
                260                 265                 270

Thr Leu Leu Lys Ala Leu Val Arg Gln Gln Leu Pro Glu Lys Tyr Lys
                275                 280                 285

Glu Ile Phe Phe Asp Gln Ser Lys Asn Gly Tyr Ala Gly Tyr Ile Asp
                290                 295                 300

Gly Gly Ala Ser Gln Glu Glu Phe Tyr Lys Phe Ile Lys Pro Ile Leu
305                 310                 315                 320

Glu Lys Met Asp Gly Thr Glu Glu Leu Leu Val Lys Leu Asn Arg Glu
                325                 330                 335

Asp Leu Leu Arg Lys Gln Arg Thr Phe Asp Asn Gly Ser Ile Pro His
                340                 345                 350

Gln Ile His Leu Gly Glu Leu His Ala Ile Leu Arg Arg Gln Glu Asp
                355                 360                 365

Phe Tyr Pro Phe Leu Lys Asp Asn Arg Glu Lys Ile Glu Lys Ile Leu
                370                 375                 380
```

```
Thr Phe Arg Ile Pro Tyr Tyr Val Gly Pro Leu Ala Arg Gly Asn Ser
385                 390                 395                 400

Arg Phe Ala Trp Met Thr Arg Lys Ser Glu Glu Thr Ile Thr Pro Trp
            405                 410                 415

Asn Phe Glu Glu Val Val Asp Lys Gly Ala Ser Ala Gln Ser Phe Ile
        420                 425                 430

Glu Arg Met Thr Asn Phe Asp Lys Asn Leu Pro Asn Glu Lys Val Leu
            435                 440                 445

Pro Lys His Ser Leu Leu Tyr Glu Tyr Phe Thr Val Tyr Asn Glu Leu
        450                 455                 460

Thr Lys Val Lys Tyr Val Thr Glu Gly Met Arg Lys Pro Ala Phe Leu
465                 470                 475                 480

Ser Gly Glu Gln Lys Lys Ala Ile Val Asp Leu Leu Phe Lys Thr Asn
            485                 490                 495

Arg Lys Val Thr Val Lys Gln Leu Lys Glu Asp Tyr Phe Lys Lys Ile
            500                 505                 510

Glu Cys Phe Asp Ser Val Glu Ile Ser Gly Val Glu Asp Arg Phe Asn
        515                 520                 525

Ala Ser Leu Gly Thr Tyr His Asp Leu Leu Lys Ile Ile Lys Asp Lys
        530                 535                 540

Asp Phe Leu Asp Asn Glu Glu Asn Glu Asp Ile Leu Glu Asp Ile Val
545                 550                 555                 560

Leu Thr Leu Thr Leu Phe Glu Asp Arg Glu Met Ile Glu Glu Arg Leu
            565                 570                 575

Lys Thr Tyr Ala His Leu Phe Asp Asp Lys Val Met Lys Gln Leu Lys
            580                 585                 590

Arg Arg Arg Tyr Thr Gly Trp Gly Arg Leu Ser Arg Lys Leu Ile Asn
            595                 600                 605

Gly Ile Arg Asp Lys Gln Ser Gly Lys Thr Ile Leu Asp Phe Leu Lys
            610                 615                 620

Ser Asp Gly Phe Ala Asn Arg Asn Phe Met Gln Leu Ile His Asp Asp
625                 630                 635                 640

Ser Leu Thr Phe Lys Glu Asp Ile Gln Lys Ala Gln Val Ser Gly Gln
            645                 650                 655

Gly Asp

<210> SEQ ID NO 6
<211> LENGTH: 60
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 6

Met Asp Lys Lys Tyr Ser Ile Gly Leu Asp Ile Gly Thr Asn Ser Val
1               5                   10                  15

Gly Trp Ala Val Ile Thr Asp Asp Tyr Lys Val Pro Ser Lys Lys Phe
            20                  25                  30

Lys Val Leu Gly Asn Thr Asp Arg His Ser Ile Lys Lys Asn Leu Ile
        35                  40                  45

Gly Ala Leu Leu Phe Asp Ser Gly Glu Thr Ala Glu
    50                  55                  60

<210> SEQ ID NO 7
```

```
<211> LENGTH: 650
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 7
```

| | | | | | | | | | | | | | | | |
|---|---|---|---|---|---|---|---|---|---|---|---|---|---|---|---|
| Ser | Leu | His | Glu | His | Ile | Ala | Asn | Leu | Ala | Gly | Ser | Pro | Ala | Ile | Lys |
| 1 | | | | 5 | | | | | 10 | | | | | 15 | |
| Lys | Gly | Ile | Leu | Gln | Thr | Val | Lys | Val | Val | Asp | Glu | Leu | Val | Lys | Val |
| | | | 20 | | | | | 25 | | | | | 30 | | |
| Met | Gly | Arg | His | Lys | Pro | Glu | Asn | Ile | Val | Ile | Glu | Met | Ala | Arg | Glu |
| | | 35 | | | | | 40 | | | | | 45 | | | |
| Asn | Gln | Thr | Thr | Gln | Lys | Gly | Gln | Lys | Asn | Ser | Arg | Glu | Arg | Met | Lys |
| | 50 | | | | | 55 | | | | | 60 | | | | |
| Arg | Ile | Glu | Glu | Gly | Ile | Lys | Glu | Leu | Gly | Ser | Gln | Ile | Leu | Lys | Glu |
| 65 | | | | | 70 | | | | | 75 | | | | | 80 |
| His | Pro | Val | Glu | Asn | Thr | Gln | Leu | Gln | Asn | Glu | Lys | Leu | Tyr | Leu | Tyr |
| | | | | 85 | | | | | 90 | | | | | 95 | |
| Tyr | Leu | Gln | Asn | Gly | Arg | Asp | Met | Tyr | Val | Asp | Gln | Glu | Leu | Asp | Ile |
| | | | 100 | | | | | 105 | | | | | 110 | | |
| Asn | Arg | Leu | Ser | Asp | Tyr | Asp | Val | Asp | His | Ile | Val | Pro | Gln | Ser | Phe |
| | | 115 | | | | | 120 | | | | | 125 | | | |
| Leu | Lys | Asp | Asp | Ser | Ile | Asp | Asn | Lys | Val | Leu | Thr | Arg | Ser | Asp | Lys |
| | 130 | | | | | 135 | | | | | 140 | | | | |
| Asn | Arg | Gly | Lys | Ser | Asp | Asn | Val | Pro | Ser | Glu | Glu | Val | Val | Lys | Lys |
| 145 | | | | | 150 | | | | | 155 | | | | | 160 |
| Met | Lys | Asn | Tyr | Trp | Arg | Gln | Leu | Leu | Asn | Ala | Lys | Leu | Ile | Thr | Gln |
| | | | | 165 | | | | | 170 | | | | | 175 | |
| Arg | Lys | Phe | Asp | Asn | Leu | Thr | Lys | Ala | Glu | Arg | Gly | Gly | Leu | Ser | Glu |
| | | | 180 | | | | | 185 | | | | | 190 | | |
| Leu | Asp | Lys | Ala | Gly | Phe | Ile | Lys | Arg | Gln | Leu | Val | Glu | Thr | Arg | Gln |
| | | 195 | | | | | 200 | | | | | 205 | | | |
| Ile | Thr | Lys | His | Val | Ala | Gln | Ile | Leu | Asp | Ser | Arg | Met | Asn | Thr | Lys |
| | 210 | | | | | 215 | | | | | 220 | | | | |
| Tyr | Asp | Glu | Asn | Asp | Lys | Leu | Ile | Arg | Glu | Val | Lys | Val | Ile | Thr | Leu |
| 225 | | | | | 230 | | | | | 235 | | | | | 240 |
| Lys | Ser | Lys | Leu | Val | Ser | Asp | Phe | Arg | Lys | Asp | Phe | Gln | Phe | Tyr | Lys |
| | | | | 245 | | | | | 250 | | | | | 255 | |
| Val | Arg | Glu | Ile | Asn | Asn | Tyr | His | His | Ala | His | Asp | Ala | Tyr | Leu | Asn |
| | | | 260 | | | | | 265 | | | | | 270 | | |
| Ala | Val | Val | Gly | Thr | Ala | Leu | Ile | Lys | Lys | Tyr | Pro | Lys | Leu | Glu | Ser |
| | | 275 | | | | | 280 | | | | | 285 | | | |
| Glu | Phe | Val | Tyr | Gly | Asp | Tyr | Lys | Val | Tyr | Asp | Val | Arg | Lys | Met | Ile |
| | 290 | | | | | 295 | | | | | 300 | | | | |
| Ala | Lys | Ser | Glu | Gln | Glu | Ile | Gly | Lys | Ala | Thr | Ala | Lys | Tyr | Phe | Phe |
| 305 | | | | | 310 | | | | | 315 | | | | | 320 |
| Tyr | Ser | Asn | Ile | Met | Asn | Phe | Phe | Lys | Thr | Glu | Ile | Thr | Leu | Ala | Asn |
| | | | | 325 | | | | | 330 | | | | | 335 | |
| Gly | Glu | Ile | Arg | Lys | Arg | Pro | Leu | Ile | Glu | Thr | Asn | Gly | Glu | Thr | Gly |
| | | | 340 | | | | | 345 | | | | | 350 | | |
| Glu | Ile | Val | Trp | Asp | Lys | Gly | Arg | Asp | Phe | Ala | Thr | Val | Arg | Lys | Val |
| | | 355 | | | | | 360 | | | | | 365 | | | |

```
Leu Ser Met Pro Gln Val Asn Ile Val Lys Lys Thr Glu Val Gln Thr
    370                 375                 380

Gly Gly Phe Ser Lys Glu Ser Ile Leu Pro Lys Arg Asn Ser Asp Lys
385                 390                 395                 400

Leu Ile Ala Arg Lys Lys Asp Trp Asp Pro Lys Lys Tyr Gly Gly Phe
                405                 410                 415

Asp Ser Pro Thr Val Ala Tyr Ser Val Leu Val Val Ala Lys Val Glu
                420                 425                 430

Lys Gly Lys Ser Lys Lys Leu Lys Ser Val Lys Glu Leu Leu Gly Ile
                435                 440                 445

Thr Ile Met Glu Arg Ser Ser Phe Glu Lys Asn Pro Ile Asp Phe Leu
    450                 455                 460

Glu Ala Lys Gly Tyr Lys Glu Val Lys Lys Asp Leu Ile Ile Lys Leu
465                 470                 475                 480

Pro Lys Tyr Ser Leu Phe Glu Leu Glu Asn Gly Arg Lys Arg Met Leu
                485                 490                 495

Ala Ser Ala Gly Glu Leu Gln Lys Gly Asn Glu Leu Ala Leu Pro Ser
                500                 505                 510

Lys Tyr Val Asn Phe Leu Tyr Leu Ala Ser His Tyr Glu Lys Leu Lys
                515                 520                 525

Gly Ser Pro Glu Asp Asn Glu Gln Lys Gln Leu Phe Val Glu Gln His
                530                 535                 540

Lys His Tyr Leu Asp Glu Ile Ile Glu Gln Ile Ser Glu Phe Ser Lys
545                 550                 555                 560

Arg Val Ile Leu Ala Asp Ala Asn Leu Asp Lys Val Leu Ser Ala Tyr
                565                 570                 575

Asn Lys His Arg Asp Lys Pro Ile Arg Glu Gln Ala Glu Asn Ile Ile
                580                 585                 590

His Leu Phe Thr Leu Thr Asn Leu Gly Ala Pro Ala Ala Phe Lys Tyr
                595                 600                 605

Phe Asp Thr Thr Ile Asp Arg Lys Arg Tyr Thr Ser Thr Lys Glu Val
                610                 615                 620

Leu Asp Ala Thr Leu Ile His Gln Ser Ile Thr Gly Leu Tyr Glu Thr
625                 630                 635                 640

Arg Ile Asp Leu Ser Gln Leu Gly Gly Asp
                645                 650

<210> SEQ ID NO 8
<211> LENGTH: 34
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 8

Ala Thr Arg Leu Lys Arg Thr Ala Arg Arg Arg Tyr Thr Arg Arg Lys
1               5                   10                  15

Asn Arg Ile Cys Tyr Leu Gln Glu Ile Phe Ser Asn Glu Met Ala Lys
                20                  25                  30

Val Asp

<210> SEQ ID NO 9
<211> LENGTH: 86
<212> TYPE: PRT
<213> ORGANISM: Artificial Sequence
```

```
<220> FEATURE:
<221> NAME/KEY: source
<223> OTHER INFORMATION: /note="Description of Artificial Sequence:
      Synthetic polypeptide"

<400> SEQUENCE: 9

Asp Ser Phe Phe His Arg Leu Glu Glu Ser Phe Leu Val Glu Glu Asp
1               5                   10                  15

Lys Lys His Glu Arg His Pro Ile Phe Gly Asn Ile Val Asp Glu Val
            20                  25                  30

Ala Tyr His Glu Lys Tyr Pro Thr Ile Tyr His Leu Arg Lys Lys Leu
        35                  40                  45

Val Asp Ser Thr Asp Lys Ala Asp Leu Arg Leu Ile Tyr Leu Ala Leu
    50                  55                  60

Ala His Met Ile Lys Phe Arg Gly His Phe Leu Ile Glu Gly Asp Leu
65                  70                  75                  80

Asn Pro Asp Asn Ser Asp
                85

<210> SEQ ID NO 10
<211> LENGTH: 410
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 10

Asn Thr Glu Ile Thr Lys Ala Pro Leu Ser Ala Ser Met Ile Lys Arg
1               5                   10                  15

Tyr Asp Glu His His Gln Asp Leu Thr Leu Leu Lys Ala Leu Val Arg
            20                  25                  30

Gln Gln Leu Pro Glu Lys Tyr Lys Glu Ile Phe Phe Asp Gln Ser Lys
        35                  40                  45

Asn Gly Tyr Ala Gly Tyr Ile Asp Gly Gly Ala Ser Gln Glu Glu Phe
    50                  55                  60

Tyr Lys Phe Ile Lys Pro Ile Leu Glu Lys Met Asp Gly Thr Glu Glu
65                  70                  75                  80

Leu Leu Val Lys Leu Asn Arg Glu Asp Leu Leu Arg Lys Gln Arg Thr
                85                  90                  95

Phe Asp Asn Gly Ser Ile Pro His Gln Ile His Leu Gly Glu Leu His
            100                 105                 110

Ala Ile Leu Arg Arg Gln Glu Asp Phe Tyr Pro Phe Leu Lys Asp Asn
        115                 120                 125

Arg Glu Lys Ile Glu Lys Ile Leu Thr Phe Arg Ile Pro Tyr Tyr Val
    130                 135                 140

Gly Pro Leu Ala Arg Gly Asn Ser Arg Phe Ala Trp Met Thr Arg Lys
145                 150                 155                 160

Ser Glu Glu Thr Ile Thr Pro Trp Asn Phe Glu Glu Val Val Asp Lys
                165                 170                 175

Gly Ala Ser Ala Gln Ser Phe Ile Glu Arg Met Thr Asn Phe Asp Lys
            180                 185                 190

Asn Leu Pro Asn Glu Lys Val Leu Pro Lys His Ser Leu Leu Tyr Glu
        195                 200                 205

Tyr Phe Thr Val Tyr Asn Glu Leu Thr Lys Val Lys Tyr Val Thr Glu
    210                 215                 220
```

-continued

Gly Met Arg Lys Pro Ala Phe Leu Ser Gly Glu Gln Lys Lys Ala Ile
225                 230                 235                 240

Val Asp Leu Leu Phe Lys Thr Asn Arg Lys Val Thr Val Lys Gln Leu
                245                 250                 255

Lys Glu Asp Tyr Phe Lys Lys Ile Glu Cys Phe Asp Ser Val Glu Ile
                260                 265                 270

Ser Gly Val Glu Asp Arg Phe Asn Ala Ser Leu Gly Thr Tyr His Asp
            275                 280                 285

Leu Leu Lys Ile Ile Lys Lys Asp Phe Leu Asp Asn Glu Glu Asn
        290                 295                 300

Glu Asp Ile Leu Glu Asp Ile Val Leu Thr Leu Thr Leu Phe Glu Asp
305                 310                 315                 320

Arg Glu Met Ile Glu Glu Arg Leu Lys Thr Tyr Ala His Leu Phe Asp
                325                 330                 335

Asp Lys Val Met Lys Gln Leu Lys Arg Arg Arg Tyr Thr Gly Trp Gly
                340                 345                 350

Arg Leu Ser Arg Lys Leu Ile Asn Gly Ile Arg Asp Lys Gln Ser Gly
            355                 360                 365

Lys Thr Ile Leu Asp Phe Leu Lys Ser Asp Gly Phe Ala Asn Arg Asn
370                 375                 380

Phe Met Gln Leu Ile His Asp Asp Ser Leu Thr Phe Lys Glu Asp Ile
385                 390                 395                 400

Gln Lys Ala Gln Val Ser Gly Gln Gly Asp
                405                 410

<210> SEQ ID NO 11
<211> LENGTH: 128
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 11

Val Asp Lys Leu Asn Ile Gln Leu Val Gln Thr Tyr Asn Gln Leu Phe
1               5                   10                  15

Glu Glu Asn Pro Ile Asn Ala Ser Gly Val Asp Ala Lys Ala Ile Leu
                20                  25                  30

Ser Ala Arg Leu Ser Lys Ser Arg Arg Leu Glu Asn Leu Ile Ala Gln
            35                  40                  45

Leu Pro Gly Glu Lys Lys Asn Gly Leu Phe Gly Asn Leu Ile Ala Leu
        50                  55                  60

Ser Leu Gly Leu Thr Pro Asn Phe Lys Ser Asn Phe Asp Leu Ala Glu
65                  70                  75                  80

Asp Ala Lys Leu Gln Leu Ser Lys Asp Thr Tyr Asp Asp Asp Leu Asp
                85                  90                  95

Asn Leu Leu Ala Gln Ile Gly Asp Gln Tyr Ala Asp Leu Phe Leu Ala
                100                 105                 110

Ala Lys Asn Leu Ser Asp Ala Ile Leu Leu Ser Asp Ile Leu Arg Val
        115                 120                 125

<210> SEQ ID NO 12
<211> LENGTH: 59
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 12

Met Asp Lys Lys Tyr Ser Ile Gly Leu Asp Ile Gly Thr Asn Ser Val
1               5                   10                  15

Gly Trp Ala Val Ile Thr Asp Asp Tyr Lys Val Pro Ser Lys Lys Phe
            20                  25                  30

Lys Val Leu Gly Asn Thr Asp Arg His Ser Ile Lys Lys Asn Leu Ile
        35                  40                  45

Gly Ala Leu Leu Phe Asp Ser Gly Glu Thr Ala
    50                  55

<210> SEQ ID NO 13
<211> LENGTH: 57
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 13

Asp Ser Leu His Glu His Ile Ala Asn Leu Ala Gly Ser Pro Ala Ile
1               5                   10                  15

Lys Lys Gly Ile Leu Gln Thr Val Lys Val Val Asp Glu Leu Val Lys
            20                  25                  30

Val Met Gly Arg His Lys Pro Glu Asn Ile Val Ile Glu Met Ala Arg
        35                  40                  45

Glu Asn Gln Thr Thr Gln Lys Gly Gln
    50                  55

<210> SEQ ID NO 14
<211> LENGTH: 190
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 14

Ser Glu Leu Asp Lys Ala Gly Phe Ile Lys Arg Gln Leu Val Glu Thr
1               5                   10                  15

Arg Gln Ile Thr Lys His Val Ala Gln Ile Leu Asp Ser Arg Met Asn
            20                  25                  30

Thr Lys Tyr Asp Glu Asn Asp Lys Leu Ile Arg Glu Val Lys Val Ile
        35                  40                  45

Thr Leu Lys Ser Lys Leu Val Ser Asp Phe Arg Lys Asp Phe Gln Phe
    50                  55                  60

Tyr Lys Val Arg Glu Ile Asn Asn Tyr His His Ala His Asp Ala Tyr
65                  70                  75                  80

Leu Asn Ala Val Val Gly Thr Ala Leu Ile Lys Lys Tyr Pro Lys Leu
                85                  90                  95

Glu Ser Glu Phe Val Tyr Gly Asp Tyr Lys Val Tyr Asp Val Arg Lys
            100                 105                 110

Met Ile Ala Lys Ser Glu Gln Glu Ile Gly Lys Ala Thr Ala Lys Tyr
        115                 120                 125

Phe Phe Tyr Ser Asn Ile Met Asn Phe Phe Lys Thr Glu Ile Thr Leu
    130                 135                 140

```
Ala Asn Gly Glu Ile Arg Lys Arg Pro Leu Ile Glu Thr Asn Gly Glu
145                 150                 155                 160

Thr Gly Glu Ile Val Trp Asp Lys Gly Arg Asp Phe Ala Thr Val Arg
            165                 170                 175

Lys Val Leu Ser Met Pro Gln Val Asn Ile Val Lys Lys Thr
        180                 185                 190

<210> SEQ ID NO 15
<211> LENGTH: 134
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 15

Lys Asn Ser Arg Glu Arg Met Lys Arg Ile Glu Glu Gly Ile Lys Glu
1               5                   10                  15

Leu Gly Ser Gln Ile Leu Lys Glu His Pro Val Glu Asn Thr Gln Leu
            20                  25                  30

Gln Asn Glu Lys Leu Tyr Leu Tyr Tyr Leu Gln Asn Gly Arg Asp Met
        35                  40                  45

Tyr Val Asp Gln Glu Leu Asp Ile Asn Arg Leu Ser Asp Tyr Asp Val
50                  55                  60

Asp His Ile Val Pro Gln Ser Phe Leu Lys Asp Asp Ser Ile Asp Asn
65                  70                  75                  80

Lys Val Leu Thr Arg Ser Asp Lys Asn Arg Gly Lys Ser Asp Asn Val
                85                  90                  95

Pro Ser Glu Glu Val Val Lys Lys Met Lys Asn Tyr Trp Arg Gln Leu
            100                 105                 110

Leu Asn Ala Lys Leu Ile Thr Gln Arg Lys Phe Asp Asn Leu Thr Lys
        115                 120                 125

Ala Glu Arg Gly Gly Leu
    130

<210> SEQ ID NO 16
<211> LENGTH: 270
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 16

Glu Val Gln Thr Gly Gly Phe Ser Lys Glu Ser Ile Leu Pro Lys Arg
1               5                   10                  15

Asn Ser Asp Lys Leu Ile Ala Arg Lys Lys Asp Trp Asp Pro Lys Lys
            20                  25                  30

Tyr Gly Gly Phe Asp Ser Pro Thr Val Ala Tyr Ser Val Leu Val Val
        35                  40                  45

Ala Lys Val Glu Lys Gly Lys Ser Lys Lys Leu Lys Ser Val Lys Glu
50                  55                  60

Leu Leu Gly Ile Thr Ile Met Glu Arg Ser Ser Phe Glu Lys Asn Pro
65                  70                  75                  80

Ile Asp Phe Leu Glu Ala Lys Gly Tyr Lys Glu Val Lys Lys Asp Leu
                85                  90                  95
```

```
Ile Ile Lys Leu Pro Lys Tyr Ser Leu Phe Glu Leu Glu Asn Gly Arg
            100                 105                 110

Lys Arg Met Leu Ala Ser Ala Gly Glu Leu Gln Lys Gly Asn Glu Leu
        115                 120                 125

Ala Leu Pro Ser Lys Tyr Val Asn Phe Leu Tyr Leu Ala Ser His Tyr
    130                 135                 140

Glu Lys Leu Lys Gly Ser Pro Glu Asp Asn Glu Gln Lys Gln Leu Phe
145                 150                 155                 160

Val Glu Gln His Lys His Tyr Leu Asp Glu Ile Ile Glu Gln Ile Ser
                165                 170                 175

Glu Phe Ser Lys Arg Val Ile Leu Ala Asp Ala Asn Leu Asp Lys Val
            180                 185                 190

Leu Ser Ala Tyr Asn Lys His Arg Asp Lys Pro Ile Arg Glu Gln Ala
        195                 200                 205

Glu Asn Ile Ile His Leu Phe Thr Leu Thr Asn Leu Gly Ala Pro Ala
    210                 215                 220

Ala Phe Lys Tyr Phe Asp Thr Thr Ile Asp Arg Lys Arg Tyr Thr Ser
225                 230                 235                 240

Thr Lys Glu Val Leu Asp Ala Thr Leu Ile His Gln Ser Ile Thr Gly
                245                 250                 255

Leu Tyr Glu Thr Arg Ile Asp Leu Ser Gln Leu Gly Gly Asp
            260                 265                 270

<210> SEQ ID NO 17
<211> LENGTH: 1409
<212> TYPE: PRT
<213> ORGANISM: Streptococcus thermophilus

<400> SEQUENCE: 17

Met Leu Phe Asn Lys Cys Ile Ile Ile Ser Ile Asn Leu Asp Phe Ser
1               5                   10                  15

Asn Lys Glu Lys Cys Met Thr Lys Pro Tyr Ser Ile Gly Leu Asp Ile
            20                  25                  30

Gly Thr Asn Ser Val Gly Trp Ala Val Ile Thr Asp Asn Tyr Lys Val
        35                  40                  45

Pro Ser Lys Lys Met Lys Val Leu Gly Asn Thr Ser Lys Lys Tyr Ile
    50                  55                  60

Lys Lys Asn Leu Leu Gly Val Leu Leu Phe Asp Ser Gly Ile Thr Ala
65                  70                  75                  80

Glu Gly Arg Arg Leu Lys Arg Thr Ala Arg Arg Tyr Thr Arg Arg
                85                  90                  95

Arg Asn Arg Ile Leu Tyr Leu Gln Glu Ile Phe Ser Thr Glu Met Ala
            100                 105                 110

Thr Leu Asp Asp Ala Phe Phe Gln Arg Leu Asp Asp Ser Phe Leu Val
        115                 120                 125

Pro Asp Asp Lys Arg Asp Ser Lys Tyr Pro Ile Phe Gly Asn Leu Val
    130                 135                 140

Glu Glu Lys Val Tyr His Asp Glu Phe Pro Thr Ile Tyr His Leu Arg
145                 150                 155                 160

Lys Tyr Leu Ala Asp Ser Thr Lys Ala Asp Leu Arg Leu Val Tyr
                165                 170                 175

Leu Ala Leu Ala His Met Ile Lys Tyr Arg Gly His Phe Leu Ile Glu
            180                 185                 190

Gly Glu Phe Asn Ser Lys Asn Asn Asp Ile Gln Lys Asn Phe Gln Asp
        195                 200                 205
```

```
Phe Leu Asp Thr Tyr Asn Ala Ile Phe Glu Ser Asp Leu Ser Leu Glu
    210                 215                 220
Asn Ser Lys Gln Leu Glu Glu Ile Val Lys Asp Lys Ile Ser Lys Leu
225                 230                 235                 240
Glu Lys Lys Asp Arg Ile Leu Lys Leu Phe Pro Gly Glu Lys Asn Ser
                245                 250                 255
Gly Ile Phe Ser Glu Phe Leu Lys Leu Ile Val Gly Asn Gln Ala Asp
                260                 265                 270
Phe Arg Lys Cys Phe Asn Leu Asp Glu Lys Ala Ser Leu His Phe Ser
            275                 280                 285
Lys Glu Ser Tyr Asp Glu Asp Leu Glu Thr Leu Leu Gly Tyr Ile Gly
    290                 295                 300
Asp Asp Tyr Ser Asp Val Phe Leu Lys Ala Lys Lys Leu Tyr Asp Ala
305                 310                 315                 320
Ile Leu Leu Ser Gly Phe Leu Thr Val Thr Asp Asn Glu Thr Glu Ala
                325                 330                 335
Pro Leu Ser Ser Ala Met Ile Lys Arg Tyr Asn Glu His Lys Glu Asp
                340                 345                 350
Leu Ala Leu Leu Lys Glu Tyr Ile Arg Asn Ile Ser Leu Lys Thr Tyr
            355                 360                 365
Asn Glu Val Phe Lys Asp Asp Thr Lys Asn Gly Tyr Ala Gly Tyr Ile
    370                 375                 380
Asp Gly Lys Thr Asn Gln Glu Asp Phe Tyr Val Tyr Leu Lys Asn Leu
385                 390                 395                 400
Leu Ala Glu Phe Glu Gly Ala Asp Tyr Phe Leu Glu Lys Ile Asp Arg
                405                 410                 415
Glu Asp Phe Leu Arg Lys Gln Arg Thr Phe Asp Asn Gly Ser Ile Pro
            420                 425                 430
Tyr Gln Ile His Leu Gln Glu Met Arg Ala Ile Leu Asp Lys Gln Ala
    435                 440                 445
Lys Phe Tyr Pro Phe Leu Ala Lys Asn Lys Glu Arg Ile Glu Lys Ile
    450                 455                 460
Leu Thr Phe Arg Ile Pro Tyr Tyr Val Gly Pro Leu Ala Arg Gly Asn
465                 470                 475                 480
Ser Asp Phe Ala Trp Ser Ile Arg Lys Arg Asn Glu Lys Ile Thr Pro
            485                 490                 495
Trp Asn Phe Glu Asp Val Ile Asp Lys Glu Ser Ser Ala Glu Ala Phe
                500                 505                 510
Ile Asn Arg Met Thr Ser Phe Asp Leu Tyr Leu Pro Glu Glu Lys Val
            515                 520                 525
Leu Pro Lys His Ser Leu Leu Tyr Glu Thr Phe Asn Val Tyr Asn Glu
530                 535                 540
Leu Thr Lys Val Arg Phe Ile Ala Glu Ser Met Arg Asp Tyr Gln Phe
545                 550                 555                 560
Leu Asp Ser Lys Gln Lys Lys Asp Ile Val Arg Leu Tyr Phe Lys Asp
                565                 570                 575
Lys Arg Lys Val Thr Asp Lys Asp Ile Ile Glu Tyr Leu His Ala Ile
            580                 585                 590
Tyr Gly Tyr Asp Gly Ile Glu Leu Lys Gly Ile Glu Lys Gln Phe Asn
    595                 600                 605
Ser Ser Leu Ser Thr Tyr His Asp Leu Leu Asn Ile Ile Asn Asp Lys
    610                 615                 620
```

-continued

```
Glu Phe Leu Asp Asp Ser Ser Asn Glu Ala Ile Ile Glu Glu Ile Ile
625                 630                 635                 640

His Thr Leu Thr Ile Phe Glu Asp Arg Glu Met Ile Lys Gln Arg Leu
            645                 650                 655

Ser Lys Phe Glu Asn Ile Phe Asp Lys Ser Val Leu Lys Lys Leu Ser
                660                 665                 670

Arg Arg His Tyr Thr Gly Trp Gly Lys Leu Ser Ala Lys Leu Ile Asn
            675                 680                 685

Gly Ile Arg Asp Glu Lys Ser Gly Asn Thr Ile Leu Asp Tyr Leu Ile
690                 695                 700

Asp Asp Gly Ile Ser Asn Arg Asn Phe Met Gln Leu Ile His Asp Asp
705                 710                 715                 720

Ala Leu Ser Phe Lys Lys Ile Gln Lys Ala Gln Ile Ile Gly Asp
                725                 730                 735

Glu Asp Lys Gly Asn Ile Lys Glu Val Val Lys Ser Leu Pro Gly Ser
                740                 745                 750

Pro Ala Ile Lys Lys Gly Ile Leu Gln Ser Ile Lys Ile Val Asp Glu
                755                 760                 765

Leu Val Lys Val Met Gly Gly Arg Lys Pro Glu Ser Ile Val Val Glu
770                 775                 780

Met Ala Arg Glu Asn Gln Tyr Thr Asn Gln Gly Lys Ser Asn Ser Gln
785                 790                 795                 800

Gln Arg Leu Lys Arg Leu Glu Lys Ser Leu Lys Glu Leu Gly Ser Lys
                805                 810                 815

Ile Leu Lys Glu Asn Ile Pro Ala Lys Leu Ser Lys Ile Asp Asn Asn
                820                 825                 830

Ala Leu Gln Asn Asp Arg Leu Tyr Leu Tyr Tyr Leu Gln Asn Gly Lys
835                 840                 845

Asp Met Tyr Thr Gly Asp Asp Leu Asp Ile Asp Arg Leu Ser Asn Tyr
850                 855                 860

Asp Ile Asp His Ile Ile Pro Gln Ala Phe Leu Lys Asp Asn Ser Ile
865                 870                 875                 880

Asp Asn Lys Val Leu Val Ser Ser Ala Ser Asn Arg Gly Lys Ser Asp
                885                 890                 895

Asp Phe Pro Ser Leu Glu Val Val Lys Lys Arg Lys Thr Phe Trp Tyr
                900                 905                 910

Gln Leu Leu Lys Ser Lys Leu Ile Ser Gln Arg Lys Phe Asp Asn Leu
                915                 920                 925

Thr Lys Ala Glu Arg Gly Gly Leu Leu Pro Gly Asp Lys Ala Gly Phe
                930                 935                 940

Ile Gln Arg Gln Leu Val Glu Thr Arg Gln Ile Thr Lys His Val Ala
945                 950                 955                 960

Arg Leu Leu Asp Glu Lys Phe Asn Asn Lys Lys Asp Glu Asn Asn Arg
                965                 970                 975

Ala Val Arg Thr Val Lys Ile Ile Thr Leu Lys Ser Thr Leu Val Ser
                980                 985                 990

Gln Phe Arg Lys Asp Phe Glu Leu Tyr Lys Val Arg Glu Ile Asn Asp
                995                 1000                1005

Phe His His Ala His Asp Ala Tyr Leu Asn Ala Val Ile Ala Ser
                1010                1015                1020

Ala Leu Leu Lys Lys Tyr Pro Lys Leu Glu Pro Glu Phe Val Tyr
                1025                1030                1035

Gly Asp Tyr Pro Lys Tyr Asn Ser Phe Arg Glu Arg Lys Ser Ala
```

```
                    1040                1045                1050
Thr Glu Lys Val Tyr Phe Tyr Ser Asn Ile Met Asn Ile Phe Lys
    1055                1060                1065
Lys Ser Ile Ser Leu Ala Asp Gly Arg Val Ile Glu Arg Pro Leu
    1070                1075                1080
Ile Glu Val Asn Glu Glu Thr Gly Glu Ser Val Trp Asn Lys Glu
    1085                1090                1095
Ser Asp Leu Ala Thr Val Arg Arg Val Leu Ser Tyr Pro Gln Val
    1100                1105                1110
Asn Val Val Lys Lys Val Glu Glu Gln Asn His Gly Leu Asp Arg
    1115                1120                1125
Gly Lys Pro Lys Gly Leu Phe Asn Ala Asn Leu Ser Ser Lys Pro
    1130                1135                1140
Lys Pro Asn Ser Asn Glu Asn Leu Val Gly Ala Lys Glu Tyr Leu
    1145                1150                1155
Asp Pro Lys Lys Tyr Gly Gly Tyr Ala Gly Ile Ser Asn Ser Phe
    1160                1165                1170
Ala Val Leu Val Lys Gly Thr Ile Glu Lys Gly Ala Lys Lys Lys
    1175                1180                1185
Ile Thr Asn Val Leu Glu Phe Gln Gly Ile Ser Ile Leu Asp Arg
    1190                1195                1200
Ile Asn Tyr Arg Lys Asp Lys Leu Asn Phe Leu Leu Glu Lys Gly
    1205                1210                1215
Tyr Lys Asp Ile Glu Leu Ile Ile Glu Leu Pro Lys Tyr Ser Leu
    1220                1225                1230
Phe Glu Leu Ser Asp Gly Ser Arg Arg Met Leu Ala Ser Ile Leu
    1235                1240                1245
Ser Thr Asn Asn Lys Arg Gly Glu Ile His Lys Gly Asn Gln Ile
    1250                1255                1260
Phe Leu Ser Gln Lys Phe Val Lys Leu Leu Tyr His Ala Lys Arg
    1265                1270                1275
Ile Ser Asn Thr Ile Asn Glu Asn His Arg Lys Tyr Val Glu Asn
    1280                1285                1290
His Lys Lys Glu Phe Glu Glu Leu Phe Tyr Tyr Ile Leu Glu Phe
    1295                1300                1305
Asn Glu Asn Tyr Val Gly Ala Lys Lys Asn Gly Lys Leu Leu Asn
    1310                1315                1320
Ser Ala Phe Gln Ser Trp Gln Asn His Ser Ile Asp Glu Leu Cys
    1325                1330                1335
Ser Ser Phe Ile Gly Pro Thr Gly Ser Glu Arg Lys Gly Leu Phe
    1340                1345                1350
Glu Leu Thr Ser Arg Gly Ser Ala Ala Asp Phe Glu Phe Leu Gly
    1355                1360                1365
Val Lys Ile Pro Arg Tyr Arg Asp Tyr Thr Pro Ser Ser Leu Leu
    1370                1375                1380
Lys Asp Ala Thr Leu Ile His Gln Ser Val Thr Gly Leu Tyr Glu
    1385                1390                1395
Thr Arg Ile Asp Leu Ala Lys Leu Gly Glu Gly
    1400                1405

<210> SEQ ID NO 18
<211> LENGTH: 1371
<212> TYPE: PRT
<213> ORGANISM: Streptococcus dysgalactiae
```

<400> SEQUENCE: 18

```
Met Asp Lys Lys Tyr Ser Ile Gly Leu Asp Ile Gly Thr Asn Ser Val
1               5                   10                  15

Gly Trp Ala Val Ile Thr Asp Asp Tyr Lys Val Pro Ser Lys Lys Phe
            20                  25                  30

Lys Val Leu Gly Asn Thr Asp Arg His Ser Ile Lys Lys Asn Leu Ile
                35                  40                  45

Gly Ala Leu Leu Phe Asp Ser Gly Glu Thr Ala Glu Ala Thr Arg Leu
    50                  55                  60

Lys Arg Thr Ala Arg Arg Arg Tyr Thr Arg Arg Lys Asn Arg Ile Arg
65                  70                  75                  80

Tyr Leu Gln Glu Ile Phe Ser Ser Glu Met Ser Lys Val Asp Asp Ser
                    85                  90                  95

Phe Phe His Arg Leu Glu Glu Ser Phe Leu Val Glu Glu Asp Lys Lys
                100                 105                 110

His Glu Arg His Pro Ile Phe Gly Asn Ile Val Asp Glu Val Ala Tyr
            115                 120                 125

His Glu Lys Tyr Pro Thr Ile Tyr His Leu Arg Lys Lys Leu Ala Asp
        130                 135                 140

Ser Thr Asp Lys Ala Asp Leu Arg Leu Ile Tyr Leu Ala Leu Ala His
145                 150                 155                 160

Met Ile Lys Phe Arg Gly His Phe Leu Ile Glu Gly Asp Leu Asn Pro
                    165                 170                 175

Asp Asn Ser Asp Met Asp Lys Leu Phe Ile Gln Leu Val Gln Thr Tyr
                180                 185                 190

Asn Gln Leu Phe Glu Glu Asn Pro Ile Asn Ala Ser Arg Val Asp Ala
            195                 200                 205

Lys Ala Ile Leu Ser Ala Arg Leu Ser Lys Ser Arg Arg Leu Glu Asn
        210                 215                 220

Leu Ile Ala Gln Leu Pro Gly Glu Lys Arg Asn Gly Leu Phe Gly Asn
225                 230                 235                 240

Leu Ile Ala Leu Ser Leu Gly Leu Thr Pro Asn Phe Lys Ser Asn Phe
                    245                 250                 255

Asp Leu Ala Glu Asp Ala Lys Leu Gln Leu Ser Lys Asp Thr Tyr Asp
                260                 265                 270

Asp Asp Leu Asp Asn Leu Leu Ala Gln Ile Gly Asp Gln Tyr Ala Asp
            275                 280                 285

Leu Phe Leu Ala Ala Lys Asn Leu Ser Asp Ala Ile Leu Leu Ser Asp
        290                 295                 300

Ile Leu Arg Val Asn Ser Glu Ile Thr Lys Ala Pro Leu Ser Ala Ser
305                 310                 315                 320

Met Ile Lys Arg Tyr Asp Glu His His Gln Asp Leu Thr Leu Leu Lys
                    325                 330                 335

Ala Leu Val Arg Gln Gln Leu Pro Glu Lys Tyr Lys Glu Ile Phe Phe
                340                 345                 350

Asp Gln Ser Lys Asn Gly Tyr Ala Gly Tyr Ile Asp Gly Gly Ala Ser
            355                 360                 365

Gln Glu Glu Phe Tyr Lys Phe Ile Lys Pro Ile Leu Glu Lys Met Asp
        370                 375                 380

Gly Thr Glu Glu Leu Leu Ala Lys Leu Asn Arg Glu Asp Leu Leu Arg
385                 390                 395                 400

Lys Gln Arg Thr Phe Asp Asn Gly Ser Ile Pro His Gln Ile His Leu
```

```
                    405                 410                 415
Gly Glu Leu His Ala Ile Leu Arg Arg Gln Glu Asp Phe Tyr Pro Phe
                420                 425                 430

Leu Lys Asp Asn Arg Glu Lys Ile Glu Lys Ile Leu Thr Phe Arg Ile
            435                 440                 445

Pro Tyr Tyr Val Gly Pro Leu Ala Arg Gly Asn Ser Arg Phe Ala Trp
        450                 455                 460

Met Thr Arg Lys Ser Glu Glu Thr Ile Thr Pro Trp Asn Phe Glu Glu
465                 470                 475                 480

Val Val Asp Lys Gly Ala Ser Ala Gln Ser Phe Ile Glu Arg Met Thr
                485                 490                 495

Asn Phe Asp Lys Asn Leu Pro Asn Glu Lys Val Leu Pro Lys His Ser
            500                 505                 510

Leu Leu Tyr Glu Tyr Phe Thr Val Tyr Asn Glu Leu Thr Lys Val Lys
        515                 520                 525

Tyr Val Thr Glu Gly Met Arg Lys Pro Glu Phe Leu Ser Gly Lys Gln
    530                 535                 540

Lys Glu Ala Ile Val Asp Leu Leu Phe Lys Thr Asn Arg Lys Val Thr
545                 550                 555                 560

Val Lys Gln Leu Lys Glu Asp Tyr Phe Lys Lys Ile Glu Cys Phe Asp
                565                 570                 575

Ser Val Glu Ile Ser Gly Val Glu Asp Arg Phe Asn Ala Ser Leu Gly
            580                 585                 590

Thr Tyr His Asp Leu Leu Lys Ile Ile Lys Asp Lys Asp Phe Leu Asp
        595                 600                 605

Asn Glu Glu Asn Glu Asp Ile Leu Glu Asp Ile Val Leu Thr Leu Thr
    610                 615                 620

Leu Phe Glu Asp Lys Glu Met Ile Glu Glu Arg Leu Lys Thr Tyr Ala
625                 630                 635                 640

His Leu Phe Asp Asp Lys Val Met Lys Gln Leu Lys Arg Arg His Tyr
                645                 650                 655

Thr Gly Trp Gly Arg Leu Ser Arg Lys Leu Ile Asn Gly Ile Arg Asp
            660                 665                 670

Lys Gln Ser Gly Lys Thr Ile Leu Asp Phe Leu Lys Ser Asp Gly Phe
        675                 680                 685

Ala Asn Arg Asn Phe Ile Gln Leu Ile His Asp Asp Ser Leu Thr Phe
    690                 695                 700

Lys Glu Ala Ile Gln Lys Ala Gln Val Ser Gly Gln Gly His Ser Leu
705                 710                 715                 720

His Glu Gln Ile Ala Asn Leu Ala Gly Ser Pro Ala Ile Lys Lys Gly
                725                 730                 735

Ile Leu Gln Ser Val Lys Val Val Asp Glu Leu Val Lys Val Met Gly
            740                 745                 750

His Lys Pro Glu Asn Ile Val Ile Glu Met Ala Arg Glu Asn Gln Thr
        755                 760                 765

Thr Gln Lys Gly Gln Lys Asn Ser Arg Glu Arg Met Lys Arg Ile Glu
    770                 775                 780

Glu Gly Ile Lys Glu Leu Gly Ser Gln Ile Leu Lys Glu His Pro Val
785                 790                 795                 800

Glu Asn Thr Gln Leu Gln Asn Glu Lys Leu Tyr Leu Tyr Tyr Leu Gln
                805                 810                 815

Asn Gly Arg Asp Met Tyr Val Asp Gln Glu Leu Asp Ile Asn Arg Leu
            820                 825                 830
```

-continued

Ser Asp Tyr Asp Val Asp His Ile Val Pro Gln Ser Phe Ile Lys Asp
        835                 840                 845

Asp Ser Ile Asp Asn Lys Val Leu Thr Arg Ser Asp Lys Asn Arg Gly
850                 855                 860

Lys Ser Asp Asp Val Pro Ser Glu Glu Val Val Lys Lys Met Lys Asn
865                 870                 875                 880

Tyr Trp Arg Gln Leu Leu Asn Ala Lys Leu Ile Thr Gln Arg Lys Phe
                885                 890                 895

Asp Asn Leu Thr Lys Ala Glu Arg Gly Gly Leu Ser Glu Leu Asp Lys
            900                 905                 910

Ala Gly Phe Ile Lys Arg Gln Leu Val Glu Thr Arg Gln Ile Thr Lys
            915                 920                 925

His Val Ala Gln Ile Leu Asp Ser Arg Met Asn Thr Lys Tyr Asp Glu
        930                 935                 940

Asn Asp Lys Leu Ile Arg Glu Val Lys Val Ile Thr Leu Lys Ser Lys
945                 950                 955                 960

Leu Val Ser Asp Phe Arg Lys Asp Phe Gln Phe Tyr Lys Val Arg Glu
                965                 970                 975

Ile Asn Asn Tyr His His Ala His Asp Ala Tyr Leu Asn Ala Val Val
            980                 985                 990

Gly Thr Ala Leu Ile Lys Lys Tyr Pro Lys Leu Glu Ser Glu Phe Val
            995                 1000                1005

Tyr Gly Asp Tyr Lys Val Tyr Asp Val Arg Lys Met Ile Ala Lys
    1010                1015                1020

Ser Glu Gln Glu Ile Gly Lys Ala Thr Ala Lys Arg Phe Phe Tyr
    1025                1030                1035

Ser Asn Ile Met Asn Phe Phe Lys Thr Glu Ile Thr Leu Ala Asn
    1040                1045                1050

Gly Glu Ile Arg Lys Arg Pro Leu Ile Glu Thr Asn Glu Glu Thr
    1055                1060                1065

Gly Glu Ile Val Trp Asn Lys Gly Arg Asp Phe Ala Thr Val Arg
    1070                1075                1080

Lys Val Leu Ser Met Pro Gln Val Asn Ile Val Lys Lys Thr Glu
    1085                1090                1095

Val Gln Thr Gly Ala Leu Thr Asn Glu Ser Ile Tyr Ala Arg Gly
    1100                1105                1110

Ser Phe Asp Lys Leu Ile Ser Arg Lys His Arg Phe Glu Ser Ser
    1115                1120                1125

Lys Tyr Gly Gly Phe Gly Ser Pro Thr Val Thr Tyr Ser Val Leu
    1130                1135                1140

Val Val Ala Lys Ser Lys Val Gln Asp Gly Lys Val Lys Lys Ile
    1145                1150                1155

Lys Thr Gly Lys Glu Leu Ile Gly Ile Thr Leu Leu Asp Lys Leu
    1160                1165                1170

Val Phe Glu Lys Asn Pro Leu Lys Phe Ile Glu Asp Lys Gly Tyr
    1175                1180                1185

Gly Asn Val Gln Ile Asp Lys Cys Ile Lys Leu Pro Lys Tyr Ser
    1190                1195                1200

Leu Phe Glu Phe Glu Asn Gly Thr Arg Arg Met Leu Ala Ser Val
    1205                1210                1215

Met Ala Asn Asn Asn Ser Arg Gly Asp Leu Gln Lys Ala Asn Glu
    1220                1225                1230

-continued

```
Met Phe Leu Pro Ala Lys Leu Val Thr Leu Leu Tyr His Ala His
1235                1240                1245

Lys Ile Glu Ser Ser Lys Glu Leu Glu His Glu Ala Tyr Ile Leu
1250                1255                1260

Asp His Tyr Asn Asp Leu Tyr Gln Leu Leu Ser Tyr Ile Glu Arg
1265                1270                1275

Phe Ala Ser Leu Tyr Val Asp Val Glu Lys Asn Ile Ser Lys Val
1280                1285                1290

Lys Glu Leu Phe Ser Asn Ile Glu Ser Tyr Ser Ile Ser Glu Ile
1295                1300                1305

Cys Ser Ser Val Ile Asn Leu Leu Thr Leu Thr Ala Ser Gly Ala
1310                1315                1320

Pro Ala Asp Phe Lys Phe Leu Gly Thr Thr Ile Pro Arg Lys Arg
1325                1330                1335

Tyr Gly Ser Pro Gln Ser Ile Leu Ser Ser Thr Leu Ile His Gln
1340                1345                1350

Ser Ile Thr Gly Leu Tyr Glu Thr Arg Ile Asp Leu Ser Gln Leu
1355                1360                1365

Gly Gly Asp
1370

<210> SEQ ID NO 19
<211> LENGTH: 1345
<212> TYPE: PRT
<213> ORGANISM: Streptococcus mutans

<400> SEQUENCE: 19

Met Lys Lys Pro Tyr Ser Ile Gly Leu Asp Ile Gly Thr Asn Ser
1                   5                   10                  15

Gly Trp Ala Val Val Thr Asp Asp Tyr Lys Val Pro Ala Lys Lys Met
                    20                  25                  30

Lys Val Leu Gly Asn Thr Asp Lys Ser His Ile Glu Lys Asn Leu Leu
            35                  40                  45

Gly Ala Leu Leu Phe Asp Ser Gly Asn Thr Ala Glu Asp Arg Arg Leu
50                  55                  60

Lys Arg Thr Ala Arg Arg Arg Tyr Thr Arg Arg Asn Arg Ile Leu
65                  70                  75                  80

Tyr Leu Gln Glu Ile Phe Ser Glu Glu Met Gly Lys Val Asp Asp Ser
                    85                  90                  95

Phe Phe His Arg Leu Glu Asp Ser Phe Leu Val Thr Glu Asp Lys Arg
            100                 105                 110

Gly Glu Arg His Pro Ile Phe Gly Asn Leu Glu Glu Glu Val Lys Tyr
        115                 120                 125

His Glu Asn Phe Pro Thr Ile Tyr His Leu Arg Gln Tyr Leu Ala Asp
130                 135                 140

Asn Pro Glu Lys Val Asp Leu Arg Leu Val Tyr Leu Ala Leu Ala His
145                 150                 155                 160

Ile Ile Lys Phe Arg Gly His Phe Leu Ile Glu Gly Lys Phe Asp Thr
                    165                 170                 175

Arg Asn Asn Asp Val Gln Arg Leu Phe Gln Glu Phe Leu Ala Val Tyr
            180                 185                 190

Asp Asn Thr Phe Glu Asn Ser Ser Leu Gln Glu Gln Asn Val Gln Val
        195                 200                 205

Glu Glu Ile Leu Thr Asp Lys Ile Ser Lys Ser Ala Lys Lys Asp Arg
210                 215                 220
```

```
Val Leu Lys Leu Phe Pro Asn Glu Lys Ser Asn Gly Arg Phe Ala Glu
225                 230                 235                 240

Phe Leu Lys Leu Ile Val Gly Asn Gln Ala Asp Phe Lys Lys His Phe
            245                 250                 255

Glu Leu Glu Glu Lys Ala Pro Leu Gln Phe Ser Lys Asp Thr Tyr Glu
        260                 265                 270

Glu Glu Leu Glu Val Leu Leu Ala Gln Ile Gly Asp Asn Tyr Ala Glu
        275                 280                 285

Leu Phe Leu Ser Ala Lys Lys Leu Tyr Asp Ser Ile Leu Leu Ser Gly
        290                 295                 300

Ile Leu Thr Val Thr Asp Val Gly Thr Lys Ala Pro Leu Ser Ala Ser
305                 310                 315                 320

Met Ile Gln Arg Tyr Asn Glu His Gln Met Asp Leu Ala Gln Leu Lys
            325                 330                 335

Gln Phe Ile Arg Gln Lys Leu Ser Asp Lys Tyr Asn Glu Val Phe Ser
            340                 345                 350

Asp Val Ser Lys Asp Gly Tyr Ala Gly Tyr Ile Asp Gly Lys Thr Asn
        355                 360                 365

Gln Glu Ala Phe Tyr Lys Tyr Leu Lys Gly Leu Leu Asn Lys Ile Glu
        370                 375                 380

Gly Ser Gly Tyr Phe Leu Asp Lys Ile Glu Arg Glu Asp Phe Leu Arg
385                 390                 395                 400

Lys Gln Arg Thr Phe Asp Asn Gly Ser Ile Pro His Gln Ile His Leu
            405                 410                 415

Gln Glu Met Arg Ala Ile Ile Arg Arg Gln Ala Glu Phe Tyr Pro Phe
            420                 425                 430

Leu Ala Asp Asn Gln Asp Arg Ile Glu Lys Leu Leu Thr Phe Arg Ile
            435                 440                 445

Pro Tyr Tyr Val Gly Pro Leu Ala Arg Gly Lys Ser Asp Phe Ala Trp
    450                 455                 460

Leu Ser Arg Lys Ser Ala Asp Lys Ile Thr Pro Trp Asn Phe Asp Glu
465                 470                 475                 480

Ile Val Asp Lys Glu Ser Ser Ala Glu Ala Phe Ile Asn Arg Met Thr
            485                 490                 495

Asn Tyr Asp Leu Tyr Leu Pro Asn Gln Lys Val Leu Pro Lys His Ser
            500                 505                 510

Leu Leu Tyr Glu Lys Phe Thr Val Tyr Asn Glu Leu Thr Lys Val Lys
            515                 520                 525

Tyr Lys Thr Glu Gln Gly Lys Thr Ala Phe Phe Asp Ala Asn Met Lys
            530                 535                 540

Gln Glu Ile Phe Asp Gly Val Phe Lys Val Tyr Arg Lys Val Thr Lys
545                 550                 555                 560

Asp Lys Leu Met Asp Phe Leu Glu Lys Glu Phe Asp Glu Phe Arg Ile
            565                 570                 575

Val Asp Leu Thr Gly Leu Asp Lys Glu Asn Lys Val Phe Asn Ala Ser
            580                 585                 590

Tyr Gly Thr Tyr His Asp Leu Cys Lys Ile Leu Asp Lys Asp Phe Leu
            595                 600                 605

Asp Asn Ser Lys Asn Glu Lys Ile Leu Glu Asp Ile Val Leu Thr Leu
            610                 615                 620

Thr Leu Phe Glu Asp Arg Glu Met Ile Arg Lys Arg Leu Glu Asn Tyr
625                 630                 635                 640
```

```
Ser Asp Leu Leu Thr Lys Glu Gln Val Lys Lys Leu Glu Arg Arg His
                645                 650                 655
Tyr Thr Gly Trp Gly Arg Leu Ser Ala Glu Leu Ile His Gly Ile Arg
            660                 665                 670
Asn Lys Glu Ser Arg Lys Thr Ile Leu Asp Tyr Leu Ile Asp Asp Gly
        675                 680                 685
Asn Ser Asn Arg Asn Phe Met Gln Leu Ile Asn Asp Asp Ala Leu Ser
    690                 695                 700
Phe Lys Glu Glu Ile Ala Lys Ala Gln Val Ile Gly Glu Thr Asp Asn
705                 710                 715                 720
Leu Asn Gln Val Val Ser Asp Ile Ala Gly Ser Pro Ala Ile Lys Lys
                725                 730                 735
Gly Ile Leu Gln Ser Leu Lys Ile Val Asp Glu Leu Val Lys Ile Met
            740                 745                 750
Gly His Gln Pro Glu Asn Ile Val Val Glu Met Ala Arg Glu Asn Gln
        755                 760                 765
Phe Thr Asn Gln Gly Arg Arg Asn Ser Gln Gln Arg Leu Lys Gly Leu
    770                 775                 780
Thr Asp Ser Ile Lys Glu Phe Gly Ser Gln Ile Leu Lys Glu His Pro
785                 790                 795                 800
Val Glu Asn Ser Gln Leu Gln Asn Asp Arg Leu Phe Leu Tyr Tyr Leu
                805                 810                 815
Gln Asn Gly Arg Asp Met Tyr Thr Gly Glu Glu Leu Asp Ile Asp Tyr
            820                 825                 830
Leu Ser Gln Tyr Asp Ile Asp His Ile Ile Pro Gln Ala Phe Ile Lys
        835                 840                 845
Asp Asn Ser Ile Asp Asn Arg Val Leu Thr Ser Ser Lys Glu Asn Arg
    850                 855                 860
Gly Lys Ser Asp Asp Val Pro Ser Lys Asp Val Arg Lys Met Lys
865                 870                 875                 880
Ser Tyr Trp Ser Lys Leu Leu Ser Ala Lys Leu Ile Thr Gln Arg Lys
                885                 890                 895
Phe Asp Asn Leu Thr Lys Ala Glu Arg Gly Gly Leu Thr Asp Asp Asp
            900                 905                 910
Lys Ala Gly Phe Ile Lys Arg Gln Leu Val Glu Thr Arg Gln Ile Thr
        915                 920                 925
Lys His Val Ala Arg Ile Leu Asp Glu Arg Phe Asn Thr Glu Thr Asp
    930                 935                 940
Glu Asn Asn Lys Lys Ile Arg Gln Val Lys Ile Val Thr Leu Lys Ser
945                 950                 955                 960
Asn Leu Val Ser Asn Phe Arg Lys Glu Phe Glu Leu Tyr Lys Val Arg
                965                 970                 975
Glu Ile Asn Asp Tyr His His Ala His Asp Ala Tyr Leu Asn Ala Val
            980                 985                 990
Ile Gly Lys Ala Leu Leu Gly Val Tyr Pro Gln Leu Glu Pro Glu Phe
        995                 1000                1005
Val Tyr Gly Asp Tyr Pro His Phe His Gly His Lys Glu Asn Lys
    1010                1015                1020
Ala Thr Ala Lys Lys Phe Phe Tyr Ser Asn Ile Met Asn Phe Phe
    1025                1030                1035
Lys Lys Asp Asp Val Arg Thr Asp Lys Asn Gly Glu Ile Ile Trp
    1040                1045                1050
Lys Lys Asp Glu His Ile Ser Asn Ile Lys Lys Val Leu Ser Tyr
```

Pro Gln Val Asn Ile Val Lys Lys Val Glu Glu Gln Thr Gly Gly
        1070                1075                1080

Phe Ser Lys Glu Ser Ile Leu Pro Lys Gly Asn Ser Asp Lys Leu
    1085                1090                1095

Ile Pro Arg Lys Thr Lys Lys Phe Tyr Trp Asp Thr Lys Lys Tyr
    1100                1105                1110

Gly Gly Phe Asp Ser Pro Ile Val Ala Tyr Ser Ile Leu Val Ile
    1115                1120                1125

Ala Asp Ile Glu Lys Gly Lys Ser Lys Lys Leu Lys Thr Val Lys
    1130                1135                1140

Ala Leu Val Gly Val Thr Ile Met Glu Lys Met Thr Phe Glu Arg
    1145                1150                1155

Asp Pro Val Ala Phe Leu Glu Arg Lys Gly Tyr Arg Asn Val Gln
    1160                1165                1170

Glu Glu Asn Ile Ile Lys Leu Pro Lys Tyr Ser Leu Phe Lys Leu
    1175                1180                1185

Glu Asn Gly Arg Lys Arg Leu Leu Ala Ser Ala Arg Glu Leu Gln
    1190                1195                1200

Lys Gly Asn Glu Ile Val Leu Pro Asn His Leu Gly Thr Leu Leu
    1205                1210                1215

Tyr His Ala Lys Asn Ile His Lys Val Asp Glu Pro Lys His Leu
    1220                1225                1230

Asp Tyr Val Asp Lys His Lys Asp Glu Phe Lys Glu Leu Leu Asp
    1235                1240                1245

Val Val Ser Asn Phe Ser Lys Lys Tyr Thr Leu Ala Glu Gly Asn
    1250                1255                1260

Leu Glu Lys Ile Lys Glu Leu Tyr Ala Gln Asn Asn Gly Glu Asp
    1265                1270                1275

Leu Lys Glu Leu Ala Ser Ser Phe Ile Asn Leu Leu Thr Phe Thr
    1280                1285                1290

Ala Ile Gly Ala Pro Ala Thr Phe Lys Phe Phe Asp Lys Asn Ile
    1295                1300                1305

Asp Arg Lys Arg Tyr Thr Ser Thr Thr Glu Ile Leu Asn Ala Thr
    1310                1315                1320

Leu Ile His Gln Ser Ile Thr Gly Leu Tyr Glu Thr Arg Ile Asp
    1325                1330                1335

Leu Asn Lys Leu Gly Gly Asp
    1340                1345

<210> SEQ ID NO 20
<211> LENGTH: 1334
<212> TYPE: PRT
<213> ORGANISM: Listeria innocua

<400> SEQUENCE: 20

Met Lys Lys Pro Tyr Thr Ile Gly Leu Asp Ile Gly Thr Asn Ser Val
1               5                   10                  15

Gly Trp Ala Val Leu Thr Asp Gln Tyr Asp Leu Val Lys Arg Lys Met
            20                  25                  30

Lys Ile Ala Gly Asp Ser Glu Lys Lys Gln Ile Lys Lys Asn Phe Trp
        35                  40                  45

Gly Val Arg Leu Phe Asp Glu Gly Gln Thr Ala Ala Asp Arg Arg Met
    50                  55                  60

-continued

```
Ala Arg Thr Ala Arg Arg Ile Glu Arg Arg Asn Arg Ile Ser
 65              70                  75              80

Tyr Leu Gln Gly Ile Phe Ala Glu Glu Met Ser Lys Thr Asp Ala Asn
                 85                  90                  95

Phe Phe Cys Arg Leu Ser Asp Ser Phe Tyr Val Asp Asn Glu Lys Arg
            100                 105                 110

Asn Ser Arg His Pro Phe Phe Ala Thr Ile Glu Glu Val Glu Tyr
        115                 120                 125

His Lys Asn Tyr Pro Thr Ile Tyr His Leu Arg Glu Glu Leu Val Asn
    130                 135                 140

Ser Ser Glu Lys Ala Asp Leu Arg Leu Val Tyr Leu Ala Leu Ala His
145                 150                 155                 160

Ile Ile Lys Tyr Arg Gly Asn Phe Leu Ile Glu Gly Ala Leu Asp Thr
                165                 170                 175

Gln Asn Thr Ser Val Asp Gly Ile Tyr Lys Gln Phe Ile Gln Thr Tyr
                180                 185                 190

Asn Gln Val Phe Ala Ser Gly Ile Glu Asp Gly Ser Leu Lys Lys Leu
            195                 200                 205

Glu Asp Asn Lys Asp Val Ala Lys Ile Leu Val Glu Lys Val Thr Arg
210                 215                 220

Lys Glu Lys Leu Glu Arg Ile Leu Lys Leu Tyr Pro Gly Glu Lys Ser
225                 230                 235                 240

Ala Gly Met Phe Ala Gln Phe Ile Ser Leu Ile Val Gly Ser Lys Gly
                245                 250                 255

Asn Phe Gln Lys Pro Phe Asp Leu Ile Glu Lys Ser Asp Ile Glu Cys
            260                 265                 270

Ala Lys Asp Ser Tyr Glu Glu Asp Leu Glu Ser Leu Leu Ala Leu Ile
        275                 280                 285

Gly Asp Glu Tyr Ala Glu Leu Phe Val Ala Ala Lys Asn Ala Tyr Ser
    290                 295                 300

Ala Val Val Leu Ser Ser Ile Ile Thr Val Ala Glu Thr Glu Thr Asn
305                 310                 315                 320

Ala Lys Leu Ser Ala Ser Met Ile Glu Arg Phe Asp Thr His Glu Glu
                325                 330                 335

Asp Leu Gly Glu Leu Lys Ala Phe Ile Lys Leu His Leu Pro Lys His
            340                 345                 350

Tyr Glu Glu Ile Phe Ser Asn Thr Glu Lys His Gly Tyr Ala Gly Tyr
        355                 360                 365

Ile Asp Gly Lys Thr Lys Gln Ala Asp Phe Tyr Lys Tyr Met Lys Met
    370                 375                 380

Thr Leu Glu Asn Ile Glu Gly Ala Asp Tyr Phe Ile Ala Lys Ile Glu
385                 390                 395                 400

Lys Glu Asn Phe Leu Arg Lys Gln Arg Thr Phe Asp Asn Gly Ala Ile
                405                 410                 415

Pro His Gln Leu His Leu Glu Glu Leu Glu Ala Ile Leu His Gln Gln
            420                 425                 430

Ala Lys Tyr Tyr Pro Phe Leu Lys Glu Asn Tyr Asp Lys Ile Lys Ser
        435                 440                 445

Leu Val Thr Phe Arg Ile Pro Tyr Phe Val Gly Pro Leu Ala Asn Gly
    450                 455                 460

Gln Ser Glu Phe Ala Trp Leu Thr Arg Lys Ala Asp Gly Glu Ile Arg
465                 470                 475                 480

Pro Trp Asn Ile Glu Glu Lys Val Asp Phe Gly Lys Ser Ala Val Asp
```

-continued

```
                485                 490                 495
Phe Ile Glu Lys Met Thr Asn Lys Asp Thr Tyr Leu Pro Lys Glu Asn
            500                 505                 510

Val Leu Pro Lys His Ser Leu Cys Tyr Gln Lys Tyr Leu Val Tyr Asn
            515                 520                 525

Glu Leu Thr Lys Val Arg Tyr Ile Asn Asp Gln Gly Lys Thr Ser Tyr
            530                 535                 540

Phe Ser Gly Gln Glu Lys Glu Gln Ile Phe Asn Asp Leu Phe Lys Gln
545                 550                 555                 560

Lys Arg Lys Val Lys Lys Asp Leu Glu Leu Phe Leu Arg Asn Met
            565                 570                 575

Ser His Val Glu Ser Pro Thr Ile Glu Gly Leu Glu Asp Ser Phe Asn
            580                 585                 590

Ser Ser Tyr Ser Thr Tyr His Asp Leu Leu Lys Val Gly Ile Lys Gln
            595                 600                 605

Glu Ile Leu Asp Asn Pro Val Asn Thr Glu Met Leu Glu Asn Ile Val
            610                 615                 620

Lys Ile Leu Thr Val Phe Glu Asp Lys Arg Met Ile Lys Glu Gln Leu
625                 630                 635                 640

Gln Gln Phe Ser Asp Val Leu Asp Gly Val Val Leu Lys Lys Leu Glu
            645                 650                 655

Arg Arg His Tyr Thr Gly Trp Gly Arg Leu Ser Ala Lys Leu Leu Met
            660                 665                 670

Gly Ile Arg Asp Lys Gln Ser His Leu Thr Ile Leu Asp Tyr Leu Met
            675                 680                 685

Asn Asp Asp Gly Leu Asn Arg Asn Leu Met Gln Leu Ile Asn Asp Ser
            690                 695                 700

Asn Leu Ser Phe Lys Ser Ile Ile Glu Lys Glu Gln Val Thr Thr Ala
705                 710                 715                 720

Asp Lys Asp Ile Gln Ser Ile Val Ala Asp Leu Ala Gly Ser Pro Ala
            725                 730                 735

Ile Lys Lys Gly Ile Leu Gln Ser Leu Lys Ile Val Asp Glu Leu Val
            740                 745                 750

Ser Val Met Gly Tyr Pro Pro Gln Thr Ile Val Val Glu Met Ala Arg
            755                 760                 765

Glu Asn Gln Thr Thr Gly Lys Gly Lys Asn Asn Ser Arg Pro Arg Tyr
            770                 775                 780

Lys Ser Leu Glu Lys Ala Ile Lys Glu Phe Gly Ser Gln Ile Leu Lys
785                 790                 795                 800

Glu His Pro Thr Asp Asn Gln Glu Leu Arg Asn Asn Arg Leu Tyr Leu
            805                 810                 815

Tyr Tyr Leu Gln Asn Gly Lys Asp Met Tyr Thr Gly Gln Asp Leu Asp
            820                 825                 830

Ile His Asn Leu Ser Asn Tyr Asp Ile Asp His Ile Val Pro Gln Ser
            835                 840                 845

Phe Ile Thr Asp Asn Ser Ile Asp Asn Leu Val Leu Thr Ser Ser Ala
            850                 855                 860

Gly Asn Arg Glu Lys Gly Asp Asp Val Pro Pro Leu Glu Ile Val Arg
865                 870                 875                 880

Lys Arg Lys Val Phe Trp Glu Lys Leu Tyr Gln Gly Asn Leu Met Ser
            885                 890                 895

Lys Arg Lys Phe Asp Tyr Leu Thr Lys Ala Glu Arg Gly Gly Leu Thr
            900                 905                 910
```

```
Glu Ala Asp Lys Ala Arg Phe Ile His Arg Gln Leu Val Glu Thr Arg
        915                 920                 925

Gln Ile Thr Lys Asn Val Ala Asn Ile Leu His Gln Arg Phe Asn Tyr
    930                 935                 940

Glu Lys Asp Asp His Gly Asn Thr Met Lys Gln Val Arg Ile Val Thr
945                 950                 955                 960

Leu Lys Ser Ala Leu Val Ser Gln Phe Arg Lys Gln Phe Gln Leu Tyr
            965                 970                 975

Lys Val Arg Asp Val Asn Asp Tyr His His Ala His Asp Ala Tyr Leu
            980                 985                 990

Asn Gly Val Val Ala Asn Thr Leu Leu Lys Val Tyr Pro Gln Leu Glu
        995                 1000                1005

Pro Glu Phe Val Tyr Gly Asp Tyr His Gln Phe Asp Trp Phe Lys
    1010                1015                1020

Ala Asn Lys Ala Thr Ala Lys Lys Gln Phe Tyr Thr Asn Ile Met
    1025                1030                1035

Leu Phe Phe Ala Gln Lys Asp Arg Ile Ile Asp Glu Asn Gly Glu
    1040                1045                1050

Ile Leu Trp Asp Lys Lys Tyr Leu Asp Thr Val Lys Lys Val Met
    1055                1060                1065

Ser Tyr Arg Gln Met Asn Ile Val Lys Lys Thr Glu Ile Gln Lys
    1070                1075                1080

Gly Glu Phe Ser Lys Ala Thr Ile Lys Pro Lys Gly Asn Ser Ser
    1085                1090                1095

Lys Leu Ile Pro Arg Lys Thr Asn Trp Asp Pro Met Lys Tyr Gly
    1100                1105                1110

Gly Leu Asp Ser Pro Asn Met Ala Tyr Ala Val Val Ile Glu Tyr
    1115                1120                1125

Ala Lys Gly Lys Asn Lys Leu Val Phe Glu Lys Lys Ile Ile Arg
    1130                1135                1140

Val Thr Ile Met Glu Arg Lys Ala Phe Glu Lys Asp Glu Lys Ala
    1145                1150                1155

Phe Leu Glu Glu Gln Gly Tyr Arg Gln Pro Lys Val Leu Ala Lys
    1160                1165                1170

Leu Pro Lys Tyr Thr Leu Tyr Glu Cys Glu Gly Arg Arg Arg
    1175                1180                1185

Met Leu Ala Ser Ala Asn Glu Ala Gln Lys Gly Asn Gln Gln Val
    1190                1195                1200

Leu Pro Asn His Leu Val Thr Leu Leu His Ala Ala Asn Cys
    1205                1210                1215

Glu Val Ser Asp Gly Lys Ser Leu Asp Tyr Ile Glu Ser Asn Arg
    1220                1225                1230

Glu Met Phe Ala Glu Leu Leu Ala His Val Ser Glu Phe Ala Lys
    1235                1240                1245

Arg Tyr Thr Leu Ala Glu Ala Asn Leu Asn Lys Ile Asn Gln Leu
    1250                1255                1260

Phe Glu Gln Asn Lys Glu Gly Asp Ile Lys Ala Ile Ala Gln Ser
    1265                1270                1275

Phe Val Asp Leu Met Ala Phe Asn Ala Met Gly Ala Pro Ala Ser
    1280                1285                1290

Phe Lys Phe Phe Glu Thr Thr Ile Glu Arg Lys Arg Tyr Asn Asn
    1295                1300                1305
```

Leu Lys Glu Leu Leu Asn Ser Thr Ile Ile Tyr Gln Ser Ile Thr
    1310                1315                1320

Gly Leu Tyr Glu Ser Arg Lys Arg Leu Asp Asp
    1325                1330

<210> SEQ ID NO 21
<211> LENGTH: 1053
<212> TYPE: PRT
<213> ORGANISM: Staphylococcus aureus

<400> SEQUENCE: 21

Met Lys Arg Asn Tyr Ile Leu Gly Leu Asp Ile Gly Ile Thr Ser Val
1               5                   10                  15

Gly Tyr Gly Ile Ile Asp Tyr Glu Thr Arg Asp Val Ile Asp Ala Gly
            20                  25                  30

Val Arg Leu Phe Lys Glu Ala Asn Val Glu Asn Asn Glu Gly Arg Arg
        35                  40                  45

Ser Lys Arg Gly Ala Arg Arg Leu Lys Arg Arg Arg His Arg Ile
    50                  55                  60

Gln Arg Val Lys Lys Leu Leu Phe Asp Tyr Asn Leu Leu Thr Asp His
65                  70                  75                  80

Ser Glu Leu Ser Gly Ile Asn Pro Tyr Glu Ala Arg Val Lys Gly Leu
                85                  90                  95

Ser Gln Lys Leu Ser Glu Glu Phe Ser Ala Ala Leu Leu His Leu
            100                 105                 110

Ala Lys Arg Arg Gly Val His Asn Val Asn Glu Val Glu Glu Asp Thr
        115                 120                 125

Gly Asn Glu Leu Ser Thr Lys Glu Gln Ile Ser Arg Asn Ser Lys Ala
    130                 135                 140

Leu Glu Glu Lys Tyr Val Ala Glu Leu Gln Leu Glu Arg Leu Lys Lys
145                 150                 155                 160

Asp Gly Glu Val Arg Gly Ser Ile Asn Arg Phe Lys Thr Ser Asp Tyr
                165                 170                 175

Val Lys Glu Ala Lys Gln Leu Leu Lys Val Gln Lys Ala Tyr His Gln
            180                 185                 190

Leu Asp Gln Ser Phe Ile Asp Thr Tyr Ile Asp Leu Leu Glu Thr Arg
        195                 200                 205

Arg Thr Tyr Tyr Glu Gly Pro Gly Glu Gly Ser Pro Phe Gly Trp Lys
    210                 215                 220

Asp Ile Lys Glu Trp Tyr Glu Met Leu Met Gly His Cys Thr Tyr Phe
225                 230                 235                 240

Pro Glu Glu Leu Arg Ser Val Lys Tyr Ala Tyr Asn Ala Asp Leu Tyr
                245                 250                 255

Asn Ala Leu Asn Asp Leu Asn Asn Leu Val Ile Thr Arg Asp Glu Asn
            260                 265                 270

Glu Lys Leu Glu Tyr Tyr Glu Lys Phe Gln Ile Ile Glu Asn Val Phe
        275                 280                 285

Lys Gln Lys Lys Lys Pro Thr Leu Lys Gln Ile Ala Lys Glu Ile Leu
    290                 295                 300

Val Asn Glu Glu Asp Ile Lys Gly Tyr Arg Val Thr Ser Thr Gly Lys
305                 310                 315                 320

Pro Glu Phe Thr Asn Leu Lys Val Tyr His Asp Ile Lys Asp Ile Thr
                325                 330                 335

Ala Arg Lys Glu Ile Ile Glu Asn Ala Glu Leu Leu Asp Gln Ile Ala
            340                 345                 350

```
Lys Ile Leu Thr Ile Tyr Gln Ser Ser Glu Asp Ile Gln Glu Glu Leu
            355                 360                 365

Thr Asn Leu Asn Ser Glu Leu Thr Gln Glu Glu Ile Glu Gln Ile Ser
370                 375                 380

Asn Leu Lys Gly Tyr Thr Gly Thr His Asn Leu Ser Leu Lys Ala Ile
385                 390                 395                 400

Asn Leu Ile Leu Asp Glu Leu Trp His Thr Asn Asp Asn Gln Ile Ala
                405                 410                 415

Ile Phe Asn Arg Leu Lys Leu Val Pro Lys Lys Val Asp Leu Ser Gln
                420                 425                 430

Gln Lys Glu Ile Pro Thr Thr Leu Val Asp Asp Phe Ile Leu Ser Pro
            435                 440                 445

Val Val Lys Arg Ser Phe Ile Gln Ser Ile Lys Val Ile Asn Ala Ile
450                 455                 460

Ile Lys Lys Tyr Gly Leu Pro Asn Asp Ile Ile Ile Glu Leu Ala Arg
465                 470                 475                 480

Glu Lys Asn Ser Lys Asp Ala Gln Lys Met Ile Asn Glu Met Gln Lys
                485                 490                 495

Arg Asn Arg Gln Thr Asn Glu Arg Ile Glu Glu Ile Ile Arg Thr Thr
            500                 505                 510

Gly Lys Glu Asn Ala Lys Tyr Leu Ile Glu Lys Ile Lys Leu His Asp
            515                 520                 525

Met Gln Glu Gly Lys Cys Leu Tyr Ser Leu Glu Ala Ile Pro Leu Glu
            530                 535                 540

Asp Leu Leu Asn Asn Pro Phe Asn Tyr Glu Val Asp His Ile Ile Pro
545                 550                 555                 560

Arg Ser Val Ser Phe Asp Asn Ser Phe Asn Asn Lys Val Leu Val Lys
                565                 570                 575

Gln Glu Glu Asn Ser Lys Lys Gly Asn Arg Thr Pro Phe Gln Tyr Leu
            580                 585                 590

Ser Ser Ser Asp Ser Lys Ile Ser Tyr Glu Thr Phe Lys Lys His Ile
            595                 600                 605

Leu Asn Leu Ala Lys Gly Lys Gly Arg Ile Ser Lys Thr Lys Lys Glu
            610                 615                 620

Tyr Leu Leu Glu Glu Arg Asp Ile Asn Arg Phe Ser Val Gln Lys Asp
625                 630                 635                 640

Phe Ile Asn Arg Asn Leu Val Asp Thr Arg Tyr Ala Thr Arg Gly Leu
                645                 650                 655

Met Asn Leu Leu Arg Ser Tyr Phe Arg Val Asn Asn Leu Asp Val Lys
                660                 665                 670

Val Lys Ser Ile Asn Gly Gly Phe Thr Ser Phe Leu Arg Arg Lys Trp
            675                 680                 685

Lys Phe Lys Lys Glu Arg Asn Lys Gly Tyr Lys His His Ala Glu Asp
690                 695                 700

Ala Leu Ile Ile Ala Asn Ala Asp Phe Ile Phe Lys Glu Trp Lys Lys
705                 710                 715                 720

Leu Asp Lys Ala Lys Lys Val Met Glu Asn Gln Met Phe Glu Lys
                725                 730                 735

Gln Ala Glu Ser Met Pro Glu Ile Glu Thr Glu Gln Glu Tyr Lys Glu
            740                 745                 750

Ile Phe Ile Thr Pro His Gln Ile Lys His Ile Lys Asp Phe Lys Asp
            755                 760                 765
```

```
Tyr Lys Tyr Ser His Arg Val Asp Lys Lys Pro Asn Arg Glu Leu Ile
    770             775                 780
Asn Asp Thr Leu Tyr Ser Thr Arg Lys Asp Asp Lys Gly Asn Thr Leu
785             790                 795                 800
Ile Val Asn Asn Leu Asn Gly Leu Tyr Asp Lys Asp Asn Asp Lys Leu
                805                 810                 815
Lys Lys Leu Ile Asn Lys Ser Pro Glu Lys Leu Leu Met Tyr His His
            820                 825                 830
Asp Pro Gln Thr Tyr Gln Lys Leu Lys Leu Ile Met Glu Gln Tyr Gly
            835                 840                 845
Asp Glu Lys Asn Pro Leu Tyr Lys Tyr Glu Glu Thr Gly Asn Tyr
850                 855                 860
Leu Thr Lys Tyr Ser Lys Lys Asp Asn Gly Pro Val Ile Lys Lys Ile
865                 870                 875                 880
Lys Tyr Tyr Gly Asn Lys Leu Asn Ala His Leu Asp Ile Thr Asp Asp
                885                 890                 895
Tyr Pro Asn Ser Arg Asn Lys Val Val Lys Leu Ser Leu Lys Pro Tyr
                900                 905                 910
Arg Phe Asp Val Tyr Leu Asp Asn Gly Val Tyr Lys Phe Val Thr Val
                915                 920                 925
Lys Asn Leu Asp Val Ile Lys Lys Glu Asn Tyr Tyr Glu Val Asn Ser
            930                 935                 940
Lys Cys Tyr Glu Glu Ala Lys Lys Leu Lys Lys Ile Ser Asn Gln Ala
945                 950                 955                 960
Glu Phe Ile Ala Ser Phe Tyr Asn Asn Asp Leu Ile Lys Ile Asn Gly
                965                 970                 975
Glu Leu Tyr Arg Val Ile Gly Val Asn Asn Asp Leu Leu Asn Arg Ile
                980                 985                 990
Glu Val Asn Met Ile Asp Ile Thr Tyr Arg Glu Tyr Leu Glu Asn Met
            995                 1000                1005
Asn Asp Lys Arg Pro Pro Arg Ile Ile Lys Thr Ile Ala Ser Lys
    1010                1015                1020
Thr Gln Ser Ile Lys Lys Tyr Ser Thr Asp Ile Leu Gly Asn Leu
    1025                1030                1035
Tyr Glu Val Lys Ser Lys Lys His Pro Gln Ile Ile Lys Lys Gly
    1040                1045                1050

<210> SEQ ID NO 22
<211> LENGTH: 1400
<212> TYPE: PRT
<213> ORGANISM: Klebsiella pneumoniae

<400> SEQUENCE: 22

Met Ala Pro Lys Lys Arg Lys Val Gly Ile His Gly Val Pro Ala
1               5                   10                  15
Ala Asp Lys Lys Tyr Ser Ile Gly Leu Asp Ile Gly Thr Asn Ser Val
                20                  25                  30
Gly Trp Ala Val Ile Thr Asp Glu Tyr Lys Val Pro Ser Lys Lys Phe
            35                  40                  45
Lys Val Leu Gly Asn Thr Asp Arg His Ser Ile Lys Lys Asn Leu Ile
        50                  55                  60
Gly Ala Leu Leu Phe Asp Ser Gly Glu Thr Ala Glu Ala Thr Arg Leu
65              70                  75                  80
Lys Arg Thr Ala Arg Arg Arg Tyr Thr Arg Arg Lys Asn Arg Ile Cys
                85                  90                  95
```

```
Tyr Leu Gln Glu Ile Phe Ser Asn Glu Met Ala Lys Val Asp Asp Ser
                100                 105                 110

Phe Phe His Arg Leu Glu Glu Ser Phe Leu Val Glu Glu Asp Lys Lys
            115                 120                 125

His Glu Arg His Pro Ile Phe Gly Asn Ile Val Asp Glu Val Ala Tyr
        130                 135                 140

His Glu Lys Tyr Pro Thr Ile Tyr His Leu Arg Lys Lys Leu Val Asp
145                 150                 155                 160

Ser Thr Asp Lys Ala Asp Leu Arg Leu Ile Tyr Leu Ala Leu Ala His
                165                 170                 175

Met Ile Lys Phe Arg Gly His Phe Leu Ile Glu Gly Asp Leu Asn Pro
            180                 185                 190

Asp Asn Ser Asp Val Asp Lys Leu Phe Ile Gln Leu Val Gln Thr Tyr
        195                 200                 205

Asn Gln Leu Phe Glu Glu Asn Pro Ile Asn Ala Ser Gly Val Asp Ala
    210                 215                 220

Lys Ala Ile Leu Ser Ala Arg Leu Ser Lys Ser Arg Arg Leu Glu Asn
225                 230                 235                 240

Leu Ile Ala Gln Leu Pro Gly Glu Lys Lys Asn Gly Leu Phe Gly Asn
                245                 250                 255

Leu Ile Ala Leu Ser Leu Gly Leu Thr Pro Asn Phe Lys Ser Asn Phe
            260                 265                 270

Asp Leu Ala Glu Asp Ala Lys Leu Gln Leu Ser Lys Asp Thr Tyr Asp
        275                 280                 285

Asp Asp Leu Asp Asn Leu Leu Ala Gln Ile Gly Asp Gln Tyr Ala Asp
    290                 295                 300

Leu Phe Leu Ala Ala Lys Asn Leu Ser Asp Ala Ile Leu Leu Ser Asp
305                 310                 315                 320

Ile Leu Arg Val Asn Thr Glu Ile Thr Lys Ala Pro Leu Ser Ala Ser
                325                 330                 335

Met Ile Lys Arg Tyr Asp Glu His His Gln Asp Leu Thr Leu Leu Lys
            340                 345                 350

Ala Leu Val Arg Gln Gln Leu Pro Glu Lys Tyr Lys Glu Ile Phe Phe
        355                 360                 365

Asp Gln Ser Lys Asn Gly Tyr Ala Gly Tyr Ile Asp Gly Gly Ala Ser
    370                 375                 380

Gln Glu Glu Phe Tyr Lys Phe Ile Lys Pro Ile Leu Glu Lys Met Asp
385                 390                 395                 400

Gly Thr Glu Glu Leu Leu Val Lys Leu Asn Arg Glu Asp Leu Leu Arg
                405                 410                 415

Lys Gln Arg Thr Phe Asp Asn Gly Ser Ile Pro His Gln Ile His Leu
            420                 425                 430

Gly Glu Leu His Ala Ile Leu Arg Arg Gln Glu Asp Phe Tyr Pro Phe
        435                 440                 445

Leu Lys Asp Asn Arg Glu Lys Ile Glu Lys Ile Leu Thr Phe Arg Ile
    450                 455                 460

Pro Tyr Tyr Val Gly Pro Leu Ala Arg Gly Asn Ser Arg Phe Ala Trp
465                 470                 475                 480

Met Thr Arg Lys Ser Glu Glu Thr Ile Thr Pro Trp Asn Phe Glu Glu
                485                 490                 495

Val Val Asp Lys Gly Ala Ser Ala Gln Ser Phe Ile Glu Arg Met Thr
            500                 505                 510
```

```
Asn Phe Asp Lys Asn Leu Pro Asn Glu Lys Val Leu Pro Lys His Ser
            515                 520                 525

Leu Leu Tyr Glu Tyr Phe Thr Val Tyr Asn Glu Leu Thr Lys Val Lys
530                 535                 540

Tyr Val Thr Glu Gly Met Arg Lys Pro Ala Phe Leu Ser Gly Glu Gln
545                 550                 555                 560

Lys Lys Ala Ile Val Asp Leu Leu Phe Lys Thr Asn Arg Lys Val Thr
                565                 570                 575

Val Lys Gln Leu Lys Glu Asp Tyr Phe Lys Lys Ile Glu Cys Phe Asp
            580                 585                 590

Ser Val Glu Ile Ser Gly Val Glu Asp Arg Phe Asn Ala Ser Leu Gly
            595                 600                 605

Thr Tyr His Asp Leu Leu Lys Ile Ile Lys Asp Lys Asp Phe Leu Asp
        610                 615                 620

Asn Glu Glu Asn Glu Asp Ile Leu Glu Asp Ile Val Leu Thr Leu Thr
625                 630                 635                 640

Leu Phe Glu Asp Arg Glu Met Ile Glu Glu Arg Leu Lys Thr Tyr Ala
                645                 650                 655

His Leu Phe Asp Asp Lys Val Met Lys Gln Leu Lys Arg Arg Arg Tyr
            660                 665                 670

Thr Gly Trp Gly Arg Leu Ser Arg Lys Leu Ile Asn Gly Ile Arg Asp
        675                 680                 685

Lys Gln Ser Gly Lys Thr Ile Leu Asp Phe Leu Lys Ser Asp Gly Phe
            690                 695                 700

Ala Asn Arg Asn Phe Met Gln Leu Ile His Asp Asp Ser Leu Thr Phe
705                 710                 715                 720

Lys Glu Asp Ile Gln Lys Ala Gln Val Ser Gly Gln Gly Asp Ser Leu
                725                 730                 735

His Glu His Ile Ala Asn Leu Ala Gly Ser Pro Ala Ile Lys Lys Gly
            740                 745                 750

Ile Leu Gln Thr Val Lys Val Val Asp Glu Leu Val Lys Val Met Gly
        755                 760                 765

Arg His Lys Pro Glu Asn Ile Val Ile Glu Met Ala Arg Glu Asn Gln
    770                 775                 780

Thr Thr Gln Lys Gly Gln Lys Asn Ser Arg Glu Arg Met Lys Arg Ile
785                 790                 795                 800

Glu Glu Gly Ile Lys Glu Leu Gly Ser Gln Ile Leu Lys Glu His Pro
                805                 810                 815

Val Glu Asn Thr Gln Leu Gln Asn Glu Lys Leu Tyr Leu Tyr Tyr Leu
            820                 825                 830

Gln Asn Gly Arg Asp Met Tyr Val Asp Gln Glu Leu Asp Ile Asn Arg
        835                 840                 845

Leu Ser Asp Tyr Asp Val Asp His Ile Val Pro Gln Ser Phe Leu Lys
850                 855                 860

Asp Asp Ser Ile Asp Asn Lys Val Leu Thr Arg Ser Asp Lys Asn Arg
865                 870                 875                 880

Gly Lys Ser Asp Asn Val Pro Ser Glu Glu Val Val Lys Lys Met Lys
                885                 890                 895

Asn Tyr Trp Arg Gln Leu Leu Asn Ala Lys Leu Ile Thr Gln Arg Lys
            900                 905                 910

Phe Asp Asn Leu Thr Lys Ala Glu Arg Gly Gly Leu Ser Glu Leu Asp
        915                 920                 925

Lys Ala Gly Phe Ile Lys Arg Gln Leu Val Glu Thr Arg Gln Ile Thr
```

```
                930              935              940
Lys His Val Ala Gln Ile Leu Asp Ser Arg Met Asn Thr Lys Tyr Asp
945              950              955              960

Glu Asn Asp Lys Leu Ile Arg Glu Val Lys Val Ile Thr Leu Lys Ser
                 965              970              975

Lys Leu Val Ser Asp Phe Arg Lys Asp Phe Gln Phe Tyr Lys Val Arg
            980              985              990

Glu Ile Asn Asn Tyr His His Ala His Asp Ala Tyr Leu Asn Ala Val
       995             1000             1005

Val Gly Thr Ala Leu Ile Lys Lys Tyr Pro Lys Leu Glu Ser Glu
   1010             1015             1020

Phe Val Tyr Gly Asp Tyr Lys Val Tyr Asp Val Arg Lys Met Ile
   1025             1030             1035

Ala Lys Ser Glu Gln Glu Ile Gly Lys Ala Thr Ala Lys Tyr Phe
   1040             1045             1050

Phe Tyr Ser Asn Ile Met Asn Phe Phe Lys Thr Glu Ile Thr Leu
   1055             1060             1065

Ala Asn Gly Glu Ile Arg Lys Arg Pro Leu Ile Glu Thr Asn Gly
   1070             1075             1080

Glu Thr Gly Glu Ile Val Trp Asp Lys Gly Arg Asp Phe Ala Thr
   1085             1090             1095

Val Arg Lys Val Leu Ser Met Pro Gln Val Asn Ile Val Lys Lys
   1100             1105             1110

Thr Glu Val Gln Thr Gly Gly Phe Ser Lys Glu Ser Ile Leu Pro
   1115             1120             1125

Lys Arg Asn Ser Asp Lys Leu Ile Ala Arg Lys Lys Asp Trp Asp
   1130             1135             1140

Pro Lys Lys Tyr Gly Gly Phe Asp Ser Pro Thr Val Ala Tyr Ser
   1145             1150             1155

Val Leu Val Val Ala Lys Val Glu Lys Gly Lys Ser Lys Lys Leu
   1160             1165             1170

Lys Ser Val Lys Glu Leu Leu Gly Ile Thr Ile Met Glu Arg Ser
   1175             1180             1185

Ser Phe Glu Lys Asn Pro Ile Asp Phe Leu Glu Ala Lys Gly Tyr
   1190             1195             1200

Lys Glu Val Lys Lys Asp Leu Ile Ile Lys Leu Pro Lys Tyr Ser
   1205             1210             1215

Leu Phe Glu Leu Glu Asn Gly Arg Lys Arg Met Leu Ala Ser Ala
   1220             1225             1230

Gly Glu Leu Gln Lys Gly Asn Glu Leu Ala Leu Pro Ser Lys Tyr
   1235             1240             1245

Val Asn Phe Leu Tyr Leu Ala Ser His Tyr Glu Lys Leu Lys Gly
   1250             1255             1260

Ser Pro Glu Asp Asn Glu Gln Lys Gln Leu Phe Val Glu Gln His
   1265             1270             1275

Lys His Tyr Leu Asp Glu Ile Ile Glu Gln Ile Ser Glu Phe Ser
   1280             1285             1290

Lys Arg Val Ile Leu Ala Asp Ala Asn Leu Asp Lys Val Leu Ser
   1295             1300             1305

Ala Tyr Asn Lys His Arg Asp Lys Pro Ile Arg Glu Gln Ala Glu
   1310             1315             1320

Asn Ile Ile His Leu Phe Thr Leu Thr Asn Leu Gly Ala Pro Ala
   1325             1330             1335
```

```
Ala Phe  Lys Tyr Phe Asp Thr  Thr Ile Asp Arg Lys  Arg Tyr Thr
    1340                1345                1350

Ser Thr  Lys Glu Val Leu Asp  Ala Thr Leu Ile His  Gln Ser Ile
    1355                1360                1365

Thr Gly  Leu Tyr Glu Thr Arg  Ile Asp Leu Ser Gln  Leu Gly Gly
    1370                1375                1380

Asp Lys  Arg Pro Ala Ala Thr  Lys Lys Ala Gly Gln  Ala Lys Lys
    1385                1390                1395

Lys Lys
    1400

<210> SEQ ID NO 23
<211> LENGTH: 1629
<212> TYPE: PRT
<213> ORGANISM: Francisella novicida

<400> SEQUENCE: 23

Met Asn Phe Lys Ile Leu Pro Ile Ala Ile Asp Leu Gly Val Lys Asn
1               5                   10                  15

Thr Gly Val Phe Ser Ala Phe Tyr Gln Lys Gly Thr Ser Leu Glu Arg
            20                  25                  30

Leu Asp Asn Lys Asn Gly Lys Val Tyr Glu Leu Ser Lys Asp Ser Tyr
        35                  40                  45

Thr Leu Leu Met Asn Asn Arg Thr Ala Arg Arg His Gln Arg Arg Gly
    50                  55                  60

Ile Asp Arg Lys Gln Leu Val Lys Arg Leu Phe Lys Leu Ile Trp Thr
65                  70                  75                  80

Glu Gln Leu Asn Leu Glu Trp Asp Lys Asp Thr Gln Gln Ala Ile Ser
                85                  90                  95

Phe Leu Phe Asn Arg Arg Gly Phe Ser Phe Ile Thr Asp Gly Tyr Ser
            100                 105                 110

Pro Glu Tyr Leu Asn Ile Val Pro Glu Gln Val Lys Ala Ile Leu Met
        115                 120                 125

Asp Ile Phe Asp Asp Tyr Asn Gly Glu Asp Asp Leu Asp Ser Tyr Leu
    130                 135                 140

Lys Leu Ala Thr Glu Gln Glu Ser Lys Ile Ser Glu Ile Tyr Asn Lys
145                 150                 155                 160

Leu Met Gln Lys Ile Leu Glu Phe Lys Leu Met Lys Leu Cys Thr Asp
                165                 170                 175

Ile Lys Asp Asp Lys Val Ser Thr Lys Thr Leu Lys Glu Ile Thr Ser
            180                 185                 190

Tyr Glu Phe Glu Leu Leu Ala Asp Tyr Leu Ala Asn Tyr Ser Glu Ser
        195                 200                 205

Leu Lys Thr Gln Lys Phe Ser Tyr Thr Asp Lys Gln Gly Asn Leu Lys
    210                 215                 220

Glu Leu Ser Tyr Tyr His His Asp Lys Tyr Asn Ile Gln Glu Phe Leu
225                 230                 235                 240

Lys Arg His Ala Thr Ile Asn Asp Arg Ile Leu Asp Thr Leu Leu Thr
                245                 250                 255

Asp Asp Leu Asp Ile Trp Asn Phe Asn Phe Glu Lys Phe Asp Phe Asp
            260                 265                 270

Lys Asn Glu Glu Lys Leu Gln Asn Gln Glu Asp Lys Asp His Ile Gln
        275                 280                 285

Ala His Leu His His Phe Val Phe Ala Val Asn Lys Ile Lys Ser Glu
```

```
                290             295             300
Met Ala Ser Gly Gly Arg His Arg Ser Gln Tyr Phe Gln Glu Ile Thr
305                 310             315                 320

Asn Val Leu Asp Glu Asn Asn His Gln Glu Gly Tyr Leu Lys Asn Phe
                325             330                 335

Cys Glu Asn Leu His Asn Lys Lys Tyr Ser Asn Leu Ser Val Lys Asn
                340             345             350

Leu Val Asn Leu Ile Gly Asn Leu Ser Asn Leu Glu Leu Lys Pro Leu
                355             360             365

Arg Lys Tyr Phe Asn Asp Lys Ile His Ala Lys Ala Asp His Trp Asp
                370             375             380

Glu Gln Lys Phe Thr Glu Thr Tyr Cys His Trp Ile Leu Gly Glu Trp
385                 390             395                 400

Arg Val Gly Val Lys Asp Gln Asp Lys Asp Gly Ala Lys Tyr Ser
                405             410             415

Tyr Lys Asp Leu Cys Asn Glu Leu Lys Gln Lys Val Thr Lys Ala Gly
                420             425             430

Leu Val Asp Phe Leu Leu Glu Leu Asp Pro Cys Arg Thr Ile Pro Pro
                435             440             445

Tyr Leu Asp Asn Asn Arg Lys Pro Pro Lys Cys Gln Ser Leu Ile
                450             455             460

Leu Asn Pro Lys Phe Leu Asp Asn Gln Tyr Pro Asn Trp Gln Gln Tyr
465                 470             475                 480

Leu Gln Glu Leu Lys Lys Leu Gln Ser Ile Gln Asn Tyr Leu Asp Ser
                485             490             495

Phe Glu Thr Asp Leu Lys Val Leu Lys Ser Lys Asp Gln Pro Tyr
                500             505             510

Phe Val Glu Tyr Lys Ser Ser Asn Gln Gln Ile Ala Ser Gly Gln Arg
                515             520             525

Asp Tyr Lys Asp Leu Asp Ala Arg Ile Leu Gln Phe Ile Phe Asp Arg
                530             535             540

Val Lys Ala Ser Asp Glu Leu Leu Asn Glu Ile Tyr Phe Gln Ala
545                 550             555                 560

Lys Lys Leu Lys Gln Lys Ala Ser Ser Glu Leu Lys Leu Glu Ser
                565             570             575

Ser Lys Lys Leu Asp Glu Val Ile Ala Asn Ser Gln Leu Ser Gln Ile
                580             585             590

Leu Lys Ser Gln His Thr Asn Gly Ile Phe Glu Gln Gly Thr Phe Leu
                595             600             605

His Leu Val Cys Lys Tyr Tyr Lys Gln Arg Gln Arg Ala Arg Asp Ser
                610             615             620

Arg Leu Tyr Ile Met Pro Glu Tyr Arg Tyr Asp Lys Lys Leu His Lys
625                 630             635                 640

Tyr Asn Asn Thr Gly Arg Phe Asp Asp Asp Asn Gln Leu Leu Thr Tyr
                645             650             655

Cys Asn His Lys Pro Arg Gln Lys Arg Tyr Gln Leu Leu Asn Asp Leu
                660             665             670

Ala Gly Val Leu Gln Val Ser Pro Asn Phe Leu Lys Asp Lys Ile Gly
                675             680             685

Ser Asp Asp Asp Leu Phe Ile Ser Lys Trp Leu Val Glu His Ile Arg
                690             695             700

Gly Phe Lys Lys Ala Cys Glu Asp Ser Leu Lys Ile Gln Lys Asp Asn
705                 710             715                 720
```

-continued

Arg Gly Leu Leu Asn His Lys Ile Asn Ile Ala Arg Asn Thr Lys Gly
            725                 730                 735

Lys Cys Glu Lys Glu Ile Phe Asn Leu Ile Cys Lys Ile Glu Gly Ser
            740                 745                 750

Glu Asp Lys Lys Gly Asn Tyr Lys His Gly Leu Ala Tyr Glu Leu Gly
            755                 760                 765

Val Leu Leu Phe Gly Glu Pro Asn Glu Ala Ser Lys Pro Glu Phe Asp
    770                 775                 780

Arg Lys Ile Lys Lys Phe Asn Ser Ile Tyr Ser Phe Ala Gln Ile Gln
785                 790                 795                 800

Gln Ile Ala Phe Ala Glu Arg Lys Gly Asn Ala Asn Thr Cys Ala Val
            805                 810                 815

Cys Ser Ala Asp Asn Ala His Arg Met Gln Gln Ile Lys Ile Thr Glu
            820                 825                 830

Pro Val Glu Asp Asn Lys Asp Lys Ile Ile Leu Ser Ala Lys Ala Gln
            835                 840                 845

Arg Leu Pro Ala Ile Pro Thr Arg Ile Val Asp Gly Ala Val Lys Lys
    850                 855                 860

Met Ala Thr Ile Leu Ala Lys Asn Ile Val Asp Asp Asn Trp Gln Asn
865                 870                 875                 880

Ile Lys Gln Val Leu Ser Ala Lys His Gln Leu His Ile Pro Ile Ile
            885                 890                 895

Thr Glu Ser Asn Ala Phe Glu Phe Glu Pro Ala Leu Ala Asp Val Lys
            900                 905                 910

Gly Lys Ser Leu Lys Asp Arg Arg Lys Lys Ala Leu Glu Arg Ile Ser
            915                 920                 925

Pro Glu Asn Ile Phe Lys Asp Lys Asn Asn Arg Ile Lys Glu Phe Ala
    930                 935                 940

Lys Gly Ile Ser Ala Tyr Ser Gly Ala Asn Leu Thr Asp Gly Asp Phe
945                 950                 955                 960

Asp Gly Ala Lys Glu Glu Leu Asp His Ile Ile Pro Arg Ser His Lys
            965                 970                 975

Lys Tyr Gly Thr Leu Asn Asp Glu Ala Asn Leu Ile Cys Val Thr Arg
            980                 985                 990

Gly Asp Asn Lys Asn Lys Gly Asn Arg Ile Phe Cys Leu Arg Asp Leu
            995                 1000                1005

Ala Asp Asn Tyr Lys Leu Lys Gln Phe Glu Thr Thr Asp Asp Leu
    1010                1015                1020

Glu Ile Glu Lys Lys Ile Ala Asp Thr Ile Trp Asp Ala Asn Lys
    1025                1030                1035

Lys Asp Phe Lys Phe Gly Asn Tyr Arg Ser Phe Ile Asn Leu Thr
    1040                1045                1050

Pro Gln Glu Gln Lys Ala Phe Arg His Ala Leu Phe Leu Ala Asp
    1055                1060                1065

Glu Asn Pro Ile Lys Gln Ala Val Ile Arg Ala Ile Asn Asn Arg
    1070                1075                1080

Asn Arg Thr Phe Val Asn Gly Thr Gln Arg Tyr Phe Ala Glu Val
    1085                1090                1095

Leu Ala Asn Asn Ile Tyr Leu Arg Ala Lys Lys Glu Asn Leu Asn
    1100                1105                1110

Thr Asp Lys Ile Ser Phe Asp Tyr Phe Gly Ile Pro Thr Ile Gly
    1115                1120                1125

-continued

Asn Gly Arg Gly Ile Ala Glu Ile Arg Gln Leu Tyr Glu Lys Val
    1130            1135                1140

Asp Ser Asp Ile Gln Ala Tyr Ala Lys Gly Asp Lys Pro Gln Ala
    1145            1150                1155

Ser Tyr Ser His Leu Ile Asp Ala Met Leu Ala Phe Cys Ile Ala
    1160            1165                1170

Ala Asp Glu His Arg Asn Asp Gly Ser Ile Gly Leu Glu Ile Asp
    1175            1180                1185

Lys Asn Tyr Ser Leu Tyr Pro Leu Asp Lys Asn Thr Gly Glu Val
    1190            1195                1200

Phe Thr Lys Asp Ile Phe Ser Gln Ile Lys Ile Thr Asp Asn Glu
    1205            1210                1215

Phe Ser Asp Lys Lys Leu Val Arg Lys Lys Ala Ile Glu Gly Phe
    1220            1225                1230

Asn Thr His Arg Gln Met Thr Arg Asp Gly Ile Tyr Ala Glu Asn
    1235            1240                1245

Tyr Leu Pro Ile Leu Ile His Lys Glu Leu Asn Glu Val Arg Lys
    1250            1255                1260

Gly Tyr Thr Trp Lys Asn Ser Glu Glu Ile Lys Ile Phe Lys Gly
    1265            1270                1275

Lys Lys Tyr Asp Ile Gln Gln Leu Asn Asn Leu Val Tyr Cys Leu
    1280            1285                1290

Lys Phe Val Asp Lys Pro Ile Ser Ile Asp Ile Gln Ile Ser Thr
    1295            1300                1305

Leu Glu Glu Leu Arg Asn Ile Leu Thr Thr Asn Asn Ile Ala Ala
    1310            1315                1320

Thr Ala Glu Tyr Tyr Ile Asn Leu Lys Thr Gln Lys Leu His
    1325            1330                1335

Glu Tyr Tyr Ile Glu Asn Tyr Asn Thr Ala Leu Gly Tyr Lys Lys
    1340            1345                1350

Tyr Ser Lys Glu Met Glu Phe Leu Arg Ser Leu Ala Tyr Arg Ser
    1355            1360                1365

Glu Arg Val Lys Ile Lys Ser Ile Asp Asp Val Lys Gln Val Leu
    1370            1375                1380

Asp Lys Asp Ser Asn Phe Ile Ile Gly Lys Ile Thr Leu Pro Phe
    1385            1390                1395

Lys Lys Glu Trp Gln Arg Leu Tyr Arg Glu Trp Gln Asn Thr Thr
    1400            1405                1410

Ile Lys Asp Asp Tyr Glu Phe Leu Lys Ser Phe Phe Asn Val Lys
    1415            1420                1425

Ser Ile Thr Lys Leu His Lys Lys Val Arg Lys Asp Phe Ser Leu
    1430            1435                1440

Pro Ile Ser Thr Asn Glu Gly Lys Phe Leu Val Lys Arg Lys Thr
    1445            1450                1455

Trp Asp Asn Asn Phe Ile Tyr Gln Ile Leu Asn Asp Ser Asp Ser
    1460            1465                1470

Arg Ala Asp Gly Thr Lys Pro Phe Ile Pro Ala Phe Asp Ile Ser
    1475            1480                1485

Lys Asn Glu Ile Val Glu Ala Ile Ile Asp Ser Phe Thr Ser Lys
    1490            1495                1500

Asn Ile Phe Trp Leu Pro Lys Asn Ile Glu Leu Gln Lys Val Asp
    1505            1510                1515

Asn Lys Asn Ile Phe Ala Ile Asp Thr Ser Lys Trp Phe Glu Val

```
            1520                1525                1530

Glu Thr  Pro Ser Asp Leu Arg  Asp Ile Gly Ile Ala  Thr Ile Gln
    1535                1540                1545

Tyr Lys  Ile Asp Asn Asn Ser  Arg Pro Lys Val Arg  Val Lys Leu
    1550                1555                1560

Asp Tyr  Val Ile Asp Asp Ser  Lys Ile Asn Tyr Phe  Met Asn
    1565                1570                1575

His Ser  Leu Leu Lys Ser Arg  Tyr Pro Asp Lys Val  Leu Glu Ile
    1580                1585                1590

Leu Lys  Gln Ser Thr Ile Ile  Glu Phe Glu Ser Ser  Gly Phe Asn
    1595                1600                1605

Lys Thr  Ile Lys Glu Met Leu  Gly Met Lys Leu Ala  Gly Ile Tyr
    1610                1615                1620

Asn Glu  Thr Ser Asn Asn
    1625

<210> SEQ ID NO 24
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 24

Lys Phe Glu Arg Gln
1               5

<210> SEQ ID NO 25
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 25

Arg Lys Val Glu Gln
1               5

<210> SEQ ID NO 26
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 26

Gln Asp Leu Lys Phe
1               5

<210> SEQ ID NO 27
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 27
```

```
Gln Arg Phe Phe Glu
1               5

<210> SEQ ID NO 28
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 28

Asn Arg Val Val Asp
1               5

<210> SEQ ID NO 29
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 29

Gln Arg Asp Lys Val
1               5

<210> SEQ ID NO 30
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 30

Gln Lys Ile Leu Asp
1               5

<210> SEQ ID NO 31
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 31

Gln Lys Lys Glu Leu
1               5

<210> SEQ ID NO 32
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 32

Gln Phe Arg Glu Leu
1               5
```

```
<210> SEQ ID NO 33
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 33

Ile Lys Leu Asp Gln
1               5

<210> SEQ ID NO 34
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 34

Asp Val Val Arg Gln
1               5

<210> SEQ ID NO 35
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 35

Gln Arg Ile Val Glu
1               5

<210> SEQ ID NO 36
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 36

Val Lys Glu Leu Gln
1               5

<210> SEQ ID NO 37
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 37

Gln Lys Val Phe Asp
1               5

<210> SEQ ID NO 38
<211> LENGTH: 5
<212> TYPE: PRT
```

```
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 38

Gln Glu Leu Leu Arg
1               5

<210> SEQ ID NO 39
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 39

Val Asp Lys Leu Asn
1               5

<210> SEQ ID NO 40
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 40

Arg Ile Lys Glu Asn
1               5

<210> SEQ ID NO 41
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 41

Asn Lys Lys Phe Glu
1               5

<210> SEQ ID NO 42
<211> LENGTH: 7
<212> TYPE: PRT
<213> ORGANISM: Simian virus 40

<400> SEQUENCE: 42

Pro Lys Lys Lys Arg Lys Val
1               5

<210> SEQ ID NO 43
<211> LENGTH: 20
<212> TYPE: PRT
<213> ORGANISM: Unknown
<220> FEATURE:
<221> NAME/KEY: source
<223> OTHER INFORMATION: /note="Description of Unknown:
      Nucleoplasmin bipartite NLS sequence"

<400> SEQUENCE: 43
```

```
Ala Val Lys Arg Pro Ala Ala Thr Lys Lys Ala Gly Gln Ala Lys Lys
1               5                   10                  15

Lys Lys Leu Asp
            20

<210> SEQ ID NO 44
<211> LENGTH: 9
<212> TYPE: PRT
<213> ORGANISM: Unknown
<220> FEATURE:
<221> NAME/KEY: source
<223> OTHER INFORMATION: /note="Description of Unknown:
      C-myc NLS sequence"

<400> SEQUENCE: 44

Pro Ala Ala Lys Arg Val Lys Leu Asp
1               5

<210> SEQ ID NO 45
<211> LENGTH: 25
<212> TYPE: PRT
<213> ORGANISM: Caenorhabditis elegans

<400> SEQUENCE: 45

Met Ser Arg Arg Arg Lys Ala Asn Pro Thr Lys Leu Ser Glu Asn Ala
1               5                   10                  15

Lys Lys Leu Ala Lys Glu Val Glu Asn
            20                  25

<210> SEQ ID NO 46
<211> LENGTH: 9
<212> TYPE: PRT
<213> ORGANISM: Escherichia coli

<400> SEQUENCE: 46

Lys Leu Lys Ile Lys Arg Pro Val Lys
1               5

<210> SEQ ID NO 47
<211> LENGTH: 5
<212> TYPE: PRT
<213> ORGANISM: Unknown
<220> FEATURE:
<221> NAME/KEY: source
<223> OTHER INFORMATION: /note="Description of Unknown:
      yeast transcription repressor Mat-alpha-2 sequence"

<400> SEQUENCE: 47

Lys Ile Pro Ile Lys
1               5

<210> SEQ ID NO 48
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 48
ttccagaacc ggaggacaaa g                                           21

<210> SEQ ID NO 49
<211> LENGTH: 20
<212> TYPE: DNA
```

```
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 49
ccaccctagt cattggaggt                                                   20

<210> SEQ ID NO 50
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 50
tttattatct gcacatgtat g                                                 21

<210> SEQ ID NO 51
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 51
ctacctgtac atctgcacaa g                                                 21

<210> SEQ ID NO 52
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 52
atgtgcttca acccatcacg                                                   20

<210> SEQ ID NO 53
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 53
gttggctttc acaaggatgc                                                   20

<210> SEQ ID NO 54
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 54
cacggataaa gacgctggga                                                   20
```

-continued

<210> SEQ ID NO 55
<211> LENGTH: 19
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 55
tcccaggtgc tgacgtagg                                                  19

<210> SEQ ID NO 56
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 56
tagcactggg tgcttaatcc g                                               21

<210> SEQ ID NO 57
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 57
gggtttggtt ggctgctcat                                                 20

<210> SEQ ID NO 58
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 58
accggggcca ctagggacag gat                                             23

<210> SEQ ID NO 59
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 59
aaacatcctg tccctagtgg ccc                                             23

<210> SEQ ID NO 60
<211> LENGTH: 28
<212> TYPE: DNA
<213> ORGANISM: Artificial Sequence
<220> FEATURE:
<221> NAME/KEY: source
<223> OTHER INFORMATION: /note="Description of Artificial Sequence:

-continued

Synthetic primer"

<400> SEQUENCE: 60
gataaagcag acctgcggct gatctatc                                28

<210> SEQ ID NO 61
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 61
ctggcagctg agcgatcagg ttctc                                   25

<210> SEQ ID NO 62
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 62
gatgcccacc ttcccctctc                                         20

<210> SEQ ID NO 63
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 63
agtggtggcc tcattctgga                                         20

<210> SEQ ID NO 64
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 64
ggcttcacga gaaagttga tg                                       22

<210> SEQ ID NO 65
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 65
ggattcacag gcttcaccta c                                       21

<210> SEQ ID NO 66
<211> LENGTH: 20

```
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 66
gagtccgagc agaagaagaa                                                    20

<210> SEQ ID NO 67
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 67
ggaatccctt ctgcagcacc                                                    20

<210> SEQ ID NO 68
<211> LENGTH: 19
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 68
cactttggga ggccgaggc                                                     19

<210> SEQ ID NO 69
<211> LENGTH: 40
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 69
gaacttggtg atgatatcgt gccctctggc cagtcctgat                              40

<210> SEQ ID NO 70
<211> LENGTH: 40
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 70
tttatagtag gatttacacg accaattcct tcattaatct                              40

<210> SEQ ID NO 71
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 71
```
caggttccat gggatgctct                                              20

<210> SEQ ID NO 72
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 72
agcagcagcg gcggcaacag                                              20

<210> SEQ ID NO 73
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 73
gagtccgagc agaagaagaa ggg                                          23

<210> SEQ ID NO 74
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 74
gagtctaagc agaagaagaa gag                                          23

<210> SEQ ID NO 75
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 75
ggaatccctt ctgcagcacc tgg                                          23

<210> SEQ ID NO 76
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 76
ggaaccccgt ctgcagcacc tgg                                          23

<210> SEQ ID NO 77
<211> LENGTH: 23
<212> TYPE: DNA
<213> ORGANISM: Unknown
<220> FEATURE:
<221> NAME/KEY: source
<223> OTHER INFORMATION: /note="Description of Unknown:
       wild-type sequence"
<220> FEATURE:
<221> NAME/KEY: modified_base
<222> LOCATION: (21)..(21)
<223> OTHER INFORMATION: a, c, t, g, unknown or other

<400> SEQUENCE: 77
agcagcagcg gcggcaacag ngg                                              23

<210> SEQ ID NO 78
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
       Synthetic oligonucleotide"

<400> SEQUENCE: 78
agcagcagcg gcggcaacag cgg                                              23

<210> SEQ ID NO 79
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
       Synthetic oligonucleotide"

<400> SEQUENCE: 79
agcagcagca gcagcaacag cgg                                              23

<210> SEQ ID NO 80
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
       Synthetic oligonucleotide"

<400> SEQUENCE: 80
agcagcagcg gcagcaacag cag                                              23

<210> SEQ ID NO 81
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
       Synthetic oligonucleotide"

<400> SEQUENCE: 81
agcagcagca gcagcaacag ggg                                              23

<210> SEQ ID NO 82
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
       Synthetic oligonucleotide"

<400> SEQUENCE: 82

```
agcagcagca gcagcaacag gag                                    23

<210> SEQ ID NO 83
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 83
agcagcagca gcagcaacag cgg                                    23

<210> SEQ ID NO 84
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 84
agcagcagcg gcggcaacag cag                                    23

<210> SEQ ID NO 85
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 85
agcagcagca acagcaacag cgg                                    23

<210> SEQ ID NO 86
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 86
agcagcagca gcagcaacag cag                                    23

<210> SEQ ID NO 87
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 87
agcagcaggg gcggcaacag ggg                                    23
```